United States Patent
Baldasare et al.

(10) Patent No.: US 12,322,986 B2
(45) Date of Patent: Jun. 3, 2025

(54) SYSTEM AND METHOD FOR PROVIDING INTERCONNECTED AND SECURE MOBILE DEVICE CHARGING STATIONS

(71) Applicant: ChargeItSpot, LLC, Philadelphia, PA (US)

(72) Inventors: Douglas Baldasare, Philadelphia, PA (US); Sheri Tate, Philadelphia, PA (US); Robert Kay, Cinnaminson, NJ (US); Jeffrey Bergeland, Philadelphia, PA (US); David Andreasen, Menahga, MN (US); Saran Singh Sound, Boca Raton, FL (US); Michael Weinberg, Philadelphia, PA (US); Ashwin Muthiah, Marietta, GA (US); Omkar Borse, Philadelphia, PA (US); Jake Brigham, Philadelphia, PA (US); Charles Williams, Cornwall, NY (US)

(73) Assignee: ChargeItSpot, LLC, Philadelphia, PA (US)

( * ) Notice: Subject to any disclaimer, the term of this patent is extended or adjusted under 35 U.S.C. 154(b) by 468 days.

(21) Appl. No.: 17/675,136

(22) Filed: Feb. 18, 2022

(65) Prior Publication Data

US 2022/0181887 A1    Jun. 9, 2022

Related U.S. Application Data

(63) Continuation-in-part of application No. 17/239,111, filed on Apr. 23, 2021, now Pat. No. 11,258,282, (Continued)

(51) Int. Cl.
*H02J 7/00* (2006.01)
*G06V 40/10* (2022.01)
(Continued)

(52) U.S. Cl.
CPC ........... *H02J 7/0013* (2013.01); *G06V 40/10* (2022.01); *G07C 9/21* (2020.01); *G08B 21/182* (2013.01);
(Continued)

(58) Field of Classification Search
CPC .............. G06Q 10/0833; G06Q 10/06; G06Q 10/087; G06Q 10/0631; H02J 7/0013;
(Continued)

(56) References Cited

U.S. PATENT DOCUMENTS 5,212,644 A * 5/1993 Frisch ................. G07F 17/0014
235/378
5,668,929 A * 9/1997 Foster, Jr. .............. G10L 15/26
704/E15.045
(Continued)

OTHER PUBLICATIONS

International Search Report/Written Opinion issued in corresponding International Application No. PCT/US23/62840, filed Feb. 17, 2023.

*Primary Examiner* — Dung Hong
(74) *Attorney, Agent, or Firm* — Fox Rothschild LLP

(57) ABSTRACT

A system for charging a plurality of worker devices for use by a plurality of users is disclosed. The system includes one or more charging stations, each charging station including a plurality of storage housings, one or more detection devices, and an identification device, and a controller. The controller is configured to selectively lock and unlock the plurality of worker devices in the plurality of storage housings of the one or more charging stations, electrically charge the plurality of worker devices when locked in the plurality of storage housings of the one or more charging stations, and validate an identity of the plurality of users with the identification device of the one or more charging stations when the plurality of users removes or returns the plurality of worker (Continued)

devices to the plurality of storage housings of the one or more charging stations.

19 Claims, 81 Drawing Sheets

Related U.S. Application Data which is a continuation-in-part of application No. 17/018,833, filed on Sep. 11, 2020, now Pat. No. 11,031,790, which is a continuation of application No. 16/665,479, filed on Oct. 28, 2019, now Pat. No. 10,778,016, which is a continuation-in-part of application No. 15/996,956, filed on Jun. 4, 2018, now Pat. No. 10,742,046, which is a continuation-in-part of application No. 15/362,370, filed on Nov. 28, 2016, now Pat. No. 10,070,250, which is a continuation-in-part of application No. 14/095,866, filed on Dec. 3, 2013, now Pat. No. 9,537,994, said application No. 17/239,111 is a continuation-in-part of application No. 16/986,396, filed on Aug. 6, 2020, now abandoned.

(60) Provisional application No. 62/994,210, filed on Mar. 24, 2020, provisional application No. 61/732,732, filed on Dec. 3, 2012.

(51) Int. Cl.
| | | |
|---|---|---|
| *G07C 9/21* | (2020.01) | |
| *G07C 9/22* | (2020.01) | |
| *G07C 9/32* | (2020.01) | |
| *G08B 21/18* | (2006.01) | |
| *H04L 9/40* | (2022.01) | |
| *H04W 4/02* | (2018.01) | |
| *H04W 4/021* | (2018.01) | |
| *H04W 4/80* | (2018.01) | |
| *H04W 8/18* | (2009.01) | |
| *H04W 12/06* | (2021.01) | |
| *H04W 12/065* | (2021.01) | |

(52) U.S. Cl.
CPC ........ *H02J 7/0047* (2013.01); *H04L 63/0861* (2013.01); *H04W 4/021* (2013.01); *H04W 4/023* (2013.01); *H04W 12/06* (2013.01); *H04W 12/065* (2021.01); *G07C 9/22* (2020.01); *G07C 9/32* (2020.01); *H02J 7/0048* (2020.01); *H04W 4/80* (2018.02); *H04W 8/18* (2013.01)

(58) Field of Classification Search
CPC ........ H02J 7/0047; H02J 7/0048; G07C 9/21; G07C 9/22; G07C 9/32; H04W 12/065; H04W 4/021; H04W 4/023; H04W 12/06; H04W 4/80; H04W 8/18; G06V 40/10; G08B 21/182; H04L 63/0861

See application file for complete search history.

(56) References Cited

U.S. PATENT DOCUMENTS

| | | | |
|---|---|---|---|
| 5,894,277 A * | 4/1999 | Keskin | G07C 9/00896 235/382 |
| 9,373,967 B1 * | 6/2016 | Sullivan | G08B 13/14 |
| 10,032,327 B1 * | 7/2018 | Xin | G07C 9/00563 |
| 10,678,302 B1 * | 6/2020 | Shipman, Jr. | G06F 8/65 |
| 11,591,159 B1 * | 2/2023 | Shipman, Jr. | H02J 7/0042 |
| 2002/0080030 A1 * | 6/2002 | Inomata | G07F 17/0014 340/542 |
| 2002/0191817 A1 * | 12/2002 | Sato | G06V 40/172 382/118 |
| 2003/0052768 A1 * | 3/2003 | Maune | G07C 9/253 340/5.52 |
| 2004/0021551 A1 * | 2/2004 | Yamagishi | G07C 9/33 340/5.52 |
| 2006/0190419 A1 * | 8/2006 | Bunn | G06V 20/52 706/2 |
| 2007/0085655 A1 * | 4/2007 | Wildman | G06V 40/63 109/23 |
| 2013/0132307 A1 * | 5/2013 | Phelps | H02J 7/0013 705/412 |
| 2013/0252577 A1 | 9/2013 | Jordan | |
| 2013/0307382 A1 * | 11/2013 | Garrison | G07F 9/001 312/215 |
| 2013/0340656 A1 * | 12/2013 | Rainier | E05G 1/10 109/23 |
| 2014/0264075 A1 * | 9/2014 | LaPorte | A61L 2/00 250/455.11 |
| 2015/0186840 A1 * | 7/2015 | Torres | A47F 10/02 705/339 |
| 2015/0254760 A1 * | 9/2015 | Pepper | G07F 17/12 705/5 |
| 2016/0364658 A1 | 12/2016 | Khoo et al. | |
| 2017/0033579 A1 * | 2/2017 | Maguire | H02J 7/0044 |
| 2017/0323503 A1 * | 11/2017 | Garcia | G07F 15/006 |
| 2018/0213191 A1 * | 7/2018 | Shen | G07C 9/00563 |
| 2018/0291650 A1 * | 10/2018 | Zabala Zabaleta | E05B 47/0012 |
| 2019/0077597 A1 * | 3/2019 | Janwadkar | C07F 11/00 |
| 2019/0102962 A1 * | 4/2019 | Miller | G07C 9/00309 |
| 2019/0114859 A1 * | 4/2019 | Fee | G07C 9/00912 |
| 2019/0182457 A1 * | 6/2019 | Kanaoka | B60R 25/102 |
| 2020/0210685 A1 * | 7/2020 | Ko | G06V 40/50 |
| 2020/0291682 A1 * | 9/2020 | Pukari | E05B 47/0649 |

\* cited by examiner

Current Charging Sequence
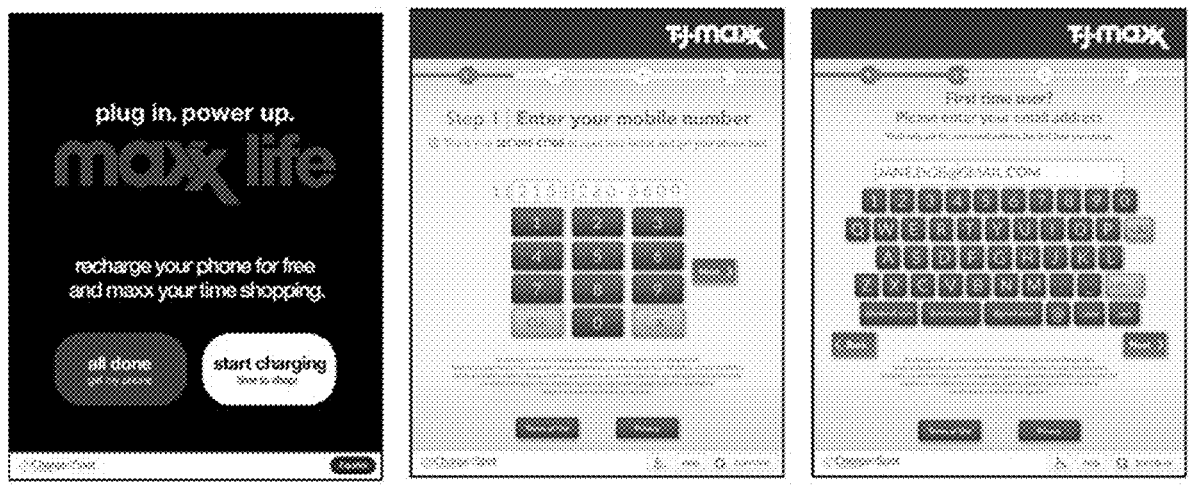
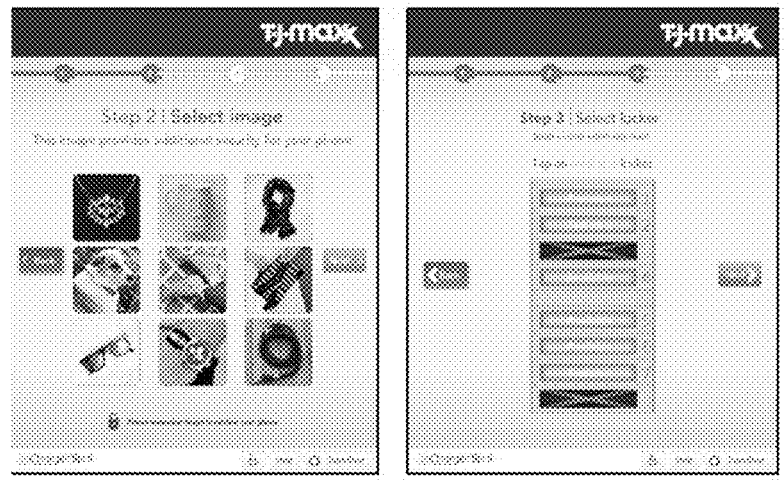
Figure 4G

Photo Verification in English

Photo Verification in Spanish

Attract Screen

Enroll in Rewards Access

Confirm Your Information
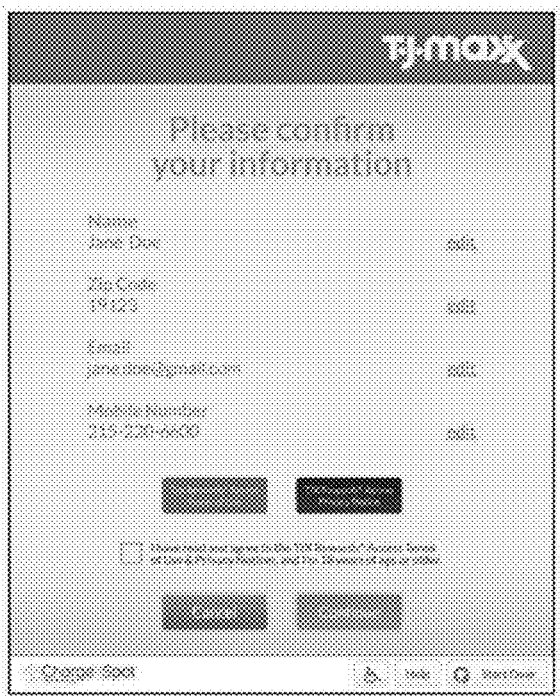
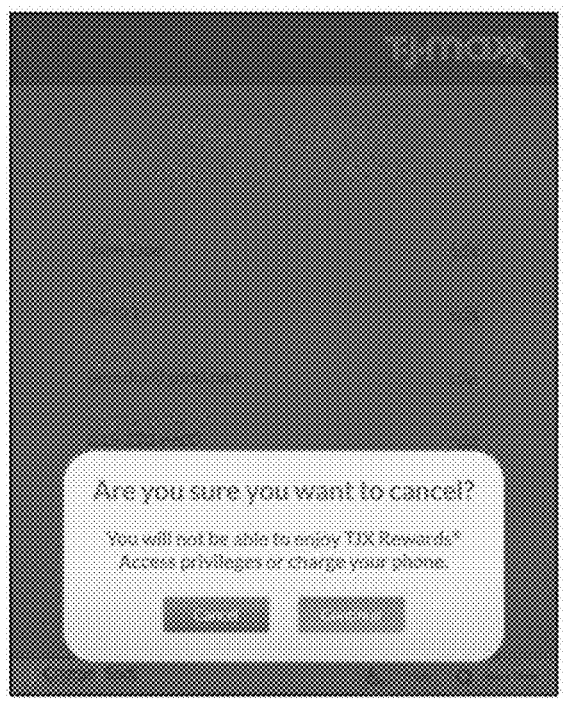
Figure 6E
Figure 6F

Survey Flow

Brief Survey Before you Charge

Progress Bar

1. What is Your Age?

○ Under 18

◉ 18-25

○ 26-30

○ 31-35

○ 36-40

○ 40+

Next

Welcome!

Before you charge up, please answer a few questions about retail shopping.

Figure 7L

Attract Screen

Enter Mobile Number

Oops! Email (or scan) not recognized

Security Image

Select Locker

SYSTEM AND METHOD FOR PROVIDING
INTERCONNECTED AND SECURE MOBILE
DEVICE CHARGING STATIONS

CROSS REFERENCE TO RELATED
APPLICATIONS

This application is a continuation-in-part of U.S. patent application Ser. No. 17/239,111, filed Apr. 23, 2021, which is a continuation-in-part of U.S. patent application Ser. No. 17/018,833, filed Sep. 11, 2020, which is a continuation-in-part of U.S. patent application Ser. No. 16/665,479, filed Oct. 28, 2019, which is a continuation of U.S. patent application Ser. No. 15/996,956, filed Jun. 4, 2018, which is a continuation-in-part of U.S. patent application Ser. No. 15/362,370, filed Nov. 28, 2016 (and now U.S. Pat. No. 10,070,250), which claims priority to U.S. patent application Ser. No. 14/095,866, filed Dec. 3, 2013 (and now U.S. Pat. No. 9,537,994), which claims priority to U.S. Provisional Patent Application No. 61/732,731, filed Dec. 3, 2012, which are hereby incorporated by reference in their entireties. This application is a continuation-in-part of U.S. patent application Ser. No. 17/239,111, filed Apr. 23, 2021, which is also a continuation-in-part of U.S. patent application Ser. No. 16/986,396, filed Aug. 6, 2020, which claims priority to U.S. Provisional Patent Application No. 62/994,210, filed Mar. 24, 2020, which are hereby incorporated by reference in their entireties.

FIELD OF THE INVENTION

The instant disclosure relates to mobile devices, and, in particular, to systems and methods for providing interconnected, secure public or private mobile device charging stations.

BACKGROUND OF THE INVENTION

Mobile devices, such as cellular phones, personal digital assistants, tablets, and the like, are now widely used and heavily depended upon for voice and data communications. In order to maintain proper power levels for the operation of the device, the battery of the mobile device needs to be recharged from time to time. Often, at inopportune times, mobile device users may be located at public or private locations without the ability to recharge the mobile device battery. Even with the existence of public mobile device charging stations, these stations are limited in number and location. Consequently, a mobile device user runs the risk of his mobile device battery being exhausted before locating an available station to recharge the mobile device.

Further, conventional systems employed to charge and dispense mobile devices used by workers such as employees are largely manual in nature, and typically involve a manager using a key to open a storage area where devices that may be worth thousands of dollars are plugged in for charging. An employee typically manually signs out one or more devices at a beginning of a shift, and then returns the devices at the end of the shift. Conventional systems do not include efficient tracking mechanisms to ensure that checked-out devices are returned, resulting in large numbers of relatively expensive devices going missing each year and significant costs due to theft by employees.

The exemplary disclosed system, apparatus, and method are directed to overcoming one or more of the shortcomings set forth above and/or other deficiencies in existing technology.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts:

FIGS. 4G and 4H illustrate a charging sequence and a "get phone" sequence;

FIGS. 6A-6G illustrate loyalty program enrollment;

Figure 7B:
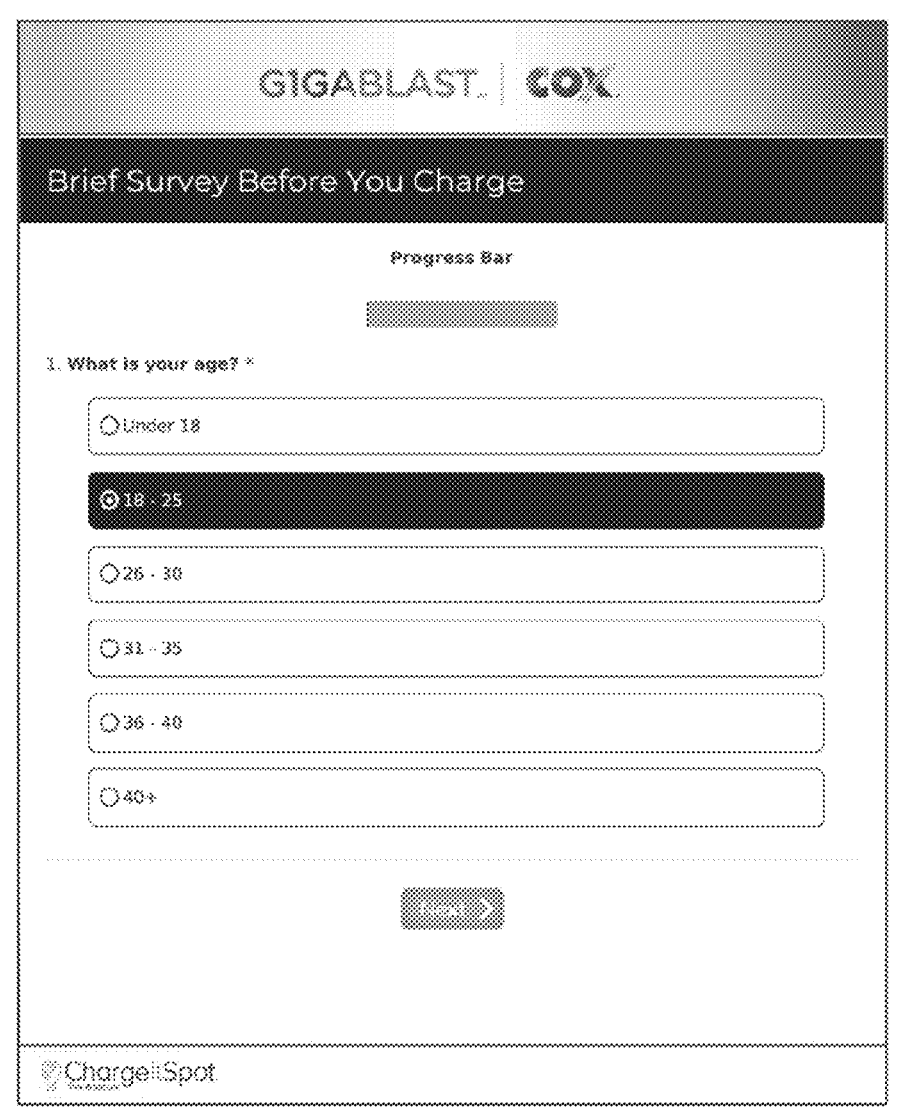
Figure 7D:
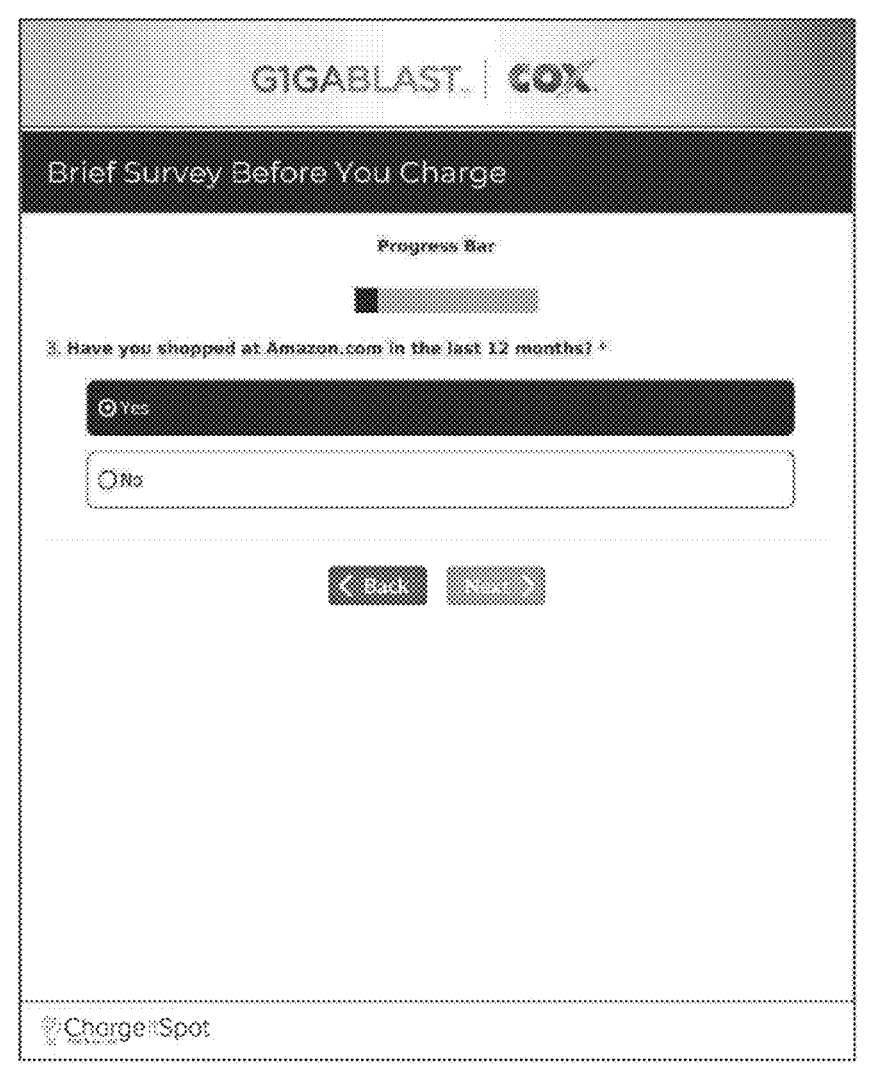
Figure 7H:
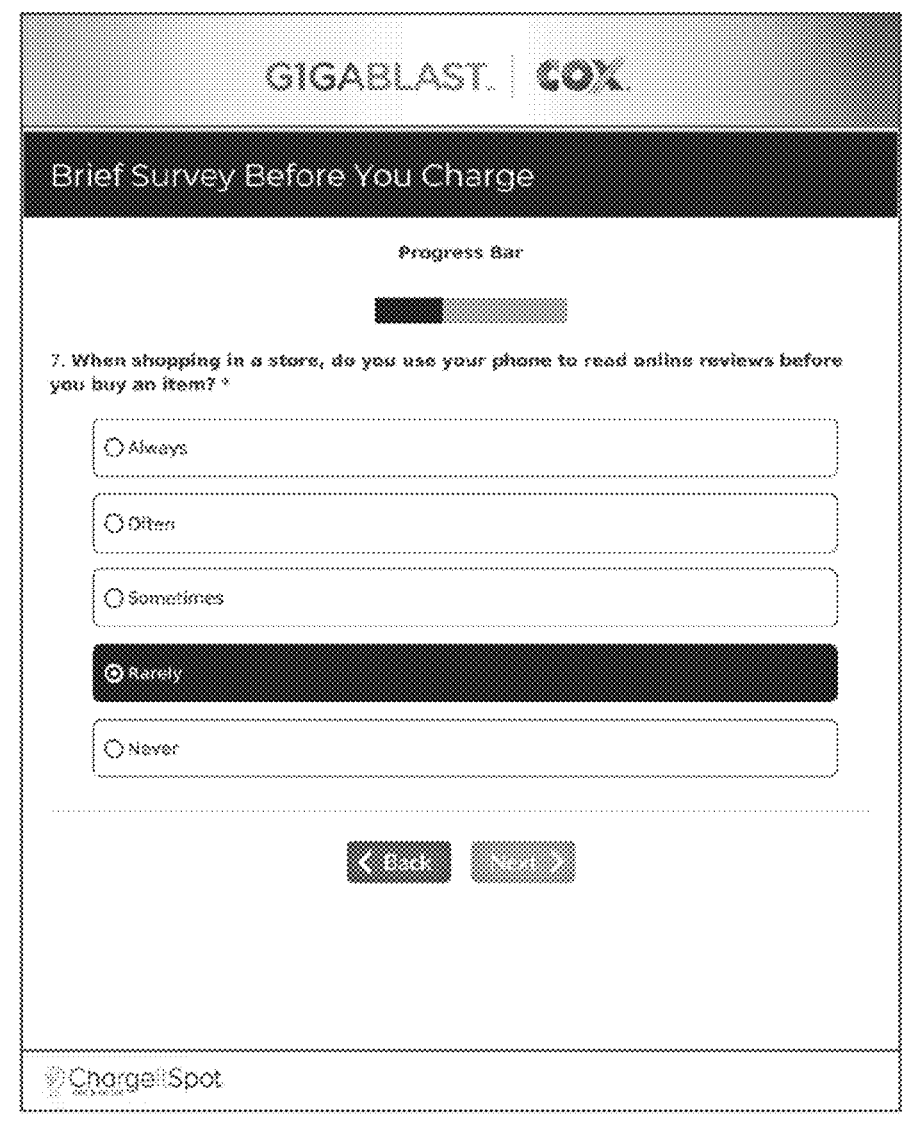
Figure 7I:
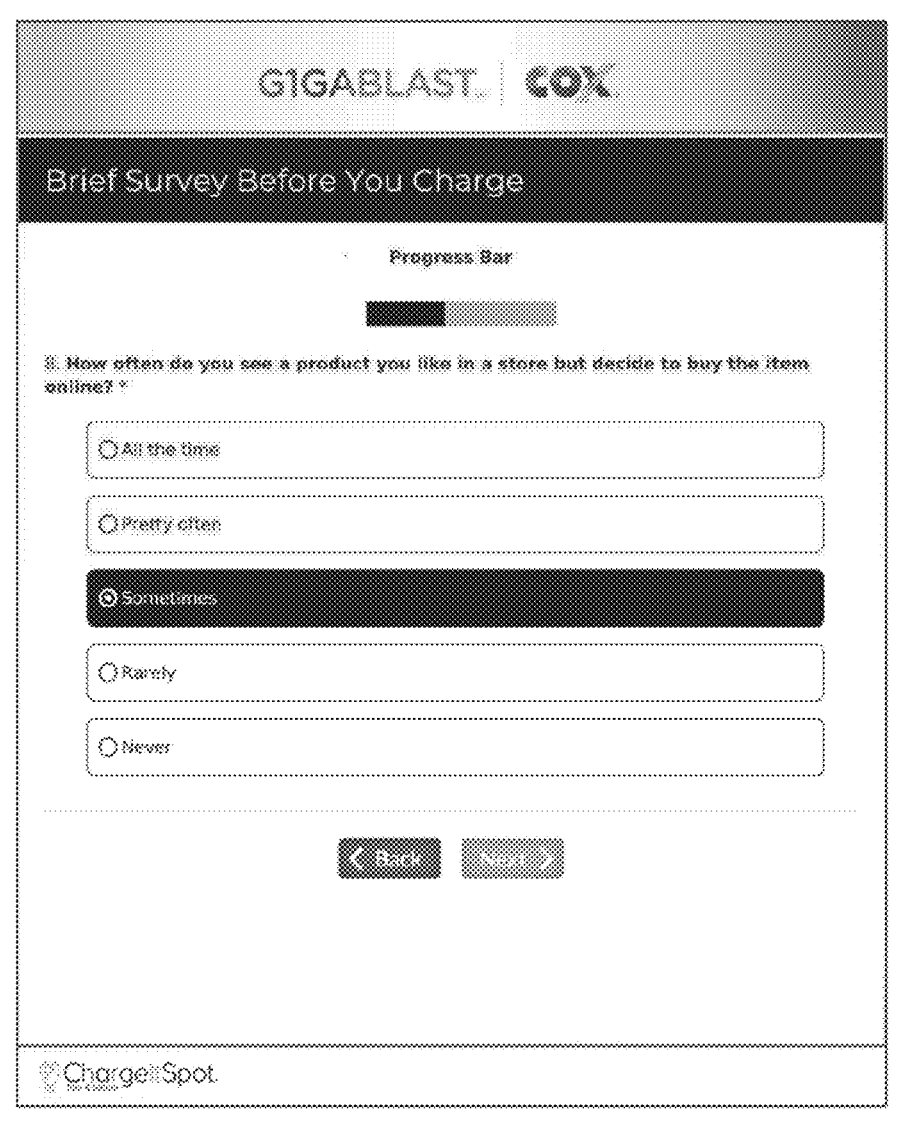
Figure 7K:
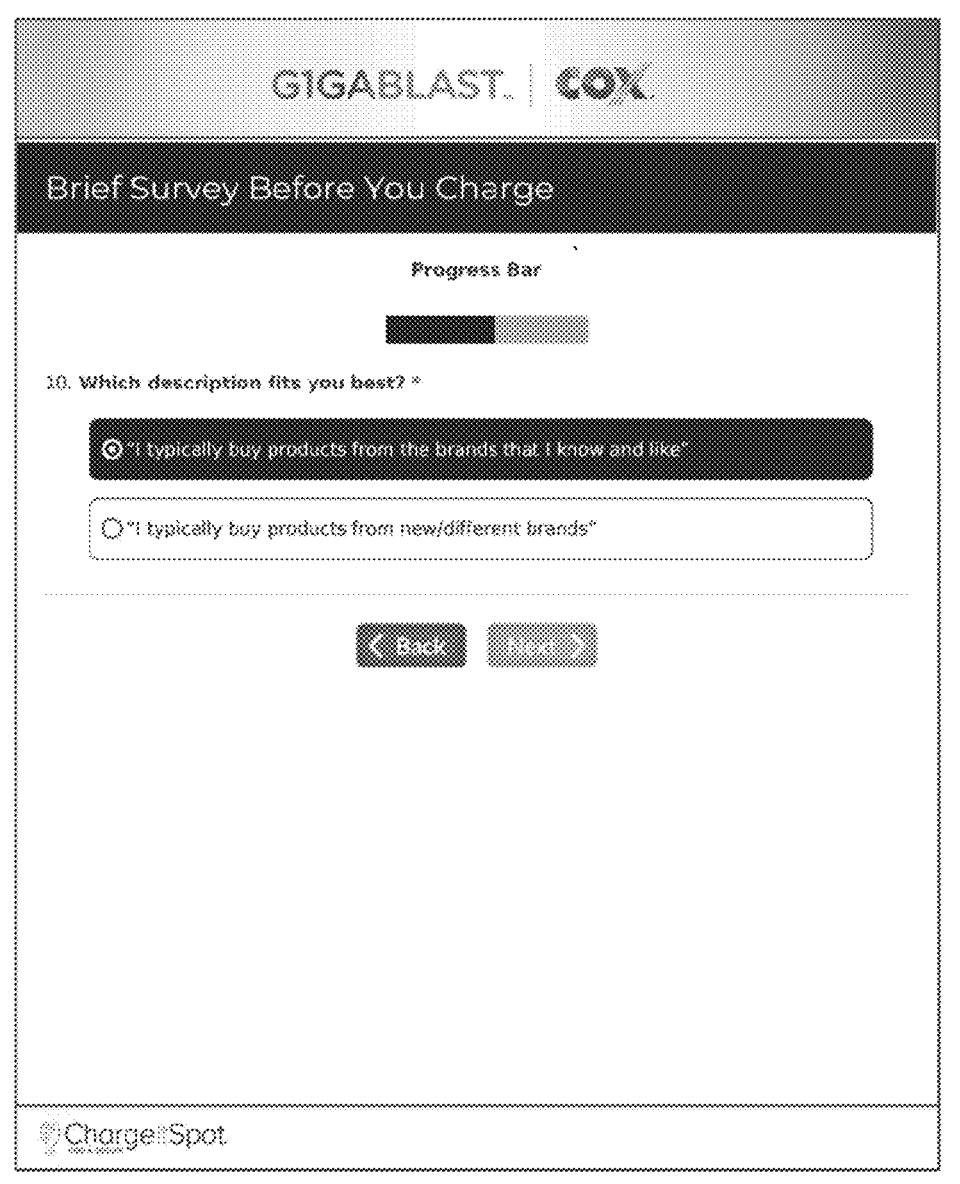

FIGS. 7A-7L illustrate a survey interface embodiment;

SUMMARY OF THE INVENTION

Figure 1:
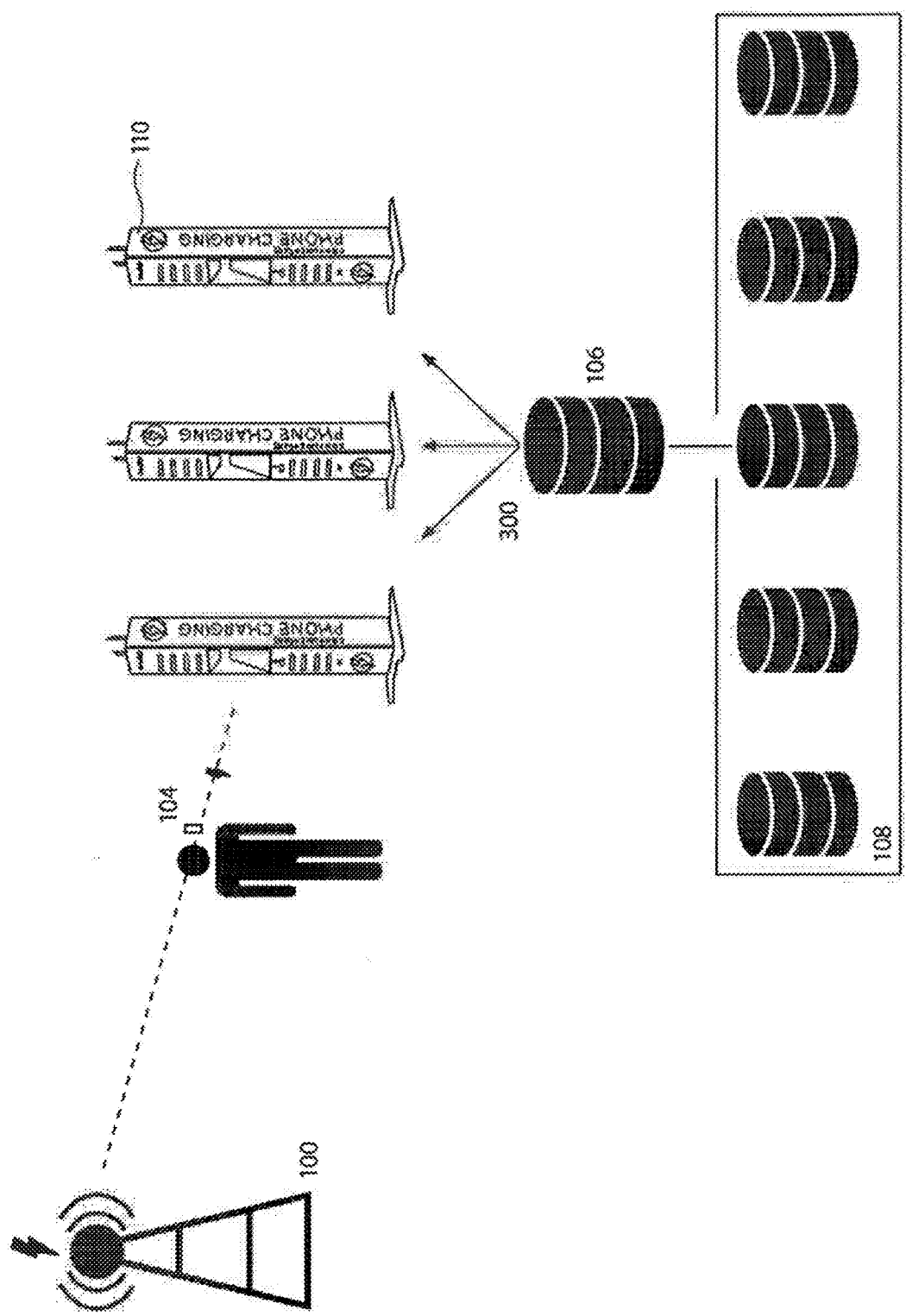
FIG. 1 illustrates a diagram of a system according to embodiments of the present invention.

In one exemplary aspect, the present disclosure is directed to a method. The method includes providing a door that selectively opens to allow access to a cavity and selectively closes to block access to the cavity, using a lock to selectively lock and unlock the door when the door is closed, and electrically charging a user device in the cavity when the door is closed and locked. The method also includes unlocking the door based on a first input provided by a first user, the first user removing the user device, electrically charging the user device in the cavity when the door is closed and locked after the first user returns the user device, and unlocking the door based on a second input provided by a second user, the second user removing the user device.

In another exemplary aspect, the present disclosure is directed to a system for charging at least one user device. The system includes at least one cavity including a door, which selectively opens to allow access to the cavity and selectively closes to block access to the cavity, a lock configured to selectively lock and unlock the door when the door is closed, an electrical charger configured to charge the at least one user device, and an ultraviolet lighting device, and a controller. The controller is configured to control the electrical charger to electrically charge the at least one user device in the at least one cavity when the door is closed and locked, control the lock to unlock the door based on a first input provided by a first user before the first user removes the at least one user device, control the electrical charger to electrically charge the at least one user device in the at least one cavity when the door is closed and locked after the first user returns the at least one user device, and control the lock to unlock the door based on a second input provided by a second user before the second user removes the at least one user device.

In another exemplary aspect, the present disclosure is directed to a system for verifying the identity of a user. The system includes a door that selectively opens to allow access to a cavity and selectively closes to block access to the cavity, a lock configured to selectively lock and unlock the door when the door is closed, a camera configured to image a user area adjacent to the door, computing memory having associated therewith code, and a processor communicatively coupled with the computing memory. The processor communicatively coupled with the computing memory is configured to execute the code and to control the camera to record a first image data of the user area that includes a plurality of first image sets recorded at a plurality of first times, store the first image data, control the camera to record a second image data of the user area that includes a second image set recorded at a second time, and selectively unlock the door based on comparing the second image data to the first image data. Comparing the second image data to the first image data includes transmitting the first and second image data to a remotely-located device, selectively displaying some of the plurality of first images sets on the remotely-located device, and continuously displaying the second image set on the remotely-located device.

In another aspect, the present disclosure is directed to a method. The method includes providing a door that selectively opens to allow access to a cavity and selectively closes to block access to the cavity, using a lock to selectively lock and unlock the door when the door is closed, using a camera to image a user area adjacent to the door, providing computing memory having associated therewith code and a processor communicatively coupled with the computing memory to execute the code, and controlling the camera to record a first image data of the user area that includes a plurality of first image sets recorded at a plurality of first times. The method also includes storing the first image data, locking the door, controlling the camera to record a second image data of the user area that includes a second image set recorded at a second time, transmitting the first and second image data to a remotely-located device, selectively displaying some of the plurality of first images sets on the remotely-located device, continuously displaying the second image set on the remotely-located device, and selectively unlocking the door based on comparing the second image data to the first image data using the remotely-located device.

The present disclosure provides systems and techniques for providing and locating public or private mobile device charging stations.

In embodiments of the present invention, one or more charging stations may be configured to charge a battery of a mobile device. A database may be configured to store location information of the one or more charging stations, as well as mobile device location, charge, and/or other information of the one or more respective mobile devices. A server communicatively coupled with the one or more charging stations and the database may be configured to determine proximity of the one or more charging stations to a location of the mobile device. This determination may be based on the station location information and the mobile device location information. Based on the determined proximity, the server may provide the station location information of a respective one or more charging stations to the mobile device.

By way of example, the location of a charging station may be provided to a device as a push notification, such as including an indication of battery level and the closest charging station; or the location may be provided when an on-device app is proactively opened by the user to see the closest locations, such as may be assessed based on native geo-location services, for example. In the latter methodology, the battery level may not be provided, and the closest stations may be shown in any of a variety of views, such as a list view, that may be selectable by the user.

As such, the server and/or mobile application may monitor, such as pinging the device periodically for, a power level of the battery of the mobile device. Based on the power level of the battery of the mobile device, the user may be alerted via any known methodology, such as via a pop-up alert from an app, and may be provided with location information of the respective one or more charging stations nearest to the mobile device using the methods above.

Thereby, the invention may provide a system and method to alert a user of the locations of nearby public or private charging stations to charge his mobile device when the battery power level of his mobile device decreases to a low level. Moreover, the disclosed system and method also provide a system and method that provides: advertising opportunities for retailers; the ability for retailers to drive traffic to a store or stores; a mobile application—such a mobile application might indicate and/or suggest charging station locations, and/or monitor a user's use and the correspondent battery charge; and the like.

DETAILED DESCRIPTION OF THE EMBODIMENTS

It is to be understood that the figures and descriptions of the present invention have been simplified to illustrate elements that are relevant for a clear understanding of the present invention, while eliminating, for the purpose of clarity, many other elements found in typical network systems, mobile devices, telecommunications servers and telecommunications generally, and associated methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to the disclosed elements and methods known to those skilled in the art.

It would be advantageous for a user to use a system to be alerted of the locations of nearby public or private charging stations to charge his mobile device when the battery power level of his mobile device decreases to a low level. It would be particularly advantageous if such a system and method also provided: advertising opportunities for retailers; the ability for retailers to drive traffic to a store or stores; a mobile application, such as a mobile application that would indicate and/or suggest charging station locations, and/or that would monitor a user's use and the correspondent battery charge; and the like.

Mobile devices, such as cellular phones, personal digital assistants, tablets, and the like are now widely used and heavily depended upon for voice and data communications, and for information generally. In order to be operational, mobile devices typically employ the use of rechargeable batteries. These batteries need to be recharged from time to time in order to maintain proper power levels for the operation of the mobile device. For example, some estimate that the typical user runs very low on battery power in a mobile device multiple times each week.

Because a conventional charger generally utilizes alternating current, and specifically typically uses either 110V or 220V "household" current designed for general use, it is often difficult to recharge a mobile device battery in a public place or while traveling without access to a suitable power terminal. However, the amount of current a phone accepts is generally "stepped down" from the 110V or 220V alternating current, such as typically using a "wall wart" charger that comes with the phone, as would be apparent to the skilled artisan. Thus, even in the case of an available power terminal, such charging would require the user to also be traveling with a charger, which may be inconveniently bulky or easily forgotten. Similarly, while outside and/or travelling in a vehicle, the user may need to have his or her charger available (particularly, a charger that is adapted for the specific device brand and model) in order to use a vehicle's electrical power supply. Thus, public mobile device charging systems suitable for charging mobile devices are highly beneficial.

However, although charging stations are known, and due in part to the ubiquity of mobile device users and the currently limited number of publicly available mobile device charging stations, mobile device users may still have great difficulty locating a public charging station available for use. Consequently, a mobile device user regularly runs the risk of his mobile device battery being exhausted before locating an available station to recharge the mobile device.

Therefore, the present invention provides for a user to have readily available, secure charging capabilities. This is contrary to presently available charging solutions, which are typically non-secure at least in that the only security generally provided is when the user stands nearby to "guard" his/her phone. The inventive aspects may also provide for a user to be alerted of the locations of available public charging stations when the battery power level of his mobile device decreases to a low level. In particular, when the battery power of the mobile device decreases below a predetermined threshold level (for example, 20% of its maximum power), the mobile device may request, from the server, information of one or more registered businesses, i.e., any place of business that includes a charging unit, that house a charging station within a specified distance from the mobile device.

The disclosed system and method may also provide: advertising and differentiating opportunities for retailers; the ability for retailers to drive traffic to, and maintain traffic in, a store or stores; a mobile application, such as a mobile application that would indicate and/or suggest charging station locations, and/or that would monitor a user's use and the correspondent battery charge; and the like. For example, a user's time in-store in a retail establishment is likely to be increased as the user shops while awaiting a recharge. The user is also provided with a differentiated, enhanced customer shopping experience that increases consumer loyalty.

With reference to FIG. 1, GPS satellites (or other known mobile device locating technologies, such as triangulation) 100 operate to determine a location of a mobile device 104 that contains features, some of which features may be available based upon the location data. As used herein, mobile device 104 may refer to cellular phones, personal digital assistants, tablets, and the like. The mobile device 104 may determine its location through the use of received GPS signals, or through the use of a filter which may combine location data from the GPS signals and/or from another system, such as cell-tower-triangulation or a WLAN system in order to obtain a location or a more accurate location. The mobile device 104 may be wirelessly coupled to server 106. The server 106 may be communicatively coupled to a datastore 108, as well as to a plurality of charging stations 110.

According to certain embodiments of the present invention, the server 106 periodically receives and stores location information associated with the mobile device 104. This location information may be sent from the mobile device 104; pulled from the mobile device 104; or obtained from another service that is able to determine the location of the mobile device (e.g., Location Based Services (LBS), Assisted GPS (A-GPS), eGPS, GSM Localization, Multilaterilization, Radiolocation, Trilateration, etc.).

For example, many public areas may provide Wi-Fi access points that consumers are allowed to utilize. These access points may also be used to help ascertain the location of a user or his relation to publicly available charging stations. For example, a Skyhook Wireless system may be used. This location information may be analyzed independent of or in conjunction with other forms of information or location information. For example, Wi-Fi location information may be particularly useful in certain indoor environments where other technologies (e.g. GPS) may have more difficulty functioning, such as in a shopping mall housing a collection of retail businesses.

Embodiments of the present invention allow a mobile device user (who may become registered with the system upon using the charging station 110 for the first time) to be alerted of the locations of available public charging stations when the battery power level of his mobile device decreases, such as to a predetermined threshold level, which may be automatically set or which may be previously set by the user. Accordingly, when the battery power of the mobile device decreases below this predetermined threshold level (for example, 20% of its maximum power), the mobile device may request, from the server, information of one or more registered businesses housing a charging station within a specified distance from the mobile device. Alternatively, the location information of the mobile device may be sent to the server and compared with: the location information of one or more of the registered businesses housing a charging station; a list or a preferential list of registered businesses housing a charging station; a list of registered businesses having charging stations and making offers to consumers that those businesses wish to be known to the consumers; and the like.

By way of non-limiting example only, a mobile device user may be out in public, shopping. Becoming occupied with his shopping, the user may forget or neglect to check the battery power level of his mobile device. The system and method, according to embodiments of the present invention, may notify the user via his mobile device that the battery power of the device is indeed low, and then may display to the user a nearby store which houses a charging station, and that has a charging unit, such as a charging "locker," available. In an embodiment of the present invention, the mobile device app may display the number of charging lockers available so a user does not waste time going to a charging station that does not have any charging lockers available. By being timely notified by the mobile device associated with the disclosed system and method, the user may have enough time to locate and subsequently recharge his mobile device battery for continued use of his mobile device without having to cut short his shopping experience or risk losing operation of his mobile device. As a substantial benefit to a registered business housing the charging station, the business may experience increased consumer traffic, as potential consumers enter the business to recharge their phone, and the opportunity to make targeted enticements to consumers having a known location proximate to the registered business. For example, in a specific retail brand research study, usage of the disclosed cell phone charging kiosk resulted in an increase in dwell time of 130%, an increase in spend of 51%, and an increase in Net Promoter Score of 26%.

Figure 2:
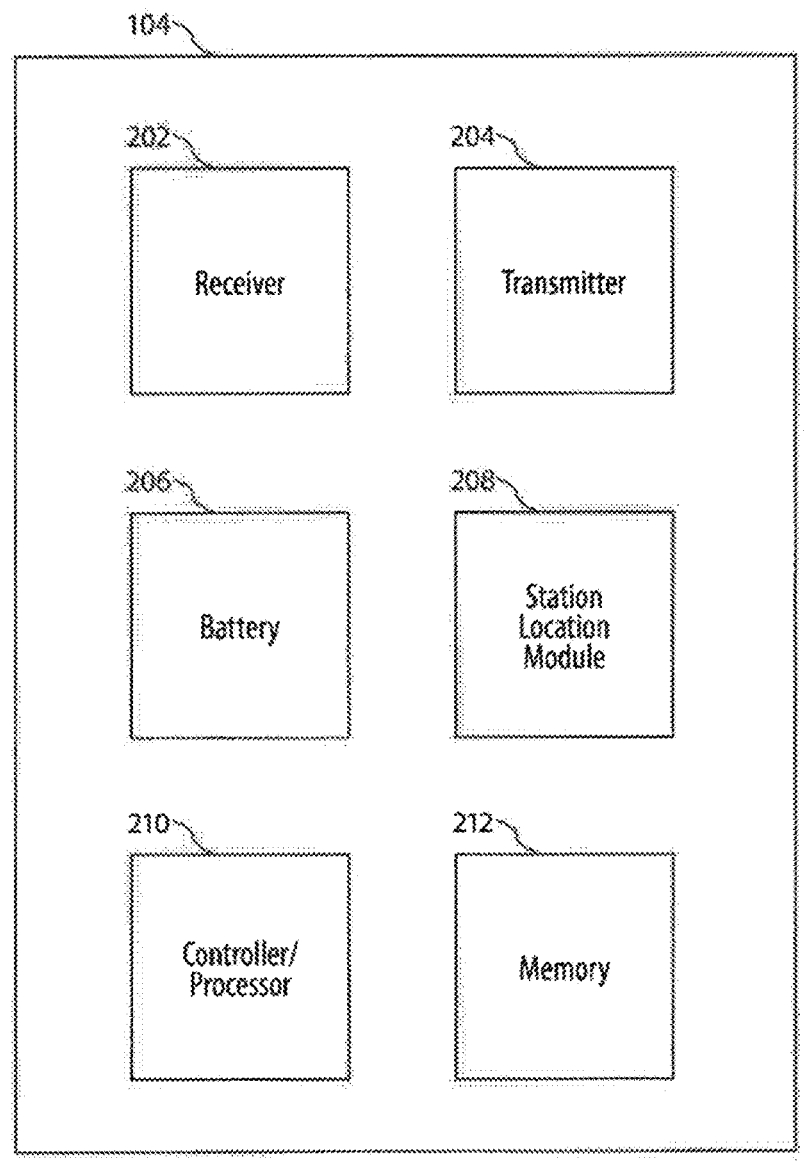
FIG. 2 illustrates a block diagram of a mobile device according to embodiments of the present invention.

FIG. 2 shows a block diagram of a mobile device 104 according to an embodiment. Within the mobile device 104, a receiver 202 may receive signals transmitted from GPS satellites, cell-towers, and/or access points for WLAN communication. A transmitter 204 may transmit signals including location information to the remote server or other access points. Power is provided to the various components of the mobile device 104 through battery 206. A station location module 208 may monitor a power level of the battery 206, and, based on the power level, the station location module 208 may provide station location information to the user of the mobile device 104. It should be noted that the station location module 208 may be able to monitor other functions and features of the mobile device as well. This information may be stored in one or more of databases described in datastore 108. The various modules within the mobile device 104 may operate as described hereinthroughout. A controller/processor 210 may direct the operation of various modules within mobile device 104, such as by execution of software program code to perform the functions discussed hereinthroughout. A memory 212 may store data and program codes for mobile device 104.

Figure 3:
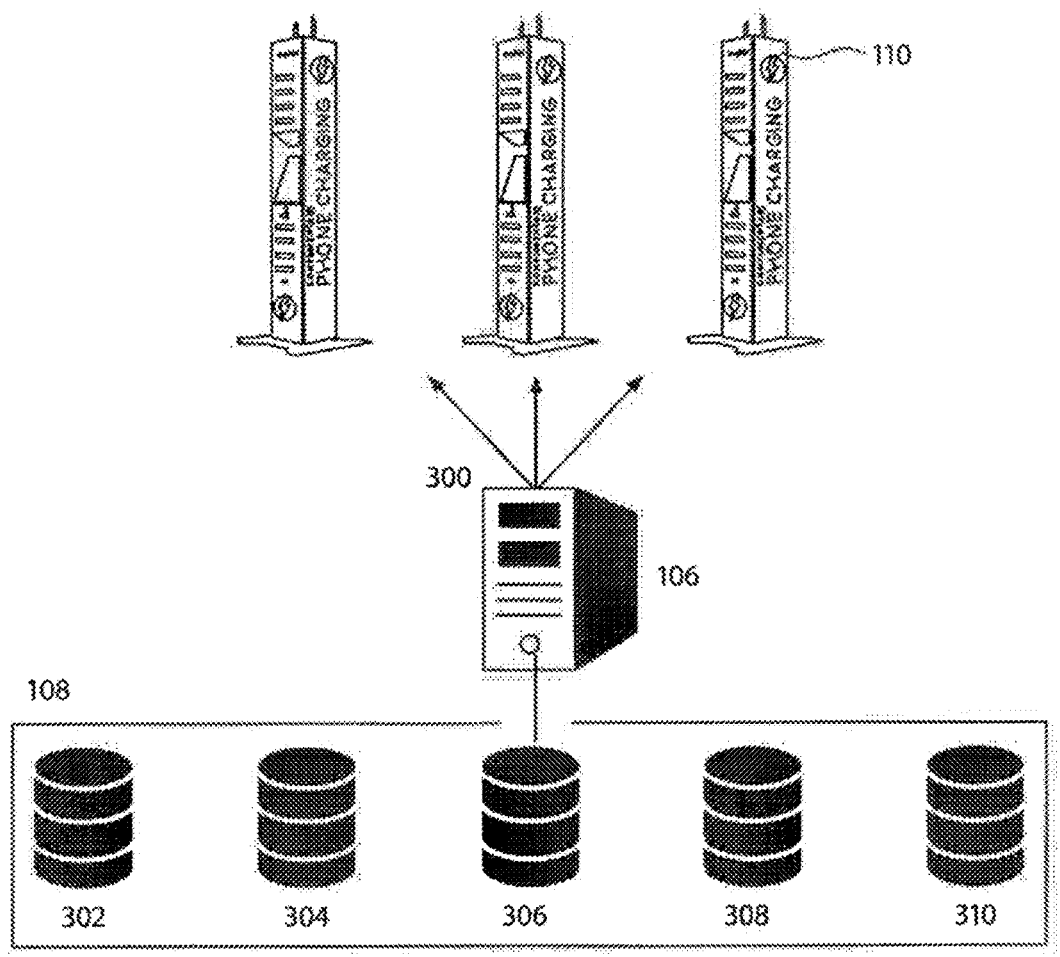
FIG. 3 illustrates a block diagram of a system according to embodiments of the present invention.

FIG. 3 shows a block diagram of a system 300 according to embodiments of the present invention. The system 300 comprises one or more charging stations 110, server 106 and data store 108. In certain embodiments of the present invention, the server 106 performs the tasks of providing charging station information to the mobile device. This charging station information may include geographical locations and/or directions to one or more respective charging stations and registered businesses in which these charging stations are housed or otherwise associated. This charging station information may also include advertisements or other types of information related to the associated businesses. This charging station information, among other types of information, is stored in one of the various databases 302-310 in data store 108. It should be noted that the various databases 302-310 shown in data store 108 may be organized as separate databases, portions of a single database, or by any other logical structure appropriate for storing the data.

Of course, the skilled artisan will appreciate, in light of the disclosure herein, that information and data may also be stored locally at a locker/kiosk/station. Thereby, a user may be enabled to obtain her phone even if power is lost or the network connection of the locker/station goes down. In the case of a power outage, an alternative embodiment may include a UPS (universal power supply) that provides up to 45 minutes of battery backup as an added security measure that allows customers to interact with the kiosk when power is out for short periods of time. Moreover, in order to provide enhanced security in the instant invention, this locally stored information may be periodically purged, such as when a phone is obtained, or daily or weekly.

As illustrated in FIG. 3, data store 108 stores user information in user database 302. This information may include email addresses, phone numbers, user photos, survey responses, duration of charge, and the like.

A map database 304 may also be included. This database 304 may provide the background maps that are displayed on each user's mobile device and that correspond to an area or region around the user at the time the application is invoked (i.e., when the user's mobile device battery is low). For example, a map tile of the United States may provide an image of the continental U.S. that can be zoomed to display a regional street level map for any area in the U.S. The map may further be zoomed to display locations within a venue housing a collection of businesses. For example, a user may be located within a mall, and the application may be invoked due to his mobile device battery being low. The mobile device may display locations of retail stores within the mall which house available charging stations to charge the user's mobile device, either upon zooming in on the application by the user, or by a predetermined setting for displaying a location.

Figure 4A:
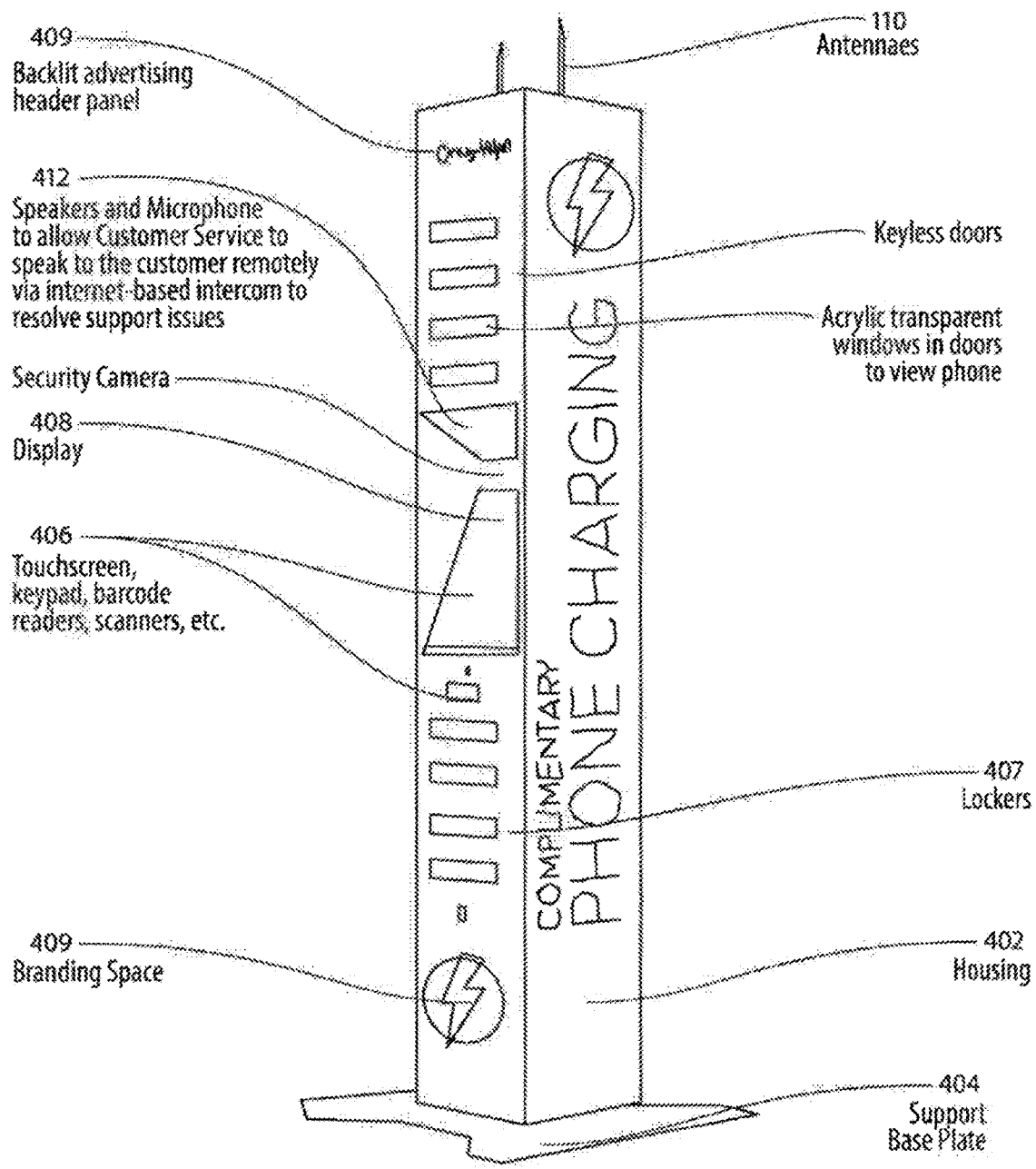
FIG. 4A illustrates an example of a mobile device charging station according to embodiments of the present invention.
Figure 4B:
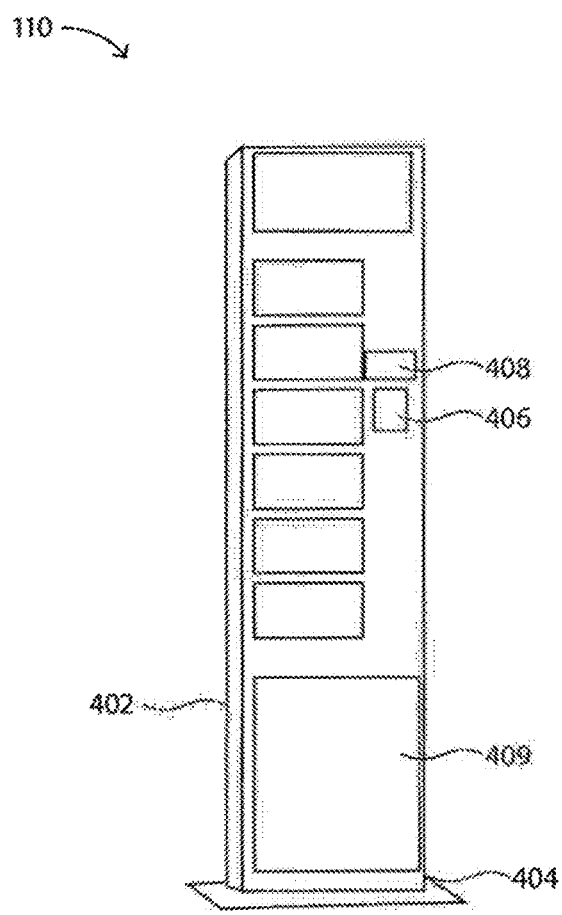
FIG. 4B illustrates another example of a mobile device charging station according to embodiments of the present invention.

A location database 306 may store geographic locations of charging stations and/or geographic locations of mobile devices 104 and/or clusters thereof. A charging station database 308 may store the current status of available lockers within any charging stations. This status may include a number of lockers of a particular charging station not currently in use, or, available, for charging. The data store 108 may also comprise a registered business database 310, which may store information related to businesses currently registered with the charging system according to embodiments of the present invention. For example, the business database 310 may include approved advertisements, or associated content describing respective registered businesses. FIG. 4A illustrates a mobile device charging station 110 according to embodiments of the present invention. This station 110 may be located in a retail store, mall, hospital, stadium, casino, building lobby, or any other location suitable for accessibility. In FIG. 4B, station 110 includes a housing 402 mounted on a support 404. Embodiments may also include, on a face of the charging station 110, branding or advertising space 409 for a registered business to provide information about its business, which may include, by non-limiting example, advertisements, coupons, or any other suitable content related to its business. Each housing 402 may comprise one or more lockers 407, preferably having resident therein supplied power, such as a plurality of charging cords or other wireless charging options, such as supplied power having different plugs, power mats, or like proprietary or third party charging formats for mating to different mobile devices, such as USB plugs, micro-USB, mini-USB or USB-C plugs, laptop tip plugs, and/or one or more proprietary plugs, such as plugs for an iPhone 3, 4, 5, 6, 7, 8, and so on. Of course, any other charging plugs that presently exist or are subsequently developed may be included, as well as any other current or subsequent charging methodologies, such as charging mats, wireless charging, etc. It should be understood that housing 402, support 404, locker 407, and branding space 409 may have any desired dimension or configuration, depending, at least in part, on the particular location of the station 110, and that the overall design of station 110 shown in FIG. 4A is for exemplary purposes only.

By way of example, charging stations may comprise eight lockers, each with multi-use charging cables, and/or multiple different charging cables, there within. The lockers may reside in a structure formed of a suitably durable composition, such as metal, acrylic, plastics or other, and combinations thereof. For example, the door of a charging locker may allow for the user to see inside the locker, but may be formed of a combination or metal or other, and/or an acrylic panel that can withstand forces up to or exceeding, by way of non-limiting example, 10,000 psi.

Of course, a durable cabinet construction may allow for usage in a variety of environments, and the durable construction may be formed accordingly, such as by metal treated with rust proofing. In addition, other measures may be taken for kiosks for use in outdoor environments such as gasketing, heating and ventilation systems, etc. Moreover, the durable housing may house there within a variety of other features, such as antennas, PCBs, and the like, as referenced herein throughout. Alternatively, antennas may be placed atop, behind, or alongside in physical association with a cabinet. In preferred embodiments, the antennas and associated or alternative hardware may be suitable to communicate and/or connect to a network, such as a local or global network, such as the Internet, using any of a variety of different communication methodologies dependent upon the context in which the cabinet is placed, such as using 4G LTE, 3G, a wide area network, a local area network, or the like. Moreover, multiple different antennas may provide this functionality, where a single antenna may provide multiple different functionalities for communication purposes. Accordingly, and dependent in part on location, communication speeds may be optimized by software or firmware algorithms within the cabinet, or remotely by an administrator, by way of non-limiting example.

Additionally, in the event the lockers can be at least partially transparent to a user, other features may be added within each individual charging locker, such as multi-color LEDs or blinking LEDs, also as referenced herein. These additional features may be controlled locally or remotely, such as to provide optionality correspondent to time of year, i.e., Christmas lights, branding of the unit, whether or not a locker is in use (i.e., a red light may mean that locker is in use), and the like.

Different mechanisms may be mounted on or associated with the housing 402 to enable a user to access, lock, and subsequently unlock an individual locker 407 for charging his mobile device 104. For example, the locking mechanism associated with a charging locker, such as in order to provide optimal security, may be break proof or resistant, such as withstanding up to or in excess of 1,000 pounds of force before yielding.

Referring to FIG. 4A, another mechanism, such as a bar code scanner or card or key FOB reader, and/or a display 408, such as a touch screen display (which may also display ads, coupons, codes and/or other aspects referenced herein), and/or a keypad 406 mounted to the housing 402, may allow for the collection of more user information. Coupled with a display 408 and microcontroller (not shown) connected to an electronic, keyless lock 413 (FIG. 4C), a user may be provided with instructions and options for charging his or her mobile device 104. For example, the locker 407 may be preprogrammed by the microcontroller (not shown) to accept a selected sequence or information entry by a new user when the electronic lock is unlatched (i.e. the locker 407 is open). The microcontroller (not shown) may be configured to accept the same sequence or information first entered by the user causing the lock to unlatch, allowing the user to remove his phone from the locker after use. This sequence or information may include user identifying information, such as the user's telephone number, key code, pin numbers, security questions, email addresses, selection of security images, scanning of a bar code (such as on a ticket provided by the kiosk to a user when the user placed the phone in the locker), etc.

The display 408 may thus prompt the user for other identifying information for the collection and subsequent storage of user shopping information which may be valuable to retailers/registered businesses. For example, the display 408 may prompt the user to enter his name, a telephone number, an email address, a name and/or telephone number in conjunction with other information, such as a security "pin" having 2, 3, 4, 5, 6 or more digits or such as a security image, a loyalty program identifier, or the like.

By way of example, upon actuation of keypad 406 or touch display 408, the display may prompt the user to enter his telephone number. It should be noted that other and/or additional user identifying information may be gathered as a part of these instructions. This gathered information may be used to serve several purposes. One purpose may be to provide verification information that the user is, indeed, who he says he is (such as by way of comparison to registered user information for system 300, by way of verification with information stored in the mobile application having associated therewith the aforementioned map and battery charge level capabilities, and/or by comparison with personal information on or associated with the mobile device. Another purpose is to ensure that only the user (or, an individual authorized by the user) is able to access the mobile device 104 from the locker 407 after the mobile device has been locked in the given locker 407. Yet further and as mentioned above, another purpose for the prompted user identifying information is to gather information about the user's shopping habits and/or frequented registered businesses, and/or other information as described hereinthroughout, which may be subsequently stored in user database 302 (as shown in FIG. 3).

The embodiments may thus include one or more remote, or local, data warehouses/databases 302. The data warehouse may include user information as discussed above and throughout, and/or may comprise reports, calculations, and the like, run over a predetermined time period in association with a kiosk or a group of kiosks, such as once per day. The data in the data warehouse may be segregated by user, user type, brand, group, and so on. For example, phone numbers and emails may be indicative of uniquely personal identifying information, and as such may be segregated by brand or group to which the user is willing to allow that information to be provided. Needless to say, this may provide enhanced security of use to users.

Also, as a security feature, the display 408 may display an image of which a user has previously selected upon initially accessing an available locker. For example, the user may enter a telephone number, and then either select or be shown an image, such as a black dog. Upon returning to unlock the locker, the user may be prompted to enter his phone number, and then to select the appropriate image that matches the preselected image in order to unlock the locker.

Figure 5A:
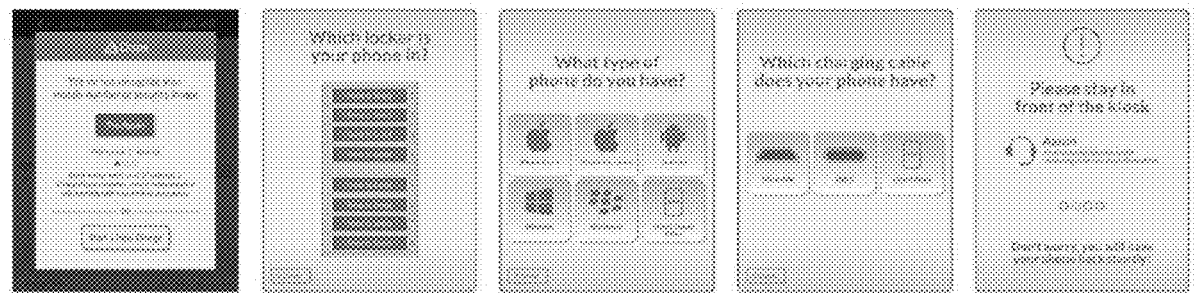
FIGS. 5A and 5B illustrate PhotoVerification in English and Spanish, respectively.
Figure 5B:
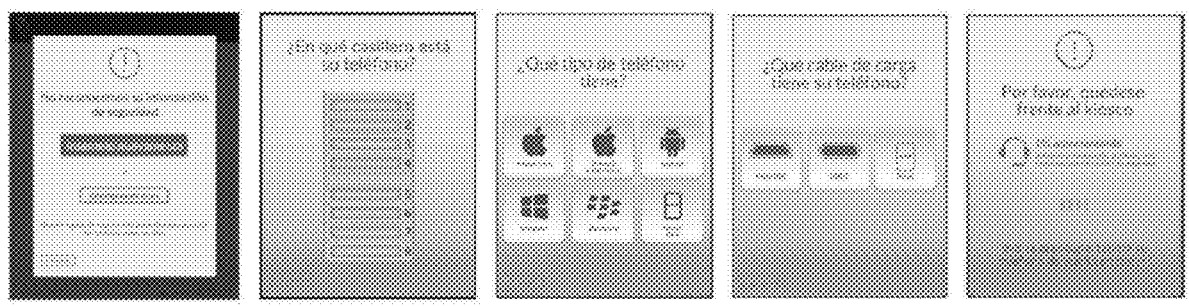
Figure 6A:
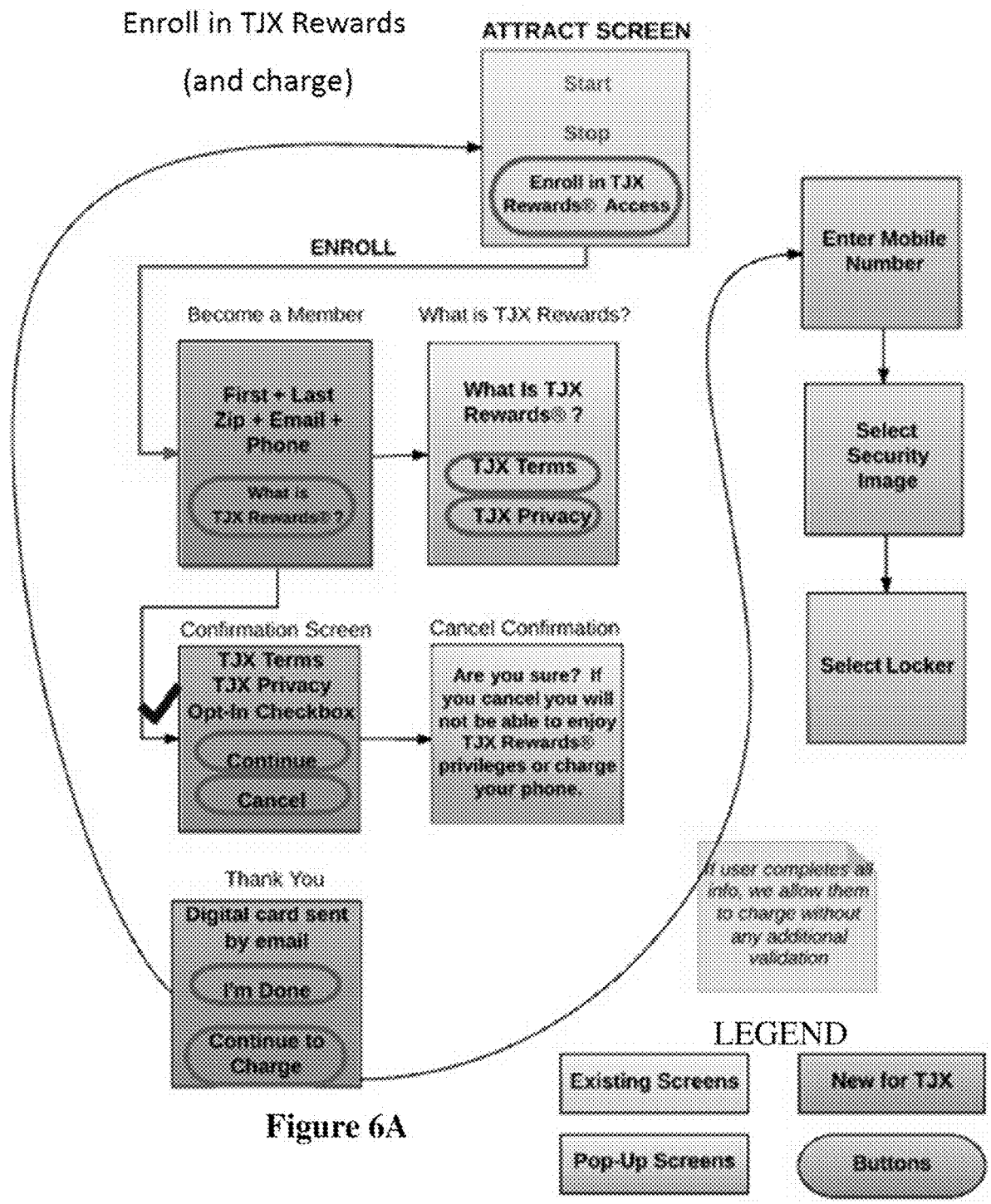
Figure 6B:
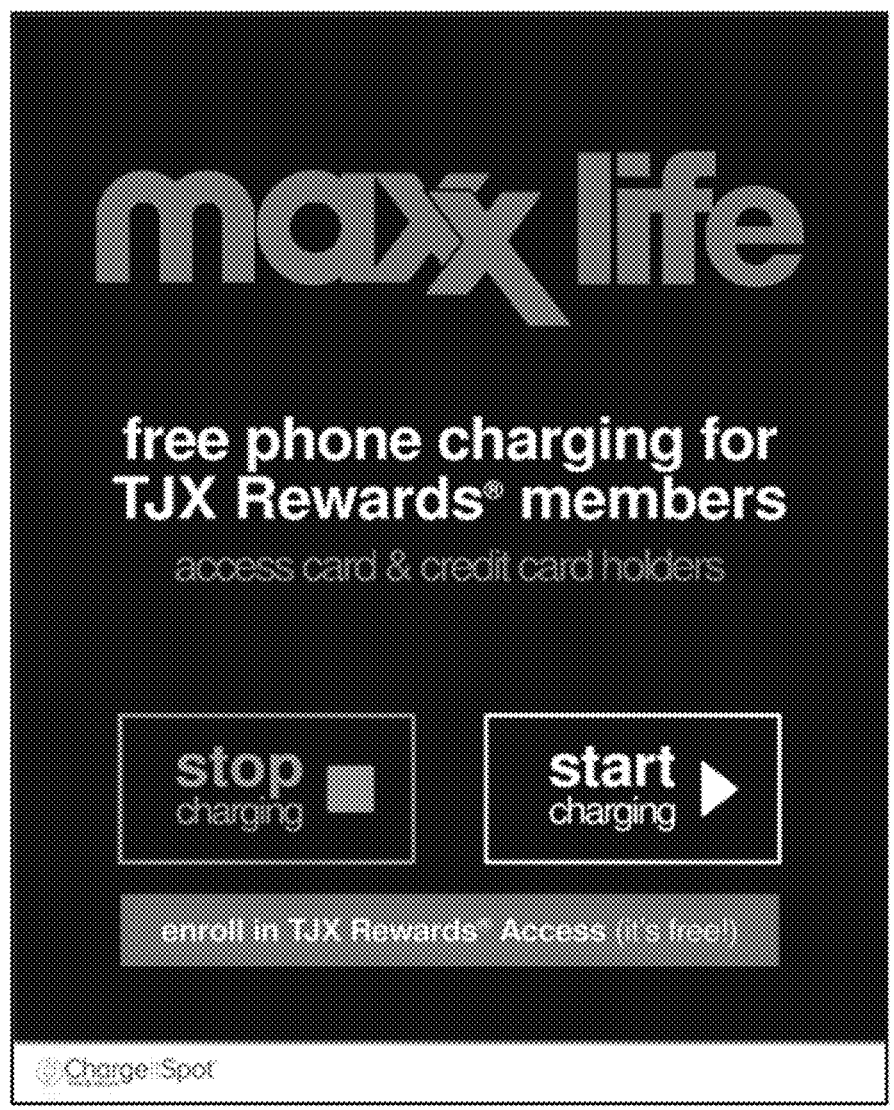
Figure 6C:
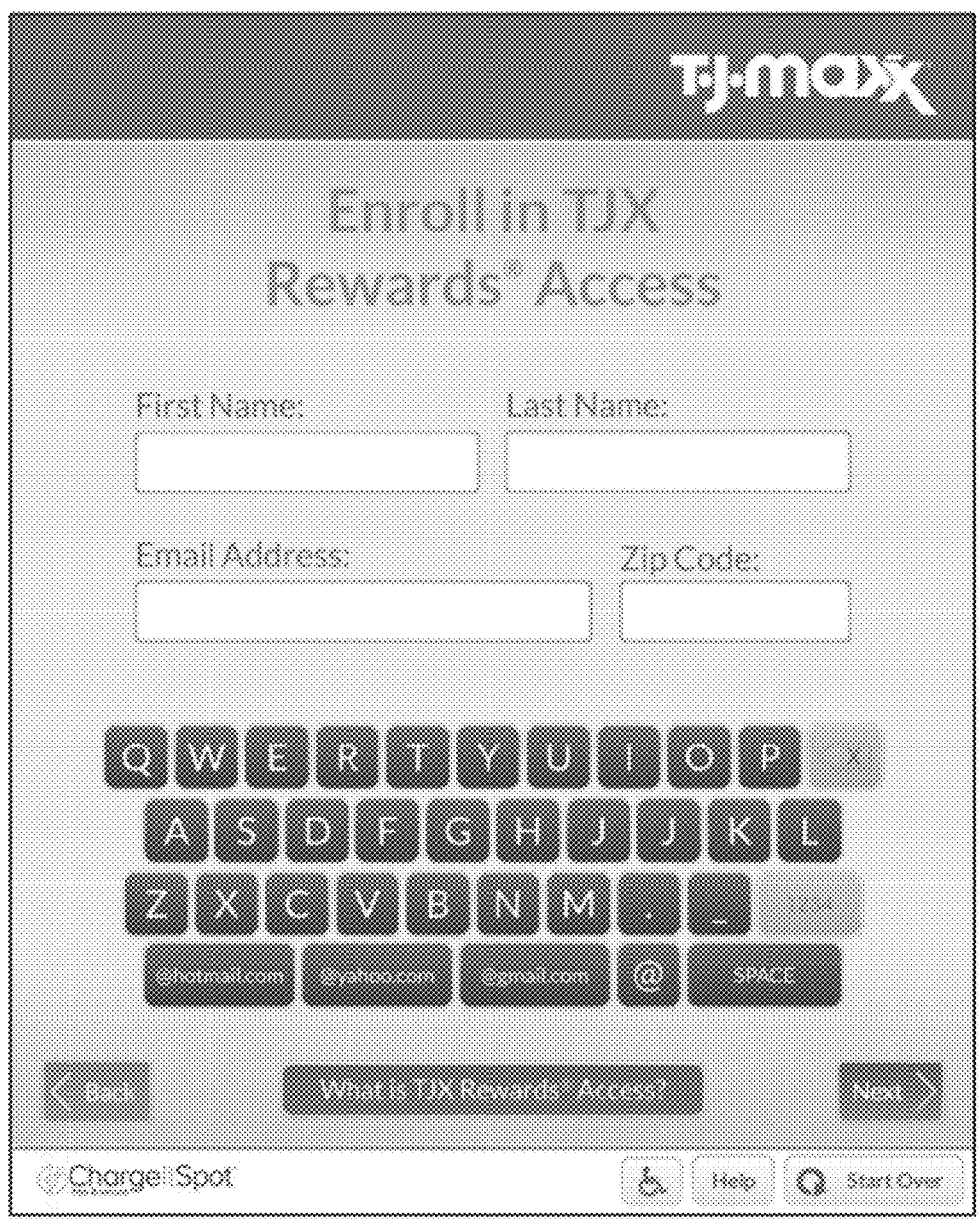
Figure 6D:
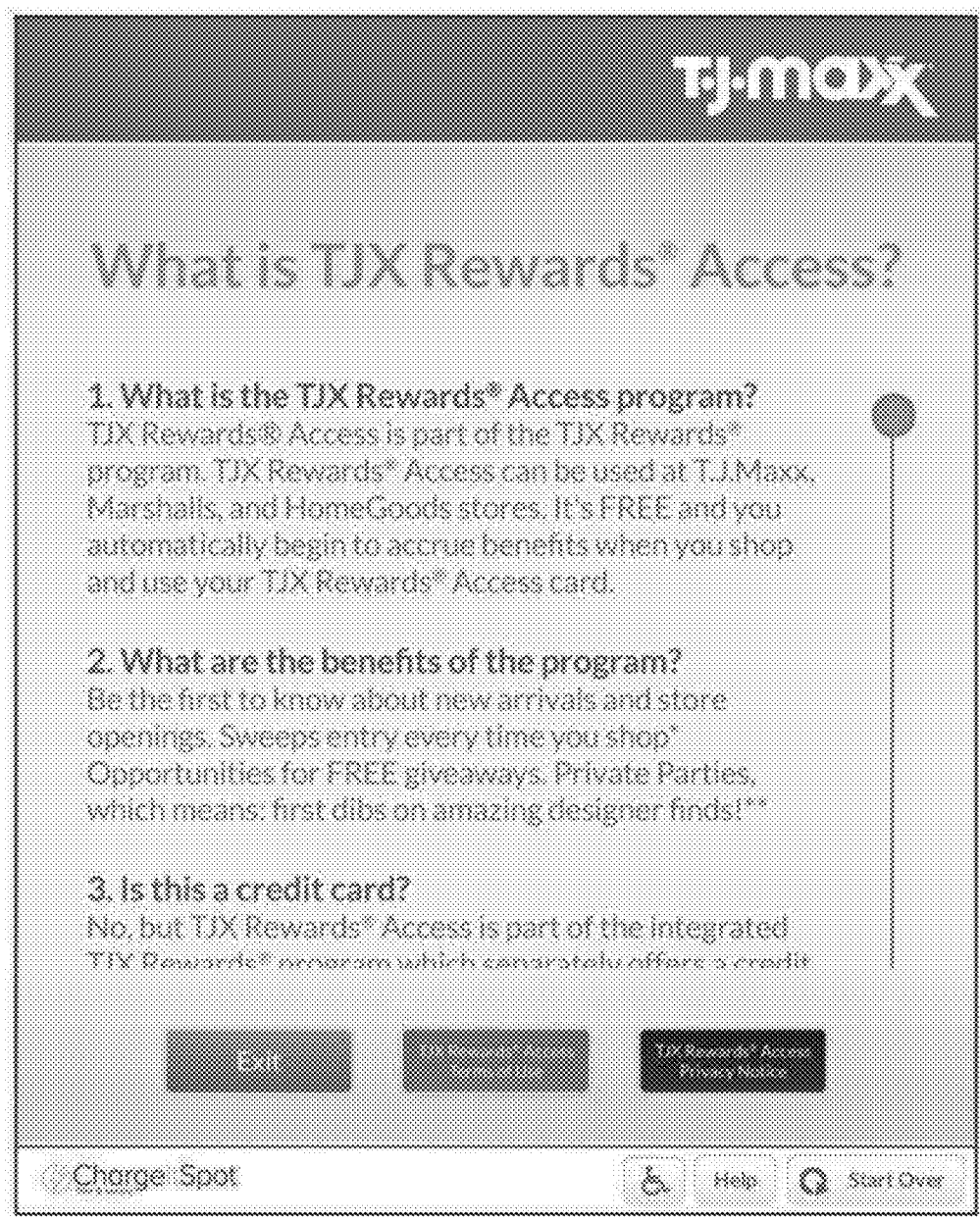
Figure 6G:
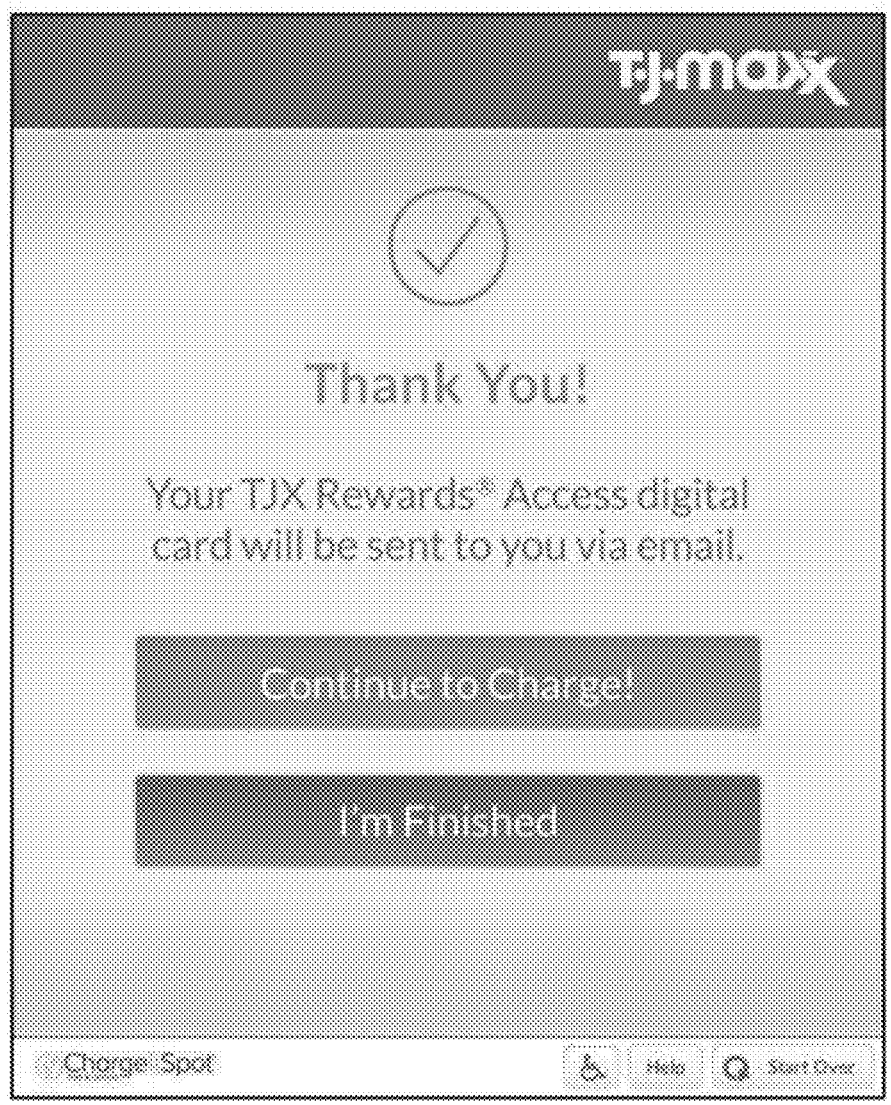
Figure 7A:
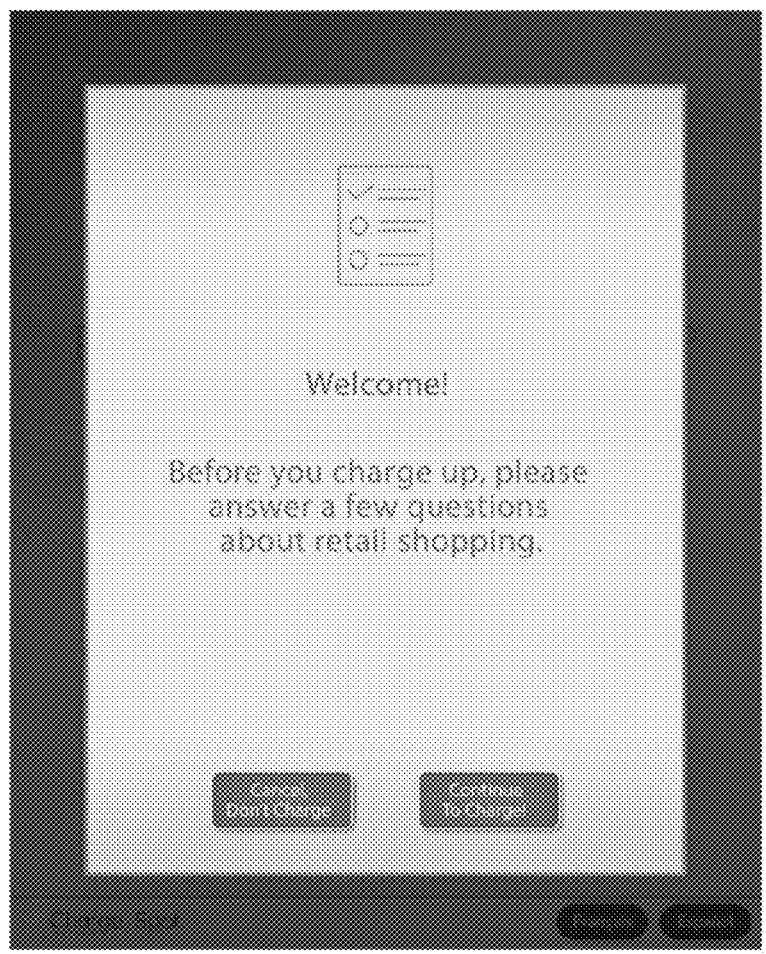
Figure 7C:
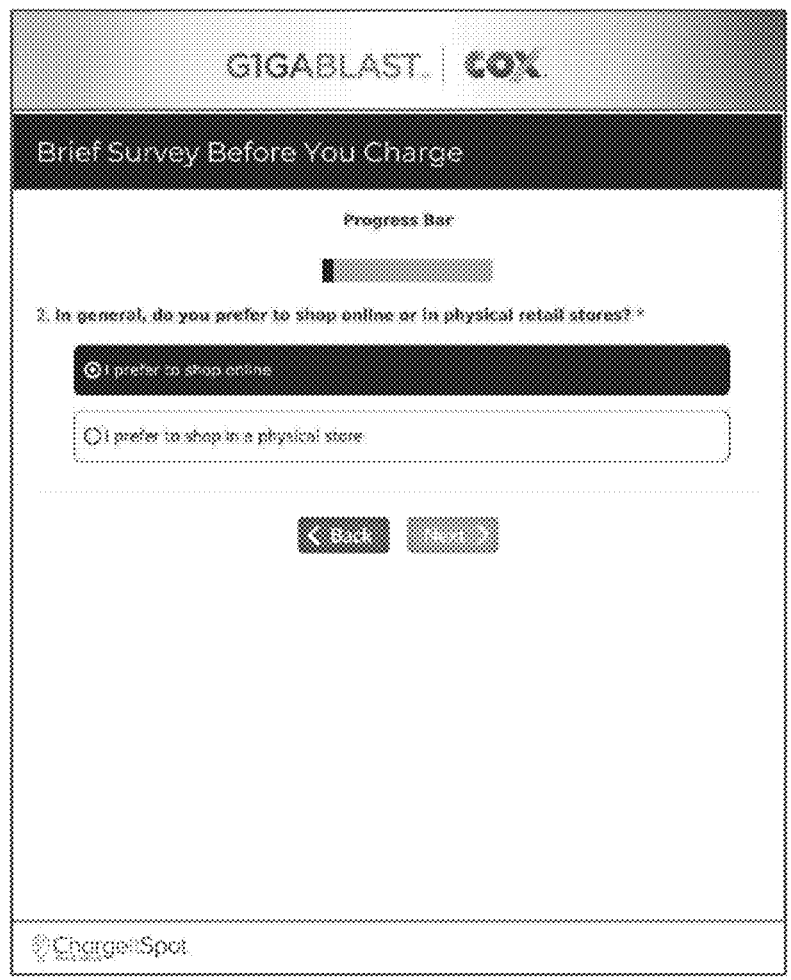
Figure 7E:
Figure 7F:
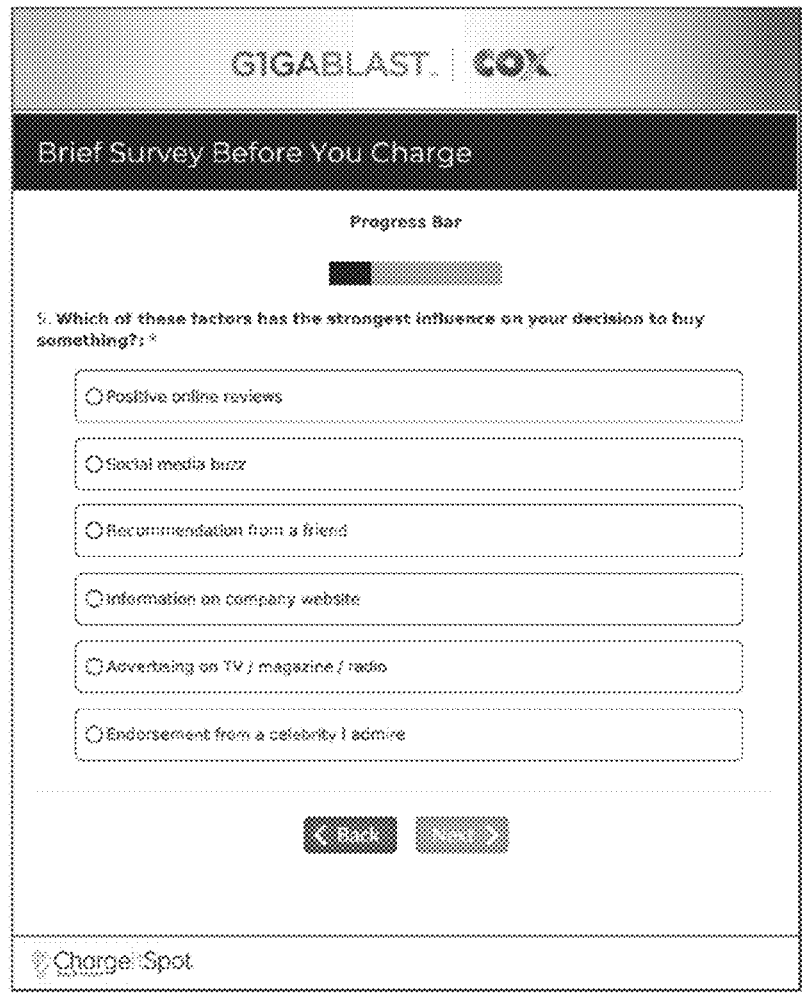
Figure 7G:
Figure 7J:
Figure 8A:
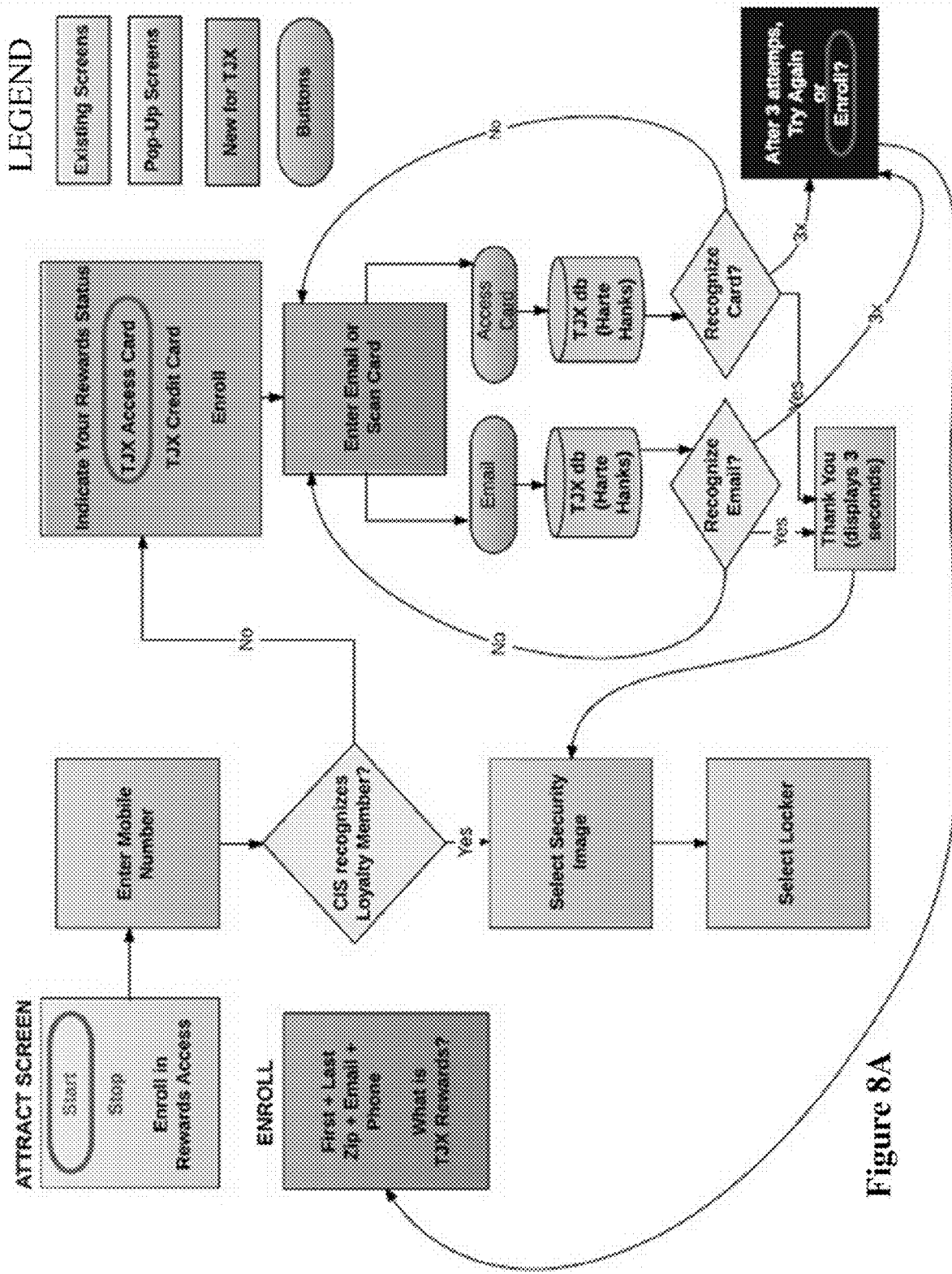
FIGS. 8A-8J illustrate an exemplary charging flow for loyalty members.
Figure 8B:
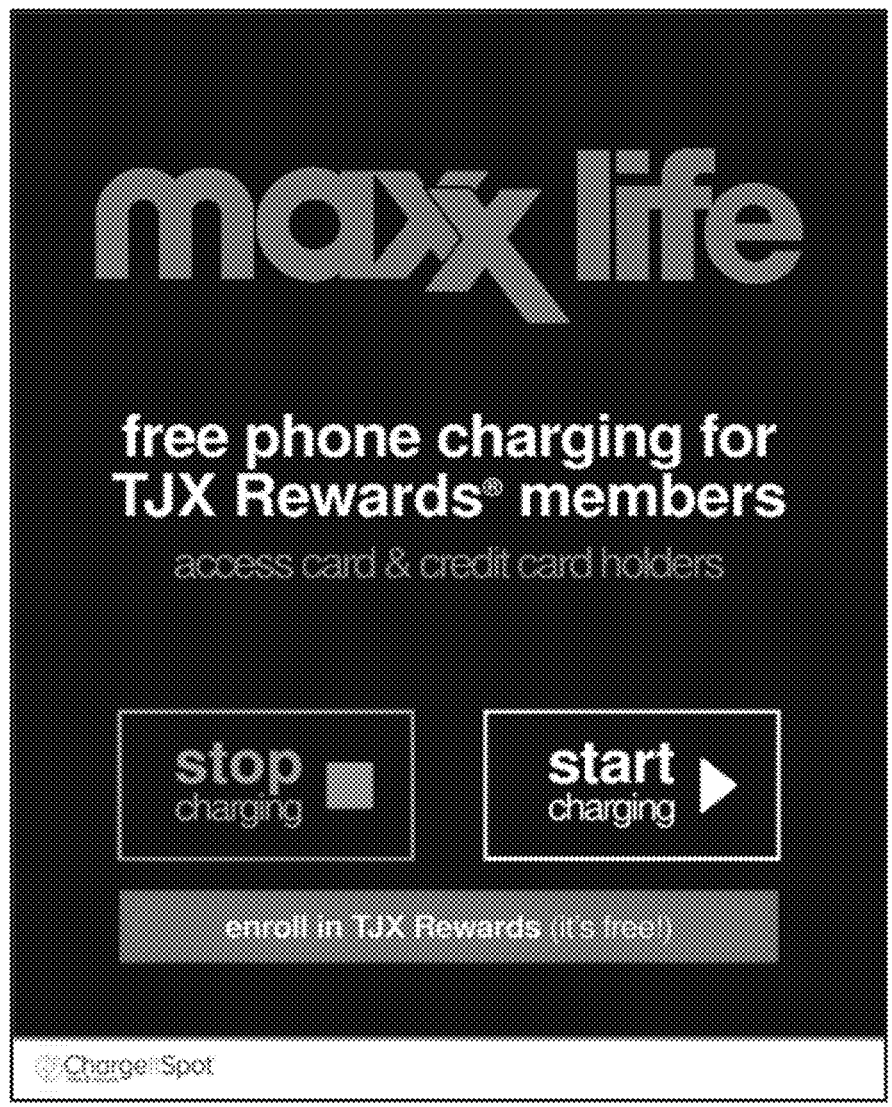
Figure 8C:
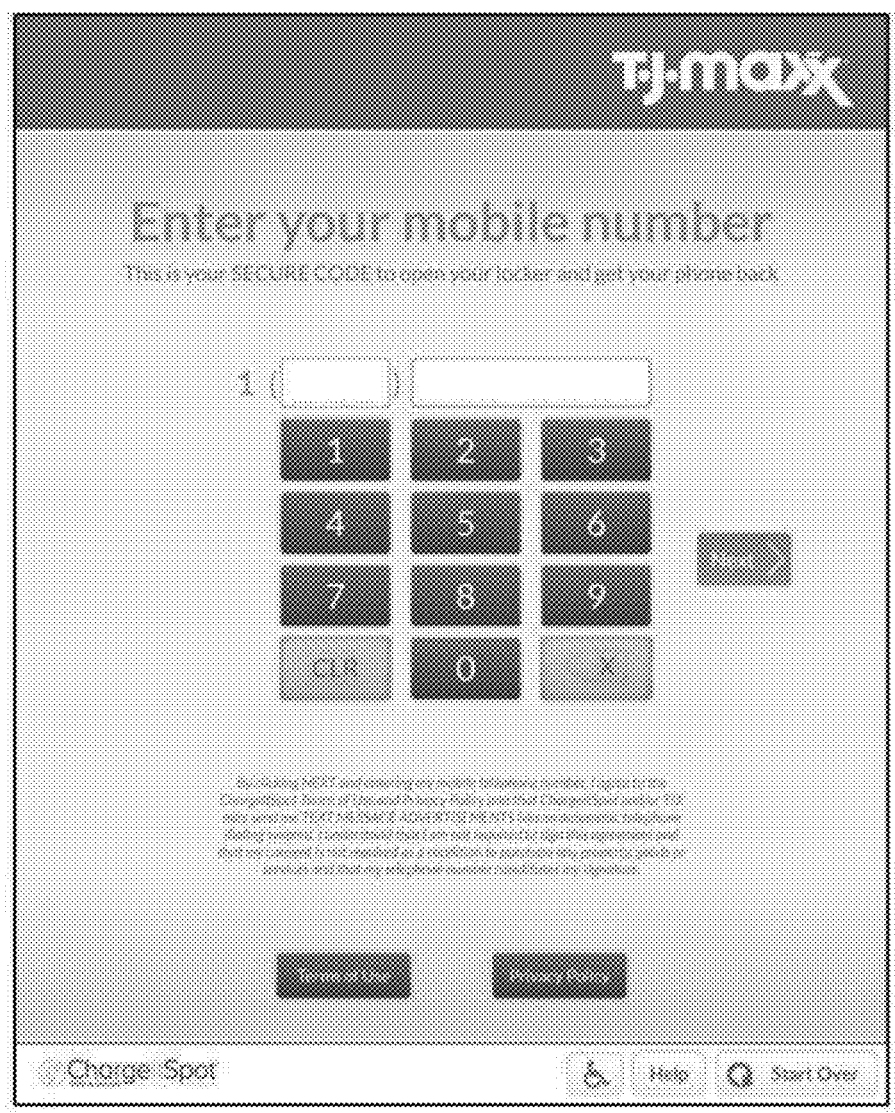
Figure 8D:
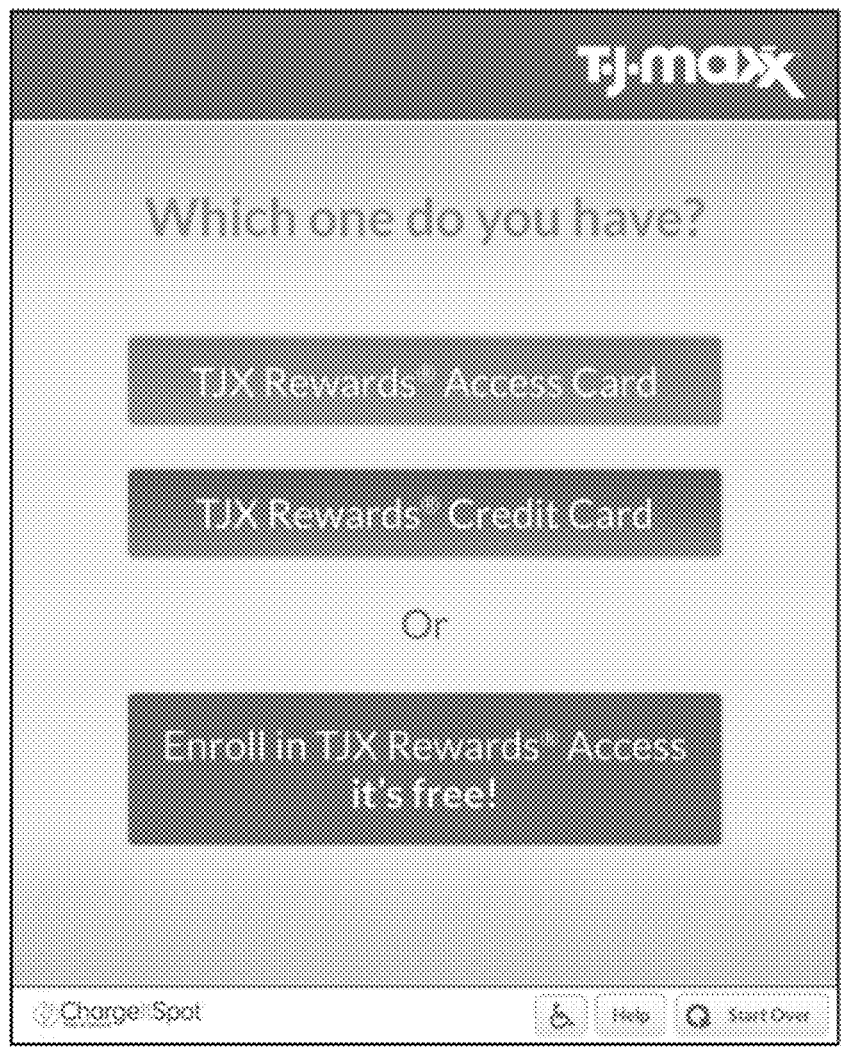
Figure 8E:
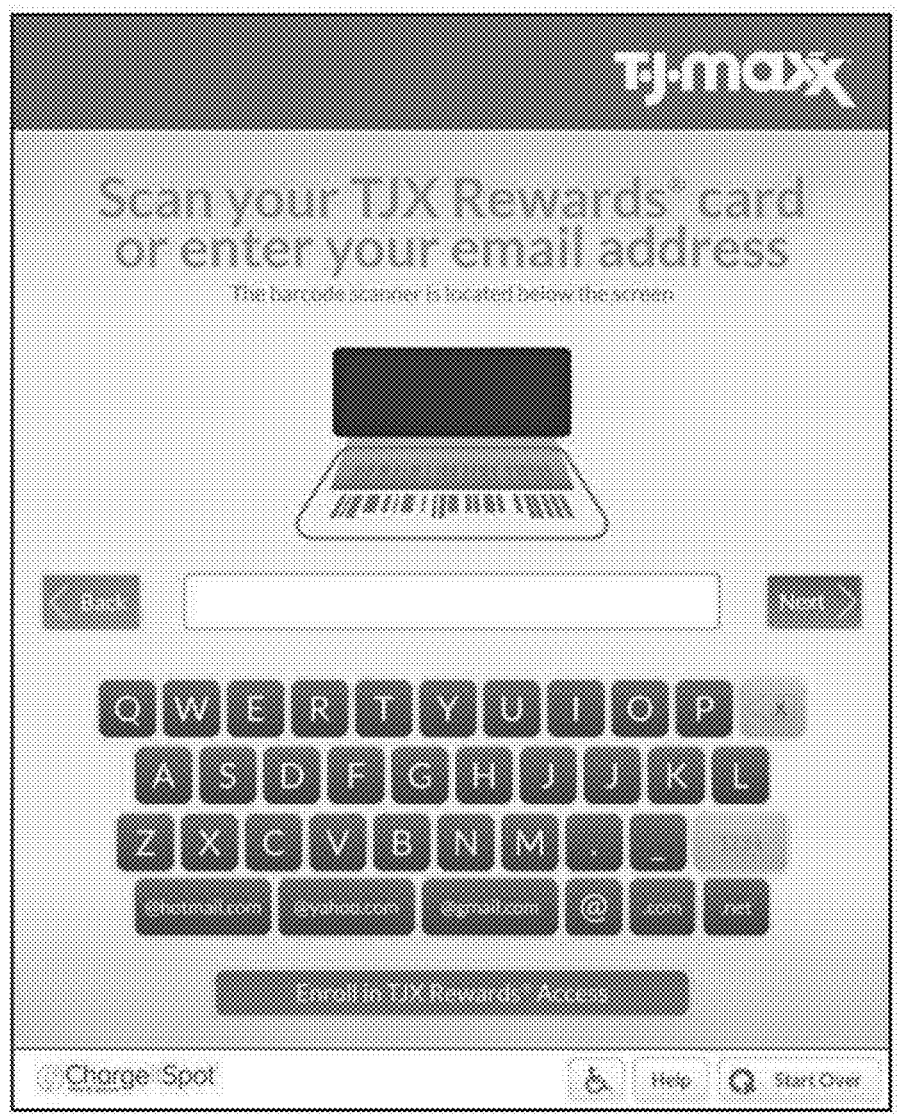
Figure 8F:
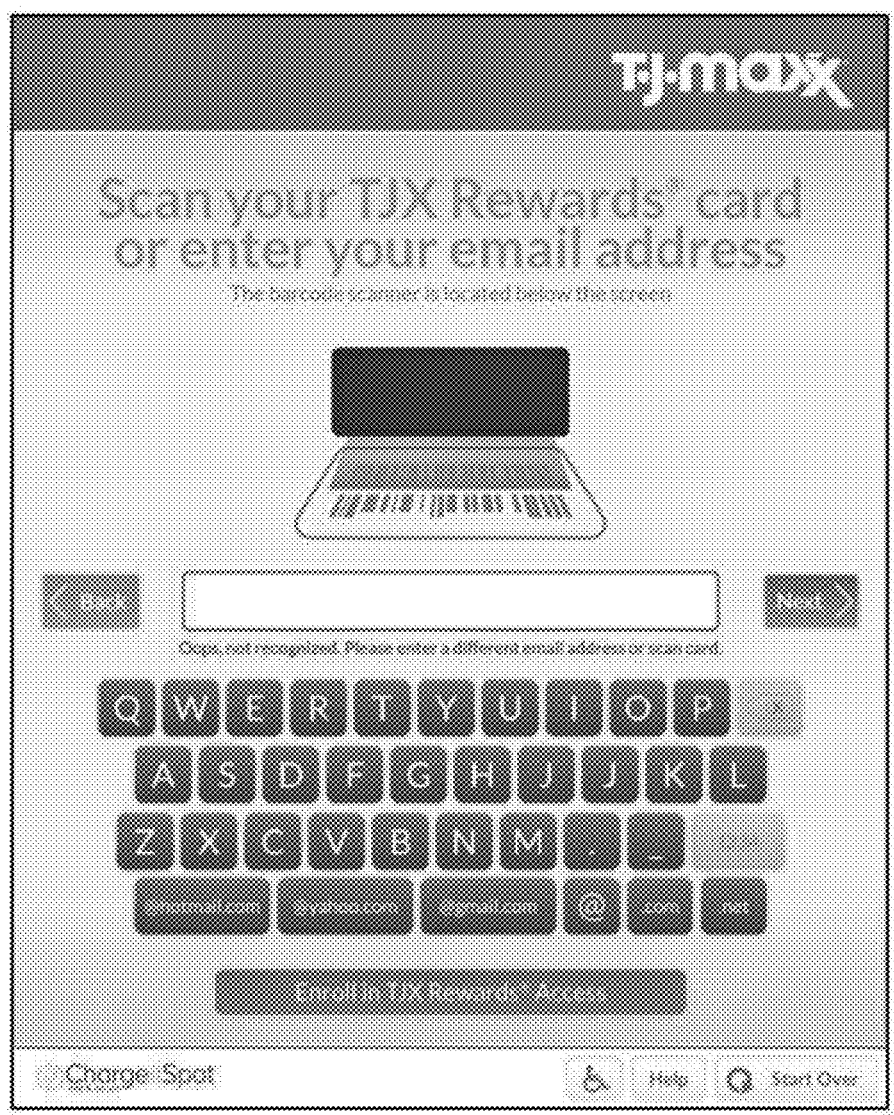
Figure 8G:
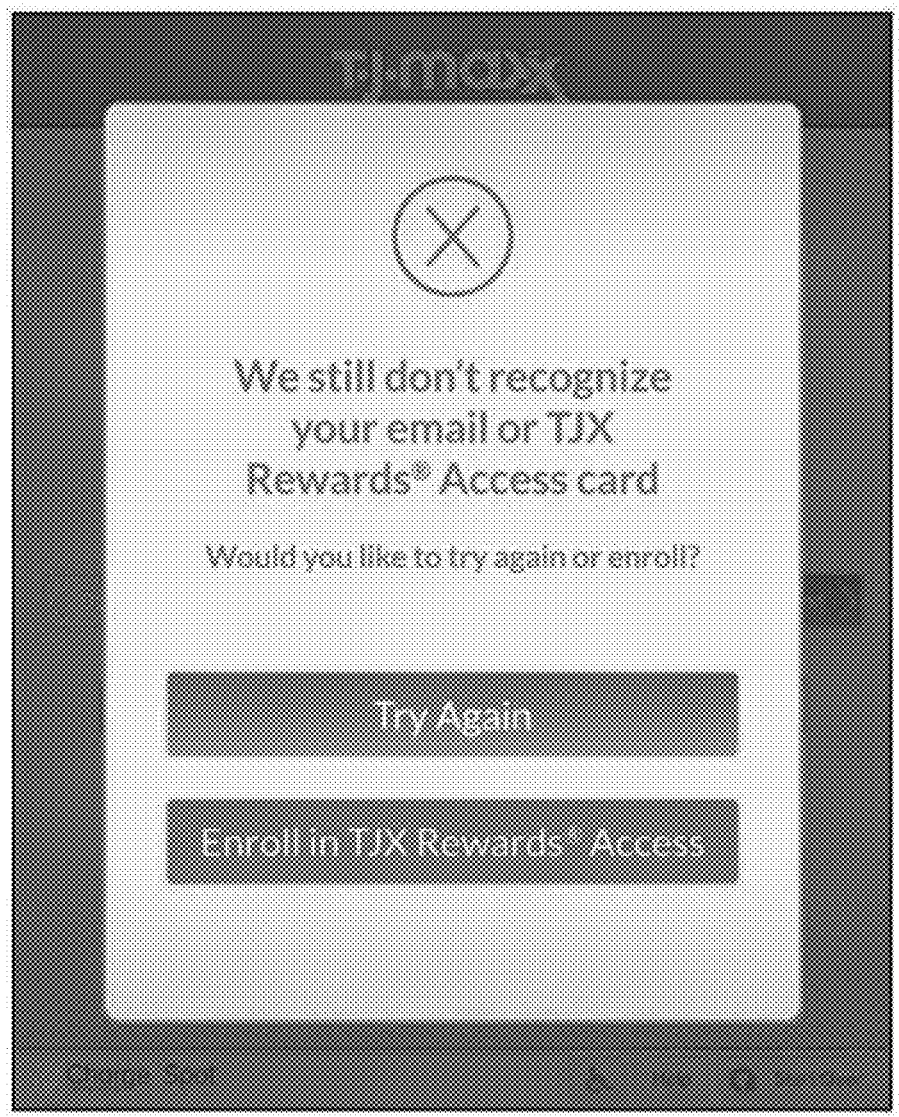
Figure 8H:
Figure 8I:
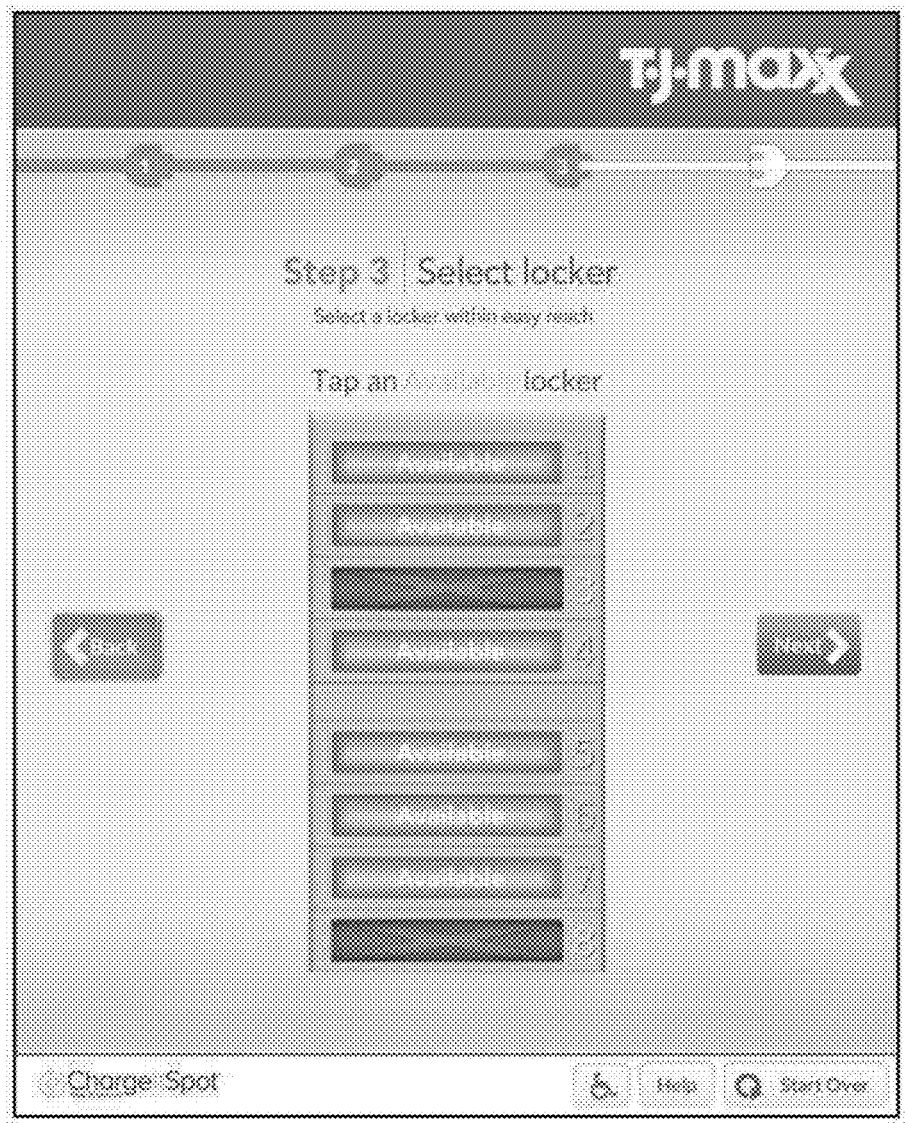
Figure 8J:
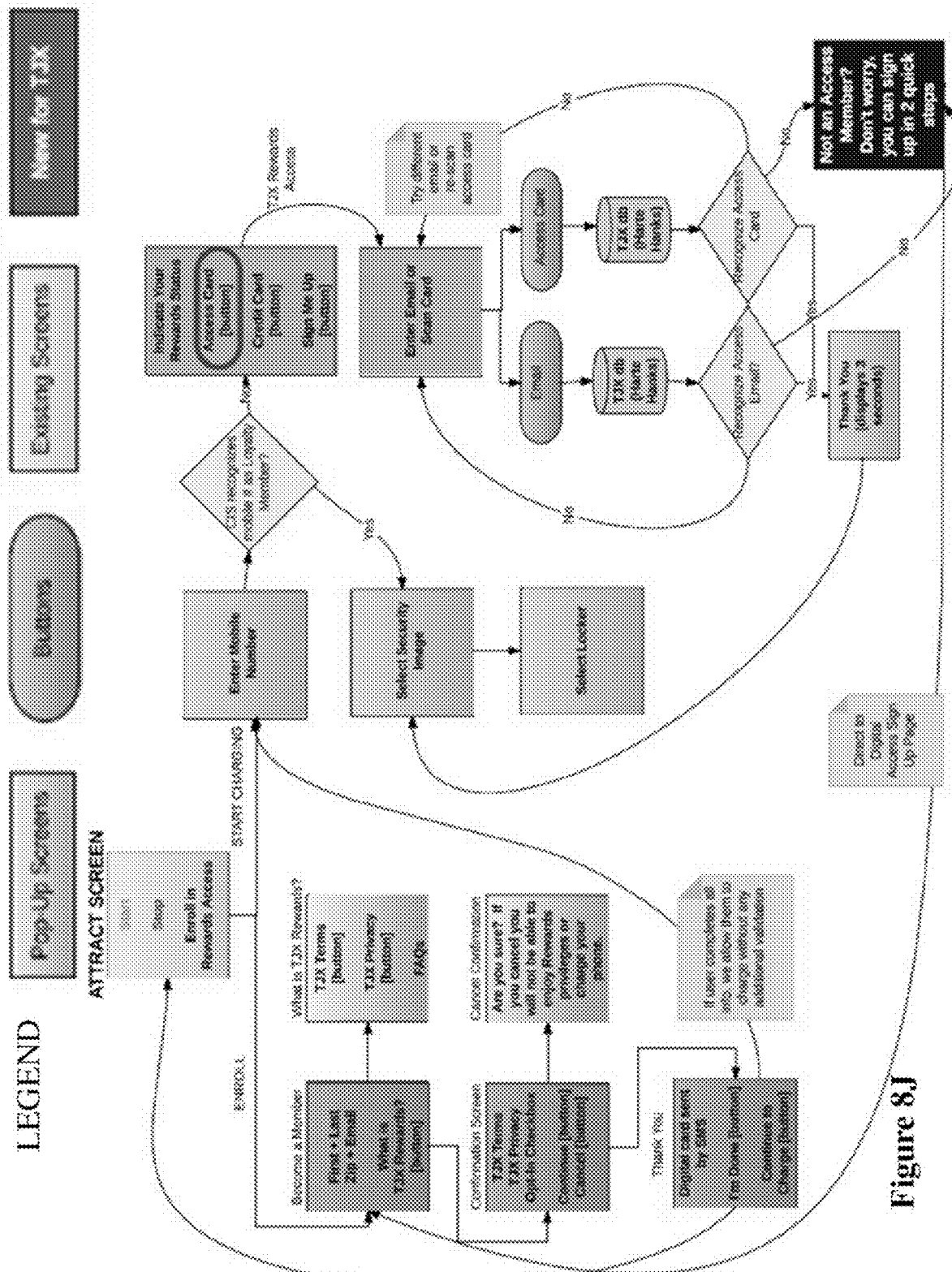

In the known art, codes or magnetic stripe readers are often used to securely identify customers. However, codes may be stolen, or magnetic stripe pre-readers used to steal magnetic strip encoding. Consequently, the security images employed in the embodiments are universal, as shown in FIGS. 5A and 5B, thus presenting no language barrier, and may also be more secure than, or when used in conjunction with, either codes or magnetic stripe readers for the reasons discussed throughout.

More particularly, the multilingual nature, provided, in part, through the disclosed security images, of the disclosed kiosk allows for automated interaction from the kiosk with the user. As such, the kiosk may communicate automatically with the user, such as using preordained scripts for certain circumstances, using any language selected by the user. For example, a user may select French as their preferred language, and if, upon attempting to obtain a charging phone, the user were to get locked out, the automated call to customer service for the lockout may occur, as indicated to the user on the touch screen, in French. The PhotoVerification review may be consistently textually, audibly or visually presented to the user in French, even in circumstances where the user's reply is provided in French, but customer service speaks only English. In such a case, the system disclosed may translate the user's French response into English upon providing that response to customer service. Likewise, the call center may provide a response to the user in English, which may be automatically translated to French upon visual and/or audible presentation to the user.

It should be noted that any suitable type of user interface may be provided. For example, the user interface may be a part of a display 408, such as the aforementioned touch screen liquid crystal display (LCD), and/or may include a display and a separate or discrete keypad 406. Moreover, it should be noted that any known methodologies of data entry may be employed, alone or in combination, including but not limited to a credit card or driver's license swipe, telephone number or other data entry to a keypad, a bar code or QR code scan, a loyalty program card or informational scan, a near field communication scan, or a biometric scan, such as a fingerprint scan, for example.

The touch screen referenced throughout may have a multiplicity of uses and communication linkages. For example, the embodiments may facilitate any type of sign-up for any type of offering via the kiosk touch screen discussed herein. For example, the touch screen protocols may be linked to an external webpage, wherein data is passed directly to the external webpage, or the touch screen protocols and algorithms may be actively associated with a partner system, such as by an API, wherein data may be captured by the touch screen and relayed to the partner. Available sign-ups may include credit card sign ups, utility company sign ups, solar panel sign ups, loyalty program sign ups as shown in FIGS. 6A-6G, and so on. Further, upon sign-up, temporary membership identifiers, such as temporary membership cards, may be provided to the user signing up, such as printing a "hard" card, or providing a virtual card via SMS or through the use of the app discussed herein.

In certain embodiments, upon entry of a telephone number, for example, the user may receive a SMS or MMS message (by way of non-limiting example) containing further information, as discussed throughout. For example, the user may receive promotional information, such as may be used upon reaching a business at which resides the charging units, and such as is discussed in detail immediately above. The user may also receive a call to action, such as to download a mobile app, go to a website, enter a contest, receive a coupon, or the like. Of course, the present invention may employ known technologies to track responses to such calls to action.

An exemplary auxiliary mechanism which may be employed for accessing and using the charging station 110, and/or for accumulating additional user information or security, is a supplemental aspect of user interface 408, such as a card reader (not shown). The card reader (shown in 406 on FIG. 4A) may accept any card identifying a particular mobile device user. The card reader may be configured to accept a user credit card, a driver's license, or a consumer card issued by a particular retailer or establishment, such as a loyalty card, by way of non-limiting example.

For example, users may choose to enroll in user loyalty programs using the disclosed embodiments, either of the kiosk provider or of other commercial entities, or users may already be members of loyalty programs prior to using a kiosk. Users may choose to enroll via the charging kiosk utilizing a graphical user interface 408 provided at the kiosk, or may be enrolled in third party or affiliated programs that provide cards, pins, QR codes, or the like, to indicate loyalty status. The loyalty program enrollment information may be stored in conjunction with the user information stored at the administration server, or the like, or may be uploaded or otherwise made available from a third party for association, such as in a database, with a charging device number at the kiosk (noting that the kiosk may include the aforementioned auxiliary reader for loyalty cards, loyalty pins or QR codes, or the like). Further, via the graphical user interface, a user of the system may participate in completing surveys or polls, which may or may not relate to the loyalty program. For example, users may be polled, such as by a casino, as to, if they were to win a prize from a slot machine, what prize would they like to win.

In certain embodiments, and such in order to use the free charging service, the user may be asked to complete one or more surveys on the touchscreen. For example, a survey may be presented to the user on behalf of a single or multiple sponsors/clients/kiosk providers who are paying to receive customer information in exchange for value, such as in exchange for a location providing charging kiosk access to its customer base. By way of nonlimiting example, the location or venue may thereby have access to the charging station at no charge or reduced charge.

In preferred embodiments, before the start of the charging process, such as prior to the automated opening of the door to a charging locker, the user may be asked to take a survey, such as is shown in FIGS. 7A-7L, in order to obtain the charging for free, or for some predetermined discounted amount. Surveys may be provided in a variety of formats, and may be provided as "integrated" surveys, wherein the presentation of the survey is an aspect of the artificial intelligence/adjustable logic algorithms integrated with the charging process; or "unintegrated" surveys, wherein the charging station calls out to the cloud, such as to third party domain, in order to obtain the survey or the survey logic. In short, the survey logic may include a steady state flow of a predetermined series of questions, or may vary the questions, question content, question type, or the like, based on a user's input or responses to questions. Further, the integrated nature of the survey logic may vary based on the responses, such as wherein, if a user answer is yes to a given question, the survey converts from a non-integrated remote logic to a local logic.

Further, not only may the integration level of the survey algorithm vary, but the types of question may vary, such as between multiple-choice, free-form text, rating scale (e.g., 1-10), conditional logic (e.g., disqualify respondents under a certain age, or having other particular characteristics), visual versus text (i.e., selection of an image or images), and so on. Of note, surveys may be steady state, such as a series of multiple-choice questions, or may, preferably be highly variable, such as in order to maintain user interest across multiple charging events. Correspondingly, surveys, provided through the use of the disclosed kiosk and kiosk system may likewise be multilingual.

In an exemplary embodiment and by way of non-limiting example, surveys may be implemented by institution of an API to a platform that delivers surveys on line and or to mobile apps. The API may be a dedicated, API, such as for a particular platform, or may be a multi-platform API which offers alternative survey platforms. Thereafter, when the user begins the charging process, the user may be presented with a screen that informs the user that she will be asked to take a survey in order to charge her phone for free, and the user may be asked to affirmatively respond in order to continue the charging process. If the user agrees, such as by pressing continue, she is then prompted to enter the mobile phone number, and/or other information, such as an email address and selection of a security image. As discussed herein, the charging kiosk may then call out to a nonintegrated survey URL and present the survey to the user prior to allowing the user to select a charging locker door to open.

Of note, surveys may present any number or type or format of questions. Surveys may be sponsored or unsponsored, such as wherein surveys are sponsored by third-party research companies to obtain research on topics ranging from food delivery to health concerns to movie preferences and so on. In preferred embodiments, the user must complete the survey before selecting a charging locker door. If the user abandons the survey, the screen may timeout and/or otherwise return to a main screen. If the same user returns in an attempt to charge a mobile device, such as may be indicated by entry of a phone number, a survey previously presented may renew at the point where the user left off. Similarly, in order to maintain user interest the same survey may not be presented to a user multiple times, such as may be tracked using a mobile phone number or other identifier, such as a loyalty card, or the like.

A survey may be optional or mandatory. Moreover, not only may the survey be presented in real time at the charging kiosk, but further, a survey may be presented to the user via a follow-up link, such as may be presented in an SMS, email, or the like. As referenced, survey logic may be local and/or integrated, and/or remote or unintegrated. As such, survey response data may be housed in an integrated system, or at a third-party system. As such, data may be delivered to a third party, a survey requester, or any other entity, and may be delivered directly, such as by an API integration, or may be housed/stored in an integrated manner and extracted by a client. Surveys may be employed to obtain information of interest from third parties, such as research companies, but may also be delivered by the charging service provider in order to gain user information, such as customer demographics. Survey results may be gathered and/or housed in substantially real time, such as to allow response or follow-up to occur on the site, such as manually by a clipboard operator.

In a survey, the user may be asked a series of questions (up to 20, by way of non-limiting example) in exchange for having access to a free phone charge. The survey may be configurable, optional or mandatory in the system. For example, users may have the option to take the survey after they lock up their phone (and/or close the door), or users may be presented the survey when they come back to get their phone after they enter their mobile number and security credentials. Moreover, there may or may not be a limit on the number of times that the same user can take a specific survey, for example. Yet further, multiple surveys may be available on the same kiosk, and may or may not be offered to some or the same users on subsequent visits. That is, some users, or the same user on a subsequent visit, may receive different surveys or no survey at all. It will also be appreciated by the skilled artisan that the user would always have the ability to opt-out of the survey by choosing not to charge their phone.

In a manner similar to the presentation of surveys, the charging kiosk may be used to recruit prospective survey participants. For example, a charging user may be presented with a screen prior to beginning the charging process asking the user if she would be interested in taking a future survey, such as with or without being paid to do so. If the user agrees, the user's phone number and/or email may be passed to third party survey company such that the survey company may follow up in the future to enroll the user as a potential survey participant. Needless to say, and as is the case with the surveys discussed throughout, users may be excluded from participation based on any number of factors, such as age or demographics. Moreover, the empaneling of survey participants may be in relation to a single survey over a given time period, a single or multiple surveys over an indefinite time period, or multiple surveys over a particular time period, by way of nonlimiting example.

Moreover, and to the extent data is obtained by an integrated survey system within the charging system, logic, customer profiles and demographics may be relationally obtained by the systems disclosed herein. Thereafter, this integrated database, such as the data warehouse and database(s) 302 discussed throughout, may be used to select participants pursuant to request from third party survey providers. For example, an integrated database of customer demographic information allows for prequalification of participants for a survey, prioritization of specific questions to particular groups of people (e.g., males, aged 30 to 45), the tying of device types to survey participation, such as to allow brands or marketers to target messaging that may or may not be optimized by device, type, and/or the linking of survey results to a location or location type (i.e., a mall, a specialty retailer, and so on).

Accordingly, survey data and/or additional user data, such as kiosk-entered data, app-profile data, and so on, may be appended to kiosk provider databases and/or clients'/sponsors' databases, such as to create a richer customer profile and/or to accumulate market research. Accordingly, survey questions may include demographic information such as gender, race, income level and the like, and/or may also include lifestyle preferences such as hobbies, favorite travel destinations, shopping locations and the like.

This enriched profile and/or enhanced market research may enhance the adoption of kiosks by location providers. For example, a mall customer presently paying a monthly fee for 1 kiosk may expand to 4 kiosks because the additional kiosk costs are partially or fully paid for by the survey provider.

In preferred embodiments, card reading or bar code scanning associated with the kiosk may be for identification and/or data accumulation purposes, and may or may not be for the purposes of charging the user a fee for usage of the charging station. For example, the card reader (as referenced above) may comprise a magnetic card reader, which, upon swiping the user's card on the reader may read the information contained on a magnetic stripe located on the user's card, enabling the charging station to gather and process user identification information, such as for secure access by the user to his device after charging, and/or to accumulate information about the user, such as shopping habits of the user, which, as mentioned above, may be stored by user database 302.

Furthermore, data gained through the use of the method and system of the present invention may be associated with the additional or auxiliary data, such as from the aforementioned card reader. The card reader may allow for a user to use a free or discounted pass, a frequent users' card, a loyalty card associated with a kiosk sponsor, or the like. Accordingly, a large variety of data may be captured and associated with the auxiliary informational items, such as the cell phone number of the user, etc. Such data may include durations at particular locations, such as restaurants or retail, typical charging start times, typical charging end times, most frequently used kiosks, most frequently used lockers, percent capacity of usage, frequently used charging types and correspondingly phone types, or the like. By way of example, the control board discussed herein may receive information about which charging cable is in use in each locker, and may thereby receive information about what type of phone is charging or what type of phone is associated with a particular phone number. This may allow, such as in conjunction with loyalty information of, for example, a casino loyalty program, for the inference of demographic or social information, such as in relation to a particular retail establishment, or the like.

Figure 4C:
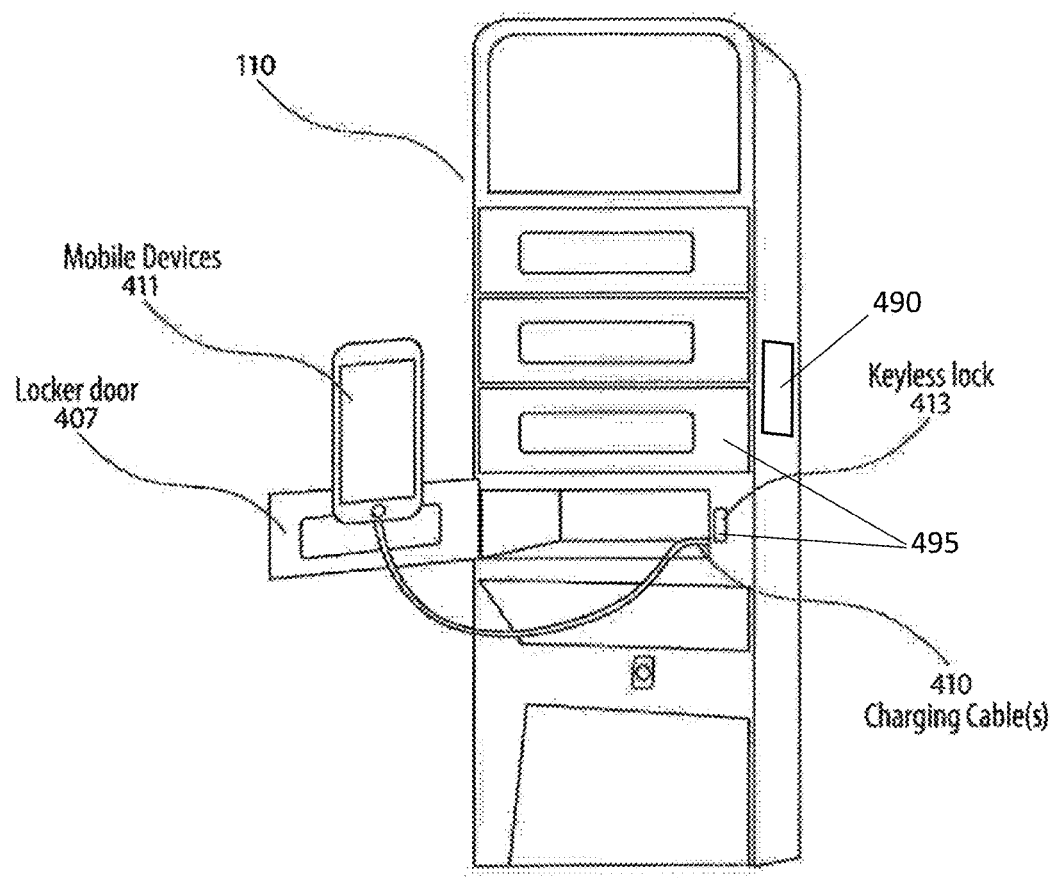
FIG. 4C illustrates an example of an open locker of a mobile device charging station according to embodiments of the present invention.

FIG. 4C illustrates an example of an open locker of the charging station 110 of an embodiment of the present invention. As shown, multiple interfaces and/or universal interfaces 410 may be located inside each locker 407 provided for recharging a given mobile device 411. Each interface 410 may be a unique type of charging interface, may be dedicated for a particular make or model of mobile device, or may be a universal charging interface.

Figure 4D:
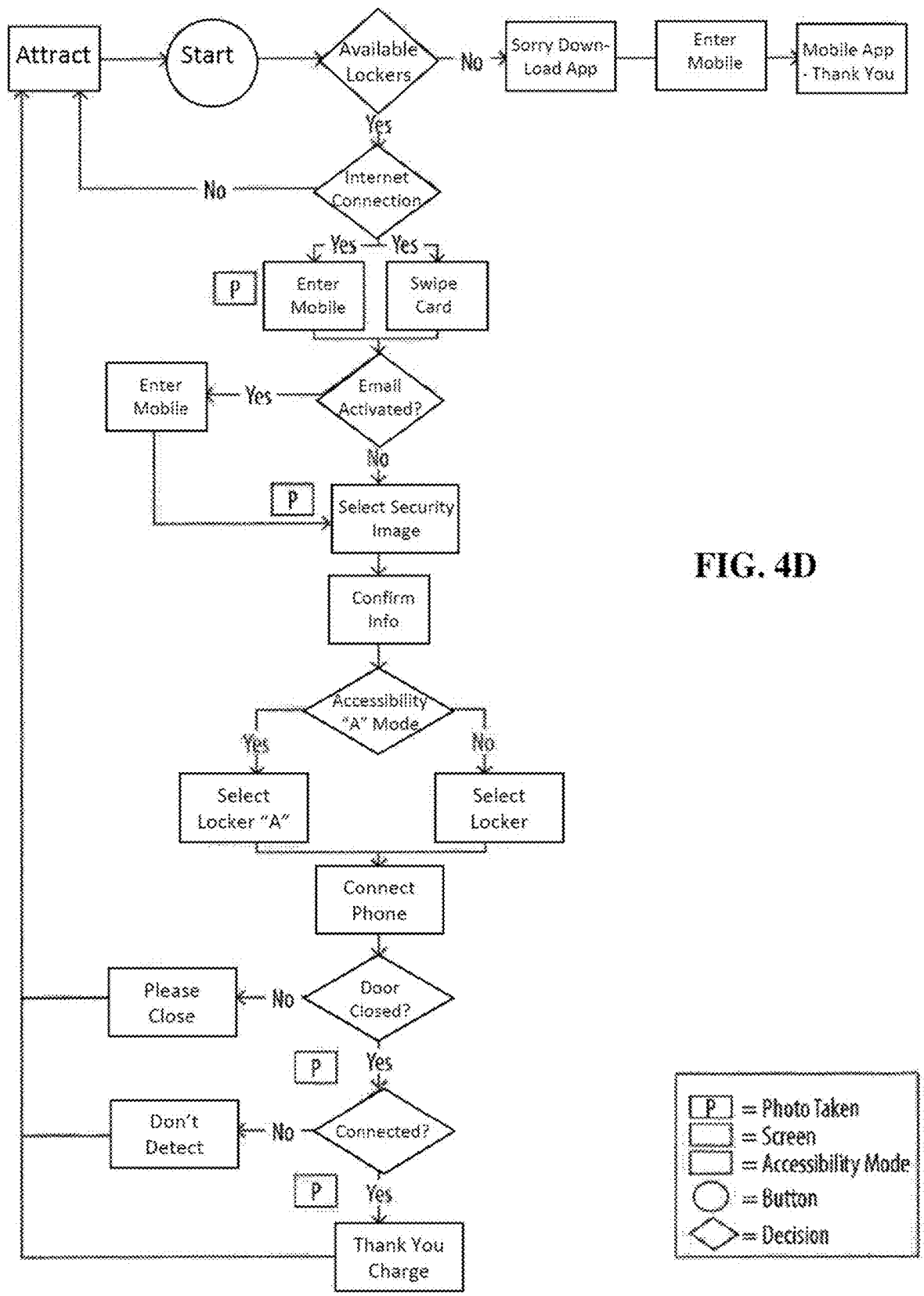
FIGS. 4D-4F are flow diagrams illustrating the use of an exemplary charging station.
Figure 4E:
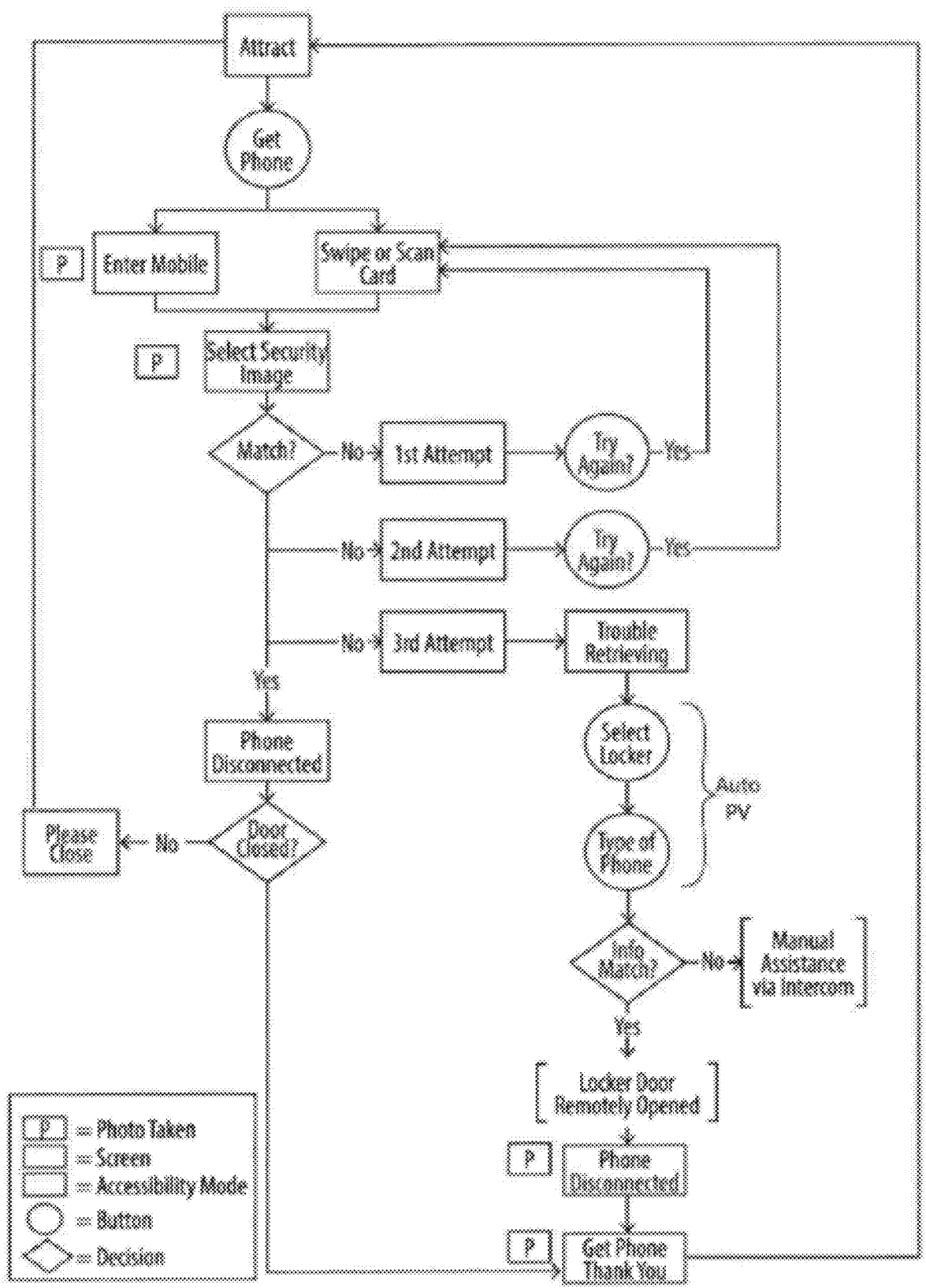

In at least one embodiment, in reference to FIGS. 4D and 4E, there is provided a PhotoVerification process of a user of the system (i.e. kiosk). As used herein, PhotoVerification is a process whereby a customer photo or similar biometric (such as facial recognition, fingerprint, retinal scan, voice recognition, etc.) is taken at the inception of a charging session, and wherein, when a user attempts to retrieve the charged device, the photo/biometric is compared, such as automatically or manually, to the biometric at inception in order to decide whether to release the charged device.

If a user's initial or subsequent security credentials are incorrect (i.e. "First Attempt Incorrect," "Second Attempt Incorrect", etc.), then the kiosk may automatically or manually "escalate" the retrieval security. Needless to say, the user may be precluded from trying an indefinite number of times to enter security credentials, such as wherein, after X number of tries (such as 3 tries), the system is "locked" and each time the user enters the same mobile number (or loyalty number, etc.), the screen may automatically further escalate, such as to a PhotoVerification process.

Further, for example, the kiosk may use a series of photos and/or a cellular, landline, and/or voice over IP conversation directly with the user (such as by a customer service representative) to manually and/or via facial recognition software verify the user's identity ("Please Wait, We Are Using Surveillance Records To Verify Your Identity"). If a match is determined to be made ("Match Verified?"), either via manual or automated check, then the user may receive a success screen and the process continues to FIG. 4F. If a match is not made, then the process may proceed to an Offline process, a more extensive customer service interaction, or locked state, until a successful verification (photo or otherwise) or a manual unlock process is performed. If the customer service representative does not respond within a specified period of time, the PhotoVerification will timeout, thereby making the kiosk available for use by another customer.

Figure 4F:
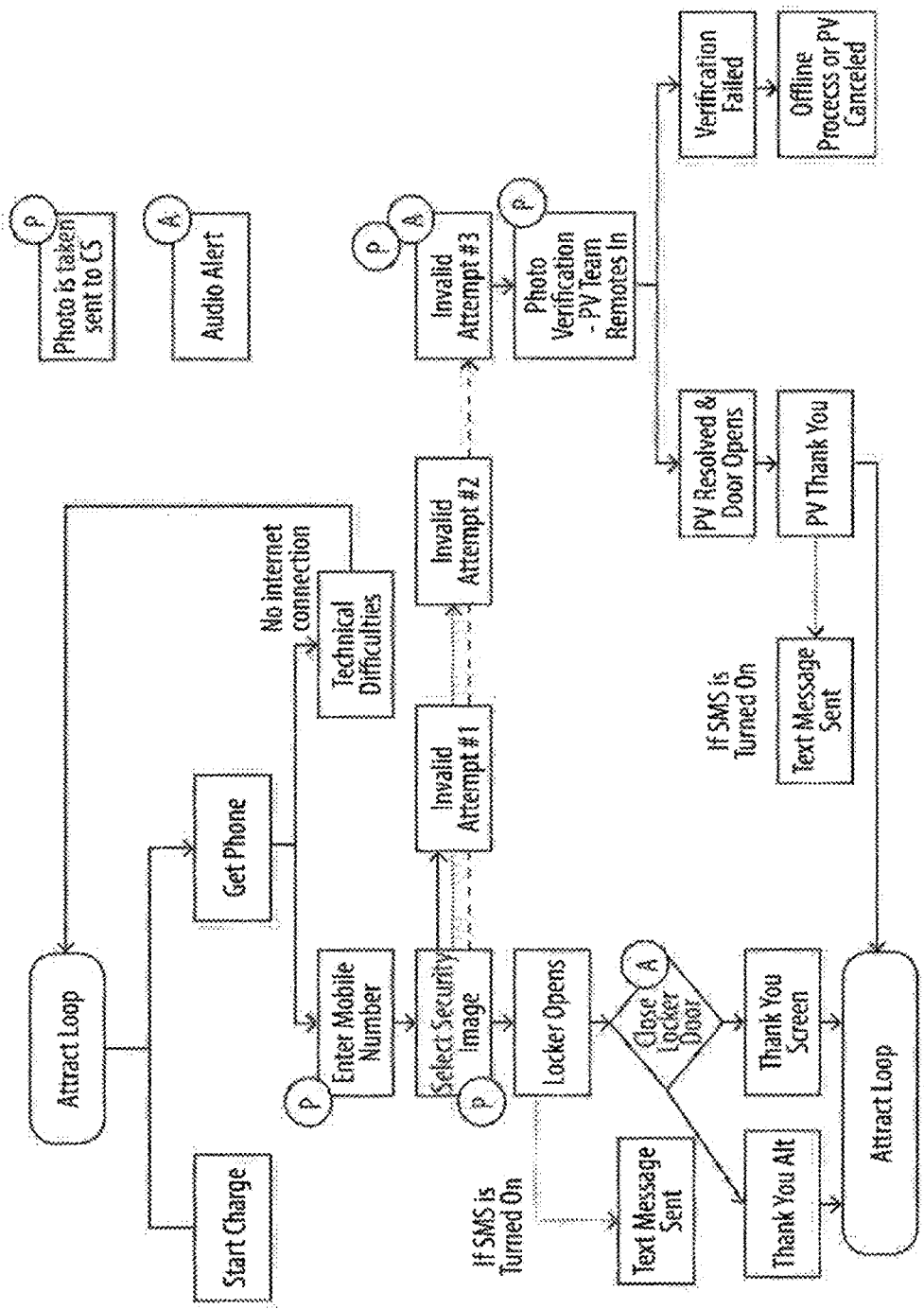
Figure 4H:
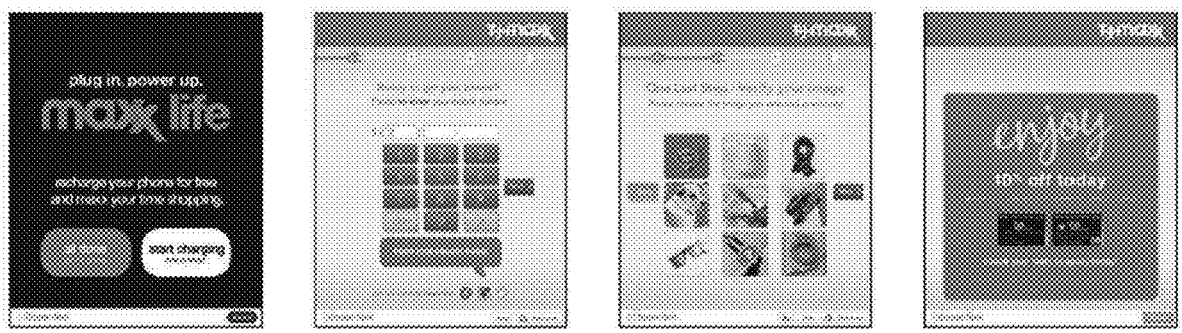

FIG. 4F is a flow diagram illustrating combinations of the foregoing aspects. In short, the flow diagram illustrates various methodologies whereby a charged device may be obtained by the owner of the device, including the use of a PhotoVerification in the event of a lockout from a locker.

The kiosk may include various other hardware and/or software and/or firmware under the control of the kiosk control board referenced herein, and which may be employed in conjunction with the PhotoVerification process. By way of example, the kiosk may include the user interaction screen discussed herein, such as a touch screen akin to those employed at automated teller machines, as well as a camera proximate to, such as above, the user interaction screen, under the control of a control board. Accordingly, a user's first interaction with the kiosk may be with the screen while standing in front of the camera, thereby the camera may take a series of images, video, audio, or the like, of the user placing the phone into a locker and/or interacting with the screen.

Confirmation of user identity, for example, may occur via remote access to the server, such as with the kiosk initiating all requests to the server. In short, this provides a security feature in that the server cannot push information (such as new configurations, software updates, restart commands, etc.) to the kiosk, but rather the kiosk periodically "pings" the server for information.

The foregoing may be due to a master-slave relationship between the server and kiosk. That is, the kiosk may be programmed to ONLY be able to communicate with one master, i.e., the server. This security precaution prevents a hack that tunnels into the kiosk from another source, such that the kiosk may be disabled to communicate or accept any commands. This is further buttressed in exemplary embodiments in which kiosks cannot "talk" to each other.

Thus, confirmation may be available at a later point, such as via the camera, that the same user is attempting to retrieve the phone as had initially placed the phone into the locker. In this manner, by way of non-limiting example, a user who has been locked out from retrieving his or her phone may be able to readily confirm with customer service that he or she should be able to retrieve the phone. Upon such confirmation using, at least in part, the camera, a remote customer service representative may, for example, open a locker, ask security questions, or the like.

This security may be enhanced by any known method. For example, security may be enhanced by allowing a user to pick, such as on the aforementioned screen, a secondary security image that the user may have to reselect as a security measure, or security measures may include PIN codes or the like in association with the user having entered his or her phone number in order to access the kiosk in the first instance. Moreover, the use of security images may additionally provide a branding or advertising opportunity, such as wherein various security images are provided to a user to select from that are representative of endorsers of the brand with which the kiosk is branded.

In at least some exemplary embodiments, the exemplary disclosed system for verifying the identity of a user may include a door that selectively opens to allow access to a cavity and selectively closes to block access to the cavity; a lock configured to selectively lock and unlock the door when the door is closed; a camera configured to image a user area adjacent to the door; computing memory having associated therewith code; and a processor communicatively coupled with the computing memory, configured to execute the code and to control the camera to record a first image data of the user area at a first time; store the first image data; control the camera to record a second image data of the user area at a second time; and selectively unlock the door based on comparing the second image data to the first image data. Comparing the second image data to the first image data may include transmitting the first and second image data to a remotely-located device and subsequently receiving an operator data from the remotely-located device. Transmitting the first and second image data to the remotely-located device may occur after the user in the user area inputs incorrect input data. The door may be unlocked when the first image data defines a first set of images of the user in the user area at the first time and the second image data defines a second set of images of the user in the user area at the second time. The door may be maintained in a locked state when the first image data defines a first set of images of the user in the user area at the first time and the second image data defines a second set of images of a different user in the user area at the second time. The lock may lock the door at the first time. Comparing the second image data to the first image data may include using facial recognition software. The operator data may be visually or audibly presented to the user in the user area. The operator data may be selected from the group consisting of a security question and a security instruction instructing the user to remove a hat or change position in the user area. The incorrect input data may be selected from the group consisting of an incorrect security image selection and or incorrect PIN code. For example, if the image data (e.g., photos) do not match, an operator may use another technique to verify an image data match. In at least some exemplary embodiments, the technique may include asking a user (e.g., a customer) located in front of a station or a kiosk for additional information or photos. For example, the technique may include pushing a screen to the user interface (e.g., providing an on-screen display requesting additional information), speaking to the user via an audio device (e.g., speaker and/or microphone) disposed at the station or kiosk (e.g., using VPN, VOIP, or other telephony method), calling the user on a phone in the store (e.g., or a contact's or friend's phone), or any other suitable technique. The communication between the operator and user may involve any suitable verification information or action. For example, using the exemplary disclosed communication techniques, the operator may request the user to remove a hat, request the user to provide information such as the user's type of device or phone, a time the user's device was dropped off, a user's alternate contact number or information, and/or any other suitable type of verification information.

In at least some exemplary embodiments, the exemplary disclosed method may include providing a door that selectively opens to allow access to a cavity and selectively closes to block access to the cavity; using a lock to selectively lock and unlock the door when the door is closed; using a camera to image a user area adjacent to the door; providing computing memory having associated therewith code and a processor communicatively coupled with the computing memory to execute the code; controlling the camera to record a first image data of the user area at a first time; storing the first image data; locking the door; controlling the camera to record a second image data of the user area at a second time; and selectively unlocking the door based on comparing the second image data to the first image data. Comparing the second image data to the first image data may include transmitting the first and second image data to a remotely-located device and subsequently receiving an operator data from the remotely-located device. Transmitting the first and second image data to the remotely-located device may occur after a user in the user area inputs an incorrect security image selection data or an incorrect PIN code data. Selectively unlocking the door may include unlocking the door when the first image data defines a first set of images of a user in the user area at the first time and the second image data defines a second set of images of the user in the user area at the second time. The processor may maintain the door in a locked state when the first image data defines a first set of images of a user in the user area at the first time and the second image data defines a second set of images of a different user in the user area at the second time. The operator data may be visually or audibly presented to a user in the user area. The operator data may be selected from the group consisting of a security question and a security instruction instructing a user in the user area to remove a hat or change position in the user area.

In at least some exemplary embodiments, the exemplary disclosed system may include a door that selectively opens to allow access to a cavity and selectively closes to block access to the cavity; a lock configured to selectively lock and unlock the door when the door is closed; a camera configured to image a user area adjacent to the door; computing memory having associated therewith code; and a processor communicatively coupled with the computing memory, configured to execute the code and to: control the camera to record a first image data of the user area at a first time; store the first image data; control the camera to record a second image data of the user area at a second time; and selectively unlock the door based on comparing the second image data to the first image data. Comparing the second image data to the first image data may include transmitting the first and second image data to a remotely-located device and subsequently receiving an operator data from the remotely-located device. Transmitting the first and second image data to the remotely-located device may occur after the user in the user area inputs incorrect input data. The incorrect input data may be an incorrect security image selection or an incorrect PIN code. The door may be unlocked when the first image data defines a first set of images of the user in the user area at the first time and the second image data defines a second set of images of the user in the user area at the second time. The door may be maintained in a locked state when the first image data defines a first set of images of the user in the user area at the first time and the second image data defines a second set of images of a different user in the user area at the second time. The lock may lock the door at the first time. Comparing the second image data to the first image data may include using facial recognition software. The operator data may be visually or audibly presented to the user in the user area. The operator data may be selected from the group consisting of a security question and a security instruction instructing the user to remove a hat or change position in the user area.

Figure 4I:
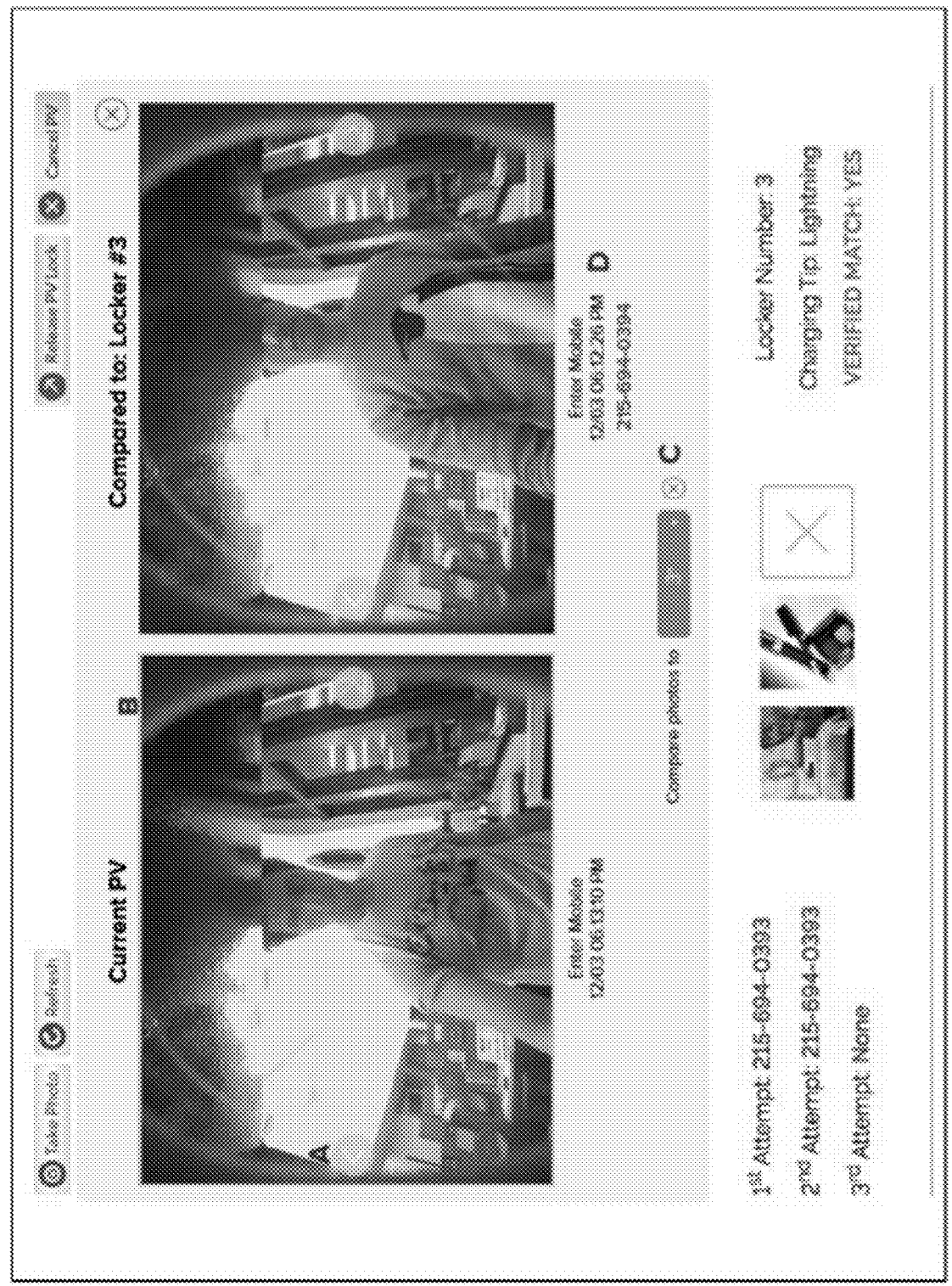
FIGS. 4I and 4J illustrate an exemplary disclosed photo comparison process.
Figure 4J:
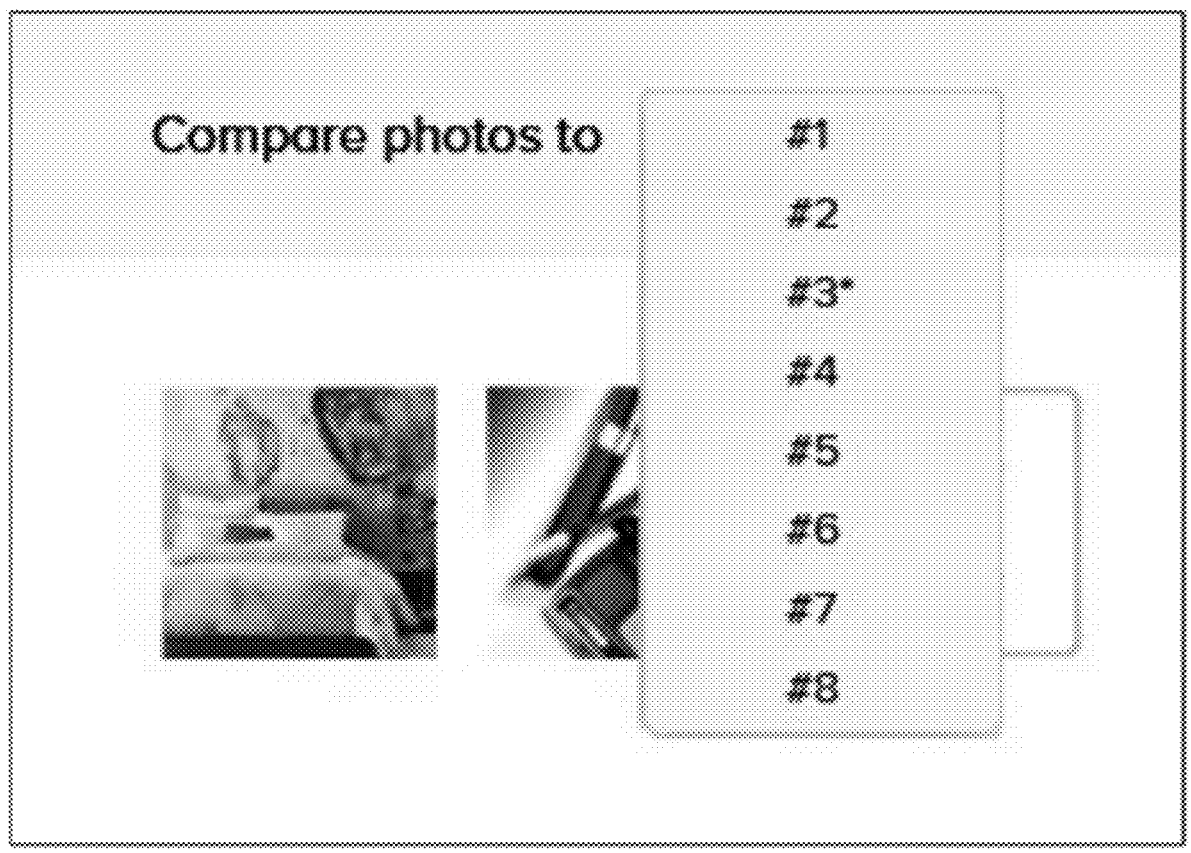

The exemplary disclosed PhotoVerification process and system may include a photo comparison module. For example as illustrated in FIGS. 4I and 4J, the exemplary disclosed PhotoVerification process and system may include a functionality (e.g., graphical user interface functionality such as a software functionality) and a screen layout that may provide a system operator with a comparison module. For example, the exemplary disclosed PhotoVerification process and system may provide a comparison module for a system operator such as a customer service representative or customer service team (e.g., remotely-located operator). As illustrated in FIG. 4I, the exemplary disclosed PhotoVerification process and system may display a first image (e.g., photo or video feed) and a second image (e.g., photo or video feed) adjacent to each other (e.g., side-by-side) on a user interface of a system operator. For example, the exemplary disclosed PhotoVerification process and system may provide a side-by-side comparison module for use by a system operator. The exemplary disclosed PhotoVerification process and system may display a first image recorded at a first time in the exemplary disclosed user area by the exemplary disclosed camera and may also display a second image recorded at a second time in the exemplary disclosed user area by the exemplary disclosed camera. The exemplary disclosed PhotoVerification process and system may process the image data from the first time and the second time (e.g., using facial recognition software and/or any other suitable technique for comparing data) to compare the first image data and the second image data. Also, a system operator may directly compare the first and second image data by comparing the data directly using the exemplary disclosed user interface (e.g., as illustrated in FIG. 4I). Also for example, as illustrated in FIG. 4J, the exemplary disclosed PhotoVerification process and system may provide drop-down menus, thumbnails, and any/or suitable graphical user interface element for facilitating comparison of image data by a system operator. The exemplary disclosed PhotoVerification process and system may thereby provide a user operator with an efficient and effective process for comparing images of users to verify if the user imaged in the first image or image data (e.g., at a first time such as when an object such as a mobile device is stored in a locker) is the same user as the user imaged in the second image or image data (e.g., at a second time such as when the object such as a mobile device is attempted to be removed from the locker).

The exemplary disclosed PhotoVerification process and system may allow a system operator to view images of users (e.g., to view locker photos of customers) to compare image data recorded and collected at different times (e.g., and/or may perform comparison processing of the image data such as, for example, including facial recognition processing and/or algorithms). The exemplary disclosed PhotoVerification process and system may thereby compare a first image data collected (e.g., photos and/or video taken) at a first time (e.g., when the locker was first accessed or any other desired time) to a second image data collected at a second time (e.g., photos and/or video being captured in real-time as a user attempts to retrieve a device for example with incorrect credentials). The exemplary disclosed PhotoVerification process and system may thereby improve a system operator's (e.g., a customer support team's) efficiency and accuracy.

For example as illustrated in FIGS. 4I and 4J, the exemplary disclosed PhotoVerification process and system may be accessed by a system operator (e.g., accessed by an operator located remotely from the station or kiosk having the exemplary disclosed cavity) based on the system operator clicking any desired image, pull-down, thumbnail, or other desired element depicted on the exemplary disclosed user interface (e.g., displayed on a page illustrated on the user interface). In at least some exemplary embodiments, a lock-out image may continuously or constantly appear on the module displayed on the user interface. For example as illustrated in FIG. 4I, the lock-out image may be the image or video depicted under "Current PV" that provides data of a user attempting to gain access to the exemplary disclosed locker. The exemplary disclosed PhotoVerification process and system may provide the "lock-out" image data in real-time or near real-time as the user is attempting to gain access to the exemplary disclosed locker. For example when a user enters incorrect security credentials, the exemplary disclosed PhotoVerification process and system may display the "lock-out" image of the user entering incorrect security credentials in real-time (e.g., immediately) or in near real-time to a system operator. The exemplary disclosed Photo-Verification process and system may alert a system operator to a user entering incorrect security credentials by displaying and maintaining the "lock-out" image data on a system operator's user interface. A system operator (e.g., customer support user, manager, technician, or any other suitable operator) may select one or more other images (e.g., image data collected at other times and/or locations) to use for comparing to the "lock-out" image for example as illustrated in FIGS. 4I and 4J and described herein. For example, a system operator may select from a dropdown list displayed on the user interface and/or select a thumbnail image (e.g., imaged at any desired time period) from the exemplary disclosed locker or location (e.g., location where the incorrect security credentials were provided). In at least some exemplary embodiments, the system operator (e.g., customer support representative) may carousel through a set of images (e.g., a movable or selectable carousel of images or videos) using a touchscreen, arrow buttons or directional keys on a keyboard, voice-activation, and/or any other suitable techniques for manipulating graphical user interface elements. For example, the movable or selectable carousel may be a variable display that the user may manipulate to display a desired image of the carousel set of images or videos. The exemplary disclosed user interface may depict the carousel feature in any desired manner such as, for example, a linear or circular display of movable thumbnails, a pull-down, or any other suitable technique for allowing a user to quickly scan through several or many images or videos (e.g., video clips). For example, FIG. 4J illustrates an exemplary disclosed carousel feature that may reduce a possibility of error when comparing image data (e.g., photos or video), which may in turn reduce a chance of poor user experience (e.g., an owner of a device being inappropriately locked out) and/or stolen devices (e.g., a theft of stored devices).

Once the user has entered the phone number and any required additional information, such as an email address, the user selects a charging locker and it is then opened, the screen may prompt the user to connect his or her phone for charging. An exemplary flow of the inception of device charging is illustrated in FIG. 4G, and may include ADA compliance, such as in the form of making available lower level lockers for persons in need of such service.

Further and as referenced herein, once the phone is plugged in for charging, an optimal charging profile may be sought, and such an optimal charging profile may include charging rates, such as whether high level charging should be an initial occurrence, or should be ramped to slowly, and additionally the proper rate of ramp down of charging for optimal charging of a particular device as discussed herein. This provision of the charging profile may occur by the offering, by the kiosk, of various charging profiles until a profile is accepted by the device. Accordingly, although there is no synchronization with the phone, the optimal charging profile may nevertheless be obtained. The lack of synchronization in the disclosed embodiments is yet an additional security feature, in part because it protects: a) the data on each individual phone (as there is no means to pull data from the phone); b) servers from being subject to viruses carried by users' phones; and c) other users' phones from being infected by a virus-infected phone that might transmit a virus to the servers.

As referenced, customer service may preferably be available by the touch screen, microphone and/or speakers 412 as shown in FIG. 4A, associated with the kiosk. This customer service may allow for a user to indicate a problem with the kiosk, such as the user being locked out of retrieving his or her phone. In exemplary embodiments discussed herein, customer service may have a variety of methods through which to confirm the propriety of the user's attempt to access the phone, such as via the customer service representative looking at pictures taken by the camera when the phone was placed in a locker, an assessment of the phone number entered or any security images or PIN numbers selected or provided by the users, charging tip type, or a series of questions asked of the user for security purposes. Such questions/actions may include, for example, the approximate time the phone was placed in a locker, the phone number of the phone associated with the particular locker for which access is requested, and the ability to contact local security personnel if a user fails to properly address security when trying to retrieve a phone. Furthermore, customer service may have a variety of abilities, such as may be provided by the network infrastructure and the kiosk control board, to remotely access features of the kiosk. For example, a customer service representative may be able to open locks and/or otherwise open lockers, change lights, force onto the user screen certain information, or the like. Moreover, customer service representatives may have particular controls available to them in relation to the aforementioned PhotoVerification period. For example, a customer service representative may be able to take a photo on demand of a user for comparison to earlier photos. He or she may be able to indicate to the user to please take off a hat, for example, to improve the ability to compare photos, may position a user in relation to the camera to provide for a best comparison of photos, or the like.

Customer service representatives may additionally have access to a variety of information in relation to the kiosk, such as usage, lockers then in use, phone numbers associated with locker, pictures taken by a camera associated with the kiosk going back in time, or the like. Much of this same information, and additional information, may preferably be available to kiosk administrators, who may oversee operation of one, multiple, or many kiosks, such as associated with a given geographic location, a given brand's campaign, a particular data type, or the like. Such administrators may be provided with a dashboard that yields real time access across a network of kiosks, which may include all kiosks or particular portions of kiosks. Using this dashboard, an administrator may be able to investigate all actions over configurable time periods, may be able to schedule maintenance, may be able to oversee customer service or the like, and needn't be at a centralized location, In further embodiments of the invention, photo or video records of users may be stored remotely, such as on an administration server which may be accessed by the customer service or administrator during the PhotoVerification process set forth herein. Further, not only may the system store records of end-users or customers, but it also may log all actions taken by administrative users, including login/logout time, configuration changes, tasks that are sent from server to kiosk, and the like, and may additionally log all actions taken within the system.

The administration server securely stores the user records and makes the user records available on an as-needed basis utilizing secure communication lines. The processing power of a centrally located admin server is considered far greater than the processing power of the charging station, or kiosk, therefore the verification process time is much quicker and results in improved overall user satisfaction. Moreover, security is enhanced by the PhotoVerification process, such as because the subject data remains firewalled.

In the event that a secure connection cannot be established with the administration server (i.e. an Internet connection is down), the authentication process for PhotoVerification may be halted and a user might thus be prevented from initiating the charge phone process, or from retrieving a device if they forgot their mobile number and security credentials. However, if the user correctly enters their mobile number and security credentials while the kiosk is offline, since the information is stored locally on the kiosk for a short amount of time, the user would still be able to retrieve their phone.

Once a device is connected to the charging cable, charging pad, or other wireless method of charging, the charging process may begin. A charging negotiation process may be undertaken, such as at the direction of control board associated with the charging station. The one or more printed circuit boards may provide local hardware interaction and control for various features of the cabinet. By way of example, such as in an eight-locker embodiment, two locker control boards may be provided—one for the upper four lockers control, the other for the lower four lockers control. This provision of multiple locker control boards may allow for a failsafe in the event one locker fails, i.e., the cabinet can continue to operate with the remaining lockers, or may correspond to different uses administratively prescribed to various parts of the cabinet, such as in embodiments where only the lower four cabinets are available for charging if the user requests accessibility mode for use of the cabinet.

More specifically, devices using the offered connectors may be sensed when connected, and may be offered a sequence of charging profiles to identify the most efficient charging standard for the device. In no circumstance is data synchronized between the kiosk and the device in this negotiation.

By way of example of this negotiation, devices being charged may vary the amount of current drawn depending on their battery level. That is, nearly empty devices may draw more current than partially charged devices. A kiosk may ultimately supply 3.0 A or more to one or all lockers simultaneously.

By way of additional example, because the Americans with Disabilities Act may necessitate that only those lockers that can be readily physically accessed by a user may be selected and opened by that user, selection of an ADA accessibility mode on the user screen may indicate to the control board that only the lower lockers, such as lockers five through eight in an eight-locker example, may be opened for a particular user. In addition, all buttons on the touch-screen interface are ADA compliant.

The exemplary disclosed process and system may include ADA-compliant hardware and an ADA-compliance module that may provide configurations and/or processes that comply with the Americans with Disabilities Act (ADA). In at least some exemplary embodiments, the kiosk software and hardware may provide for ADA-compliant operation of the exemplary disclosed system.

The exemplary disclosed ADA-compliance module may operate via the exemplary disclosed user interface so that displays of the exemplary disclosed user interface may be ADA-compliant. For example, some or substantially all displays (e.g., screens) of the exemplary disclosed user interface (e.g., kiosk user interface) may display or exhibit a minimum color and/or font contrast level that is appropriate for visually-impaired users.

The exemplary disclosed system may include hardware (e.g., kiosk hardware or supplemental hardware) to which visually- or auditorily-impaired users may connect their assistive technology devices to facilitate use of the kiosk. For example, electrical outlets and electrical connection ports may be disposed at between about 12" and about 60", or between about 15" and about 48" above floor or ground level. The exemplary disclosed system may also include any suitable electrical connectors for connection to assistive technology devices such as, for example, connectors including Braille descriptions, suitable tactile devices, and/or any other suitable assistive connectors or devices. The ADA-compliance module may recognize a connection of assistive technology devices to the exemplary disclosed system (e.g., to the kiosk). For example based on the identification of assistive technology devices that are connected to the exemplary disclosed system, the ADA-compliance module may operate (e.g., via the exemplary disclosed user interface) to provide suitable display, information, options, and instructions to a user. For example, the ADA-compliance module may operate (e.g., via the exemplary disclosed user interface) to tailor the user experience to one or more connected assistive technology devices for example by automatically playing a series of instructional recordings and/or receiving tactile inputs from the exemplary disclosed supplemental hardware of the exemplary disclosed system.

The exemplary disclosed system may include components configured to provide ADA-compliance. For example, the exemplary disclosed system (e.g., components of the system) may be wall-mounted or placed on a table-top or other suitable surface. For example, the exemplary disclosed system may include a charging station that may include a wall-mounted display and/or a table top or may be a free-standing kiosk that may be designed to comply with ADA criteria to facilitate wheelchair accessibility. For example, the exemplary disclosed system may be configured so that an individual seated in a wheelchair may reach substantially all touchable areas of the exemplary disclosed user interface (e.g., substantially all buttons on a screen of the user interface). Also for example, the exemplary disclosed system may be configured so that the system is wheelchair accessible (e.g., the kiosk may be installed at a location that is accessible by wheelchair). Also for example, the exemplary disclosed system may include a kiosk that may be installed at a location that is suitable (e.g., not a safety hazard) for visually-impaired individuals who may navigate the kiosk using a cane.

The control board may also provide various other functionality, such as charging control, kiosk remote interaction, control of the LEDs or added features, control of the user interaction screen and cameras, and so on. The board may additionally have software or firmware resident thereon that provides optimization functionality, such as by interaction through the aforementioned charging cables. By way of non-limiting example, the board may be comprised of firmware that controls the offered charging profile to the connected phone, and the phone accepts its optimal profile.

As a non-limiting example, the charging board may be pre-programmed with information pertinent to various charging profiles, or may retrieve the information from an external server. Based on this information, the charging process can provide the optimal amount of current to best charge the phone.

More specifically, the optimized charging process may be provided by the board, as discussed throughout. In sum, the disclosed exemplary embodiments provide that a phone may accept only the highest amperage for charging that the phone can handle without degradation. Accordingly, under the control of the aforementioned control board, the kiosk charging cables in the exemplary embodiments may offer various power profiles to the phone and allow the phone to draw optimally at a particular power profile, thereby indicating that power profile to be the proper one for optimal charging of the phone. Moreover, available optimal charging profiles provided by the kiosk control board may include a default profile, such as the lowest charging profile acceptable to all phones, i.e., a laptop phone charging profile of 500 mA. Thereby, the phone may be charged using a default profile, which is typically the lowest profile available, if none of the other profiles are accepted by the phone.

In at least some exemplary embodiments, the exemplary disclosed system may include a cable tester. For example, the exemplary disclosed system may include a consistent technique to test the exemplary disclosed universal interfaces 410 (e.g., charging cables) across a plurality of stations or kiosks (e.g., across the fleet of interconnected charging stations in the field). Consistently using one type of cable tester may avoid inconsistent reporting due to operators (e.g., field technicians) using their personal cable testing devices (e.g., different devices). For example, different cable testing devices and techniques may have unsuitable deviation or lack of precision in charging cable test results based on factors such as battery percentage, type of phone (e.g., type of cable and/or cable testing device), and other criteria. Accordingly, the exemplary disclosed system and process may include operators using a single type of cable testing device and/or cable testing process (e.g., a same or similar technique) for some or substantially all charging cable testing performed by operators such as field technicians. For example, the owner or operator of the exemplary disclosed system may include a customized cable testing device design and testing technique that consistently tests charging cables across a plurality of stations or kiosks of the exemplary disclosed system (e.g., that may be distributed to some or all operators such as to a global team of field technicians). In at least some exemplary embodiments, the exemplary disclosed charging cable testing device may be a handheld charging cable testing device. The exemplary disclosed charging cable testing device and process may thereby provide substantially consistent testing results that may not vary or deviate from each other because they may avoid using variable types of testing devices and/or techniques. The exemplary disclosed system may thereby reduce or substantially prevent inappropriate replacement of suitably operational cables and/or may avoid excessive costs for replacement parts. The exemplary disclosed system may also identify and remove from circulation unsuitable cables that may not provide sufficient charge (and/or that may result in a less than favorable user experience) in a quick, efficient, and consistent manner.

Further in relation to the physicality of the electronics and hardware associated with a kiosk, in typical known kiosk style embodiments, a real estate-style hardware key-based model is employed, wherein a lockbox having a code associated therewith includes there within a key to unlock some aspect of the kiosk. However, once the lock code is given out, such as to a technician or employee, that person forever has access to the key resident within the lockbox. Further, if the key is removed from the lockbox, it can be duplicated or stolen. Moreover, it is often the case that the same key is used across multiple kiosks. Yet further, a hardware lockbox may be "hacked", such as wherein a lockbox code is changed by a skilled artisan, such as a locksmith. Finally, without the algorithms or artificial intelligence that may be provided by software, there is no means of recording or tracking who it is that is entering a kiosk through the use of a code or a key.

Figure 21:
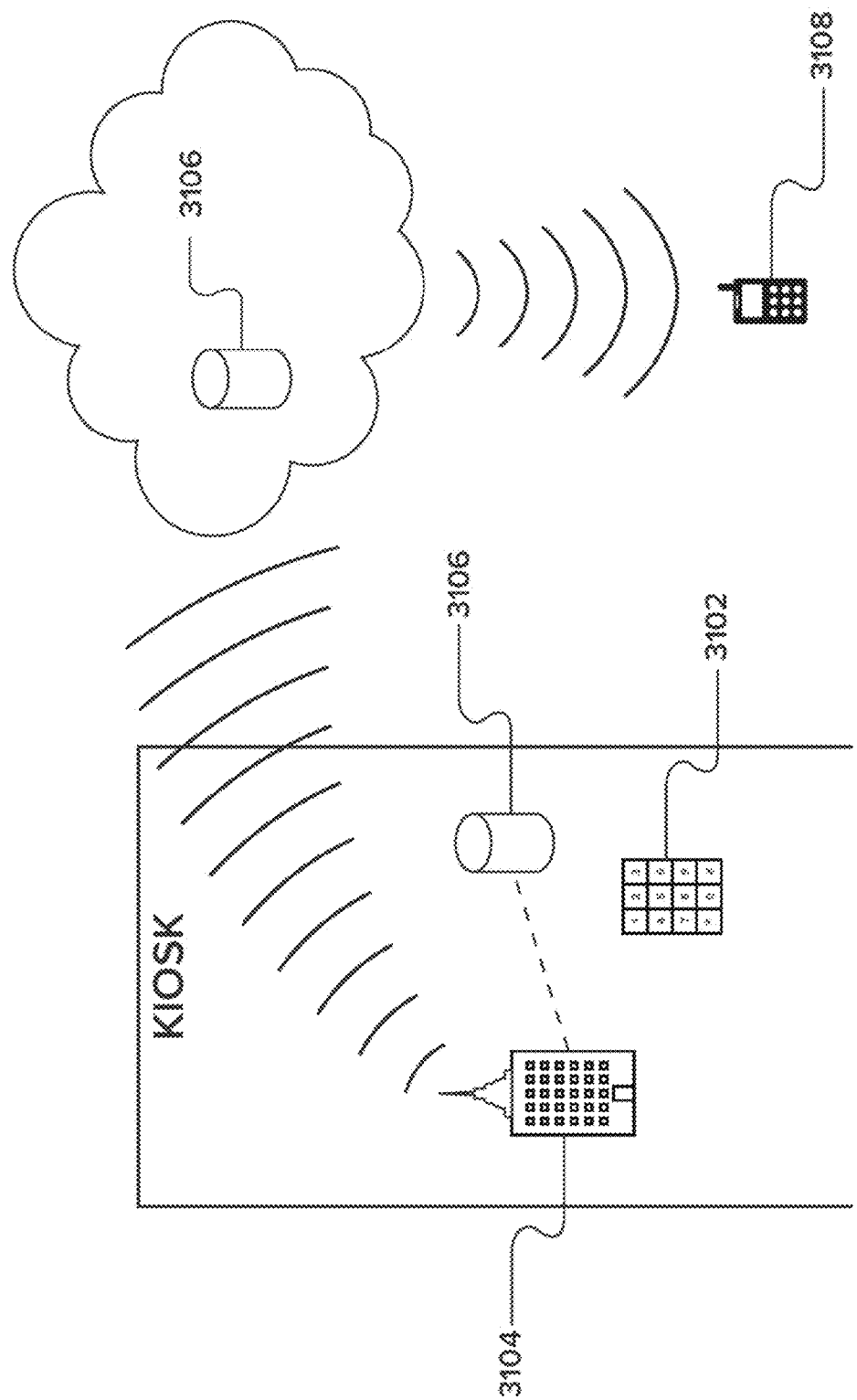
FIG. 21 illustrates a rear electronic keypad as an exemplary embodiment of the invention.

Therefore, the instant embodiments, as illustrated in the example of FIG. 21, may eliminate keyed locks and single perpetual key codes to enter a kiosk, in part by providing a system comprised of a keypad, control board, electronic lock, and power supply and/or a battery backup, which may communicate over 4G LTE (by way of example), such as to the servers, and which may communicate to a master board locally. More particularly, an electronic keypad lock 3102 may have a dedicated controller board 3104 to interact with the "master" kiosk board discussed above, or may be provide as part of a kiosk's on-board computer. The keypad lock may be remotely programmable, and codes may be issued remotely (or locally), such as from an administrative randomized database 3106. Accordingly, an electronic code suitable to operate the electronic lock may be issued from a remote administrator, and may be used only for a single use, a particular number of multi-uses, or over a predetermined timeframe, or for a specific kiosk or group of kiosks, by way of nonlimiting example. Additionally and alternatively, codes may be cached locally in the memory of the computing system on board the kiosk, and such codes may also be single or multiuse. In such embodiments, the codes may be stored on the memory in association with the board attached to the keypad, such that the door may be opened even if the kiosk is off-line or operating only on onboard battery power. That is, a battery backup may be included in the kiosk such that the door may be opened using a locally cached code if the power goes out. Upon use, or after the expiration of a predetermined timeframe, a new code may be issued.

As referenced, codes may be assigned via the remote servers discussed throughout, and may be monitored remotely or downloaded locally for operations, as discussed above. Thus, codes may be changed, revoked, issued, or reissued at any time, either automatically or manually, and locally or remotely. Codes may be assigned by a random generator, by way of nonlimiting example.

Codes may be assigned manually or automatically, as referenced above, and may be downloaded from a manual or automated administrator to a code-user either by push, such as wherein the codes are automatically sent to, for example, a secure app associated with a mobile device 3108 of an authorized user, or by pull, such as wherein an authorized unit or user may request a code in order to open a kiosk. Accordingly, the issuer of the code, the date and time stamp of issuance, and the recipient or recipients of a code may be tracked using the embodiments. The remote manual or automated pushing of codes may require network conductivity, such as to a remote administrative server, although, as referenced above, codes may be batch-replenished so that sufficient numbers of codes are always available, such as in the event of a loss of power. In accordance with the foregoing, employees, technicians, company administrators, representatives, kiosk sponsors, or the like may be issued single use or multiuse codes. Such codes may be revoked or new codes issued in the event the authorization status of one or more recipients of a code changes, by way of nonlimiting example. Further, codes may be region, kiosk, or user specific, such as to enhance security. Codes may also be reusable or non-reusable, such as based on the user, code issuer, use of the code for an entire brand, set of sponsors, region, or kiosk, or status of a code. Use may be for an indefinite time period or may be time-limited. Moreover, codes sent remotely to a kiosk may be sent at regular intervals, by a specific automated or manual push, or the like.

Accordingly, not only may the occurrence of access to a kiosk be recorded, but further, the particulars of who accessed the kiosk and when that access occurred may also be recorded, such as based on electronic signatures from mobile devices at the time of access, the identity of code recipients, and the like. Needless to say, an access methodology such as is discussed above may have applicability outside of the particular embodiments discussed above, such as for any embodiments that employ hardware lockboxes, keyless entry systems, tumbler-based systems, and so on.

During or following charging, the invention may provide a notification process. The notification process may be initiated at discreet events such as upon start charge, upon the completion of a device being charged fully, etc. Users may be notified in a myriad of different ways, including, but not limited to, SMS text message, an email, or the like. Further, once placed in a locker, the phone may remain in a locker for an unlimited period of time or for a predetermined allowable period of time. Moreover, charging in association with particular phone numbers may allow for tracking not only of time of use and location of use for an individual user, but additionally if no use occurs over a period of time. For example, if a user has not charged in 30 days, a text may be sent to the user's phone advertising a particular business previously frequented by the user at which the user charged at a kiosk, from a brand, from a kiosk sponsor, from a particular kiosk location, or the like. The user may be additionally provided with an advertisement, a coupon, a suggested app download, or the like, if the user fits certain use criteria, time of use criteria, or time without use criteria.

Figure 9A:
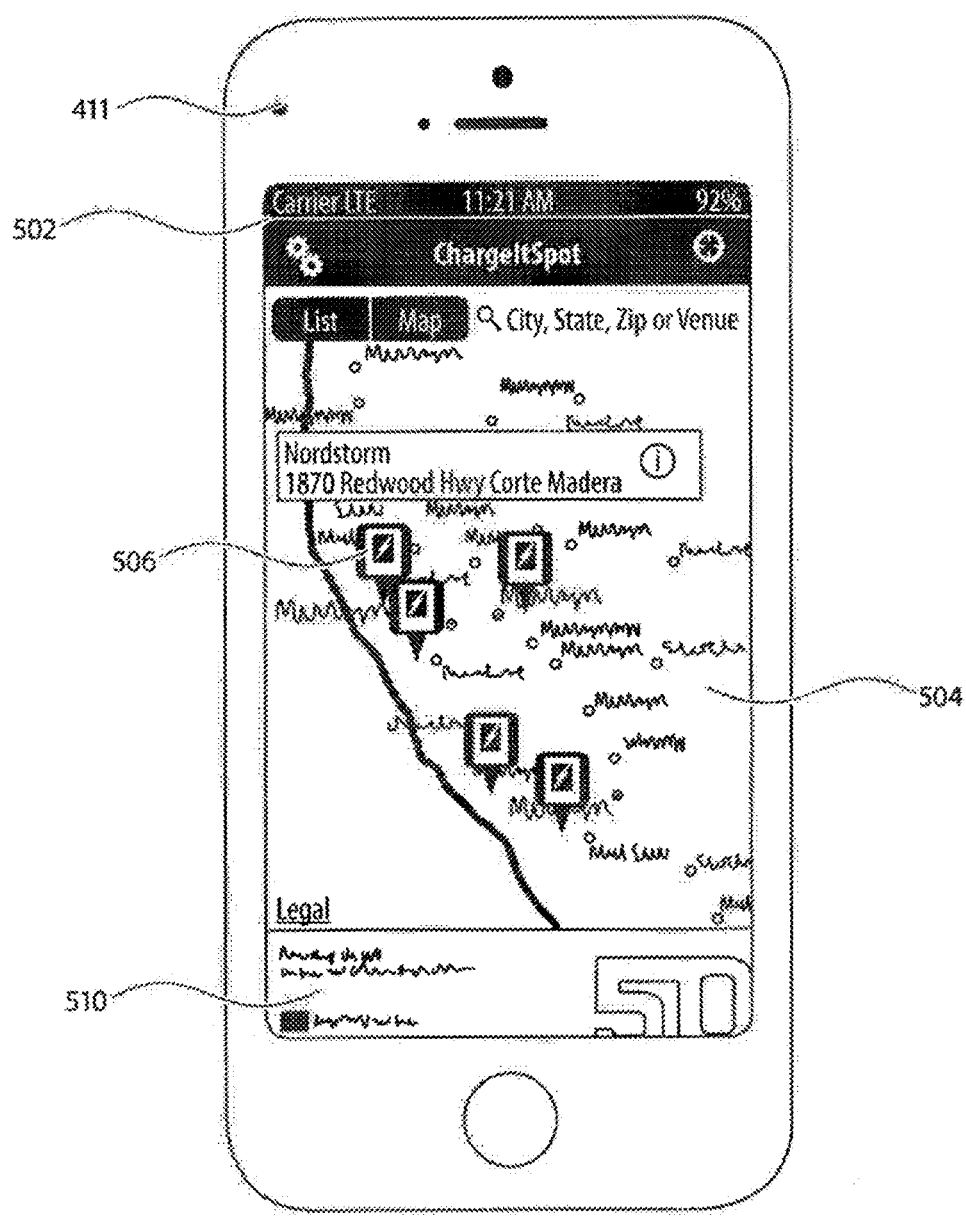
FIGS. 9A-E illustrate exemplary map displays on a mobile device according to embodiments of the present invention.
Figure 9B:
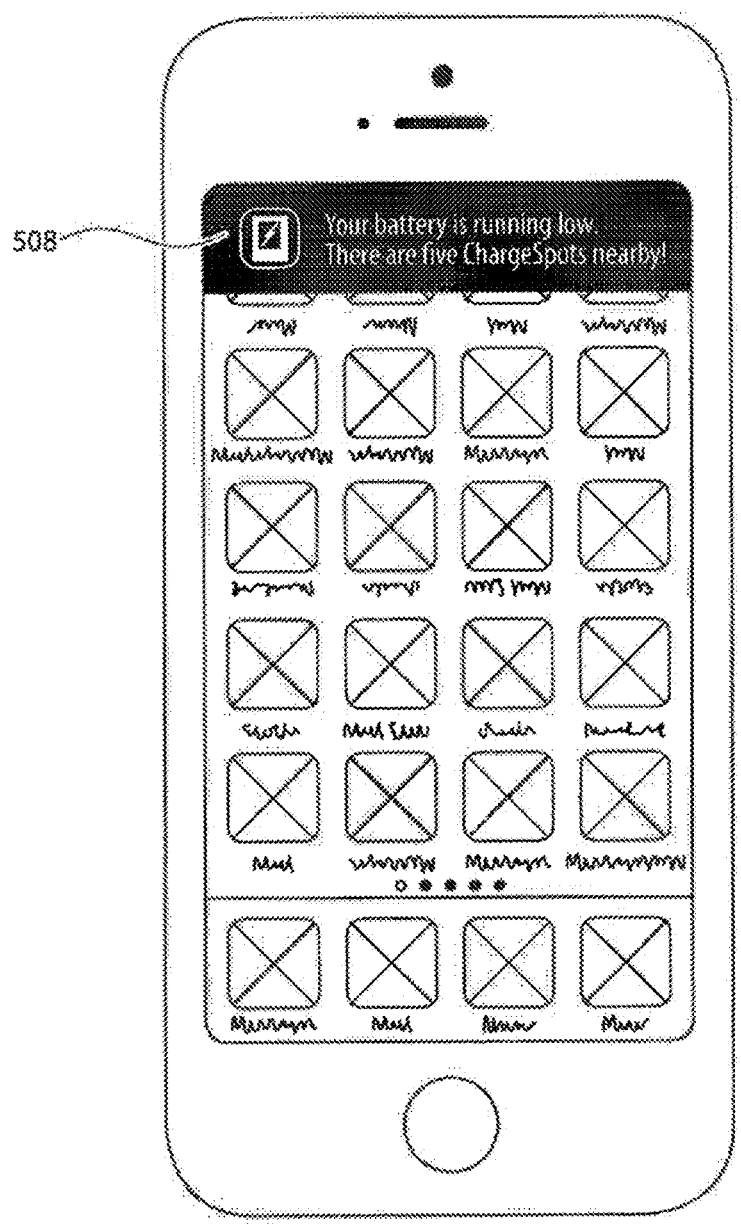

FIGS. 9A and 9B illustrate examples of a map displayed on a mobile device, such as by a mobile application associated with the disclosed systems and methods. As shown in FIG. 9A, for example, the mobile device has a display screen 502. The server (not shown) may access the mobile application on the device, such as upon sensing by the mobile application on-board that battery power has fallen below the predetermined threshold, and may cause the display of a map 504, a notification (such as to allow for subsequent display of a map), or a like-alert on the display screen 502, such as to indicate the need for charging, and/or to recommend prospective charging kiosks.

Of course, the skilled artisan will appreciate that an assessment of user location in relation to a low battery threshold may vary by device/platform type. By way of non-limiting example:

```
Android Battery Low Notification Algorithm
================================
Android OS notifies application battery level has changed
IF battery Level <= minimum charge THEN
   Find current device location
   FOR EACH CIS location DO
      IF CIS location latitude and longitude are set THEN
         compute distance to CIS location from current device location
      END IF
   DONE
   Sort CIS locations by distance from current device location
   Take nearest CIS location
   IF nearest CIS location distance < maximum distance THEN
      Show low battery notification dialog
   END IF
END IF
```

```
iOS Battery Low Notification Algorithm
================================
iOS notifies application that location region has changed
IF battery Level <= minimum charge THEN
   FOR EACH CIS location DO
      IF CIS location latitude and longitude are set THEN
         compute distance to CIS location from current device location
      END IF
   DONE
   Sort locations by distance from current location
   Take nearest location
   IF nearest location distance <= maximum distance THEN
      Show low battery notification dialog
   END IF
END IF
```

The map may populate with certain icons 506 superimposed thereon, such as for denoting the location of certain available charging stations and/or registered businesses having charging stations to the user, and/or how many charging units are available (if any) at a given location, such as responsive to a push notification to a low-battery device, or such as responsive to a user search (such as by proximity, venue, city, state, zip code, etc.). By way of non-limiting example only, a large upside-down "teardrop" icon may denote the location of a charging station 110 with at least one locker currently available for charging. Also displayed on the display screen 502 may be a notification area 508 as shown in FIG. 9B. in which the mobile application may notify the user that his battery power level has decreased to a predetermined level, and that the battery may need to be recharged soon to maintain operation of the mobile device. As shown, the notification area 508 may be located above the map, by way of nonlimiting example.

Figure 9C:
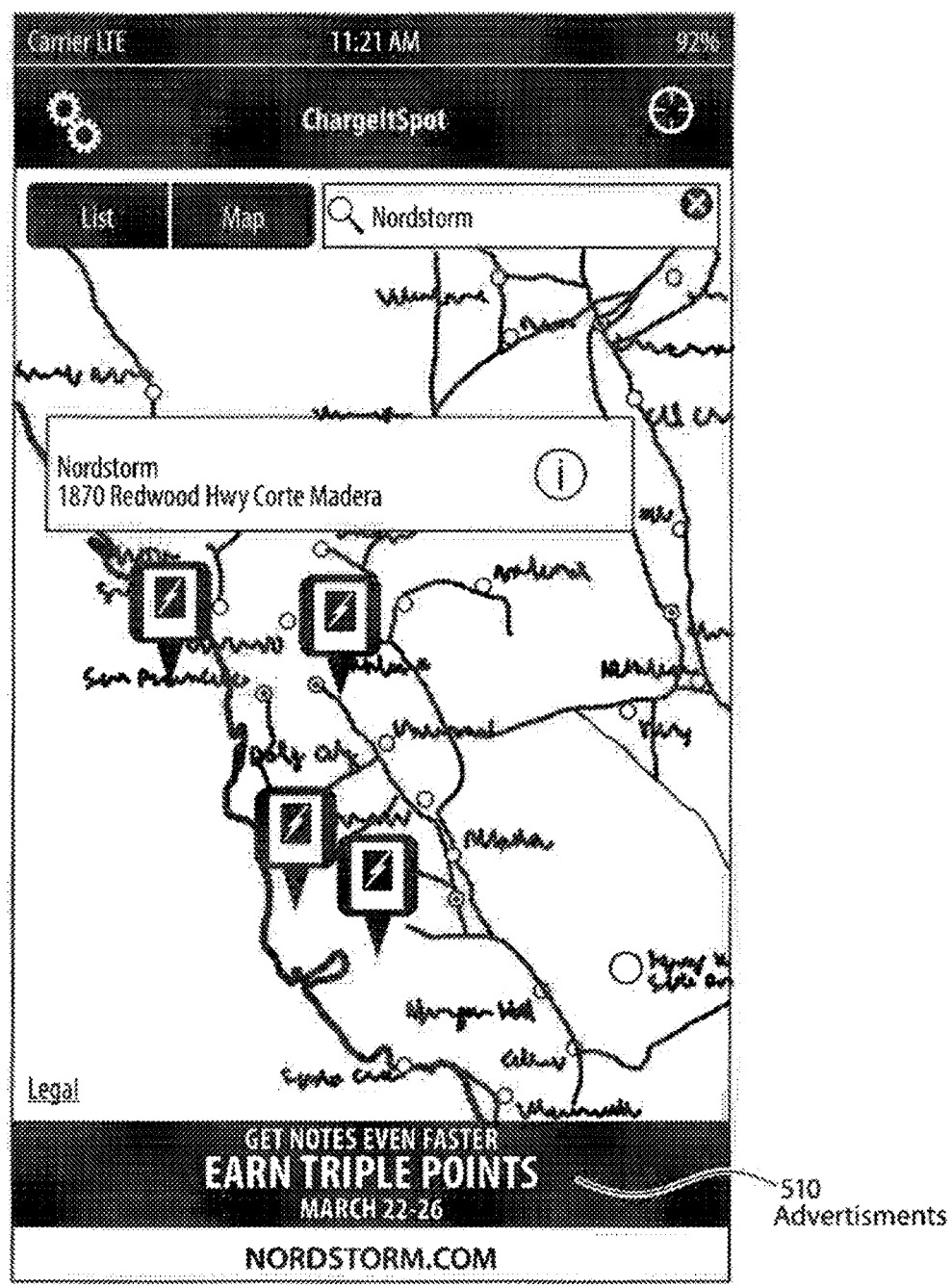

However, embodiments of the present invention are not so limited, as the notification area 508 and/or map may be of any known type, may be tiled or "windowed" in any manner, and/or may be located anywhere on the display screen 502. In an embodiment of the present invention, as illustrated in FIG. 9C, the user may toggle between the map view discussed herein and/or a list view of location which may more clearly identify the most convenient location for the user. Such a list view may, for example, note the distance between the user and the provided locations and may be sorted, for example, from closest to furthest from the user geographically. Similarly, using traffic reporting systems known to those skilled in the art, the sorting may also account for travel time due to road conditions and may sort accordingly.

Further, the configurability of the user presentation in the instant embodiments may include that the user can configure the battery percentage level that triggers a low battery notification, and/or the distance to the closest charging station in order for an alert to be delivered, by way of non-limiting example.

As further illustrated in FIG. 9C, 510 ads may be served within aspects of the GUI and may, for example, be served along with the list of possible charging locations. In an embodiment of the present invention, the served ad may be in the form of a banner ad. The served ad may be used to self-promote features and services provided by the present invention and/or may be sold to third parties. Third party ads may be associated with one or more identified locations and may pertain to that location's particular goods/services offered for sale. For example, a location having a charging station 110 may be predominately in the business of selling shoes, and, more particularly, athletic shoes, and may pay for the delivery of an ad promoting its business and/or offering a coupon for the purchase of shoes. Such a promotion may, for example, offer an additional discount/incentive based on use of the charging station 110.

Further, as referenced herein, once the app is downloaded to the user's phone, information can be readily provided to the user associated with that phone number, such as the pushing not only of ads, but also of data, an app, or the like. Moreover, an app associated with the instant invention, the screen of the charging kiosk, or simple text message may request information from one or more users, wherein that information is desired or needed by locations, sponsors, or the like. For example, email addresses may be requested, such as an association with a retail embodiment and in order to correspond to a particular phone number. Thereby, that retail establishment may develop data regarding phone numbers and matched email addresses of frequent shoppers at that establishment, whereby coupons, advertisements, or the like may be provided to that frequent shopper.

As would be appreciated by those skilled in the art, ads may also be delivered based on location and may be dynamically delivered based on user attributes. For example, an ad may be served according to the proximate of a user to a location where the ad may be relevant, whether or not the relevant location and/or ad is related to a charging station 110 location. Similarly, an ad may be served based on the type of phone used by the user and/or the apps loaded thereon or browsing history. For example, the app of the present invention may query the bookmarks or other internet browsing activity logged on the user device and may use that information when serving an ad.

As would be appreciated by those skilled in the art, ads may be scheduled with a start and end date over a specific time period. The use of revolving and/or multiple ads may be presented to a user and may, for example, create a user specific "playlist". Such ads may be configured as an attribute in any of various available programs known to the skilled artisan.

Figure 9D:
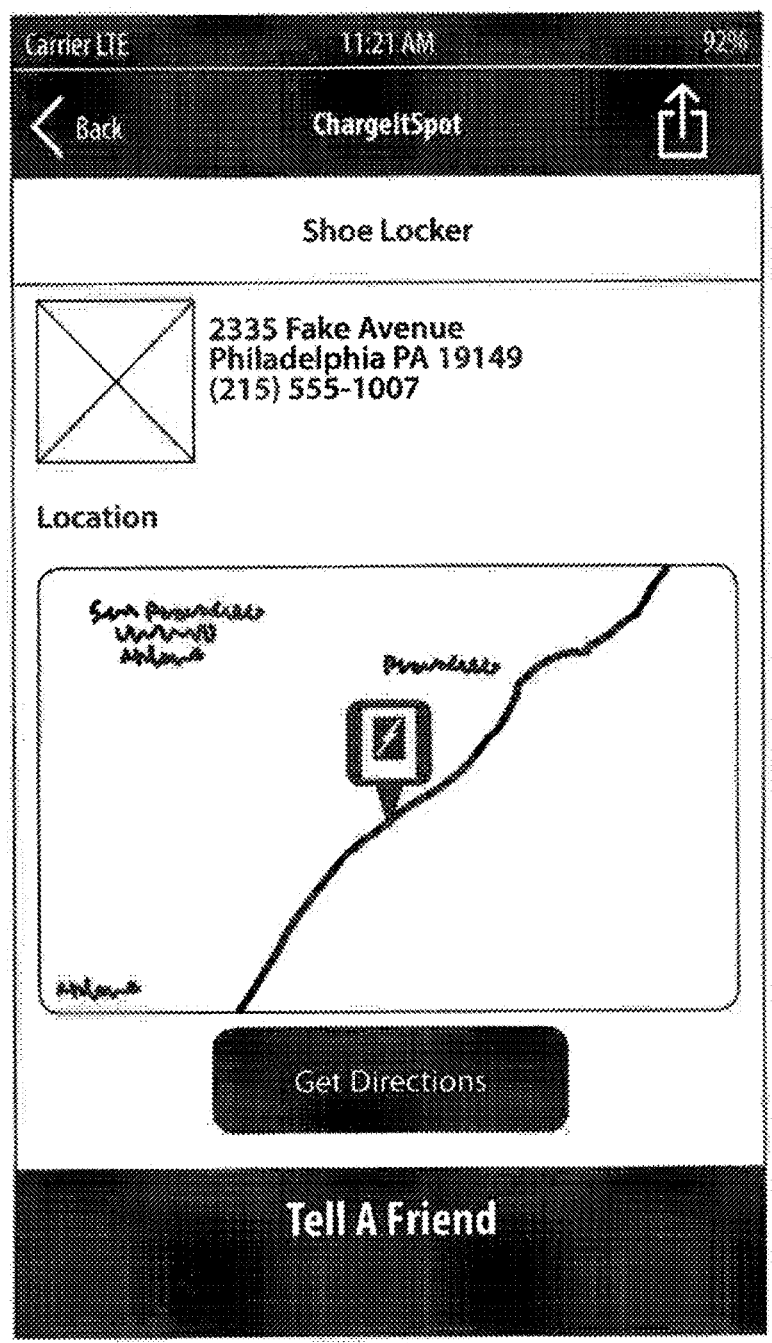

Any selection of a location, whether by selection of a graphically presented location, a listed location name, and/or automatically delivered to the user, may include a detailed map representation and/or the option to obtain directions to the selected location, as illustrated in FIG. 9D. Information provided may also include location details, including contact information, and may allow for the sharing of the location information with other contacts through conventional communication means, such as email and texting, for example, and through social networks, such as Facebook, for example. As would be appreciated by those skilled in the art, obtaining directions to the selected location may include launching a GPS aided mapping app which may be resident on the user device, such as, for example, MapQuest or Google Maps, which may give "turn-by-turn" directions to the user.

Figure 9E:

According to exemplary embodiments, advertising content 510 may also be provided to the user on the display screen 502, such as via the mobile application. The advertising content 510 may include instructions on how to take advantage of special offers or deals mentioned in the advertising content 510. For example, upon reaching a charging location, the user may, either prior to recharging or upon at least partially recharging his device at the participating location, show or play (e.g., in the case of audio-based advertising content) the advertising content on the mobile device to the cashier or other staff at the advertised location, such as to obtain any advertised prices, offers or deals, and/or to be given a coupon or the like. In other embodiments, as illustrated in FIG. 9E, the mobile device user may only have to mention that they received advertising content 510 to receive any relevant special offers. In still other embodiments, the user may be given a code, such as a numeric code, a keyword or password, or other like indicator that, once passed to a cashier or store personnel, indicates to the store personnel that the user has indeed received a special offer on his device to use a charging station at that store. In yet further embodiments, upon accessing the advertisement and/or upon reaching the charging location, a credit, such as may be accessible only in the event of a purchase, may be added to a shopper's card, store card, credit card, user account, or the like of that user.

Embodiments may allow for ordering and/or purchasing and/or searching via the disclosed kiosk, such as in relation to provided advertisements. For example, the kiosk may be communicatively integrated with a kiosk venue's database, and/or with the remote database 302 discussed throughout. Thereby, an order may be sent, such as by SMS, to a user's phone, whereafter the user brings the electronic "receipt" or Q.R. code from the SMS to obtain the ordered product. Similarly, coupons or similar discounts may be provided to the user through the use of the kiosk in the manner discussed above.

Additionally, in some embodiments, advertising content 510 may include an indication that the mobile device user is already heading toward, or is likely to pass, an advertised location. In other embodiments, advertising content 510 may include directions to the advertised location, and/or may link to a website of the location upon accessing by the user, for example.

Situations may arise where multiple nearby businesses may house a charging station, thus driving competition for the user's "foot traffic," and/or for advertising content space (and/or business location recognition by icon 506) on the user's mobile device display screen 502. Therefore, the server (not shown) may employ a prioritization algorithm to determine which participating business or businesses gets to provide an advertisement (and/or location recognition by icon 506) at any given time and location of the user's mobile device, and/or in what order advertisements are listed, displayed, or preferentially listed or displayed. This prioritization algorithm may be based on any number of factors, which may include, for example, user shopping characteristics and a known relation (such as a known preference) to the items of a participating business or business type, the relative location of the user and participating business, the level of participation of the participating business in the disclosed systems and methods (e.g., the fee amounts paid to house a charging station, paid for user access via the mobile application, paid for user data access and/or accumulation, or the like), and the like. It should be noted, however, that these factors should not be so limited, as the prioritization algorithm may apply other information related to consumers or businesses to determine the advertising content (and/or location recognition by icon 506) to be displayed on the display screen 502 at any given time.

As will be understood to the skilled artisan in light of the discussion herein with respect to FIGS. 9A-9E, a software developer's kit ("SDK") may allow for any of the variety of aforementioned notifications to be made to a mobile user in possession of a device suffering from a low battery. More specifically, a brand or charging provider 4100 may embed the ChargeItSpot SDK into their mobile "app" 4101 that a user downloads to a device. The app may communicate, such as via the cloud 4102, with ChargeItSpot's Location Database 4104, by running code provided by the SDK in order to provide aspects of the functionality discussed throughout.

By way of non-limiting example, the app 4101 may recognize that the battery level of the phone on which the app resides is low, such as that the battery level has fallen below a predetermined threshold, such as 20%. This may trigger a notification 4110, such as per the SDK, to the user, such as from the brand or charging provider 4100 that the users battery is low and a charging station exists at a location within a preconfigured proximity of the user's device. Similarly, the app could simply provide a notification of the existence of a charging station based on an algorithm employed by the SDK within a nearby location user's device, based on proximity alone. This notification may be delivered in a manner predetermined from the SDK, such as via in-app notification, a banner notification, a push notification, one or more of the above, or via any other known notification means.

Of course, other predetermined triggers may be employed besides current battery level, such as an assessment of low battery without indication to the user that the battery level is known; low battery once a battery threshold is reached, regardless of current battery percentage; loss of an additional threshold of battery level, i.e., the loss of an additional 5% or 10% since the last notification; a periodic recommendation to charge; periodic in-app ads as discussed above; and so on. This is further made evident by the illustration of FIG. 23.

The notification that is thus delivered may be of any suitable type provided to and by the SDK. For example, a low battery notification may stimulate a notification, such as in-app, of geographically proximate (such as within a predetermined geographic radius based on interaction with the SDK) locations of the brand or charging provider at which the device's battery may be charged, and/or at which charging lockers are available, and so on. Needless to say, certain types of notifications may require certain permissions from the device OS, such as the use of location services by the app, the use of local notifications in-app or via push notification, and/or other necessary background processing functionality, in the foregoing example.

Moreover, other thresholds may be set according to the SDK, and in relation to the notifications discussed throughout. For example, if a user agrees or otherwise acts to seek out the location of the nearest brand-owned charging location, the user may receive no additional notifications. However, if the user closes the notification, the notification may be provided anew, such as with increasing frequency after each time the user closes the notification.

Yet further, the mobile device suffering from low battery needn't be the same mobile device that receives the notification. By way of example, the SDK may provide for an app on a second mobile device to receive a notification based on the battery threshold on a first mobile device, wherein the first mobile device may or may not include the same app, or a second, communicative app, as the second device's app.

Furthermore, the SDK technology to provide notifications of nearby charging stations within partner apps that may not have any of their own charging stations. For example, an app that drives a customer into a store to redeem a coupon could also provide their users notice that a charging station is located within. Or an app that provides low battery notifications could provide users with information on where the nearest charging stations are located. And so on.

Figure 10:
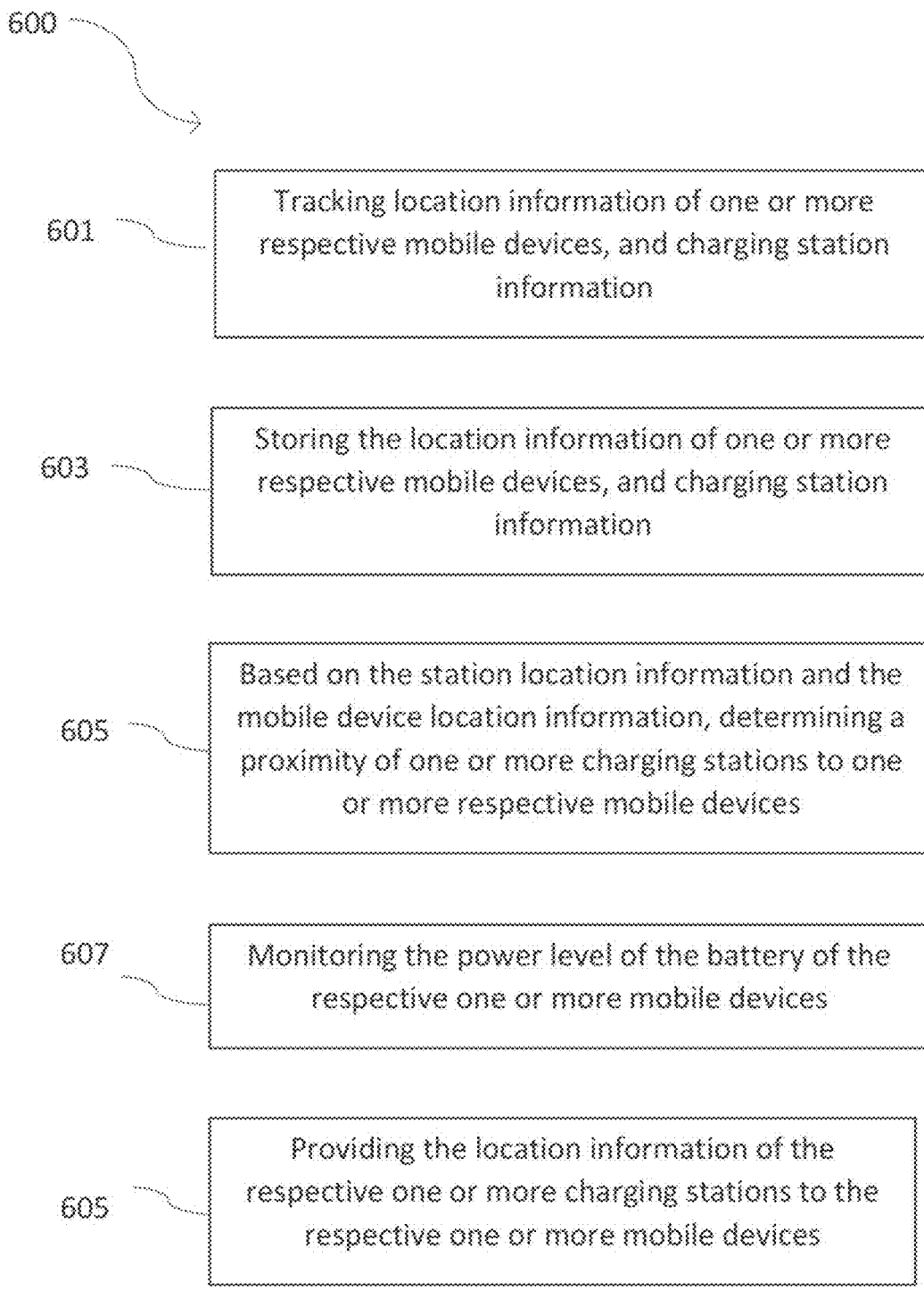
FIG. 10 is an exemplary method employed by the system according to embodiments of the present invention.

In accordance with one or more embodiments described herein, and with reference to FIG. 10, there is shown a methodology 600 operable by a system according to embodiments of the present invention. It is noted that numbers associated with the blocks of FIG. 10 do not imply a particular order in which the corresponding steps are to be performed according to the method 600.

In FIG. 10, step 601 includes having location information of one or more respective mobile devices, and charging station information. Step 603 may include having the location information of one or more respective mobile devices, and charging station information. Based on the station location information and the mobile device location information determining at step 605, a proximity of one or more charging stations to one or more respective mobile devices. Step 607 may include monitoring a power level of the battery of the mobile device. Step 609 may include alerting a mobile device user and providing the location information of the respective one or more charging stations to the mobile device. The location information may be provided to the mobile device based on a power level of the battery of the mobile device decreasing to a certain power level and/or based on a determined proximity of one or more charging stations to the one or more mobile devices.

Further, the mobile app may provide, such as on the map, or in a list or secondary window in conjunction with the map, an indication of one of the registered businesses with local charging stations available and which are making special offers, such as sales, coupons, targeted offers based on the user's history (in the mobile app and/or on the device more generally), and/or unique deals for users of the present invention.

The aforementioned mobile app may serve to monitor a mobile device charge, and alert a user to a need for recharge, i.e., the disclosed mobile app may be a stand-alone mobile app for alerting a user to a low device battery. The charge threshold for an alert may be predetermined, such as by being preset in the phone or app, or entered by the user, as discussed herein.

Once the user selects one of the registered businesses on the mobile app, the user may seek out and/or be directed to the selected business. Upon arrival, the user may or may not be provided with advertising at the charging station, such as by a display associated with the station. Further, the user may be asked, such as via the same display or via a second display, to enter user information which provides security for the user's device once placed into a charging unit. Additionally or alternatively, the charging unit may secure the device by a physical key.

Via any user-entered information and/or via a profile entered by the user (such as into the mobile app), and/or via user actions, a user profile may be created. For example, redeemed deals and special offers made in the mobile app may be tracked by the disclosed system as an indication of user product and service preferences. The profile may be maintained by the system discussed above, and may allow for targeted marketing, both of the charging services discussed herein, and of third-party goods and services, such as those provided by the registered business and/or by other businesses. For example, geo-targeted ads may be offered via the mobile app.

Moreover, the accumulation of user data from the mobile app and phone battery, in conjunction with charging behavior at locations, creates an opportunity to develop user profiles. These profiles may include recency and frequency of visits to locations, charge duration, charging tip type, battery life by device type, by usage type, or the like. The data may thus serve as a research tool for device manufacturers, researchers or marketers, or as a purchase tool (i.e., which device has the best battery life, to the extent the data is made publicly available) for a user and/or for a non-user.

Figure 11:
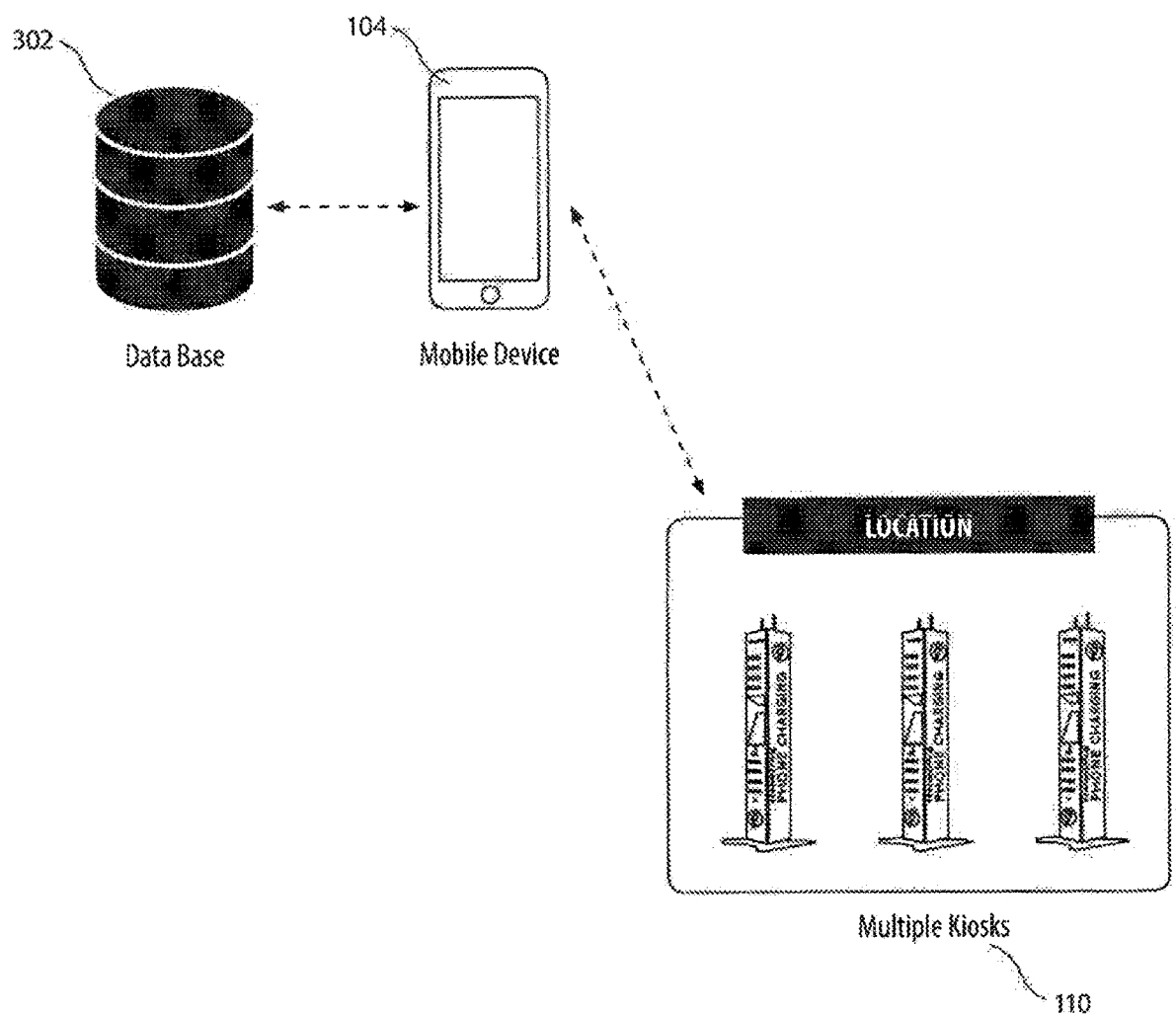
FIG. 11 is an exemplary embodiment of the present invention.

In accordance with the foregoing, and as illustrated in FIG. 11, the disclosed embodiments may provide a network, such as may be formed by the disclosed charging stations 110, businesses (which, although shown in the figure as a "shop," may be any type of public or private business), and mobile devices 104, and, more particularly, as between communicative interconnectivity, advertisers, and user mobile apps. In an example of the disclosed systems and methods, a user may download a mobile app to his device, and may set a 20% level for battery recharging—meaning the user will receive an alert from the mobile app once his phone has less than a 20% battery charge.

By way of non-limiting example, after charging his phone for the first time, the user may be prompted via SMS or other method to download the mobile app. Further, the mobile app, and/or participation in the disclosed systems and methods, may be free for consumers, and available for a monthly fee to the registered businesses. Alternatively, a fee may be charged to consumers, or a charge to consumers may vary based on consumer actions. For example, a user's willingness to accept/view/watch one or more advertisements or promotions may cause a modification, such as a decrease or elimination of, any fee due from consumers for the mobile app, the mobile app services, or the charging services. Moreover, the present invention may be free to some businesses, such as those willing to sponsor or host charging units, but may be available at a fee to other businesses.

By way of further, non-limiting example, the charging units/kiosks/lockers discussed throughout may be placed in a registered business subject to, for example, payment of rent. This and other costs to the charging unit provider may be recouped by charging consumers for the services discussed, by accepting sponsorships, by accepting advertisements or promotions to be provided to consumers (which may be from the registered business ultimately used by the user and/or from other registered businesses and/or sponsors) for a fee, and the like. Additionally, payment may be received for other occurrences, such as revenue sharing. For example, a credit card company, such as VISA, may sponsor a kiosk, and thereby the kiosk may be free to use for consumers who swipe a VISA card. For users who do not hold a VISA card, the use of the unit may be free to those consumers if they agree to apply (such as conveniently through an electronic interface at the kiosk) for a VISA card. Upon receipt of an application for a VISA card, VISA may pay a fee to the kiosk provider.

Kiosks/charging stations may be provided by any number of charging models. For example, in a first model, the kiosk may be leased, such as monthly. In such embodiments, maintenance may be provided as part of the lease, and other features, such as providing brand wrapping, may be provided for fees. In a second embodiment, a kiosk may be sold to a client. In such an instance, a charge may occur for any maintenance of the kiosk, as well as providing of other aspects, such as providing a brand wrap for the kiosk.

In yet a third model, the kiosk may be provided based on a branding or sponsorship model. In this model, a particular brand may pay to have a kiosk placed at a particular location, such as a retailer, or the brand may pay for data collected from kiosk usage. By way of nonlimiting example, such payment may be in the form of a monthly fixed fee, or based on data gathered through kiosk usage, or based on the number of users per month. The retailer may allow placement for free, or may request a revenue share with the provider of the kiosk. In such embodiments, maintenance may or may not be an additional charge to the paying brand, and wrapping of a kiosk for advertising purposes, such as on the outer portions of the kiosk, a header panel, such as a backlit header panel, of the kiosk, a kick plate or ad plate at the bottom of the kiosk, or the like, may again constitute an additional charge to the brand payer for the kiosk.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium, and preferably on a non-transitory computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Figure 12:
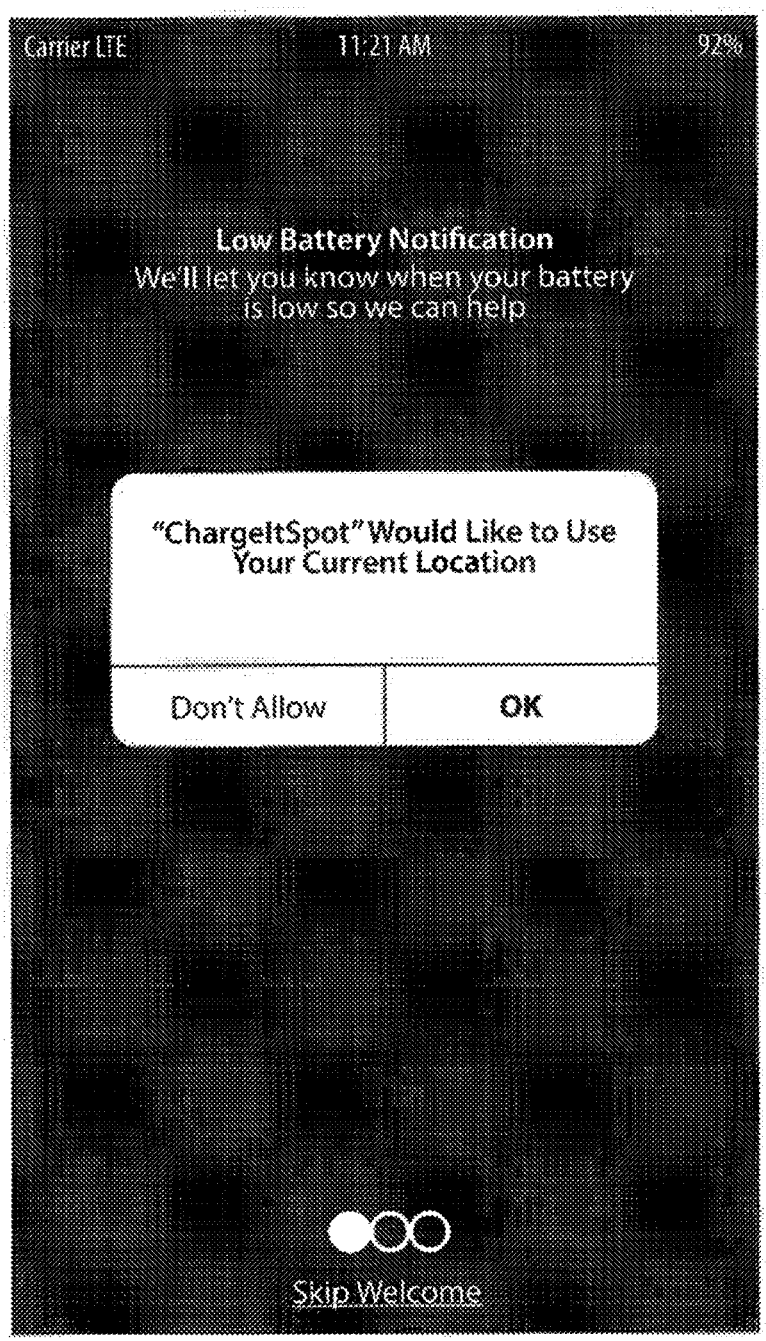
FIGS. 12-15 illustrate exemplary mobile app screens for the present invention.

As illustrated in FIG. 12, a graphical user interface ("GUI") of the mobile app associated with the present invention may be provided through an app which may be obtained through any convention means, such as through an app store, for example. Although certain features offered through the GUI may be activated and/or deactivated by the user at any desired time, the app may prompt the user to allow for location based services to provide the most useful user experience in relation to the features described more fully herein.

Figure 13:

The GUI may provide an indication of the charge capacity, as shown in FIG. 12, and the charge remaining in at least one battery and/or battery cell, associated with mobile device 104. The GUI may also include indicators as to page and/or content amount and the location of the user among such options. For example, as illustrated in FIG. 13, pagination of the GUI may be exemplified by the use of small circles which may allow the user to more easily navigate between screens of the GUI. Although many forms of navigation may be used, in a preferred embodiment, the user may toggle between GUI pages by swiping to the left and/or to the right.

Figure 14:
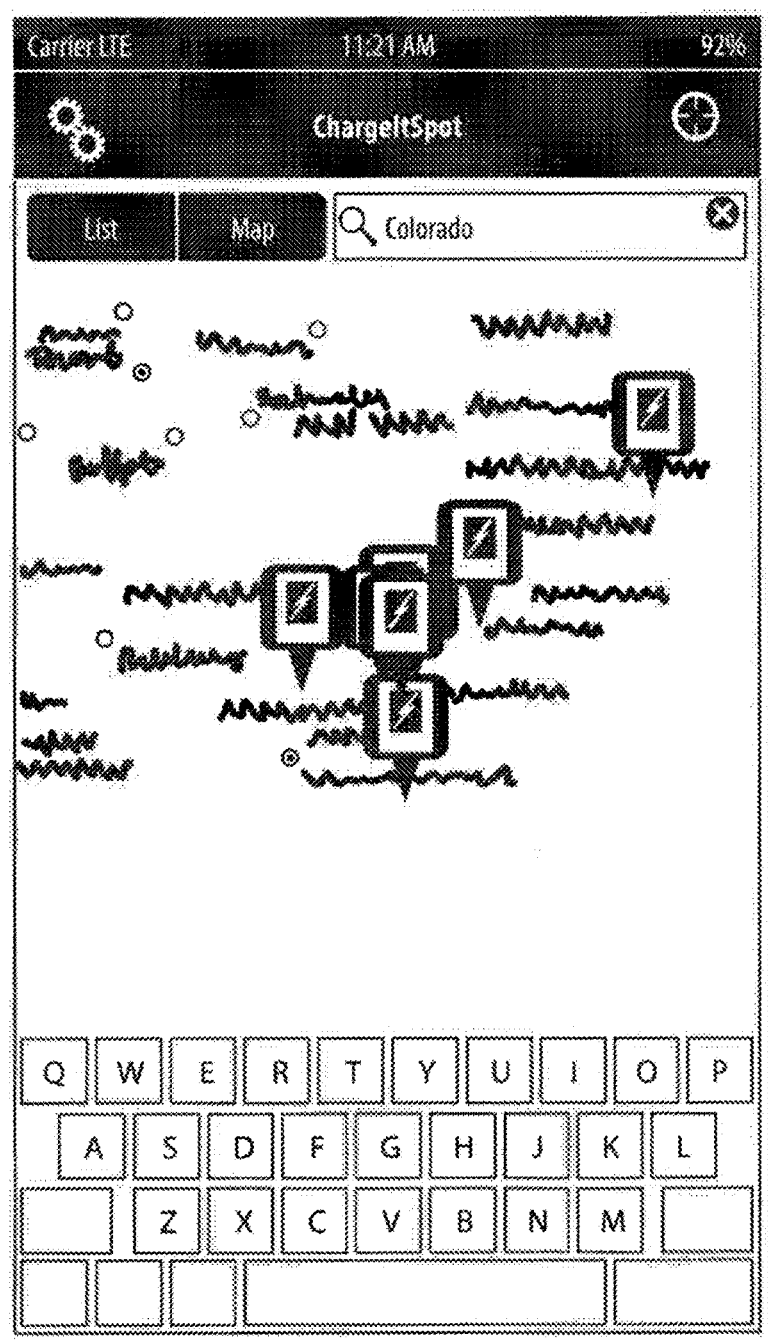

As illustrated in FIG. 14, search functionality may be presented through the GUI and used to identify the closest charging location to the user. If, for example, there are not locations within a defined range of the searcher, which range may be predefined or set by the user, the app may collect that information and allow such information to be collected by a third-party administrator to inform the administrator of user desired locations. Similarly, such information may allow for the delivery of ads based on the user's location and may allow for the delivery of ads outside the network of ads related to charging locations. Furthermore, a user may select a proximity distance which may be selected from a list having ¼ mile, ½ mile, 1 mile, 2 miles, 5 miles, and/or 10 miles as choices, by way of non-limiting example.

The exemplary disclosed process and system may include a safety system having safety components such as, for example, gloves, styli, shields, and other suitable safety components. For example as illustrated in FIG. 4C, the exemplary disclosed system may include a safety assembly 490. Safety assembly 490 may provide one or more safe and/or contactless techniques for users (e.g., consumers) to interact with stations or kiosks (e.g., phone charging kiosks) of the exemplary disclosed system. Safety assembly 490 may include a dispenser that may be provided on a station or kiosk housing and that may operate to dispense gloves that a user may wear while interacting with the exemplary disclosed user interface (e.g., a touch screen). The gloves may be dispensed manually or automatically by safety assembly 490. For example, safety assembly 490 (e.g., or the exemplary disclosed system) may include a motion sensor that detects a presence or approach of a user (e.g., or may detect when users wave their hands), and based on this detection safety assembly 490 may automatically dispense a glove or pair or gloves to the user. The gloves may be single-use gloves (e.g., latex, PVC, PVA, neoprene or any other suitable type of glove for preventing a transmission of bacteria, viruses, or other pathogens), which may provide a contactless experience (e.g., avoid direct contact).

Safety assembly 490 may also dispense contact devices such as styli, "hooks," or other similar contact devices similarly to the exemplary dispensing of gloves described above. A user may utilize the manually or automatically dispensed contact devices to press buttons on the exemplary disclosed user interface of the station or kiosk (e.g., screen) and/or to push a door (e.g., locker door) closed after a device such as a user phone is connected or disconnected (e.g., to a charging cable of the exemplary disclosed station or kiosk).

Safety assembly 490 may also include a glove, styli, and/or waste disposal bin that may be attached or mounted to the station or kiosk to provide an efficient and effective technique for a user (e.g., customer) to dispose of any materials used to facilitate touchless interaction. Users and/or venue operators may opt into one or more of the exemplary disclosed components of safety assembly 490 as add-ons (e.g., via entering input or making selections via the exemplary disclosed user interface) to utilize to reduce the spread of germs and viruses from the kiosk at a given venue. For example, users and/or venue operators may provide suitable payment to have access to the exemplary disclosed components of safety assembly 490 (e.g., and to pay for use of one-time use components of safety assembly 490) to reduce a probability of infection to a user or to users at a given station or kiosk located at a given venue.

The exemplary disclosed system may also include a shield component 495 disposed at any desired components, for example as illustrated at FIG. 4C. Shield component 495 may be for example a shield layer. For example, shield component 495 may be disposed at the exemplary disclosed user interface (e.g., touchscreen) and/or other touchable areas of the station or kiosk. Shield component 495 may be an anti-pathogen shield such as an anti-virus shield. For example, shield component 495 may be a layer that is mechanically attached (e.g., or magnetically attached) or adhered to surfaces of the station or kiosk. For example, shield component 495 may be formed from thin transparent or translucent (or opaque material). Shield component 495 may be formed from any suitable metallic or plastic material. Shield component 495 may include materials that may prevent pathogens such as viruses and bacteria from replicating or spreading, thereby rendering the pathogens inactive over a period of time (e.g., with no additional cleaning involved to maintain sanitization).

The exemplary disclosed process and system may include a location module. The exemplary disclosed location module may provide a functionality for verifying location functionality (e.g., on a tool menu of an exemplary disclosed graphical user interface such as a Tools Menu PM Workflow).

The exemplary disclosed location module may provide for when operators, users, and/or clients move an exemplary disclosed kiosk to a new location such as, for example, a new location within a venue (e.g., a same venue). Regarding such changes in location, the exemplary disclosed location module may substantially prevent disadvantages such as a precise location of a kiosk no longer being accurate in view of internet resources or other resources (e.g., Google maps, website locators, mobile apps, and/or any other desired locator resources). For example, the exemplary disclosed location module may substantially prevent a change in location of a kiosk (e.g., being moved from a select coffee chain store to a location at an escalator, or any other move) from resulting in kiosk customers not being able to find the kiosk, which may potentially lower kiosk usage. The exemplary disclosed location module may help customers and/or technicians who service kiosks to find new locations of kiosks that have been moved. The exemplary disclosed location module may provide system users and operators with an additional and/or alternate process of being updated with changes to locations of kiosks in addition to being informed by a customer or field technician via phone, email, and/or any other suitable technique.

Figure 22:
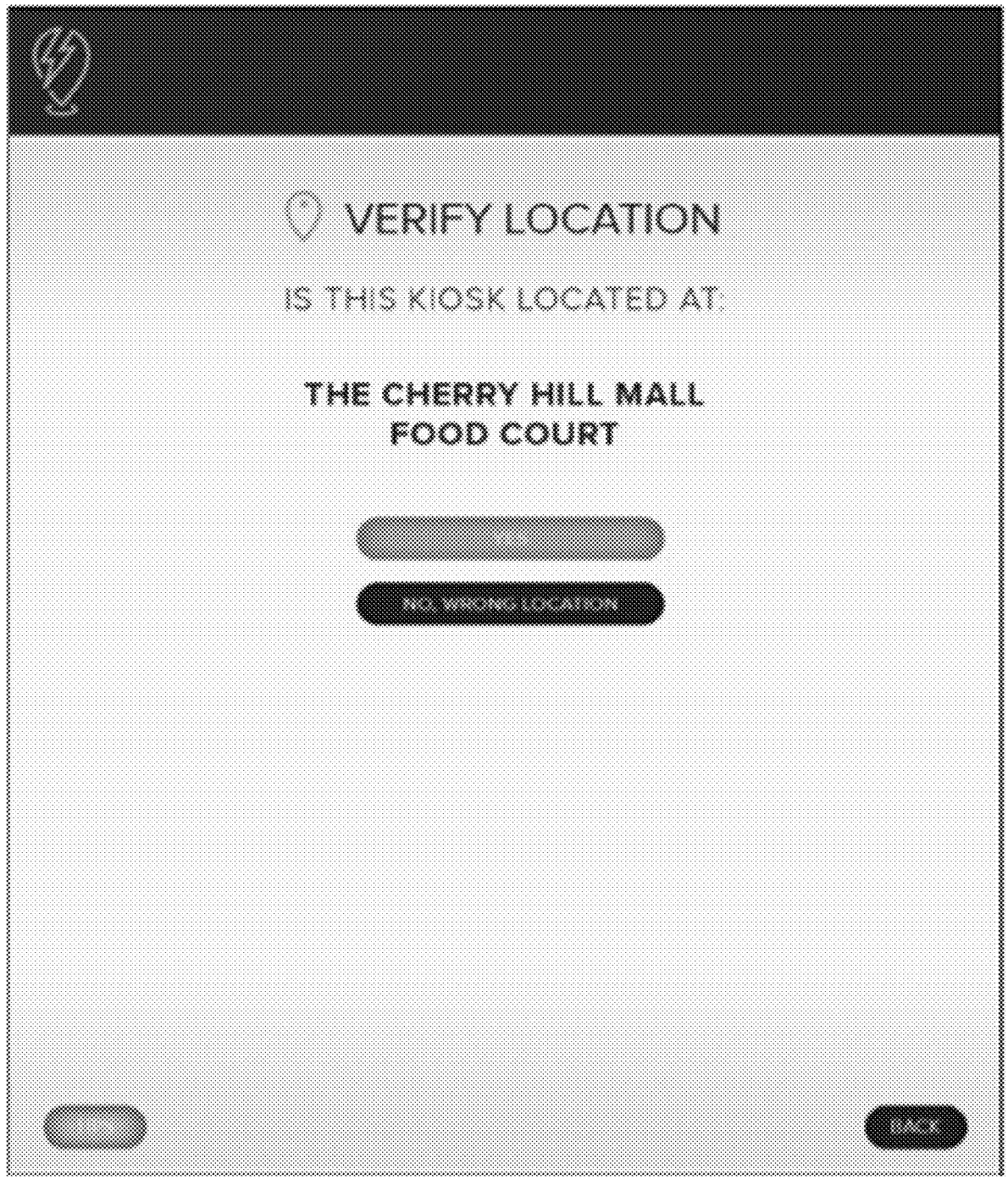
FIG. 22 illustrates an exemplary disclosed location module display for an exemplary disclosed user interface.

The exemplary disclosed location module and process may include using the exemplary disclosed user interface of the kiosk such as, for example, a Kiosk Tools Menu (e.g., special operator menu of a graphical user interface). The exemplary disclosed location module may periodically (e.g., weekly, bi-weekly, monthly, at each service time, and/or any other desired time period) query a field technician who is servicing the kiosk for location data. The exemplary disclosed location module may query an operator such as a service technician for location data each time the field technician accesses or logs on to a given kiosk (e.g., enters security credentials or uses any other digital, biometric, and/or mechanical access technique). For example, the exemplary disclosed location module may query an operator via a user interface (e.g., of the kiosk or a user interface of the operator) each time the operator accesses a given kiosk. FIG. 22 illustrates an exemplary location query for an operator, which may direct the operator to enter input indicating whether or not the kiosk is located in the location currently stored by the exemplary disclosed system. If the operator enters input indicating that the location has been changed, the exemplary disclosed location module may query the user for additional location data. For example, an operator may type in details about the location using an exemplary disclosed user interface (e.g., of the kiosk, operator, and/or any other suitable user interface). For example, the exemplary disclosed module may prompt the operator (e.g., technician) to upload one or more photos of the kiosk in its present (e.g., new) location. The operator may enter data using the Tools Menu of the exemplary disclosed user interface. The exemplary disclosed system may then be updated based on the data, with the updated data of the kiosk location being cascaded to some or all desired systems (e.g., kiosk website locator, mobile app, and/or any other desired data system may be updated).

The exemplary disclosed location module and process may also provide a suitable update data packet for poor connectivity locations such as, for example, a partial software update for poor connectivity locations. As new versions of the exemplary disclosed system are released, data updates such as software updates may be pushed to some or all system locations (e.g., kiosk locations). For example, the exemplary disclosed system remotely pushes data packets (e.g., software updates) to some or all locations (e.g., kiosks of the exemplary disclosed system's fleet). In at least some exemplary embodiments, an update data packet or package (e.g., a software package) may be up to 150 MB or more in size (e.g., and may include some or all elements of a software update).

Some locations (e.g., kiosk locations) may be located in areas with relatively low connectivity (e.g., for internet, Wi-Fi, data, cellular, and/or any other suitable system for transmitting data) and may be unable to receive an entire data packet (e.g., software package), which may result in a failure of the update. Because many or most elements of the software of the exemplary disclosed system (e.g., kiosk software) may not change from one release to the next release, the exemplary disclosed system may provide a reduced data packet. The reduced data packet may include data elements that have changed between given releases, and may not include data elements that have remained the same between given releases. The reduced data packet may be sent to some or substantially all locations (e.g., kiosks). For example, the reduced data packet may be sent to kiosks that have been identified to be in low connectivity areas for example based on data query and input similar to the exemplary disclosed location change process described above (e.g., regarding FIG. 22). Also for example, the reduced data packet may be sent to substantially all locations, for example including both locations that are in relatively good connectivity areas and location in relatively low connectivity areas (e.g., and/or any desired portions or subsets of locations may receive complete software updates or reduced software updates). The exemplary disclosed location module may thereby reduce operational costs and may also efficiently provide the latest software updates to a substantially entire fleet of locations. For example, the exemplary disclosed location module may avoid costs associated with sending a technician to manually update software of locations in relatively low connectivity areas.

The exemplary disclosed location module and process may also provide for efficient and effective use of international phone numbers. The exemplary disclosed system may use a user's mobile phone number (e.g., 10-digit mobile number) that may be entered by a user via a location user interface (e.g., a touchscreen of a kiosk user interface) to gain access to a locker. The phone number may for example be a main or primary user identifier (e.g., key identifier). In addition to querying users to enter 10 digits on an "Enter Mobile" page or other suitable input field, the exemplary disclosed system may also provide international-location-based data entry based on a nation in which a kiosk is located. For example, many international or foreign mobile numbers include a different number of digits than a 10-number U.S. mobile phone.

The exemplary disclosed location module and process may include a process for receiving entry of international phone numbers. For example, the exemplary disclosed module may query a user for a mobile number based on predetermined nation data associated with a given kiosk, based on GPS or other location-positioning data or sensing of a given kiosk, and/or based on a user inputting country location data in response to an input inquiry made by the location module via the exemplary disclosed user interface. For example using the exemplary disclosed location module and user interface, a user may select a country code and/or any other suitable entry format based on selecting a nation or other suitable data from the exemplary disclosed user interface (e.g., pull-down on a touch-screen of a kiosk). A user may thereby select a mobile phone data entry field having a correct number of digits for that user's nation. In at least some exemplary embodiments, a user may select from a country code or other list to be provided with a proper format for entry of the user's mobile number using the exemplary disclosed location module and user interface.

The exemplary disclosed location module and process may automatically detect a locale (e.g., a country) in which the user is located and automatically present a correct format for entering a mobile number. For example if the kiosk is located in Mexico, a default format for Mexican phone numbers may be presented to users via the exemplary disclosed location module and user interface. Also for example, a user from the U.S. visiting Mexico that may be using the same kiosk may press an "international button" on the exemplary disclosed user interface to enter for example a number having 10 digits (e.g., U.S. mobile phone format) so that the user may still utilize the kiosk in Mexico using a U.S. phone number while the user is traveling.

The exemplary disclosed location module and process may also provide for reliable and secure entry of a mobile phone number to the exemplary disclosed system. To provide for security, when a phone number is entered by a user via the exemplary disclosed user interface (e.g., a touchscreen), the digits may appear as asterisks in a displayed phone number field. The exemplary disclosed location module and process may reduce a probability and/or substantially prevent a probability of a user making an error (e.g., mis-keying or mistyping) entering the user's number and not being able to detect the error because the phone number may be obscured by asterisks or other suitable objects. The exemplary disclosed location module and process may thereby reduce a probability and/or substantially prevent a probability of the user being unable to later retrieve the user's phone because the phone number entered upon retrieval may not match an incorrect number first entered by the user. For example using the exemplary disclosed user interface, the location module may for example provide an option (e.g., display an eye icon on a screen) for displaying either asterisks or digits. Using this option (e.g., using the graphical user interface element to toggle back and forth between digits and asterisks), users may see the numbers they have entered in the case they desire to verify a number. For example, the exemplary disclosed location module may instruct the user to toggle back and forth between asterisks and digits to confirm the entered number. The user may use the option (e.g., tap an "eye" icon again or other suitable element) to hide the numbers as asterisks or other suitable objects for maintained security. Also for example, after a correct number of digits has been entered by a user via the user interface, the exemplary disclosed location module, via the user interface (e.g., keypad), may not allow the user to enter in additional numbers. For example, the exemplary disclosed system may subtly gray out the asterisks or digits (e.g., numbers) to provide a visual cue to the user that no additional digits may be entered (e.g., based on the predetermined number of digits for a selected country for example as described above being entered).

Figure 15:
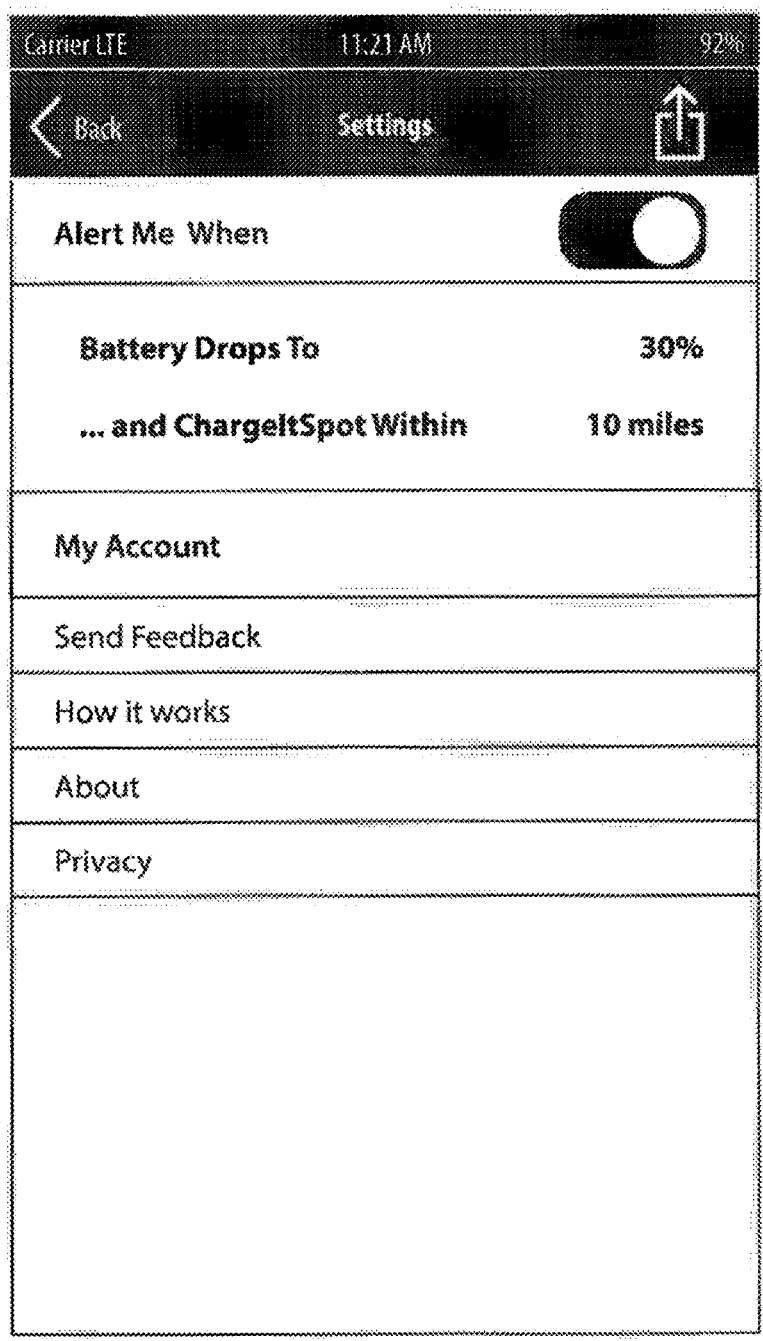
Figure 16:
FIGS. 16-20 illustrate exemplary kiosk user interface screens of the present invention.
Figure 17:
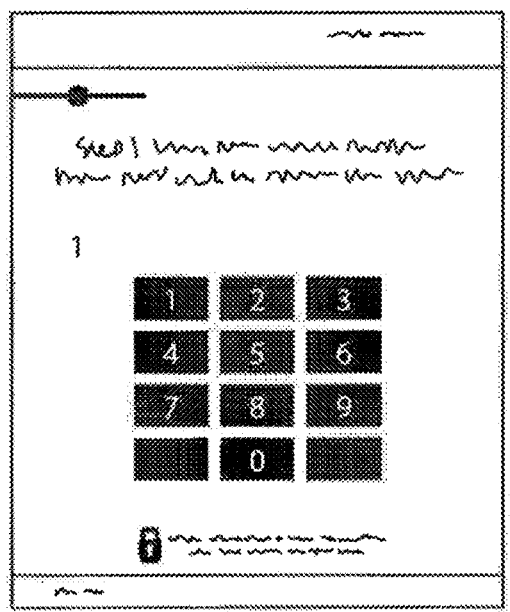
Figure 18:
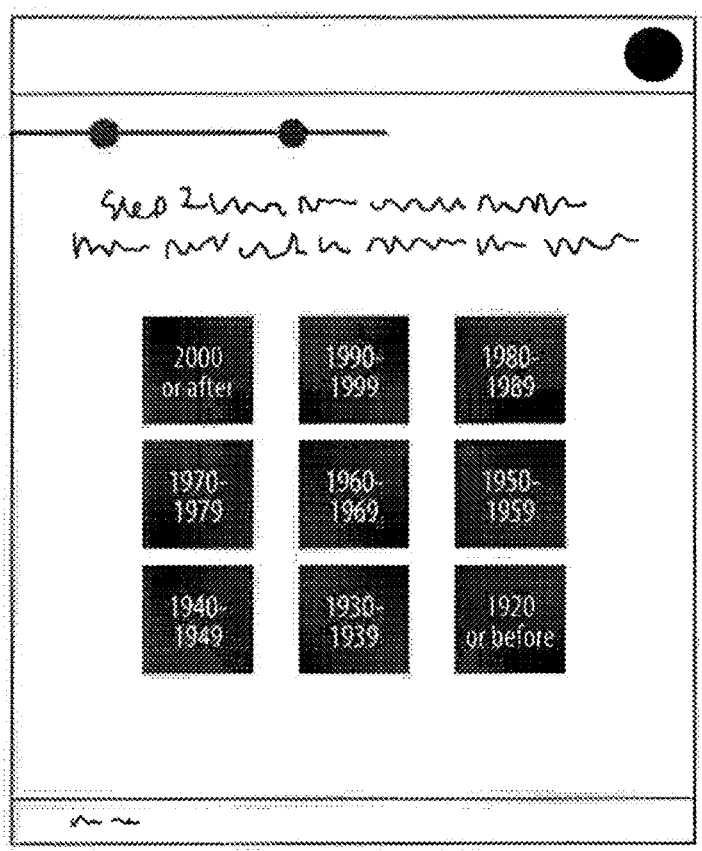
Figure 19:
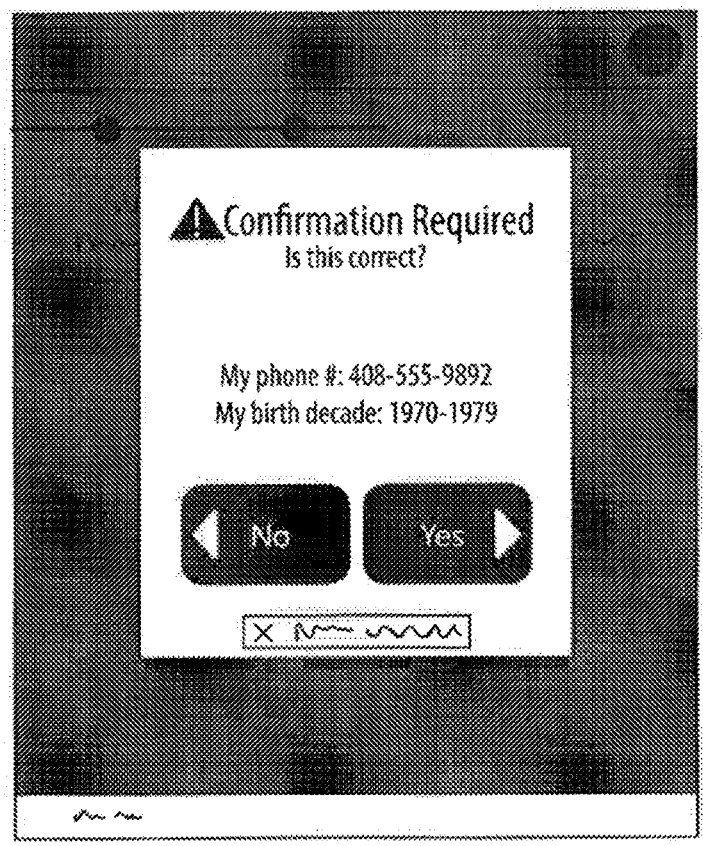
Figure 20:
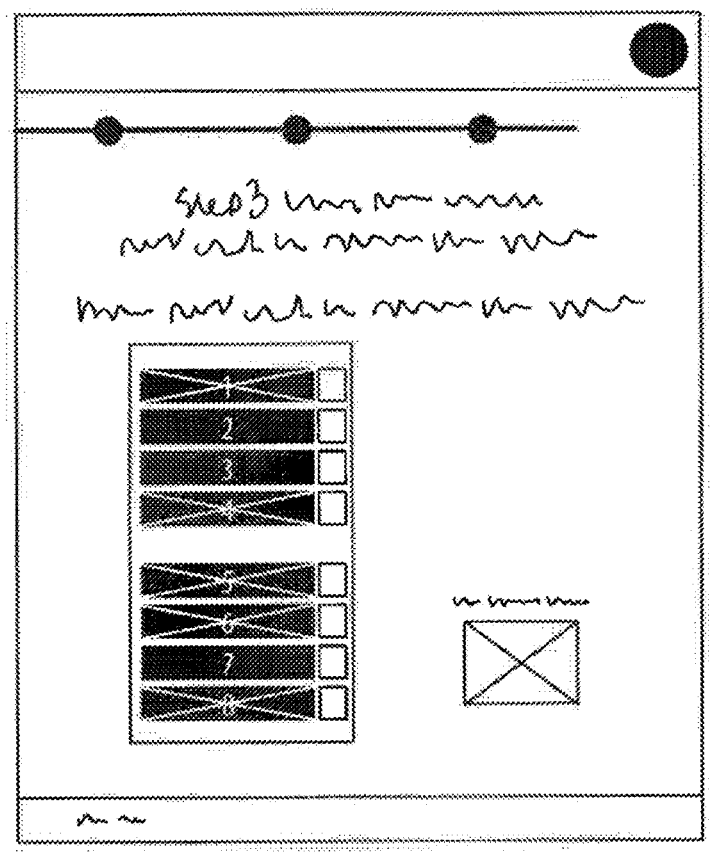

As discussed herein, the battery level of the phone may be brought to the attention of the user and, as illustrated in FIG. 15, such alerts may be customized by the user. The user may activate and deactivate any alerts and may, for example, select a desired level of battery charge for which an alert may be triggered. For example, a user may choose that an alert as to battery life be presented when the phone has only about a 30% charge remaining. Although any level of charge may be used to activate an alert, a user may select between 10% and 80% such as in increments of 10%. As would be appreciated by those skilled in the art, a battery may fluctuate over time and the percentage charge may be considered an approximation rather than an absolute direct measurement of remaining charge.

Administrative and operational alerts and notifications may be sent to and from each kiosk or subsets of kiosks, and to or from devices of authorized users, such as technicians, from one or more administrative servers using known communication methodologies, such as SMS, email, group email, mesh network communications, and the like. Such alerts or notifications may also be provided locally, via local communications, such as bluetooth or NFC, from an individual kiosk, such as in the event of a power outage. Accordingly, alerts may occur "online", and "off-line".

Alerts may include, by way of nonlimiting example, alerts and notifications related to the customer or Photo Verification as discussed throughout. Such customer service alerts may include, by way of example, management alerts regarding the start and end of employee shifts to provide customer service, notifications related to PhotoVerification (such as non-resolution of a PhotoVerification using automated systems within a given time frame), and the like.

Automated alerts may streamline the process of remotely managing a fleet of hundreds or thousands of kiosks by immediately notifying the operations and management team of issues that either require attention, or by confirming successful ongoing operation of the fleet. By way of non-limiting example, alerts may include management alerts regarding the start and end of customer service employee shifts; customer service alerts related to PhotoVerification and/or non-resolution of a PhotoVerification in an acceptable amount of time; operational alerts when a kiosk is offline or a certain hardware component is failing; or the like.

Alerts may also include, by way of example, exception alerts, such as may be unique to a store, kiosk, or the like. Other reports and alerts may include, by way of nonlimiting example, a daily charge report indicating a number of charges by kiosk, by day; an extended charge report, such as may include a number of lockers by kiosk that are not cleared within a day; environmental reports, such as high or low temperatures; movement reports, such as, due to movement or tilting of a kiosk; hardware or power malfunctions; all lockers full; firmware update needed; data usage or storage availability alert; and general data logs, such as may include security opening of a kiosk using, for example, a rear keypad, locker doors open over time limit, and the like.

The exemplary disclosed process and system may include a control module that may perform artificial intelligence and machine learning operations. The exemplary disclosed control module may perform a plurality of operations for providing efficient and effective control of the exemplary disclosed system.

The exemplary disclosed control module may provide usage monitoring and control of the exemplary disclosed system. Based on a venue or a location at which a station (e.g., a charging station or "kiosk") is located, the station may be utilized (or heavily utilized) during certain times and not utilized (or not heavily utilized) during other times. For example, a station (e.g., kiosk) may be utilized during a venue's open hours or during peak times (e.g., heavily utilized during peak times). The exemplary disclosed control module may monitor (e.g., keep track of) and store data indicating the internet connectivity of a plurality of stations (e.g., a worldwide fleet of kiosks). For example, the exemplary disclosed control module (e.g., including kiosk software) may provide one or more data transmissions (e.g., may employ a series of "heartbeats" such as "adaptive heartbeats") to notify or alert a server or other suitable component of the exemplary disclosed system that the station such as a kiosk is online and functioning properly. The one or more transmissions may include data (e.g., a small, discrete packet of data) that may be sent back and forth between the kiosk and a server or other suitable component of the exemplary disclosed system. These transmissions (e.g., heartbeats) may also define a speed or interval at which configuration updates may be shared between the station (e.g., kiosk) and a server or other component of the exemplary disclosed system. This exemplary disclosed speed or interval may be the time it may take for data (e.g., a new charge transaction) to reach the server or other suitable component of the exemplary disclosed system from the station or kiosk. These transmissions (e.g., heartbeats) may be sent at any regular interval, such as every 30 seconds or any other desired interval, and/or any other desired regular or variable intervals (e.g., any desired pattern or predetermined schedule).

The exemplary disclosed control module may operate to vary the transmissions (e.g., heartbeats). For example, in cases in which the transmissions (e.g., heartbeats) are partly or primarily used to troubleshoot station or kiosk issues by operators (e.g., a team of remote employees who work during a certain time interval each day), the exemplary disclosed control module may include software that may be configured to reduce a frequency of transmissions (e.g., heartbeats) outside of a desired interval (e.g., "working hours" interval) or increase the frequency of transmissions within the desired interval (e.g., "working hours" interval). The exemplary disclosed control module may also include software that may be configured to allow the transmission interval (e.g., heartbeat interval) to be adjusted based on any desired factors such as, for example, a time of day, type of venue, user behavior, usage patterns at a kiosk, and/or any other suitable factor. The exemplary disclosed control module may thereby reduce an operation cost of the exemplary disclosed system because for stations or kiosks that achieve connectivity through 4G LTE or other cellular data techniques, each transmission (e.g., heartbeat) may incur a data cost and such transmission may be reduced by an operation of the exemplary disclosed control module. For example, the exemplary disclosed control module may include software that may be programmed to extend a transmission or heartbeat interval, such as from once every 30 seconds during a desired interval (e.g., predefined "working hours") to once every 5 minutes outside of the desired interval (e.g., outside of predefined "working hours"). As another example, during a venue's closed hours or off-peak hours, such as when the kiosk has not been utilized in the past hour, the exemplary disclosed control module may include software that may be programmed to decrease the transmission or heartbeat frequency to a station or kiosk located in that venue to reduce costs (e.g., data costs). In doing so, the exemplary disclosed control module may operate using artificial intelligence and machine learning processes for example as described herein.

In at least some exemplary embodiments, the exemplary disclosed control module may vary the frequency of transmissions based on usage of a station or kiosk by users. For example, in the event that a user utilizes a station or kiosk during a period in which the transmissions or heartbeats are sent relatively less frequently or at extended intervals (e.g., outside of "working hours" of a venue in which the station or kiosk is located), the exemplary disclosed control module may operate to send transmissions or heartbeats at greater frequency (e.g., reduce the time interval or period between transmissions) immediately and/or shortly after the user begins to interact with the kiosk. The exemplary disclosed control module may continue to send transmissions at an increased frequency following the user interaction. For example, the exemplary disclosed control module may maintain a "standard" transmission frequency (e.g., "working hours" heartbeat frequency) for any desired time period following the user interaction at the kiosk such as, for example, a predefined time period of 60 minutes or any other suitable time period.

The exemplary disclosed control module may provide for connectivity monitoring and data usage monitoring to reduce monthly connectivity data usage and expenses. For example, when the exemplary disclosed system includes a plurality of stations (e.g., a fleet of interconnected kiosks) that may be partially or primarily dependent on 4G LTE and other data connectivity services, it may be desirable to monitor data usage to reduce monthly data expenses. Accordingly, the exemplary disclosed control module may utilize any suitable tools or algorithms (e.g., business intelligence tools) to continuously monitor data usage across the plurality of stations (e.g., the fleet) in real-time or near real-time. The exemplary disclosed control module may send or transmit alerts (e.g., automatic alerts) when a data usage at a particular location exceeds a predetermined or pre-defined threshold. For example, the exemplary disclosed control module may transmit the exemplary disclosed automatic alert to a plurality of operators (e.g., a pre-defined group of employees) or users, who may be tasked with the job of investigating the data overage and identifying a root cause, to prevent further overages. The exemplary disclosed control module (e.g., and/or system operators) may operate to make any suitable change to correct one or more issues causing the data usage overage such as, for example, making a software modification, recommending a kiosk location change within a venue, recommending a hardware modification or upgrade, or any other suitable action (e.g., including operating using artificial intelligence and machine learning processes for example as described herein). Also for example, the exemplary control module may utilize any suitable tool or algorithm (e.g., business intelligence tools and/or machine learning processes) to track monthly data expenses to budget for future station kiosk expansions and planning.

The exemplary disclosed control module may provide alerts to operators and users such as, for example, a warning alert (e.g., sound and/or image) to direct a user's attention to a user interface (e.g., screen) of the exemplary disclosed system. A station (e.g., kiosk) of the exemplary disclosed system may provide a user flow that involves a user interacting with a user interface (e.g., digital screen displayed on a touchscreen). The exemplary disclosed control module may call a user's attention to a particular state of the kiosk (e.g., as illustrated on the user interface) or may provide instructions for a user to perform a desired action (e.g., to complete the user's charging transaction or to enhance or ensure security of the user's device). In selecting a warning, the exemplary disclosed control module may use artificial intelligence and machine learning processes for example as described herein. The exemplary disclosed control module may guide or influence user behavior for example by controlling a station (e.g., kiosk) to flash lights disposed in one or more cavities or lockers, display flashing or moving images or videos (e.g. GIFs) on a display of the exemplary disclosed user interface (e.g., on a screen), emit audio recordings or warning sounds that project from kiosk speakers, and/or any other suitable actions for providing an alert.

The exemplary disclosed control module may provide a plurality of tools for use by station or kiosk technicians (e.g., for mobile application use, inventory tracking, and/or after-hours or emergency visit assignments and tracking).

For example after a station or kiosk is installed at a venue, routine preventative and/or emergency maintenance may be appropriate to maintain the station or kiosk in a fully operational status. Although a portion of this maintenance may be performed by a venue staff in some cases, some of the maintenance may be performed by system operators (e.g., part-time or full-time employees, e.g. "field technicians"), who may receive instructions and inventory via the exemplary disclosed system (e.g., from a company or organization operating the exemplary disclosed system). These instructions may include data identifying parts or components of the station or kiosk to be investigated, replaced, or repaired, a time or due date by which each visit is to be completed, and/or any other suitable technician data. The exemplary disclosed system may utilize any suitable software or algorithms to assign field techs to a particular "work order," such as a computerized maintenance management software and/or machine learning processes.

While onsite at a station or kiosk location, an operator such as a field technician may log into the exemplary disclosed system via a user interface of the kiosk or the operator's user interface (e.g., based on running Kiosk Tools Menu software) using a secure code. This login to the exemplary disclosed control module may provide the operator access to diagnostic tools and data indicating components that are to be repaired via access to the exemplary disclosed user interface and system. The operator such as a technician may interact with the exemplary disclosed control module via any suitable user interface such as a kiosk touchscreen, a mobile app connected to the kiosk server, and/or any other suitable user interface for example as described herein. The operator may thereby receive instructions, input data including notes about their visit, request additional inventory, and/or transmit or receive any other suitable data from the exemplary disclosed control module.

The exemplary disclosed control module may thereby track parts inventory in real-time or near real-time while an operator (e.g. service technician) is onsite at a station or kiosk. The exemplary disclosed control module may utilize machine learning processes to develop analytical models to predict rate of failure of parts over time and/or future desired hardware inventory amounts. The exemplary disclosed control module may thereby provide forecasts for inventory and leverage bulk component purchases to achieve cost savings. The exemplary disclosed control module may also recommend allocation of resources for components identified with a relatively highest or high failure rate and/or overall failure cost to continue to improve a product offering and to reduce costs.

The exemplary disclosed control module may provide for management and/or assignments for work groups. The exemplary disclosed system may include a plurality of stations or kiosk (e.g., a system of interconnected kiosks), in which those stations or kiosks are tracked from a secure server by the exemplary disclosed control module. Further, a plurality of operators (e.g., including employees and/or field technicians) may each have unique login credentials to the server of the exemplary disclosed system. The exemplary disclosed control module, via a server or other component, may assign operators to a particular kiosk or set of kiosks, restrict access to a set of kiosks, and/or assign work on a particular kiosk to a user or set of users (e.g., via data transmitted to and from operators via the exemplary disclosed system). For example, the exemplary disclosed module may provide data to operators regarding installation of a kiosk in a new location or removal of that kiosk from its current venue and/or any other suitable instructions or data via a user interface and/or other components of the exemplary disclosed system. In doing so, the exemplary disclosed control module may operate using artificial intelligence and machine learning processes for example as described herein.

The exemplary disclosed control module may perform calculations and/or utilize machine learning to leverage a business intelligence tool to gain insight and perform analysis regarding kiosk usage and customer behavior. The exemplary disclosed control module may utilize a business intelligence tool (e.g., Looker) to analyze data including kiosk usage and customer behavior. Using machine learning processes, the exemplary disclosed control module may analyze and identify optimal installation venues for future expansion, identify trends such as charging trends over time, identify, monitor, and analyze a status of routine software updates, and/or receive or transmit notifications and alerts regarding kiosks (e.g., of a fleet) that are to be serviced.

The exemplary disclosed control module may operate to perform uptime and/or downtime calculations. For example, the exemplary disclosed control module may perform calculations to determine (e.g., tabulate) and provide data of an amount and/or percentage of time during which a kiosk may be online and/or available for users (e.g., uptime) over a given period of time. Also for example, the exemplary disclosed control module may perform calculations to determine (e.g., tabulate) and provide data of an amount and/or percentage of time during which a kiosk may be offline and/or unusable for users (e.g., downtime) over a given period of time. The exemplary disclosed control method may automatically calculate uptime and downtime based on any suitable factors such as, for example, connectivity, power outage, parts failures, screen errors, and/or any other suitable criteria. The exemplary disclosed system may operate to collect or derive operational time periods (e.g., store hours) from any suitable data source such as, for example, a live API/data feed and/or web-based services (e.g., Google Location). For example, the exemplary disclosed control method may define downtime using any suitable parameters such as, for example, excluding instances of lost power connectivity outside of business hours (e.g., the exemplary disclosed control module may perform a downtime calculation according to this and/or other parameters). The exemplary disclosed control module may operate to transmit data of the exemplary disclosed calculations and analysis (e.g., percentages over time, discrete instances of downtime, and/or any other desired analysis) to users (e.g., clients) via components of the exemplary disclosed system.

The exemplary disclosed control module may operate to control access to a user's personally identifiable information (e.g., PII). For example as described further below, the exemplary disclosed control module may provide for role-based restriction of access, a "right to be forgotten," and/or safeguarding of data exchange between users. The exemplary disclosed control module may control access to PII using artificial intelligence and machine learning processes.

The exemplary disclosed control module may operate to provide role-based restriction of access by users to client data and/or any operation features. The exemplary disclosed system and method may be utilized by operators and/or administrators (e.g., operators of the exemplary disclosed system), users (e.g., end users or customers who interact with system components such as a station or kiosk), and clients (e.g., business entities and/or "brands" that may be clients of the operator or administrator of the exemplary disclosed system; e.g., business entities such as retailers). Per client input request (e.g., and/or an end user request), predetermined algorithms, operator instructions, and/or any other suitable instructions, the exemplary disclosed control module may operate to restrict access to a particular end-users (e.g. customers) PII. For example, access to a given user's PII may be restricted via algorithm (e.g., software rules), by which a group of system operators and/or administrators may be given access to that given end user's (e.g., customer's) PII for a defined or predetermined period of time. In at least some exemplary embodiments, data and reporting for administrators and/or operators who are excluded from access to the given end-user's PII may be modified to hide some or substantially all PII for the given end-user's PII (e.g., for one or more particular clients or client class). For example, by using logical database separation, access by an operator and/or administrator to any end-user (e.g. customer) PII may be restricted by role, by brand, or other techniques so that operators and/or administrators have access to end-user PII as per their role and other configured access rules.

The exemplary disclosed control module may operate to provide "right to be forgotten" or "right to deletion" processes (e.g., software processes). For example, the exemplary disclosed control module may operate to maintain compliance with and respond to requests under the California Consumer Privacy Act (CCPA), whereby California consumers have the right to ask entities such as companies regarding what information is collected about them, and for companies to either forget or delete all of their information (e.g., PII) and not to sell their information. The exemplary disclosed control module may operate to both comply with and also balance CCPA criteria with other criteria such as business reasons as to why a user's (e.g., person's) data may not be immediately deleted from the exemplary disclosed system (e.g., user information is maintained for a certain period of time after transactions are made so that owners or operators of the exemplary disclosed system may respond to alleged fraud or theft situations). Accordingly, when the exemplary disclosed control module receives a client request or a user request (e.g., consumer request) such as an official request (e.g., a request under CCPA, General Data Protection Regulation (GDPR), Nevada Senate Bill 220 "SB220," or any other request made under a law or other suitable policy enacted to protect consumer privacy), the exemplary disclosed control module may first evaluate (e.g., confirm) that user based on the user's phone number, email address, and/or any other desired identifying information. If the exemplary disclosed control module identifies the user (e.g., based on the user's phone number and/or email address), the exemplary disclosed control module determines (e.g., automatically detects) when that user's last or most recent transaction was with a station or kiosk of the exemplary disclosed system. If the time elapsed since the last or most recent transaction exceeds a predetermined or certain threshold (e.g., 3 months or any other desired time period), then the exemplary disclosed control module may operate to delete all of that user's information from the exemplary disclosed system (e.g., that user's information is automatically deleted from multiple tables and/or all databases of the exemplary disclosed system). If the time elapsed since the last or most recent transaction does not exceed the predetermined or certain threshold, then the exemplary disclosed control module will operate to maintain the information until the threshold is reached, and then delete the data as described above. If the user's information is not yet deleted (e.g., the threshold has not been reached) after that user submits a request, and that user transacts with the exemplary disclosed system again before the threshold time period is reached, then the exemplary disclosed control module may extend the scheduled deletion date so that the full threshold time period is reset (e.g., the threshold time period is reset to the full time period, e.g., the full 3 months before it is deleted).

The exemplary disclosed system may also share user data (e.g., PII) with third parties such as clients or sponsors. If a user opts out of sale of information (e.g., future information) for example by entering such input to an exemplary disclosed user interface, the exemplary disclosed control module operates to prevent sharing of that user's information (e.g., PII). For example, the exemplary disclosed control module may operate to exclude that user's data from data transmission (e.g., automated data extracts) that may be sent to third parties that may contract with an owner or operator of the exemplary disclosed system to have access and use of customer information. In at least some exemplary embodiments, the exemplary disclosed control module may add a flag (e.g., make an indication in a data field indicating opt-in or opt-out) to the user's identifier (e.g., mobile number) that flags that user's data (e.g., records and information) from being transferred outside of the exemplary disclosed system (e.g., passed to a third party that may for example be paying for access to information). The exemplary disclosed control module may thereby operate to automatically control data that falls under a right-to-be-forgotten request and/or a do-not-sell request (e.g., a CCPA request, a GRPR request, Nevada Consumer Rights policies, or any other request made under a law or other suitable policy enacted to protect consumer privacy) to reduce or substantially avoid costs associated with manual handling and processing of such requests.

The exemplary disclosed control module may further operate to safeguard transfer of data (e.g., PII) between users (e.g., clients such as business entities). For example, logical separation may be provided in the database between business entities (e.g., clients). In at least some exemplary embodiments, clients may also be "users" of the exemplary disclosed system, and for example by logging in would be able to view information related to their business entity (e.g., but not other information such as other clients, business entities, and/or client users.) The exemplary disclosed control module may operate to control (e.g., safeguard) transfer of data in system storages such as cloud-based storage (e.g., storage facilities) to selectively prevent sharing of some or substantially all user data (e.g., PII) between users of the exemplary disclosed system. The exemplary disclosed system and method may not display data of a given client when another client is logged in (e.g., may not display a given client's data to other clients). For example, the exemplary disclosed control module may operate to substantially prevent an information security breach and/or any other undesirable data exchange. For example, the exemplary disclosed control module may include elements of a graphical user interface of the exemplary disclosed user interface that may include a layer that separates different classes of information. For example, substantially all configuration details (e.g., all information and data) may be created and stored in a first layer (e.g., a "Brands" layer), while a second layer (e.g., a "Partners" layer) may include information that may be transferred. Transaction level data may be associated with the first level (e.g., "Brands"). For example, each brand may be mapped to a single "Partner," and multiple "Brands" may be assigned to the same partner. Users and/or operators having a relatively high or highest-privileged administrative roles may access the second (e.g., "Partner") level and designate where user data is to be sent to and at what frequency. The exemplary disclosed control module may thereby operate to control data transfer and protect transaction-level data (e.g., user PII) from being shared except as designated on the "Partner" level (relatively high or highest-privileged administrative roles) of the exemplary disclosed system.

The exemplary disclosed control module may operate to query for and obtain data regarding graphical user interface and user experience (UI/UX) modifications and designs. For example as changes are made to UI/UX of the exemplary disclosed system by system operators and/or based on machine learning processes of the exemplary disclosed control module, data of the UI/UX designs may be provided to a third party user (e.g., market research firm) in real-time or near real-time. The third party user may then transfer data including feedback information (e.g., proposed changes or comments) back to the exemplary disclosed control module, which the control module may utilize to further update the UI/UX (e.g., based on operator input and/or artificial intelligence operations).

The exemplary disclosed control module may operate to control data transfer and data reporting for example by generating and transferring data including automated reports having actionable operational information. For example, the exemplary disclosed control module may perform analysis, calculations, and/or machine learning operations using user data to generate automatic reports (e.g., based on predetermined criteria, operator input, and/or machine learning) to notify one or more operators (e.g., various operators and/or team of operators) of performance and/or operational issues so that the operators may proactively address the issues if desired. For example, the exemplary disclosed control module may generate one or more reports including data of an amount of time taken for each operator (e.g., customer service representative logged into the exemplary disclosed system) to respond to a call. Based on data including averages over time, the exemplary disclosed control module may provide data, analysis, and recommendations that can be used to train and help operators (e.g., team members) to evaluate and improve their performance. Also for example, the exemplary disclosed control module may generate one or more reports including data of an amount of time taken for data to be transferred (e.g., for information to be passed from a station or kiosk to a remotely-located server of the exemplary disclosed system). Based on the data, the exemplary disclosed control module may provide data, analysis, and recommendations that can be used to determine connectivity issues at venues, which may adversely impact user's ability to conduct transactions on the stations or kiosks.

Also for example, the exemplary disclosed control module may generate one or more reports including data of schedules and timing for sending notification reports on a distinct cadence (e.g., daily, weekly, monthly) or schedule to a specific group or groups of operators, users, and/or third parties. Based on the data, the exemplary disclosed control module may provide data, analysis, and recommendations that may be used to identify operators (e.g., employees) who are responsible for and/or suited (e.g., best suited) for resolving an issue may receive notice of that issue in a timely manner. Further for example, the exemplary disclosed control module may control reports to be generated and/or transmitted when desired criteria is met (e.g., when a new data point is available for the report).

The exemplary disclosed control module may operate to provide a fleet failure notification or alert. The exemplary disclosed control module may operate to transfer data including a notice or alert of a failure of a plurality of stations or kiosks (e.g., a fleet failure) to one or more operators (e.g., notify certain team members when certain types of fleet failures occur). For example if a certain percentage of stations or kiosks go offline within a predetermined time (e.g., certain number of minutes), a first subset of operators (e.g., a "Business Continuity" team) may be notified with a first data transmission or message, and/or a second subset of operators (e.g., an entire team) may receive a second data transmission or message (e.g., a different notification message, such as a more general message).

The exemplary disclosed control module may transfer data (e.g., send notifications) by one or more suitable techniques such as, for example, an email, a WhatsApp channel, a text or SMS message, and/or any other suitable communication system that may communicate with the exemplary disclosed system. When the percentage of stations or kiosks that is online goes back above a certain threshold, then the exemplary disclosed control module may generate a different notification for any desired subsets of operators (e.g., to different groups of people). For example, the exemplary disclosed control module may transfer data (e.g., notify) relatively large groups of operators (e.g., people) in the event of a fleet failure because the fleet failure may be caused by a software or system-wide failure that is to be remedied by those operators (e.g., individuals) as soon as possible. Also, users (e.g., clients) may also notice the fleet failure, and therefore the exemplary disclosed control module may operate to notify operators (e.g., team members) so that they may be prepared to interface with clients regarding the fleet failure and/or any other related issues.

The exemplary disclosed control module may operate to introduce new technology available in the exemplary disclosed system to users via the exemplary disclosed user interface. The exemplary disclosed control module may operate to present new features and/or functionalities of the exemplary disclosed system to users via the exemplary disclosed user interface for example by displaying screens, sounds, videos, and/or any other suitable features (e.g., in screen flow) to educate users (e.g., consumers) regarding the new features and/or functionalities. For example, new features and/or functionalities may include a new device sanitizing technology inside of each locker, new hardware and/or software to assist visually impaired persons (e.g., assisted listening) to transact with the station or kiosk, and/or any other suitable features and/or functionalities. In at least some exemplary embodiments, the exemplary disclosed user interface may include screens that may be programmed to time-out after a set period of time, such as 30 seconds, or may query the user to tap a button on the screen to proceed (such as "OK, GOT IT!").

In at least some exemplary embodiments, the exemplary disclosed system for verifying the identity of a user may include a door that selectively opens to allow access to a cavity and selectively closes to block access to the cavity, a lock configured to selectively lock and unlock the door when the door is closed, a camera configured to image a user area adjacent to the door, computing memory having associated therewith code, and a processor communicatively coupled with the computing memory. The processor may be configured to execute the code to control the camera to record a first image data of the user area that includes a plurality of first image sets recorded at a plurality of first times, store the first image data, control the camera to record a second image data of the user area that includes a second image set recorded at a second time, and selectively unlock the door based on comparing the second image data to the first image data. Comparing the second image data to the first image data may include transmitting the first and second image data to a remotely-located device, selectively displaying some of the plurality of first images sets on the remotely-located device, and continuously displaying the second image set on the remotely-located device. The camera may record the second image data of the user area that includes the second image set at the second time based on the user in the user area inputting incorrect input data. Continuously displaying the second image set on the remotely-located device may include continuously displaying the second image set depicting the user in the user area inputting incorrect input data on the remotely-located device, the second image set being displayed adjacent to a movable carousel of the plurality of first images sets displayed on the remotely-located device. The movable carousel may be a variable display of the plurality of first image sets that an operator of the remotely-located device manipulates to display a desired image of the plurality of first image sets. Comparing the second image data to the first image data may include subsequently receiving an operator data from the remotely-located device, and transmitting the first and second image data to the remotely-located device occurs after the user in the user area inputs incorrect input data. The incorrect input data may be selected from the group consisting of an incorrect security image selection or an incorrect PIN code. The operator data may be selected from the group consisting of a security question, a security instruction instructing a user in the user area via voice by VPN into the exemplary disclosed station to remove a hat or change position in the user area, and a security instruction instructing a user in the user area via onscreen display to remove a hat or change position in the user area. For example, the security instruction may be a manual verification by a customer service representative such as, for example, a verification asking for additional information via voice, screen, phone call, speaking to store personnel, and/or any other suitable technique. Also for example, any suitable photo comparison technique and/or facial recognition software may be utilized for verification. The door may be maintained in a locked state when the first image data defines a first set of images of the user in the user area at the first time and the second image data defines a second set of images not including a verified match of the user in the user area at the second time. Comparing the second image data to the first image data may include using facial recognition software.

In at least some exemplary embodiments, the exemplary disclosed method may include providing a door that selectively opens to allow access to a cavity and selectively closes to block access to the cavity, using a lock to selectively lock and unlock the door when the door is closed, using a camera to image a user area adjacent to the door, providing computing memory having associated therewith code and a processor communicatively coupled with the computing memory to execute the code, and controlling the camera to record a first image data of the user area that includes a plurality of first image sets recorded at a plurality of first times. The exemplary disclosed method may also include storing the first image data, locking the door, controlling the camera to record a second image data of the user area that includes a second image set recorded at a second time, transmitting the first and second image data to a remotely-located device, selectively displaying some of the plurality of first images sets on the remotely-located device, continuously displaying the second image set on the remotely-located device, and selectively unlocking the door based on comparing the second image data to the first image data using the remotely-located device. The exemplary disclosed method may further include recording the second image data of the user area that includes the second image set at the second time using the camera based on a user in the user area inputting correct input data or incorrect input data. The exemplary disclosed method may also include continuously displaying the second image set depicting the user in the user area inputting incorrect input data on the remotely-located device, and displaying a movable carousel of the plurality of first images sets on the remotely-located device adjacent to the second image set displayed on the remotely-located device. The exemplary disclosed method may further include manipulating the display of the movable carousel to display a desired image of the plurality of first image sets. Comparing the second image data to the first image data may include subsequently receiving an operator data from the remotely-located device, and transmitting the first and second image data to the remotely-located device occurs after a user in the user area inputs an incorrect security image selection data or an incorrect PIN code data. The operator data may be selected from the group consisting of a security question, a security instruction instructing a user in the user area via voice by VPN into the exemplary disclosed station to remove a hat or change position in the user area, and a security instruction instructing a user in the user area via onscreen display to remove a hat or change position in the user area. For example, the security instruction may be a manual verification by a customer service representative such as, for example, a verification asking for additional information via voice, screen, phone call, speaking to store personnel, and/or any other suitable technique. Also for example, any suitable photo comparison technique and/or facial recognition software may be utilized for verification. Selectively unlocking the door may include unlocking the door when the first image data defines a first set of images of a user in the user area at the first time and the second image data defines a second set of images of the user in the user area at the second time. The processor may maintain the door in a locked state when the first image data defines a first set of images of a user in the user area at the first time and the second image data defines a second set of images not including a verified match of the user in the user area at the second time.

In at least some exemplary embodiments, the exemplary disclosed system for verifying the identity of a user may include a door that selectively opens to allow access to a cavity and selectively closes to block access to the cavity, a lock configured to selectively lock and unlock the door when the door is closed, a camera configured to image a user area adjacent to the door, computing memory having associated therewith code, and a processor communicatively coupled with the computing memory. The processor may be configured to execute the code and to control the camera to record a first image data of the user area that includes a plurality of first image sets recorded at a plurality of first times, store the first image data, control the camera to record a second image data of the user area that includes a second image set recorded at a second time, and selectively unlock the door based on comparing the second image data to the first image data. Comparing the second image data to the first image data may include transmitting the first and second image data to a remotely-located device and subsequently receiving an operator data from the remotely-located device. Transmitting the first and second image data to the remotely-located device may occur after the user in the user area inputs incorrect input data. Comparing the second image data to the first image data may include continuously displaying the second image set on the remotely-located device. Continuously displaying the second image set on the remotely-located device may include continuously displaying the second image set depicting the user in the user area inputting incorrect input data on the remotely-located device, the second image set being displayed adjacent to a movable carousel of the plurality of first images sets displayed on the remotely-located device. The movable carousel may be a variable display of the plurality of first image sets that an operator of the remotely-located device manipulates to display a desired image of the plurality of first image sets.

The exemplary disclosed apparatus, system, and method may provide for sanitization of one or more storage compartments. The storage components may be any desired secure or unsecure storage components such as compartments for charging user devices such as mobile devices (e.g., smartphones), security compartments or lockers, or any other suitable compartments (e.g., publicly available compartments). The exemplary disclosed apparatus, system, and method may also provide sanitization for any suitable application such as providing sanitization of a compartment for shopping baskets, shoes, and/or clothing. The exemplary disclosed apparatus, system, and method may also be used for providing sanitization of a mailbox.

In at least some exemplary embodiments, the exemplary disclosed apparatus, system, and method may include a phone charging station that may provide a free (e.g., and/or partially or fully fee-based) "phone sanitization" service, which may provide users with a clean and secure phone charging experience while in public. For example, similar to providing free and secure phone charging stations in venues, providing a phone charging station with sanitization may increase dwell time and spend in a store or venue, as well as "net promoter score" (NPS) of the users who charge their devices using the exemplary disclosed system.

In at least some exemplary embodiments, the exemplary disclosed apparatus, system, and method may include a sanitization service through the use of UV lights in kiosk lockers. These UV lights may be used to regularly clean a storage compartment interior (e.g., a locker interior), charging cables disposed inside the locker, and/or a user's device (e.g., phone) by inactivating or killing pathogens or germs (e.g., bacteria and viruses) on these surfaces. In at least some exemplary embodiments, UV-C lights may be used to eliminate at least 99.9% (e.g., or 99.99%, 99.999%, 99.9999%, or a higher percentage, or a lower percentage than 99.9%) of pathogens or germs (e.g., bacteria and viruses) on a device. The exemplary disclosed method may leverage UV light technology, such as UV light technology that may be used in medical and scientific applications for sanitization. The exemplary disclosed method may simultaneously charge and sanitize devices stored in the exemplary disclosed cavities (e.g., lockers or compartments), and may sanitize the exemplary disclosed cavities (e.g., lockers or compartments) between uses by users to ensure that a compartment is substantially sanitized when a next user gains access to a cavity.

In at least some exemplary embodiments, the exemplary disclosed apparatus, system, and method may provide for UV lighting devices to be configurable on a per-kiosk basis (e.g., to allow clients and venues to opt in or out to including UV light in their mobile charging kiosks based on preference and public health requirements).

In at least some exemplary embodiments, the exemplary disclosed apparatus, system, and method may include UV lights that may be activated within secure, locked phone charging lockers. During the process of sanitizing his or her device, a user may be granted access to a secure locker and charging technology, such as charging cables or a wireless charging pad, that are able to charge any device. The user may thereby charge his or her device while it is being sanitized. In at least some exemplary embodiments, the UV lights may be activated to sanitize when a locker door is closed and a device is charging. For example, a controller may be configured to control an ultraviolet lighting device to operate when both the apparatus is electrically connected to the electronic device when the electronic device is received in the housing and the door is closed. Also for example, the exemplary disclosed system may prevent emission of ultraviolet light in a cavity (e.g., a locker) when either an electrical device disposed in the locker is not being electrically charged via an electrical connection or the door to the cavity is open. Further for example, the exemplary disclosed system may selectively emit UV-C light in a compartment when both a door closes to block access to the compartment and a mobile device disposed in the compartment is being charged by the charging station when the mobile device is received in the compartment. Additionally for example, the exemplary disclosed system may stop emission of the UV-C light in the compartment when at least one of the door opens to allow access to the compartment or the mobile device is not being charged by the charging station.

In at least some exemplary embodiments, the exemplary disclosed system may execute code to display data to a user device to direct the user to a location including the charging station and to display to the user a number of available compartments including the UV-C lighting device (e.g., via the exemplary disclosed user interface). The exemplary disclosed system may display data to a user including information of when the user last performed a UV-C disinfection of the mobile device, a germ status of the mobile device, and/or a recommended next time that the user should perform another UV-C disinfection of the mobile device. The exemplary disclosed system may control a rotation and movement of the UV-C lighting device based on a placement of the mobile device in the compartment. The exemplary disclosed system may control the UV-C lighting device to emit UV-C light in the compartment before and after receiving the mobile device in the compartment. The exemplary disclosed system may include a compartment having a door that includes a window that blocks ultraviolet emission from the lighting device from leaving the cavity and that is also one-way visible from the outside to allow a user to see the electronic device. The exemplary disclosed system may include a support member supporting the UV-C lighting device that is controlled by a controller to be rotatable and movable based on a placement of the electronic device in the cavity (e.g., providing mechanical adjustment of UV-C LEDs to optimize device coverage based on phone placement).

In at least some exemplary embodiments, the exemplary disclosed apparatus, system, and method may include a kiosk that includes compartments (e.g., lockers) and sanitizes the lockers prior to and following a charge transaction. Such sanitization may make the locker safe and clean for the next user.

In at least some exemplary embodiments, UV sanitization may be employed in combination with OptiCharge technology, PhotoVerification technology, short- and long-form survey, and any other desired technology, which may provide a safe (e.g., an optimal safe) and secure experience for users while charging and sanitizing their devices. For example, the PhotoVerification technology may confirm an identity of a user based on imaging of the user before and after use and comparison of the user images to confirm user identity. UV sanitization may also be used in combination with thermal imaging (e.g., infrared thermography, thermal video, and other suitable sensors and/or techniques) to determine a body temperature of users and to control access to the exemplary disclosed system. For example, if the exemplary disclosed system (e.g., a sensor of the exemplary disclosed system for example as described herein) determines that a user has a high body temperature indicative of a fever or illness (e.g., a body temperature that exceeds a threshold temperature such as, for example, about 100 degrees Fahrenheit, e.g., 100.4 degrees or any other suitable or desired threshold indicative of a fever or other pathological condition), the exemplary disclosed system may deny access to the system, issue alerts to the user and/or operators of the system, and/or take any other suitable predetermined actions.

In at least some exemplary embodiments, the exemplary disclosed UV sanitization process may be offered as a complimentary service to users who input predetermined data (e.g., enter a series of information, such as phone number and email address). A mobile app may be used to direct users who are looking for locations at which to sanitize their devices (e.g., phones), and may alert the users to nearby charging station that may sanitize their devices during charging. The exemplary disclosed mobile application may distinguish between kiosks that do offer sanitization and kiosks that do not offer sanitization, and may allow users to filter results based on this criteria. The mobile application may also indicate to users a number of sanitizing lockers currently available at one or more given kiosks or locations.

Figure 23:
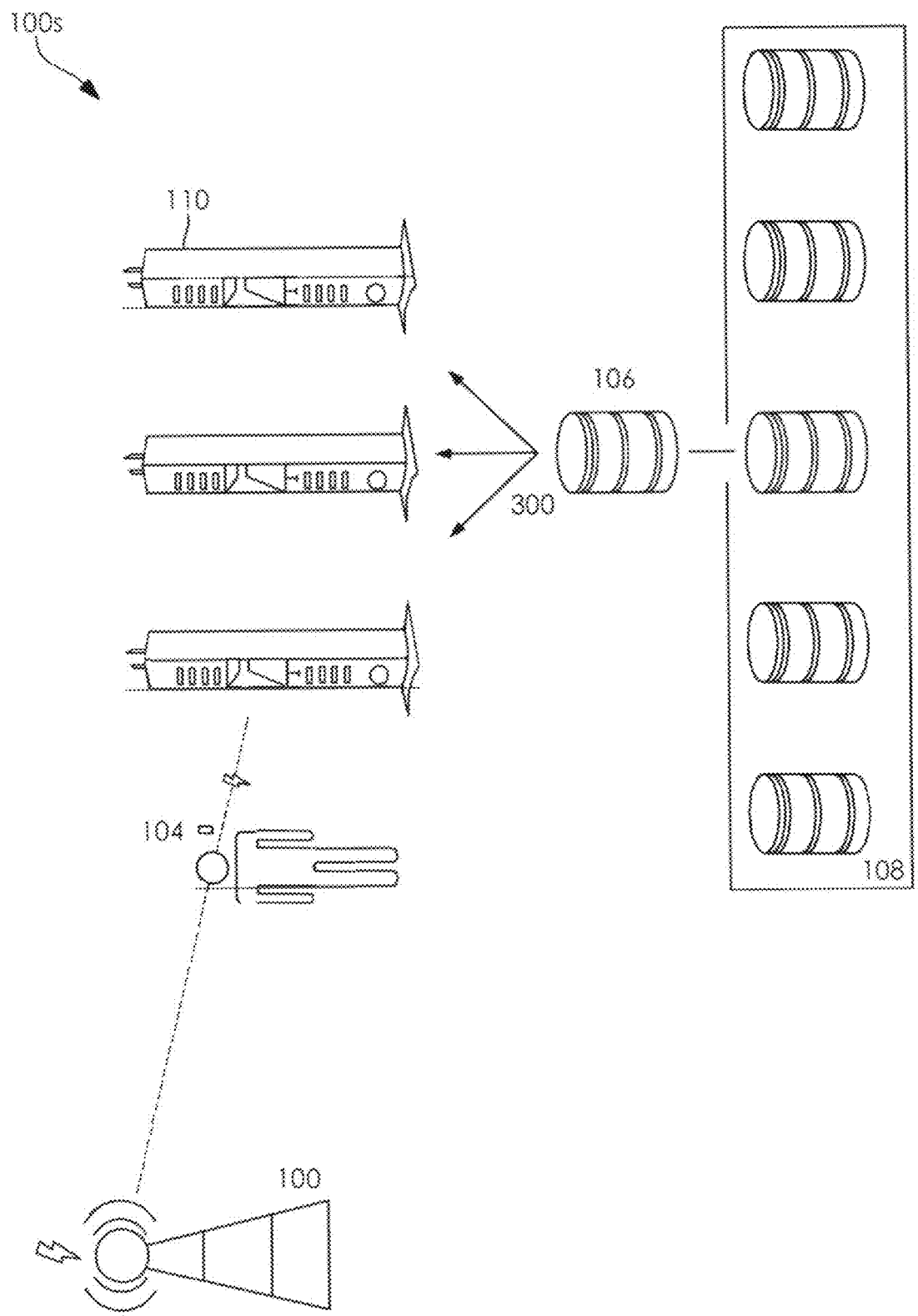
FIG. 23 illustrates a diagram of a system according to embodiments of the present invention.

For example as illustrated in FIG. 23, a sanitization system 100s may include GPS satellites (or other known mobile device locating technologies, such as triangulation) 100 that may operate to determine a location of a mobile device 104 that contains features, some of which may be available based upon the location data. As used herein, mobile device 104 may refer to cellular phones, personal digital assistants, tablets, and the like. The mobile device 104 may determine its location through the use of received GPS signals, or through the use of a filter which may combine location data from the GPS signals and/or from another system, such as cell-tower-triangulation or a WLAN system in order to obtain a location or a more accurate location. The mobile device 104 may be wirelessly coupled to server 106. The server 106 may be communicatively coupled to a datastore 108, as well as to a plurality of stations 110 (e.g., mobile device charging stations or any other suitable component or location for example as disclosed herein).

According to certain embodiments of the present invention, the server 106 periodically receives and stores location information associated with the mobile device 104. This location information may be sent from the mobile device 104; pulled from the mobile device 104; or obtained from another service that is able to determine the location of the mobile device (e.g., Location Based Services (LBS), Assisted GPS (A-GPS), eGPS, GSM Localization, Multilaterilization, Radiolocation, Trilateration, etc.).

Figure 24:
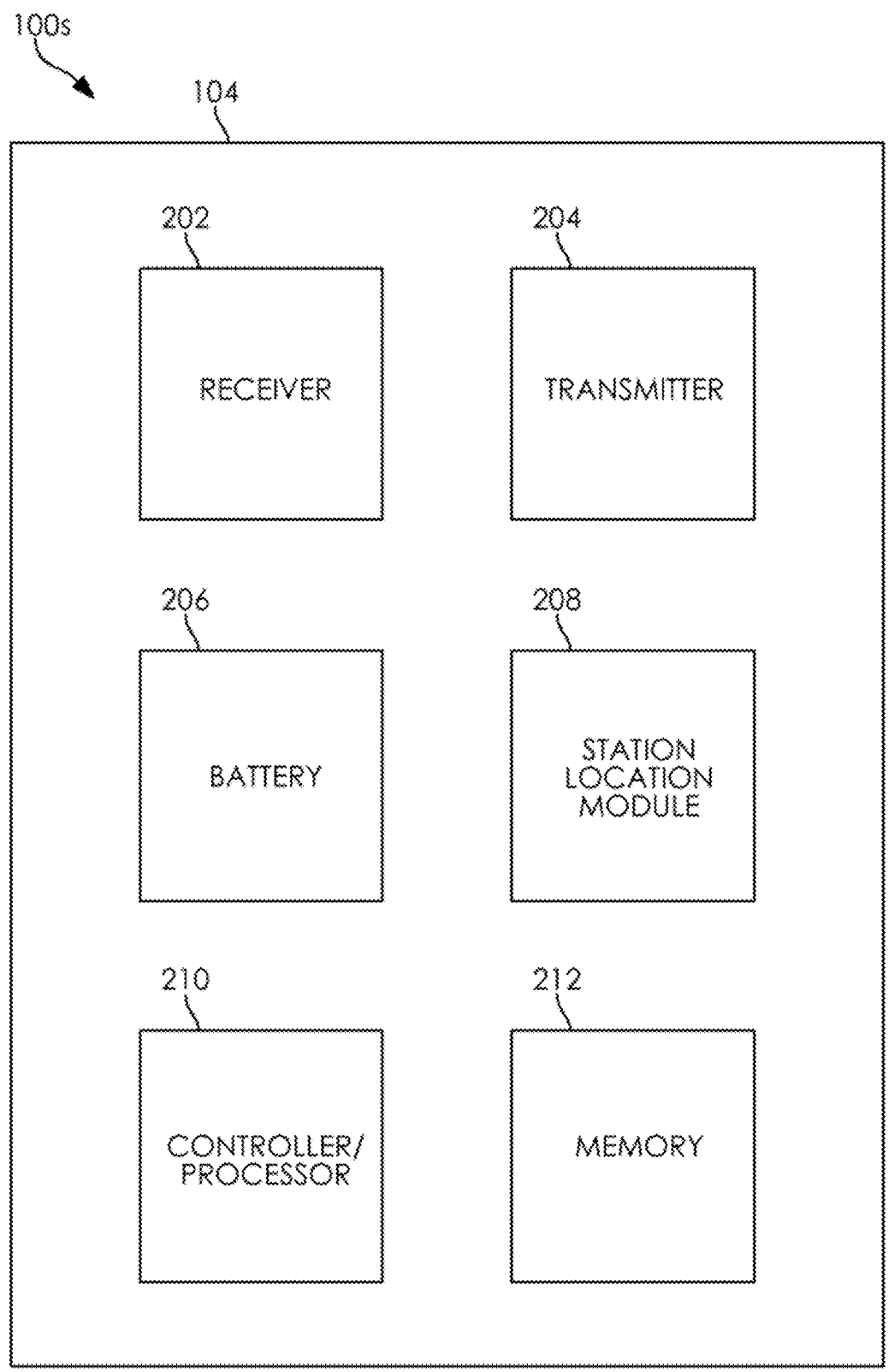
FIG. 24 illustrates a block diagram of a mobile device according to embodiments of the present invention.

FIG. 24 shows a block diagram of a mobile device 104 according to an embodiment. Within the mobile device 104, a receiver 202 may receive signals transmitted from GPS satellites, cell-towers, and/or access points for WLAN communication. A transmitter 204 may transmit signals including location information to the remote server or other access points. Power is provided to the various components of the mobile device 104 through battery 206. A station location module 208 may monitor a power level of the battery 206, and, based on the power level, the station location module 208 may provide station location information to the user of the mobile device 104. It should be noted that the station location module 208 may be able to monitor other functions and features of the mobile device as well. This information may be stored in one or more of databases described in datastore 108. The various modules within the mobile device 104 may operate as described herein. A controller/processor 210 may direct the operation of various modules within mobile device 104, such as by execution of software program code to perform the functions discussed herein. A memory 212 may store data and program codes for mobile device 104.

Figure 25:
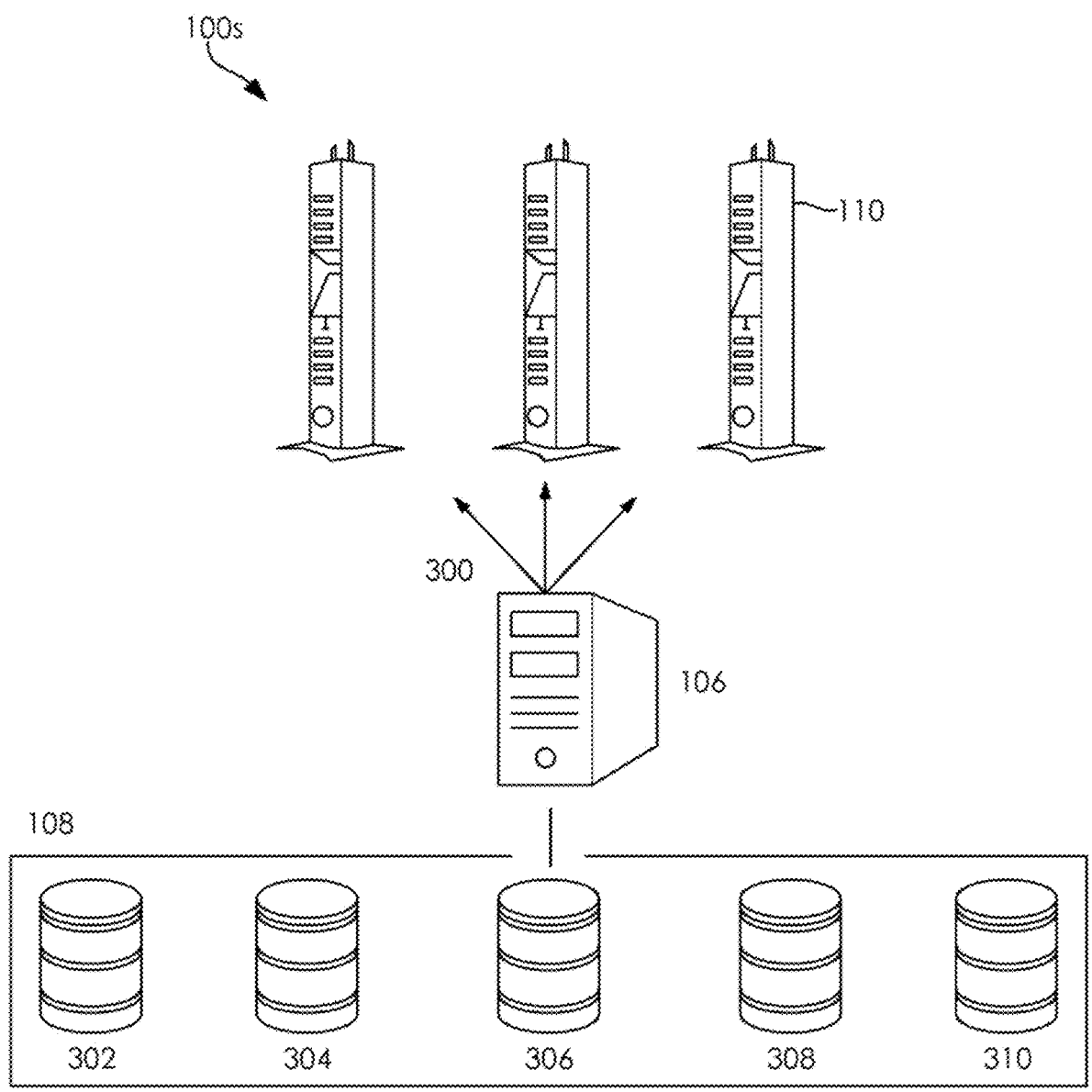
FIG. 25 illustrates a block diagram of a system according to embodiments of the present invention.

FIG. 25 shows a block diagram of a system 300 of sanitization system 100s according to embodiments of the present invention. The system 300 comprises one or more stations 110 (e.g., charging stations or any other suitable component or location for example as disclosed herein), server 106 and data store 108. In certain embodiments of the present invention, the server 106 performs the tasks of providing charging station information to the mobile device. This charging station information may include geographical locations and/or directions to one or more respective charging stations and registered businesses in which these charging stations are housed or otherwise associated. This charging station information may also include advertisements or other types of information related to the associated businesses. This charging station information, among other types of information, is stored in one of the various databases 302-310 in data store 108. It should be noted that the various databases 302-310 shown in data store 108 may be organized as separate databases, portions of a single database, or by any other logical structure appropriate for storing the data.

As illustrated in FIG. 25, data store 108 stores user information in user database 302. This information may include email addresses, phone numbers, user photos, survey responses, duration of charge, and the like. A map database 304 may also be included. This database 304 may provide the background maps that are displayed on each user's mobile device and that correspond to an area or region around the user at the time the application is invoked (e.g., when the user's mobile device battery is low). For example, a map tile of the United States may provide an image of the continental U.S. that can be zoomed to display a regional street level map for any area in the U.S. The map may further be zoomed to display locations within a venue housing a collection of businesses. For example, a user may be located within a mall, and the application may be invoked due to his mobile device battery being low. The mobile device may display locations of retail stores within the mall which house available charging stations to charge the user's mobile device, either upon zooming in on the application by the user, or by a predetermined setting for displaying a location.

A location database 306 may store geographic locations of charging stations and/or geographic locations of mobile devices 104 and/or clusters thereof. A charging station database 308 may store the current status of available lockers within any charging stations. This status may include a number of lockers of a particular charging station not currently in use, or, available, for charging. The data store 108 may also comprise a registered business database 310, which may store information related to businesses currently registered with the charging system according to embodiments of the present invention. For example, the business database 310 may include approved advertisements, or associated content describing respective registered businesses.

Figure 26:
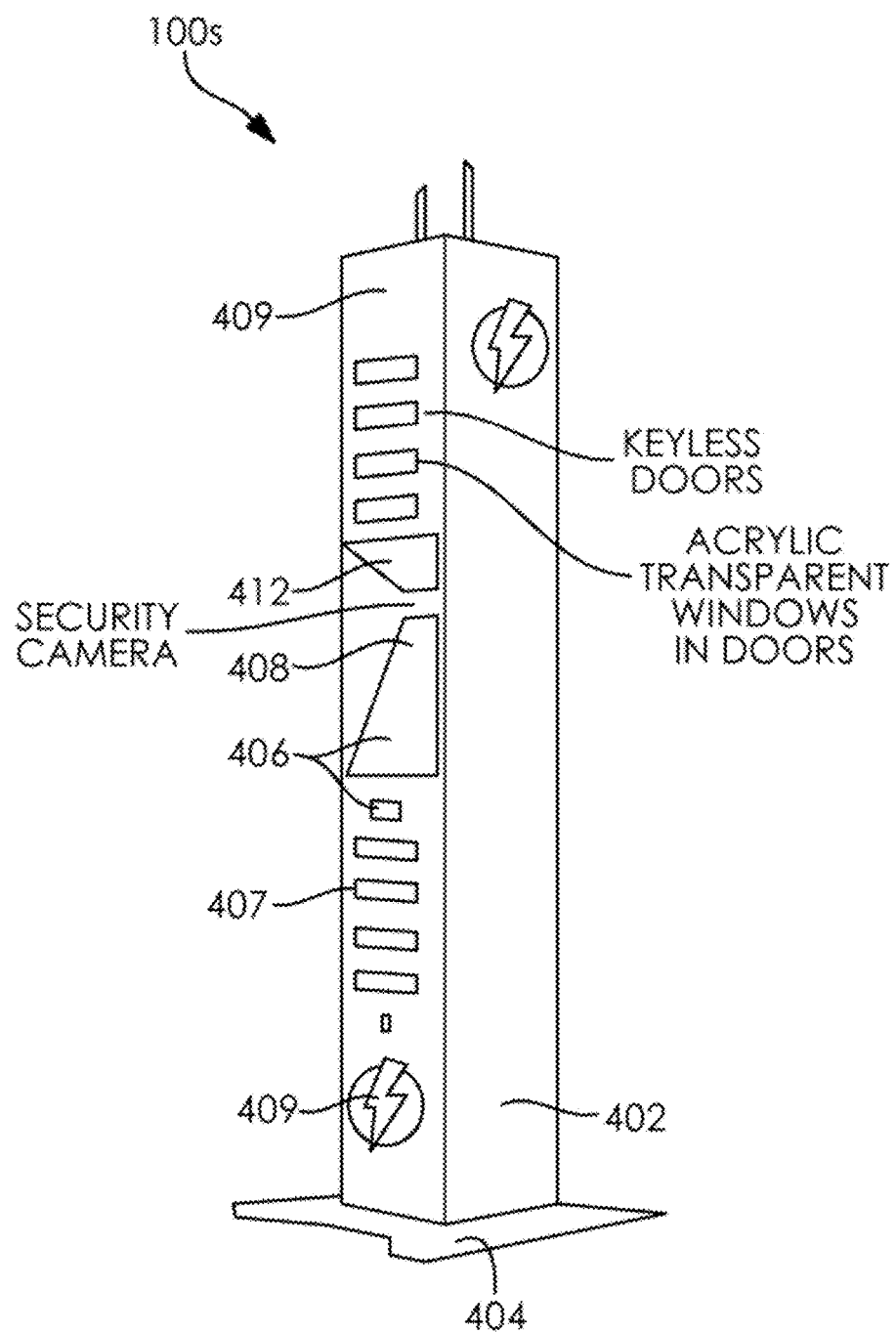
FIG. 26 illustrates an example of a mobile device charging station according to embodiments of the present invention.
Figure 27:
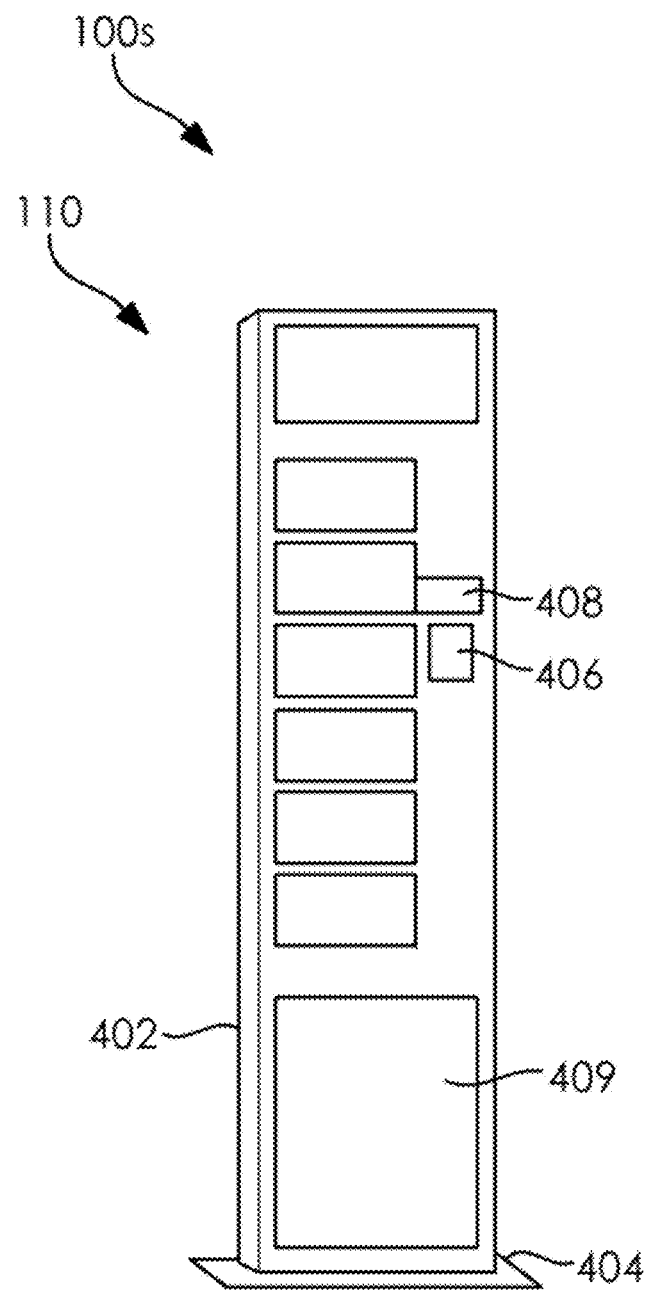
FIG. 27 illustrates another example of a mobile device charging station according to embodiments of the present invention.

FIG. 26 illustrates a station 110 (e.g., charging stations or any other suitable component or location for example as disclosed herein) according to embodiments of the present invention. This station 110 may be located in a retail store, mall, hospital, stadium, casino, building lobby, or any other location suitable for accessibility. In FIG. 27, station 110 may include a housing 402 mounted on a support 404. Embodiments may also include, on a face of the station 110, branding or advertising space 409 for a registered business to provide information about its business, which may include, by non-limiting example, advertisements, coupons, or any other suitable content related to its business. Each housing 402 may comprise one or more lockers 407, preferably having resident therein supplied power, such as a plurality of charging cords or other wireless charging options, such as supplied power having different plugs, power mats, or like proprietary or third party charging formats for mating to different mobile devices, such as USB plugs, micro-USB, mini-USB or USB-C plugs, laptop tip plugs, and/or one or more proprietary plugs, such as plugs for an iPhone 3, 4, 5, 6, 7, 8, and so on. Of course, any other charging plugs that presently exist or are subsequently developed may be included, as well as any other current or subsequent charging methodologies, such as charging mats, wireless charging, etc. It should be understood that housing 402, support 404, locker 407, and branding space 409 may have any desired dimension or configuration, depending, at least in part, on the particular location of the station 110, and that the overall design of station 110 shown in FIG. 26 is for exemplary purposes only.

By way of example, charging stations may comprise eight lockers, each with multi-use charging cables, and/or multiple different charging cables, there within. The lockers may reside in a structure formed of a suitably durable composition, such as metal, acrylic, plastics or other, and combinations thereof. For example, the door of a charging locker may allow for the user to see inside the locker, but may be formed of a combination or metal or other, and/or an acrylic panel that can withstand forces up to or exceeding, by way of non-limiting example, 10,000 psi.

A durable cabinet construction may allow for usage in a variety of environments, and the durable construction may be formed accordingly, such as by metal treated with rust proofing. In addition, other measures may be taken for kiosks for use in outdoor environments such as gasketing, heating and ventilation systems, etc. Moreover, the durable housing may house there within a variety of other features, such as antennas, PCBs, and the like, as referenced herein throughout. Alternatively, antennas may be placed atop, behind, or alongside in physical association with a cabinet. In at least some exemplary embodiments, the antennas and associated or alternative hardware may be suitable to communicate and/or connect to a network, such as a local or global network, such as the Internet, using any of a variety of different communication methodologies dependent upon the context in which the cabinet is placed, such as using 4G LTE, 3G, a wide area network, a local area network, or the like. Moreover, multiple different antennas may provide this functionality, where a single antenna may provide multiple different functionalities for communication purposes. Accordingly, and dependent in part on location, communication speeds may be optimized by software or firmware algorithms within the cabinet, or remotely by an administrator, by way of non-limiting example.

Additionally, in the event the lockers can be at least partially transparent to a user, other features may be added within each individual charging locker, such as multi-color LEDs or blinking LEDs, also as referenced herein. These additional features may be controlled locally or remotely, such as to provide optionality correspondent to time of year, e.g., Christmas lights, branding of the unit, whether or not a locker is in use (e.g., a red light may mean that locker is in use), and the like.

Different mechanisms may be mounted on or associated with the housing 402 to enable a user to access, lock, and subsequently unlock an individual locker 407 for charging his mobile device 104. For example, the locking mechanism associated with a charging locker, such as in order to provide optimal security, may be break proof or resistant, such as withstanding up to or in excess of 1,000 pounds of force before yielding.

Figure 28:
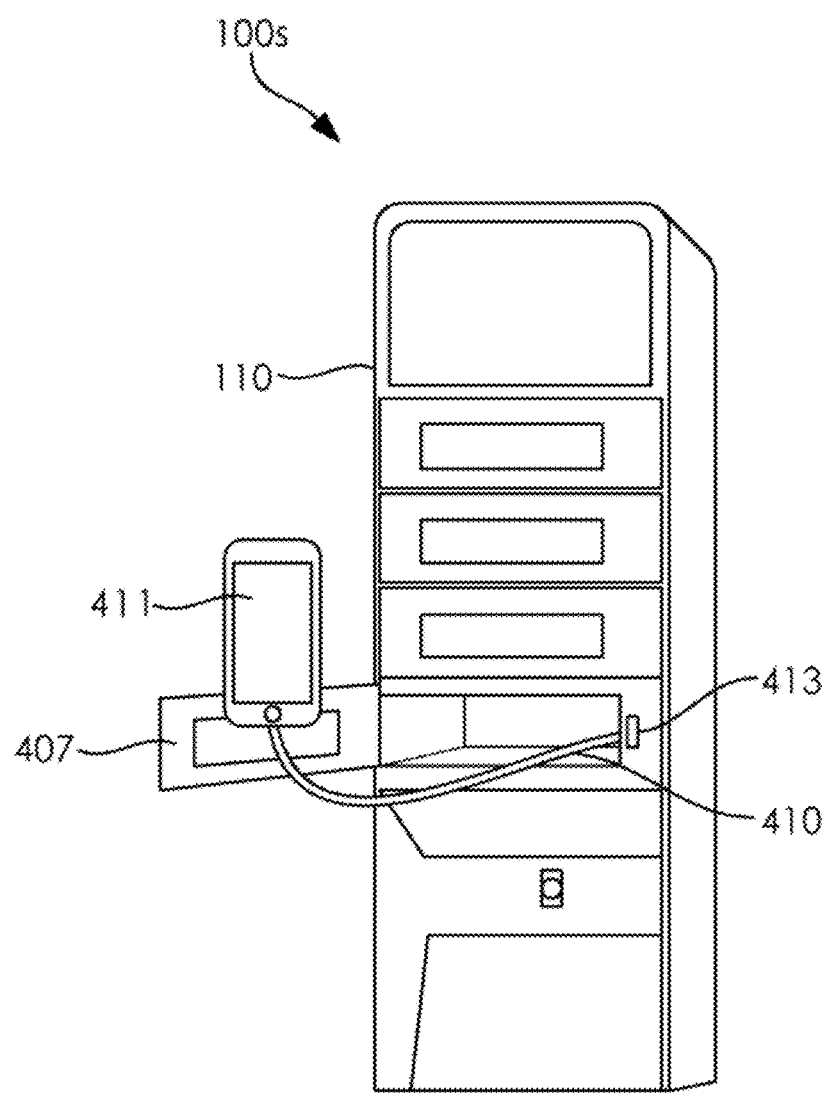
FIG. 28 illustrates an example of an open locker of a mobile device charging station according to embodiments of the present invention.

Referring to FIG. 26, another mechanism, such as a bar code scanner or card or key FOB reader, and/or a display 408, such as a touch screen display (which may also display ads, coupons, codes and/or other aspects referenced herein), and/or a keypad 406 mounted to the housing 402, may allow for the collection of more user information. Coupled with a display 408 and microcontroller (not shown) connected to an electronic, keyless lock 413 (e.g., as illustrated in FIG. 28), a user may be provided with instructions and options for charging his or her mobile device 104. For example, the locker 407 may be preprogrammed by the microcontroller (not shown) to accept a selected sequence or information entry by a new user when the electronic lock is unlatched (e.g. the locker 407 is open). The microcontroller (not shown) may be configured to accept the same sequence or information first entered by the user causing the lock to unlatch, allowing the user to remove his phone from the locker after use. This sequence or information may include user identifying information, such as the user's telephone number, key code, pin numbers, security questions, email addresses, selection of security images, scanning of a bar code (such as on a ticket provided by the kiosk to a user when the user placed the phone in the locker), etc.

The display 408 may thus prompt the user for other identifying information for the collection and subsequent storage of user shopping information which may be valuable to retailers/registered businesses. For example, the display 408 may prompt the user to enter his name, a telephone number, an email address, a name and/or telephone number in conjunction with other information, such as a security "pin" having 2, 3, 4, 5, 6 or more digits or such as a security image, a loyalty program identifier, or the like.

By way of example, upon actuation of keypad 406 or touch display 408, the display may prompt the user to enter his telephone number. It should be noted that other and/or additional user identifying information may be gathered as a part of these instructions. This gathered information may be used to serve several purposes. One purpose may be to provide verification information that the user is, indeed, who he says he is (such as by way of comparison to registered user information for system 300, by way of verification with information stored in the mobile application having associated therewith the aforementioned map and battery charge level capabilities, and/or by comparison with personal information on or associated with the mobile device. Another purpose is to ensure that only the user (or, an individual authorized by the user) is able to access the mobile device 104 from the locker 407 after the mobile device has been locked in the given locker 407. Yet further and as mentioned above, another purpose for the prompted user identifying information is to gather information about the user's shopping habits and/or frequented registered businesses, and/or other information as described herein, which may be subsequently stored in user database 302 (as shown in FIG. 25).

The embodiments may thus include one or more remote, or local, data warehouses/databases 302. The data warehouse may include user information as discussed above and throughout, and/or may comprise reports, calculations, and the like, run over a predetermined time period in association with a kiosk or a group of kiosks, such as once per day. The data in the data warehouse may be segregated by user, user type, brand, group, and so on. For example, phone numbers and emails may be indicative of uniquely personal identifying information, and as such may be segregated by brand or group to which the user is willing to allow that information to be provided. Needless to say, this may provide enhanced security of use to users.

Also, as a security feature, the display 408 may display an image of which a user has previously selected upon initially accessing an available locker. For example, the user may enter a telephone number, and then either select or be shown an image, such as a black dog. Upon returning to unlock the locker, the user may be prompted to enter his phone number, and then to select the appropriate image that matches the preselected image in order to unlock the locker.

Figure 29:
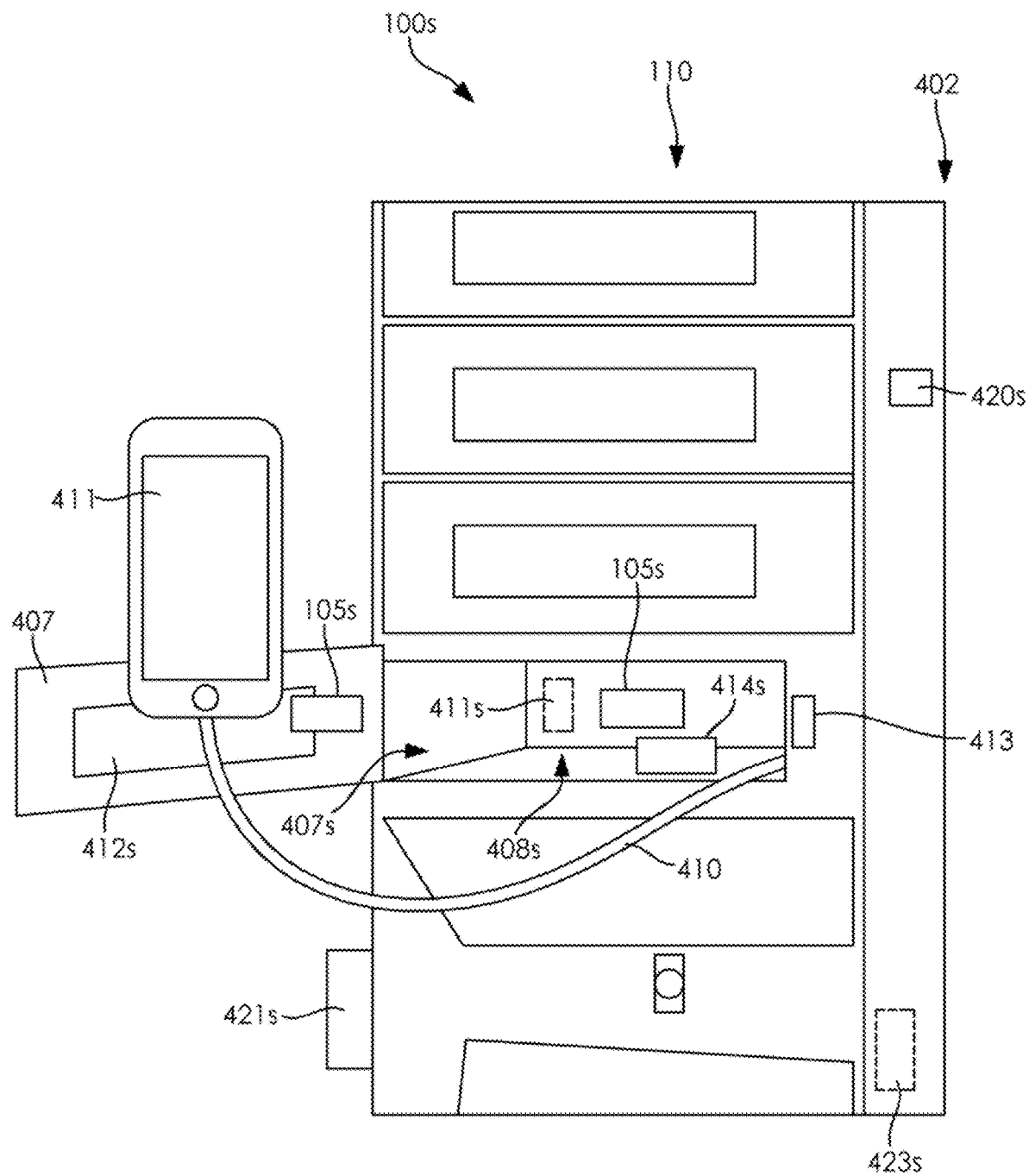
FIG. 29 illustrates an exemplary compartment according to embodiments of the present invention.

FIG. 29 illustrates a detailed view of components of sanitization system 100s described above regarding FIG. 28. As illustrated in FIG. 29, a device 105s may be included in sanitization system 100s. One or more devices 105s may be provided in a given compartment 407s. Compartment 407s may be generally similar to the exemplary disclosed compartments described above. Sanitization system 100s may include a plurality of assemblies or kiosks that each may have a plurality of compartments 407s (e.g., similar to as described above). Device 105s may be a sanitization device. For example, device 105s may be a lighting device. In at least some exemplary embodiments, device 105s may include an ultraviolet (UV) lighting device. Device 105s may also include RGB lighting devices such as RGB LEDs. For example, device 105s may include a combination of UV lights and any other desired lights such as RGB LEDs. In at least some exemplary embodiments, one or more devices 105s may include visible light LEDs (that emit a first visible light color, e.g., purple light or any other desired color) that may be activated simultaneously with UV-C LEDs to indicate to users that the UV-C LEDs are activated (e.g., are on), thereby providing users with an added safety feature (e.g., as UV-C light is not visible to humans). In at least some exemplary embodiments, one or more devices 105s may include visible light LEDs (that emit a second visible light color, e.g., white light or any other desired color) that may be activated to indicate to users that the UV-C LEDs are de-activated (e.g., are off). Device 105s may illuminate an inside of compartment 407s (e.g., a locker such as a kiosk locker) using for example RGB lighting (e.g., LEDs) including in device 105s.

In at least some exemplary embodiments, sanitization system 100s may include one or more switches 423s. Switch 423s may be for example any suitable electrical switch or relay. Switch 423s may be for example a deactivation switch or a kill switch (e.g., a physical kill switch) that may be selectively activated by the exemplary disclosed module, processors, and/or other components of sanitization system 100s for example as described herein. One or more switches 423s may be disposed at any suitable location (e.g., at, on, partially in, or within station 110) for example at one control or interface board or at a plurality of control or interface boards of station 110. In at least some exemplary embodiments, one or more switches 423s may block current or power to one or more devices 105s when one or more doors 407 are opened or remain open. For example, each switch 423s may block power to one or more devices 105s when one or more doors 407 is opened so that UV-C light of devices 105s does not emit through an aperture of an opened door 407 and reach or contact (e.g., hit) a user when one or more doors 407 are open. The exemplary disclosed module, processors, and/or other components of sanitization system 100s for example as described herein may execute software that controls switch 423s to automatically turn off UV-C light emitted by one or more devices 105s before a corresponding door 407 is opened and/or at any time door 407 is scheduled to open. One or more switches 423s may thereby be controlled to allow on-site technicians and/or remote staff to turn off UV-C emissions on demand. In at least some exemplary embodiments, switch 423s may be controlled to operate by sanitization system 100s based on data sensed by a sensor 420s (e.g., by sensor 420s that may sense the presence or absence of a user in an area adjacent to or near station 110 for example as described herein).

Device 105s may also include UV-C lighting devices such as UV-C LEDs. For example, existing LEDs of compartment 407s may be modified to include and/or use UV-C LEDs (e.g., in addition or as an alternative to color LEDs, for example using the same form factor for retrofit capabilities). For example, device 105s may include sanitizing light devices such as UV-C lights or any other suitable "germicidal irradiation" sources. Device 105s may also include Far UV-C lighting devices.

In at least some exemplary embodiments, device 105s may include sanitizing lights having UV wavelengths that may be between about 200 nm and about 300 nm, or between about 255 nm and about 300 nm. For example, device 105s may include LEDs having UV wavelengths of between about 255 nm and about 300 nm or any other wavelength range suitable for providing sanitizing light.

Device 105s (e.g., including one or more UV lights) may be mounted in any suitable location of compartment 407s. For example, device 105s may be mounted in any suitable location (e.g., anywhere) in an interior of compartment 407s such as on an interior surface of compartment 407s. As illustrated in FIG. 29, Device 105s may be disposed on a door of compartment 407s. Device 105s may be mounted outside of compartment 407s and oriented in such a way that device 105s illuminates (e.g., shines inside) the interior of compartment 407s (e.g., shines through a cutout or aperture of compartment 407s). In at least some exemplary embodiments, some or all devices 105s may be mounted in an angled position (e.g., an angled fashion) to increase and/or substantially maximize light reflection inside compartment 407s. Also for example, some or all devices 105s may be movable (e.g., rotatable and/or movable back and forth, up, down, diagonally, and/or in any other suitable manner) to provide desired light coverage (e.g., optimal light coverage) of a device 411 (e.g., that may be similar to mobile device 104) inside of compartment 407s. For example, device 105s may be mounted to a surface portion of compartment 407s by a support member (e.g., support portion of device 105s) that may be rotatable and/or movable so that device 105s may be rotated and moved (e.g., to adjust an angle and/or position of device 105s).

In at least some exemplary embodiments, compartments 407s may be configured to provide for full coverage of UV light within compartment 407s (e.g., within a cavity of compartment 407s). Device 105s (e.g., including UV lights) may be mounted on one or many of the interior surfaces inside compartment 407s (e.g., a rectangular locker). For example, one or more devices 105s including UV-C LEDs may be mounted in a square grid layout on a top interior surface and a bottom interior surface of compartment 407s, in order to sterilize a front and back of a user device such as mobile device 411. Alternatively for example, UV-C LEDs may be mounted on a top interior surface or a bottom interior surface of compartment 407s in combination with reflective interior surfaces 408s of compartment 407s. Surfaces 408s may be for example an integral part of wall portions formed from an integral reflective material or may include a reflective coating that may be applied to surface 408s. For example, reflective interior surface 408s may be an aluminum surface, vinyl material with a reflective finish, or any other suitable reflective surface. Interior surface 408s may be or may include an anodized aluminum surface or coating, a Teflon surface or coating, and/or a white reflective paint surface or coating. Interior surface 408s may be any suitable material or surface for increasing or substantially maximizing reflectivity of UV-C lights to achieve optimal dosage. For example, one or more or all interior surfaces (e.g., six surfaces 408s) of compartment 407s may be reflective surfaces (e.g., reflective surfaces 408s). The exemplary reflective surfaces may allow the UV-C light emitted by one or more devices 105s to reflect and sterilize a user device disposed in compartment 407s from multiple angles, while consuming relatively less power. Compartment 407s may also be any other suitable type of compartment such as, for example, a compartment for a shopping basket, shoes, and/or clothing (e.g., a clothing compartment). Compartment 407s may also be a mailbox or other similar compartment that may be used by multiple users.

In at least some exemplary embodiments, an interior surface (e.g., facing an interior of compartment 407s) of door 407 may be fabricated from or covered with (e.g., coated with) a reflective material that may maintain a security and integrity of the exemplary disclosed kiosk housing (e.g., such as aluminum, vinyl material with a reflective finish, or any other suitable reflective material). The surface may be similar to reflective interior surface 408s and may allow for suitable (e.g., optimal) reflection of UV light. For example as described above, material similar to reflective interior surface 408s may be provided on any suitable interior surface (e.g., a ceiling) of compartment 407s to increase reflection and illumination. For example, the exemplary disclosed reflective material may be applied or attached to (e.g., coated or members formed from) any desired surface (e.g., interior surface) of compartment 407s and/or door 407.

In at least some exemplary embodiments, a support assembly 414s may be disposed in compartment 407s. Support assembly 414s may be formed from a clear (e.g., transparent or translucent material) such as clear plastic, clear glass, or any other suitable material. In at least some exemplary embodiments, support assembly 414s may be formed from quartz glass, sapphire glass, fused silica, Polymethylpentene TPX, and/or any other suitable material that may transmit UV-C light (e.g., act as transparent and/or translucent to UV-C light). Support assembly 414s may be a wedge, bench, or other suitable support for supporting user device 411 above a floor (e.g., that may be a reflective surface similar to surface 408s) of compartment 407s. UV light emitted by device 105s may thereby pass through support assembly 414s and reach a surface of a mobile device (e.g., device 411) that may be supported on support assembly 414s (e.g., so the UV light may reach an underside of a user's phone or device). In at least some exemplary embodiments, support assembly 414s may be a riser that may be used to support device 411 in a desired position (e.g., an optimal position) to receive coverage of UV-C light. A configuration of support assembly 414s may be based on (e.g., determined by) a configuration and/or positioning of one or more devices 105s (e.g., a location and/or angle of devices 105s in compartment 407s).

In at least some exemplary embodiments, the exemplary disclosed module, processor, and other components may provide information (e.g., via display 408) to users regarding a placement of device 411 in compartment 407s. For example, a user may be guided by information (e.g., audio and/or visual information such as including graphics displayed on display 408) provided by sanitization system 100s as to how to position device 411 in compartment 407s (e.g., where to position on support assembly 414s or another surface of compartment 407s). Sanitization system 100s may also position (e.g., move and/or change an angle of) devices 105s based on a user's placement of device 411. Sanitization system 100s may thereby direct a user's placement of device 411 in compartment 407s to increase and/or substantially ensure a sanitization of device 411 (e.g., including adjusting a position and/or angle of one or more devices 105s based on a location provided to a user at which to place device 411).

In at least some exemplary embodiments, compartment 407s may include one or more inserts 411s. For example, one, many, or all compartments 407s (e.g., charging lockers) may include one or more inserts 411s. Insert 411s may be disposed partially or entirely in an aperture disposed at an interior surface of compartment 407s. Insert 411s may be similar to or may include a device 105s. Insert 411s may include a lighting device such as a UV-C bulb disposed at a top portion of insert 411s (e.g., may be disposed near or distal to an interior surface of compartment 407s). Insert 411s may include a cut-out to retrofit an existing lighting device (e.g., RGB LED) of compartment 407s. One insert 411s may be disposed at a top interior surface of compartment 407s and a second insert 411s may be disposed at a bottom interior surface of compartment 407s (e.g., based on dimensions of compartment 407s). A UV-C light of insert 411s may activate via operation of the exemplary disclosed module and controller when the compartment door (e.g., locker door 407) is closed. Insert 411s may reduce a size of the locker opening of compartment 407s, which may be desirable for users charging phones and not charging other devices such as battery packs and headphones. Compartment 407s that provides sanitization may also reduce the number of users who hang cables outside of compartments 407s such as lockers, which may lead to decreased damage to charging cables and also decreased operational costs.

In at least some exemplary embodiments, compartment 407s may have a locker door (e.g., locker door 407) that includes a solid material (e.g., a locker window may be replaced with solid material) that may block an emission of UV-C rays through door 407 (e.g., may block the UV emission from being emitted to users). Also for example, door 407 may include a window 412s that may be treated with UV protection (e.g., a UV protective layer or coating) that may block UV-A, UV-B, and UV-C radiation or emission. In at least some exemplary embodiments, blocking materials such as metal or glass may be used (e.g., be applied or coated on or integrally formed with) on interior and/or exterior portions of door 407, window 412s, and/or other portions of station 110 to block UV-C light from being emitted from compartment 407s. Also for example, portions of station 110 (e.g., compartment 407s) may be formed from UV-C transmitting materials to facilitate UV-C light emitted by device 105s (e.g., and/or insert 411s) to reach or contact (e.g., hit) desired locations (e.g., some or substantially all surfaces of device 411). For example, a UV filtering or blocking material may be applied to windows 412s that may be for example acrylic windows. Window 412s may (e.g., or may not be) one-way visible from the outside to allow users to see their respective phones in a given locker. Window 412s (e.g., that may be acrylic windows) may include a tinted (e.g., not fully opaque), UV-resistant film so that that users may see their respective device while it is charging in compartment 407s (e.g., and the user's branding colors may still show through window 412s). Window 412s may also be opaque (e.g., fully opaque) for example for branding reasons. Also, users may still be able to determine visually whether a locker is available or unavailable (e.g., unoccupied or occupied) by looking through window 412s.

In at least some exemplary embodiments, compartment 407s (e.g., and the exemplary disclosed kiosk) may include suitable gasketing (e.g., seals or sealing material such as gaskets) to block UV rays emitted within compartment 407s so that the UV rays do not escape the compartment 407s while a UV sanitization process is underway. The exemplary disclosed system (e.g., module and controller) may execute software instructions that prevent devices 105s (e.g., and/or inserts 411s) from being activated or emitting UV light when door 407 is open (e.g., is detected as open by the system).

In at least some exemplary embodiments, devices 105s (e.g., and/or inserts 411s) may be provided in lower compartments 407s and not in relatively higher compartments 407s relative to a user. For example, the bottom one or two (e.g., or more) rows of compartments 407s (e.g., at waist level or below of users) may include devices 105s (e.g., and/or inserts 411s) including UV lighting devices (e.g., UV LEDs) and compartments higher than this may not include devices 105s (e.g., and/or inserts 411s). This configuration may reduce a probability of contact of UV radiation or emission with a user's eyes (e.g., or body parts or items that may be susceptible to damage from UV radiation).

In at least some exemplary embodiments, UV-C LEDs may be combined with existing locker LEDs into a PCB assembly (e.g., a single assembly and/or integrated assembly). For example, brands advertised by the exemplary disclosed system may retain or continue to use branding LED elements already in use in the exemplary disclosed kiosk.

In at least some exemplary embodiments, a UV-C light of device 105s (e.g., and/or insert 411s) may be activated at a same time as an RGB LED (e.g., of that device 105s and/or other devices 105s and/or inserts 411s). For example, purple light may be emitted by one or more devices 105s (e.g., and/or inserts 411s) when invisible UV rays are active and being emitted by one or more devices 105s (e.g., and/or inserts 411s). The exemplary disclosed kiosk may use a charging cable 410 that may not be susceptible to damage from repeated exposure to UV radiation and that may also provide an optimal charge (e.g., OptiCharge) for users. Cable 410 may be any suitable electrical connector such as, for example, a wire (e.g., copper wire), a USB cable, or any other suitable type of electrical charging wire, cord, or cable. For example, charging cable 410 may withstand repeated exposure to UV-C radiation. In at least some exemplary embodiments, the exemplary disclosed charging cable 410 may include shielding (e.g., shielding added to cable 410 and/or a new cable 410 including shielding). The shielded cable or cables (e.g., cable 410) may include any suitable shielding such as, for example, overmolding or shrink wrap. UV light emitted by one or more devices 105s (e.g., and/or inserts 411s) may be used for disinfecting cell phones, and/or any suitable type of rechargeable device or hardware surface that is placed within compartment 407s.

In at least some exemplary embodiments, users may charge a user device and also place one or more other devices within the exemplary disclosed kiosk (e.g., in a same compartment 407s or other compartments 407s), so that multiple devices may be sanitized while one is charging. Devices may remain secure during the exemplary disclosed operation as described for example herein. Users may indicate preferences regarding multiple devices via touchscreen and/or the exemplary disclosed system may detect multiple devices as present.

In at least some exemplary embodiments, lighting devices 105s (e.g., and/or inserts 411s) may be controlled (e.g., activated and deactivated) based on operation of the exemplary disclosed system (e.g., based on an operation of the exemplary disclosed controllers, processors, and modules described for example herein). For example, the exemplary disclosed system may include controllers, processors, modules, and any other suitable computing element similar to as described for example herein.

In at least some exemplary embodiments, UV-C lights of devices 105s (e.g., and/or inserts 411s) may be connected to a charging board of the exemplary disclosed system (e.g., phone charging kiosk) via USB or other suitable connector, and may be powered on and off via software and firmware. The charging board may power the UV-C lights of devices 105s (e.g., and/or inserts 411s) for each compartment 407s (e.g., locker) separately, so that UV-C lights of devices 105s (e.g., and/or inserts 411s) of each compartment 407s may be activated independently of one another. As described for example herein, software programming may be provided so that UV-C LEDs of devices 105s (e.g., and/or inserts 411s), which may be dangerous for users to be exposed to for prolonged periods, may be activated when it is most likely that the user is not at the kiosk (e.g., based on sensors of the exemplary disclosed system that may detect the presence of user such as cameras, thermal sensors, motion detectors, and/or any other suitable sensors). For example, sanitization system 100s may include a sensor 420s that may be disposed at or near station 110. In at least some exemplary embodiments, sensor 420s may be attached to, disposed on, or mounted to a surface of station 110. One or more sensor 420s may be a stand-alone sensors or a sensor array including multiple sensors integrated into sensor 420s. For example, sensor 420s may be any suitable thermal sensor (e.g., for detecting a body temperature of a user to detect a presence of a user and/or to detect whether a user may be sick for example as described herein). For example, sensor 420s may include passive infrared sensor components, thermistor components, thermocouple components, semiconductor components, and/or resistance temperature detector components. Sensor 420s may also include motion detector components such as passive infrared motion detection components, hybrid motion detector components, microwave motion detection components, vibration motion detection components, area reflective motion detection components, and/or ultrasonic motion detection components. For example, proximity sensors may be provided at the exemplary disclosed kiosk so that UV-C LEDs of devices 105s (e.g., and/or inserts 411s) are powered off when a user is located near kiosks of sanitization system 100s.

In at least some exemplary embodiments, sanitization system 100s may include components for providing users with a safe (e.g., completely safe) interaction with components of sanitization system 100s. For example, the exemplary disclosed components may provide for contactless interaction by users. For example, sanitization system 100s may include a contactless component 421s that may be disposed at or near station 110. In at least some exemplary embodiments, contactless component 421s may be attached to, disposed on, or mounted to a surface of station 110. Contactless component 421s may be for example a dispenser for single use gloves (e.g., located on or next to station 110) that a user (e.g., customer) may use before and after each interaction with keypad 406, door 407, touch display 408, and/or other components of sanitization system 100s. Contactless component 421s may also be for example a dispenser for members such as styluses (e.g., located on or next to station 110) that a user may use to interact with keypad 406, door 407, touch display 408, and/or other components of sanitization system 100s. Contactless component 421s may be (e.g., and/or display 408 may include) a component that may allow a user to access station 110 such as a QR code scanner, a biometric (e.g. facial recognition) component, and/or a touchless touchscreen whereby, e.g., a finger of a user in close proximity to display 408 may activate its controls. Also for example, an anti-microbial shield may be applied to surfaces of station 110, touch display 408, and/or any other surface of sanitization system 100s that a user may touch or contact.

In at least some exemplary embodiments, suitable disclaimers may be provided to users (e.g., via the exemplary disclosed user interface) regarding UV-C LEDs with respect to how the sanitization process works and risks (e.g., any possible risks) associated with UV-C lights. The exemplary disclosed system may track disclaimer acceptance for purposes of compliance.

In at least some exemplary embodiments, LED light behavior may be controlled (e.g., based on software for example as described herein) so that the UV-C LEDs of devices 105s (e.g., and/or inserts 411s) are powered on for example from minute 5 through minute 30 of each charge (e.g., or at any other suitable time). This exemplary disclosed timing may be based on data surrounding user behavior, as the user may have (e.g., may have likely) walked away from the kiosk 5 minutes after the start of the charge, and may not have returned as many charge durations exceed 30 minutes. The exemplary disclosed system may also control devices 105s (e.g., and/or inserts 411s) to be applied non-continuously and/or for any desired continuous or non-continuous time intervals (e.g., one or more time intervals totaling about 15 minutes or any other suitable total).

In at least some exemplary embodiments, UV-C LEDs of devices 105s (e.g., and/or inserts 411s) may be turned off by the exemplary disclosed system as soon as touchscreen interactions by a user are detected at the kiosk (e.g., based on a user touching or manipulating keypad 406 and/or display 408), and/or may remain off while a door 407 is open and for 5 minutes after door 407 is closed. This duration and timing may be customizable for each user, venue, or kiosk. UV-C LEDs of devices 105s (e.g., and/or inserts 411s) may be activated outside of usage hours, such as in the middle of the night, to further reduce the risk of exposing users to UV rays. UV-C LEDs of devices 105s (e.g., and/or inserts 411s) may be run in "available" or unoccupied compartments 407s periodically based on logic (e.g., algorithms or predetermined instructions) that may be provided for each user, venue, or kiosk, for example depending on predicted usage. Compartments 407s may be automatically placed "out of service" or otherwise rendered unavailable while they are receiving their UV cleaning, so users do not try to access a given compartment 407s that may be undergoing sterilization. The settings for UV-C LEDs of devices 105s (e.g., and/or inserts 411s) for each compartment 407s may be controlled remotely by the exemplary disclosed system via firmware updates, software updates, configuration changes, or any other suitable techniques. These exemplary updates may be provided via 4G LTE, Wi-Fi, hardwired ethernet, and/or any other suitable technique through an interconnected network of kiosks of sanitization system 100s(e.g., for example as described above).

In at least some exemplary embodiments, users may be able to opt-in to the sanitizing process of sanitization system 100s via the exemplary disclosed user interface (e.g., via touchscreen). For example, users may choose to charge their phone without UV-C sanitization by selecting or deselecting a checkbox on the exemplary disclosed user interface. Users may (e.g., via a kiosk touchscreen) request a particular duration of time that the UV lights will be powered on, such as 15 minutes or 30 minutes. Users may similarly select a desired "level" of sanitization to be achieved, such as "low," "medium," or "high sanitization," which may determine an intensity of UV light to be emitted and/or a duration of UV illumination of compartment 407s. These exemplary user selections entered via the user interface may modify the functionality of the UV lights of device 105s (e.g., and/or inserts 411s) in the compartment 407s selected by the user for sanitization and/or charging.

In at least some exemplary embodiments, the exemplary disclosed system may execute software instructions to determine how many phones may be and/or have been disinfected on a given day, at a given location, for a given client, for a given type of phone or wireless provider, and/or for any other desired criteria. If desired, this information may be made available to an owner/renter of the exemplary disclosed system (e.g., kiosk equipment), the venue owner/operator of the facility or location of the system, third party research firms interested in the use of UV light, and/or any other desired entities. In at least some exemplary embodiments, the exemplary UV light usage information may be transmitted in real time via 4G LTE, Wi-Fi, hard-wired ethernet, and/or via any other desired technique to a secure server or set of servers.

In at least some exemplary embodiments, user devices being disinfected may be remotely monitored through the exemplary disclosed methods described herein. The device being disinfected and charged may be connected with a mobile number, email address, and/or other suitable personal information, which may have been entered by the user when the user gained access to compartment 407s. Sanitization system 100s may alert a given user via his or her respective mobile number, email address, and/or other suitable method to notify that user that his or her device is nearly completed and/or has fully completed its disinfection process (e.g., and/or any other desired status or stage has been started or finished).

In at least some exemplary embodiments, users may be able to check an application or web portal to determine when they last performed a disinfection of their device at one of the exemplary disclosed locations (e.g., charging stations) of sanitization system 100s. A user may be able to opt in to receive notifications from the exemplary disclosed application (e.g., to alert the user when they should perform another disinfection process), based on a predetermined set of criteria. The predetermined criteria may be based for example on germ accumulation, GPS location data, user-entered preferences, and/or any other desired criteria. Users may receive an SMS after using compartment 407s (e.g., UV light locker) to notify them of the germ status of their device, recommend the next time they should perform a UV light cleaning, offer a discount at a location (e.g., in a store) based on performing a UV light cleaning, and/or any other desired notification. Also for example, sanitization system 100s may (e.g., using the exemplary disclosed processors, modules, and other components for example as described herein) transfer an SMS or email to a user device (e.g., user smartphone and/or computing device). For example, sanitization system 100*s* may transfer an SMS or email to a user device when a sanitizing cycle is substantially complete (e.g., complete).

In at least some exemplary embodiments, measurements of germ presence on a user's device may be measured by sanitization system 100*s* for example within the kiosk (e.g., within compartment 407*s*) prior to and after the UV light of device 105*s* (e.g., and/or inserts 411*s*) is applied (e.g., to determine the efficacy of the UV cleaning). These exemplary measurements may be performed by sensing devices that may be included in device 105*s* (e.g., and/or insert 411*s*) or at any other desired location of sanitization system 100*s* that may sense properties of a user's device. For example, the exemplary measurements may be used by an operator of sanitization system 100*s* to refine the UV light design, assist a user to understand the usefulness of the UV light, and/or a third party to better understand phone germs.

In at least some exemplary embodiments, sanitization system 100*s* may provide a user (e.g., via the user interface) with an option to sterilize their device (e.g., phone) for a set duration of time, without charging the device simultaneously. For example, an operation of compartment 407*s* may be programmed to avoid timing out regardless of whether or not a charge is detected (e.g., because no charge may be expected in a case of sterilization without charging). Also for example, user data (e.g., user data collected by sanitization system 100*s*) may be used as part of a profile for helping operators and users to understand a frequency of sanitizing.

The exemplary disclosed module, processors, and/or other components of sanitization system 100*s* for example as described herein may execute software that may provide operation options to users (e.g., on a user-by-user basis and/or by type of user such as a paying user, a registered user, and/or other class of user). For example, a given user may be allowed to charge and sanitize, charge and not sanitize, or not charge and sanitize a device. Also for example, the exemplary disclosed module, processors, and/or other components of sanitization system 100*s* may execute software that performs component usage tracking to predict when components are scheduled for change (e.g., when bulbs of device 105*s* are scheduled for change) or are to be changed based on detected improper operation. The exemplary disclosed module, processors, and/or other components of sanitization system 100*s* may execute software that provides information, data, notifications, and/or messaging to companies or other entities owning or operating brands to provide information regarding users (e.g., indicating which end users or types of end users) who are using and/or are interested in using sanitization system 100*s* (e.g., sanitizing devices). For example, data collected by sanitization system 100*s* may be sold based on its value for marketing purposes. The exemplary disclosed module, processors, and/or other components of sanitization system 100*s* may execute software that performs contact tracing (e.g., sanitization system 100*s* may use a phone number provided by or obtained from a user to determine or show where and at which locations that user has been).

The exemplary disclosed system, apparatus, and method may be used in any suitable application for sanitization of a storage compartment or area. For example, the exemplary disclosed system, apparatus, and method may be used in any suitable secure or unsecure storage components such as compartments for charging electronic devices. In at least some exemplary embodiments, the exemplary disclosed system, apparatus, and method may be used for storage and/or charging locations for electronic devices such as mobile devices (e.g., smartphones and tablets). For example, the exemplary disclosed system, apparatus, and method may be used in any suitable publicly available security compartments, lockers, or other storage locations. The exemplary disclosed apparatus, system, and method may also be used for shopping baskets, shoes and/or clothing, garment cleaner applications (e.g., cleaning devices and/or storage areas), and/or mailboxes.

In at least some exemplary embodiments, the exemplary disclosed apparatus may include a housing including a cavity (e.g., compartment 407*s*), a door (e.g., door 407) that selectively opens to allow access to the cavity and selectively closes to block access to the cavity, a lighting device (e.g., device 105*s*) disposed in the cavity, and at least one surface portion disposed in the housing and forming the cavity. The lighting device may be an ultraviolet lighting device. The at least one surface portion may include an ultraviolet-light-reflective surface (e.g., surface 408*s*). The exemplary disclosed apparatus may also include a charging cable disposed in the cavity, wherein the housing may be a mobile device charging station and the cavity is a compartment of the mobile device charging station. The ultraviolet lighting device may be a UV-C lighting device that emits UV-C light. The exemplary disclosed apparatus may also include a support assembly that may be disposed in the cavity and that may be transparent or translucent to ultraviolet light. The support assembly may be configured to support an electronic device. The exemplary disclosed apparatus may also include a motion sensor and an electrical switch, the electrical switch configured to operate based on motion sensed adjacent to the housing by the motion sensor. The electrical switch may selectively allow and block current to the ultraviolet lighting device based on motion sensed adjacent to the housing by the motion sensor. The ultraviolet lighting device may be disposed in an aperture formed in the at least one surface portion. The exemplary disclosed apparatus may also include a contactless component selected from the group of a dispenser for single use gloves, a dispenser for styluses, a QR code scanner, a biometric component, a touchless touchscreen, and combinations thereof. The ultraviolet lighting device may be a movable device having a support member, which attaches the ultraviolet lighting device to the at least one surface portion, and may be configured to adjust an angle or a position of the ultraviolet lighting device relative to the at least one surface portion. The exemplary disclosed apparatus may further include a second lighting device that may be disposed in the cavity, the second lighting device being a visible light-emitting device.

In at least some exemplary embodiments, the exemplary disclosed method may include providing a housing including a cavity (e.g., compartment 407*s*), selectively opening a door (e.g., door 407) to allow access to the cavity and selectively closing the door to block access to the cavity, selectively disposing a user device (e.g., device 411) in the cavity, selectively emitting ultraviolet light in the cavity, and reflecting the ultraviolet light from at least one surface of the housing that forms the cavity. Selectively disposing the user device in the cavity may include selectively disposing the user device that may be a smartphone on a support assembly that may be transparent or translucent to the ultraviolet light, and transmitting the ultraviolet light through the support assembly. The exemplary disclosed method may also include sensing motion adjacent to the housing using a motion sensor, selectively emitting and stopping emission of the ultraviolet light in the cavity using an electrical switch that operates based on the sensing of the motion sensor, emitting the ultraviolet light in the cavity when the door is closed to block access to the cavity and no motion is sensed adjacent to the housing, and stopping emission of the ultraviolet light in the cavity when either motion is sensed adjacent to the housing or the door is opened to allow access to the cavity. The exemplary disclosed method may further include sensing a body temperature of a user adjacent to the housing using a thermal sensor, locking the door in a closed position when the body temperature of the user is higher than a threshold value and maintaining the door in the locked, closed position, and displaying an alert on the housing to the user or transmit a data alert to the user. The exemplary disclosed method may also include emitting visible light of a first color in the cavity when emitting the ultraviolet light in the cavity, and emitting visible light of a second color in the cavity when not emitting the ultraviolet light in the cavity, the second color being different from the first color. The exemplary disclosed method may additionally include providing at least audio or visual instructions of a position in which to dispose the user device in the cavity, via a display of the housing, to a user, and changing a direction of the ultraviolet light in the cavity based on the position.

In at least some exemplary embodiments, the exemplary disclosed system may include a charging station including a compartment (e.g., compartment 407s), a door (e.g., door 407) that selectively opens to allow access to the compartment and selectively closes to block access to the compartment, a UV-C lighting device (e.g., device 105s) disposed in the compartment, and at least one UV-C-reflective surface forming the compartment. Computing memory having associated therewith code, and a processor communicatively coupled with the computing memory, may be configured to execute the code and to selectively emit UV-C light in the compartment when the door closes to block access to the compartment, and stop emission of the UV-C light in the compartment when the door opens to allow access to the compartment. The processor communicatively coupled with the computing memory may be configured to execute the code to further sense motion adjacent to the charging station using a motion sensor, selectively emit and stop emission of the UV-C light in the compartment using an electrical switch that operates based on the sensing of the motion sensor, emit the UV-C light in the compartment when the door is closed to block access to the compartment and no motion is sensed adjacent to the charging station, and stop emission of ultraviolet light in the compartment when either motion is sensed adjacent to the charging station or the door is opened to allow access to the compartment. The processor communicatively coupled with the computing memory may be configured to execute the code to further sense a body temperature of a user adjacent to the charging station using a thermal sensor, lock the door in a closed position when the body temperature of the user is higher than a threshold value and maintaining the door in the locked, closed position, and display an alert on the housing to the user or transmitting a data alert to the user. The processor communicatively coupled with the computing memory may be configured to execute the code to further provide at least audio or visual instructions of a position in which to dispose a user device in the compartment, via a display of the charging station, to a user, and change a direction of the UV-C light in the compartment based on the position, by controlling a movement of a UV-C lighting device disposed in the compartment.

The exemplary disclosed system, apparatus, and method may provide an efficient and effective technique for sanitizing a storage compartment or area. The exemplary disclosed system, apparatus, and method may provide an efficient technique for eliminating pathogens or germs such as viruses and bacteria from surfaces of a storage compartment and contents stored in a storage compartment such as a user device. For example, the exemplary disclosed system, apparatus, and method may provide a clean and sanitized public storage and/or electric charging station.

Figure 30:
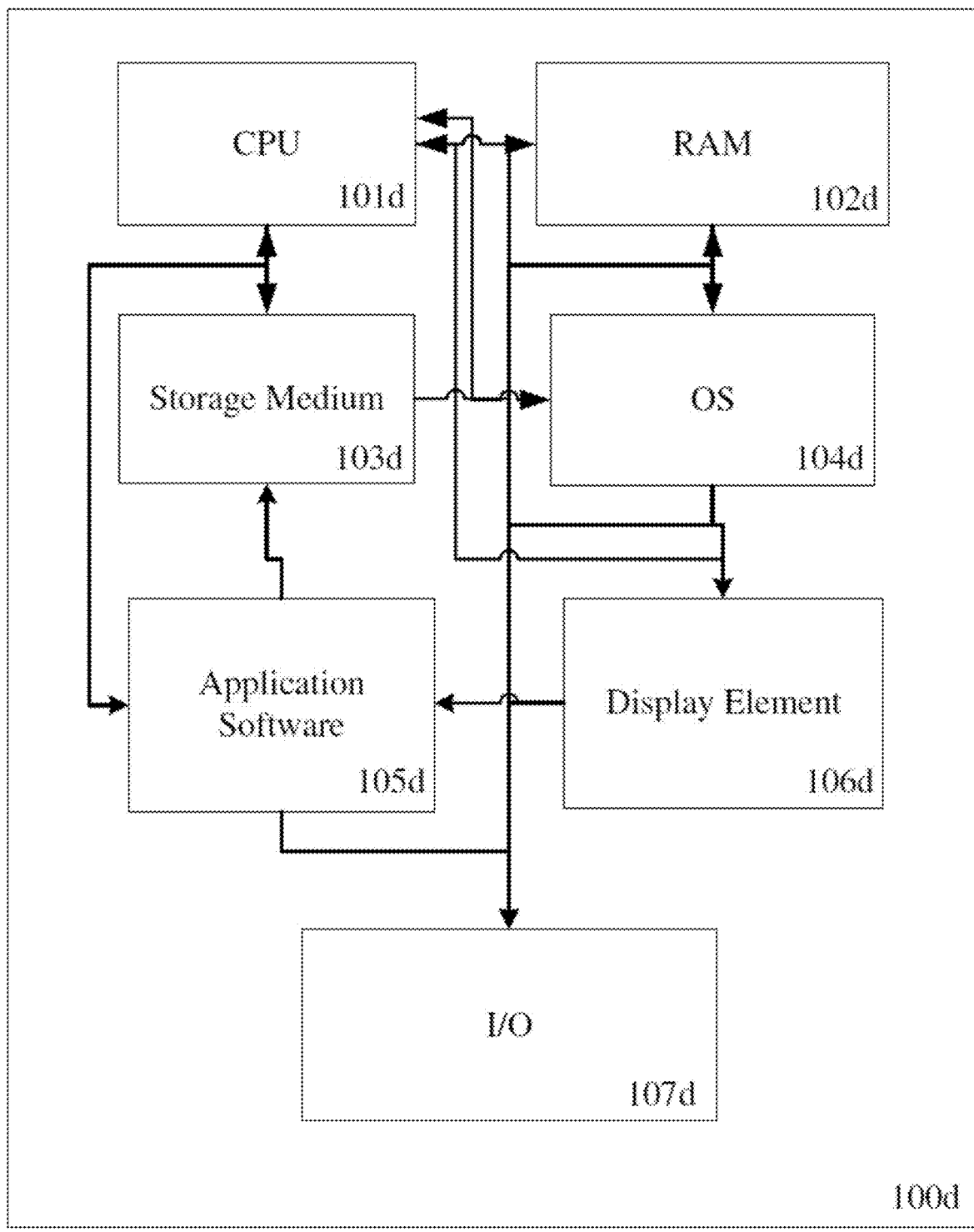
FIG. 30 is a schematic illustration of an exemplary computing device, in accordance with at least some exemplary embodiments of the present disclosure.

An illustrative representation of a computing device appropriate for use with embodiments of the system of the present disclosure is shown in FIG. 30. The computing device 100d can generally be comprised of a Central Processing Unit (CPU, 101d), optional further processing units including a graphics processing unit (GPU), a Random Access Memory (RAM, 102d), a mother board 103d, or alternatively/additionally a storage medium (e.g., hard disk drive, solid state drive, flash memory, cloud storage), an operating system (OS, 104d), one or more application software 105d, a display element 106d, and one or more input/output devices/means 107d, including one or more communication interfaces (e.g., RS232, Ethernet, Wi-Fi, Bluetooth, USB). Useful examples include, but are not limited to, personal computers, smart phones, laptops, mobile computing devices, tablet PCs, and servers. Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 31, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Figure 31:
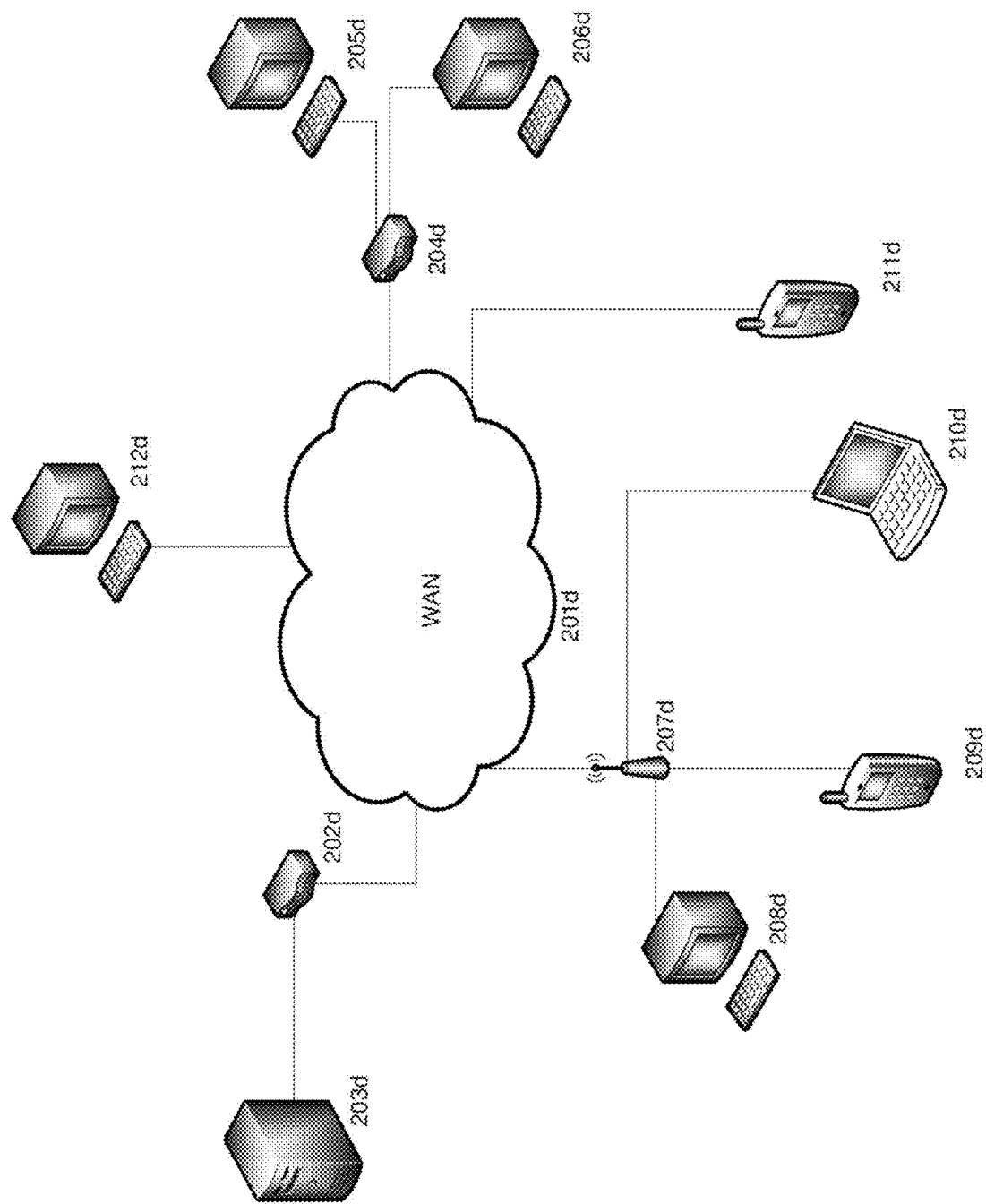
FIG. 31 is a schematic illustration of an exemplary network, in accordance with at least some exemplary embodiments of the present disclosure.

Referring to FIG. 31, a schematic overview of a system in accordance with an embodiment of the present disclosure is shown. The system is comprised of one or more application servers 203d for electronically storing information used by the system. Applications in the server 203d may retrieve and manipulate information in storage devices and exchange information through a WAN 201*d* (e.g., the Internet). Applications in server 203*d* may also be used to manipulate information stored remotely and process and analyze data stored remotely across a WAN 201*d* (e.g., the Internet).

According to an exemplary embodiment, as shown in FIG. 31, exchange of information through the WAN 201*d* or other network may occur through one or more high speed connections. In some cases, high speed connections may be over-the-air (OTA), passed through networked systems, directly connected to one or more WANs 201*d* or directed through one or more routers 202*d*. Router(s) 202*d* are completely optional and other embodiments in accordance with the present disclosure may or may not utilize one or more routers 202*d*. One of ordinary skill in the art would appreciate that there are numerous ways server 203*d* may connect to WAN 201*d* for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 203*d* via WAN 201*d* or other network in numerous ways. For instance, a component or module may connect to the system i) through a computing device 212*d* directly connected to the WAN 201*d*, ii) through a computing device 205*d*, 206*d* connected to the WAN 201*d* through a routing device 204*d*, iii) through a computing device 208*d*, 209*d*, 210*d* connected to a wireless access point 207*d* or iv) through a computing device 211*d* via a wireless connection (e.g., CDMA, GMS, 3G, 4G, 5G) to the WAN 201*d*. One of ordinary skill in the art will appreciate that there are numerous ways that a component or module may connect to server 203*d* via WAN 201*d* or other network, and embodiments of the present disclosure are contemplated for use with any method for connecting to server 203*d* via WAN 201*d* or other network. Furthermore, server 203*d* could be comprised of a personal computing device, such as a smartphone, acting as a host for other computing devices to connect to.

The communications means of the system may be any means for communicating data, including image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Figure 32:
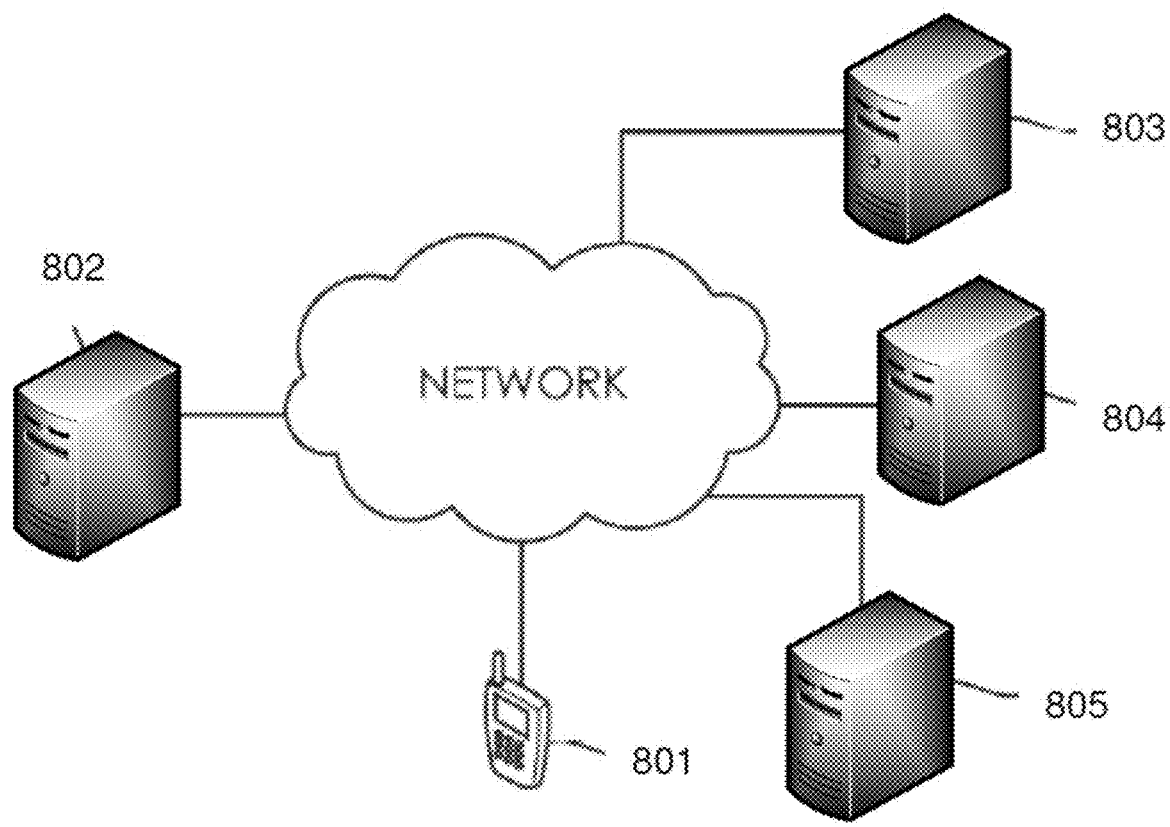
FIG. 32 is a schematic illustration of an exemplary network, in accordance with at least some exemplary embodiments of the present disclosure.

Turning now to FIG. 32, a continued schematic overview of a cloud-based system in accordance with an embodiment of the present invention is shown. In FIG. 32, the cloud-based system is shown as it may interact with users and other third party networks or APIs (e.g., APIs associated with the exemplary disclosed E-Ink displays). For instance, a user of a mobile device 801 may be able to connect to application server 802. Application server 802 may be able to enhance or otherwise provide additional services to the user by requesting and receiving information from one or more of an external content provider API/website or other third party system 803, a constituent data service 804, one or more additional data services 805 or any combination thereof. Additionally, application server 802 may be able to enhance or otherwise provide additional services to an external content provider API/website or other third party system 803, a constituent data service 804, one or more additional data services 805 by providing information to those entities that is stored on a database that is connected to the application server 802. One of ordinary skill in the art would appreciate how accessing one or more third-party systems could augment the ability of the system described herein, and embodiments of the present invention are contemplated for use with any third-party system.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

In at least some exemplary embodiments, the exemplary disclosed system may utilize sophisticated machine learning and/or artificial intelligence techniques to prepare and submit datasets and variables to cloud computing clusters and/or other analytical tools (e.g., predictive analytical tools) which may analyze such data using artificial intelligence neural networks. The exemplary disclosed system may for example include cloud computing clusters performing predictive analysis. For example, the exemplary neural network may include a plurality of input nodes that may be interconnected and/or networked with a plurality of additional and/or other processing nodes to determine a predicted result. Exemplary artificial intelligence processes may include filtering and processing datasets, processing to simplify datasets by statistically eliminating irrelevant, invariant or superfluous variables or creating new variables which are an amalgamation of a set of underlying variables, and/or processing for splitting datasets into train, test and validate datasets using at least a stratified sampling technique. The exemplary disclosed system may utilize prediction algorithms and approach that may include regression models, tree-based approaches, logistic regression, Bayesian methods, deep-learning and neural networks both as a stand-alone and on an ensemble basis, and final prediction may be based on the model/structure which delivers the highest degree of accuracy and stability as judged by implementation against the test and validate datasets.

The exemplary disclosed system, apparatus, and method may be a system for use by workers performing tasks in a facility or location that may be for example any suitable type of store (e.g., a location selling goods or services to consumers), medical or healthcare facilities such as hospitals, warehouse, distribution facility, factory, government services location (e.g., social security office, department of motor vehicles office, or unemployment office), transportation facility (e.g., airport or train station), maintenance facility (e.g., location for facilitating maintenance of a building or bridge), military or law enforcement facility, and/or any other suitable facility or location in which workers are located. Workers may be service operators. Workers may be non-customers or non-consumers. Workers may include any suitable type of employees, contractors (e.g., independent contractors), individuals performing any suitable tasks, and/or any other suitable type of worker performing work for any type of organization (e.g., a company or any other type of business association, a government agency or department, any suitable type of profit or not-for-profit organization, or any other suitable type of organization) with which the exemplary disclosed system, apparatus, and method is associated. In at least some exemplary embodiments, workers may be retail store workers, maintenance workers, government workers, security forces (e.g., government, commercial, private, law enforcement, military, and/or any other suitable type of security forces), and/or any other suitable type of worker who performs tasks for an organization with which the exemplary disclosed system, apparatus, and method is associated. Workers may have access to locations, equipment, information, and materials to which customers or consumers of the workers' organization may not have access. The exemplary disclosed system, apparatus, and method may be a worker-based system, apparatus, and method. The exemplary disclosed system, apparatus, and method may be a back-of-house system, apparatus, and method. Workers may utilize worker devices (e.g., back-of-house devices) with the system for example as described herein.

In at least some exemplary embodiments, the exemplary disclosed system, apparatus, and method may include one or more charging stations. For example, the exemplary disclosed system, apparatus, and method may include one or more charging stations for devices such as mobile devices. The exemplary disclosed system, apparatus, and method may include one or more charging stations for charging back-of-house devices.

In at least some exemplary embodiments, the exemplary disclosed system, apparatus, and method may provide secure charging and inventory management for worker devices (e.g., back-of-house devices). The worker devices may be handheld devices. The worker devices may be provided (e.g., access provided to) or issued by an organization utilizing the exemplary disclosed system, apparatus, and method to workers of the organization. The worker devices may be used by the workers to perform tasks or work (e.g., job functions). The worker devices may be any suitable type of electronic device such as, for example, tablets (e.g., smart tablets), phones (e.g., smartphones), handheld computers, scanners, walkie-talkies, credit card readers, security scanners or devices (e.g., metal or explosive detectors or tasers), remote controls, drones or drone equipment, and/or any other suitable equipment or devices utilized by workers in any suitable field or activity.

Figure 33:
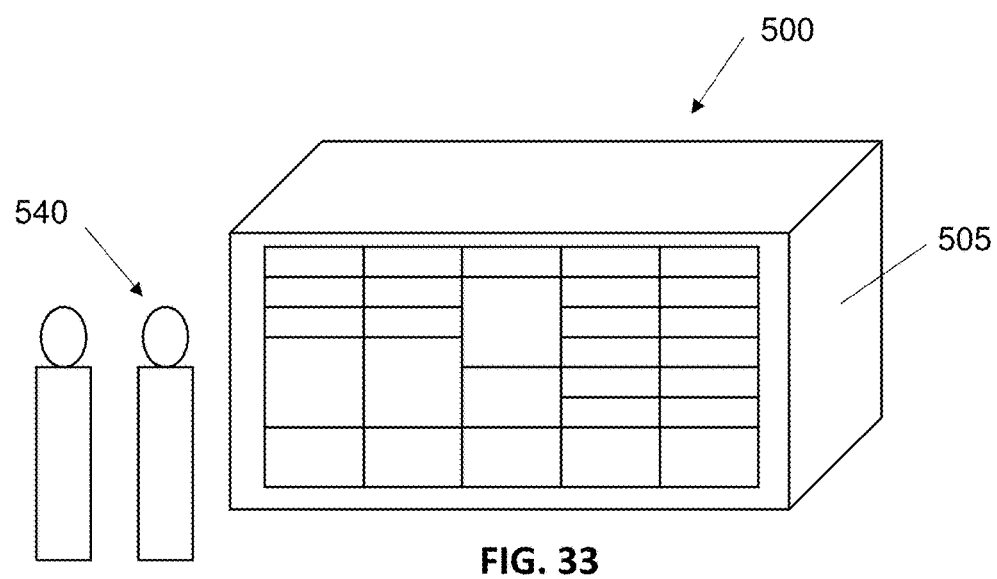
FIG. 33 illustrates an example of a charging station according to embodiments of the present invention.
Figure 34:
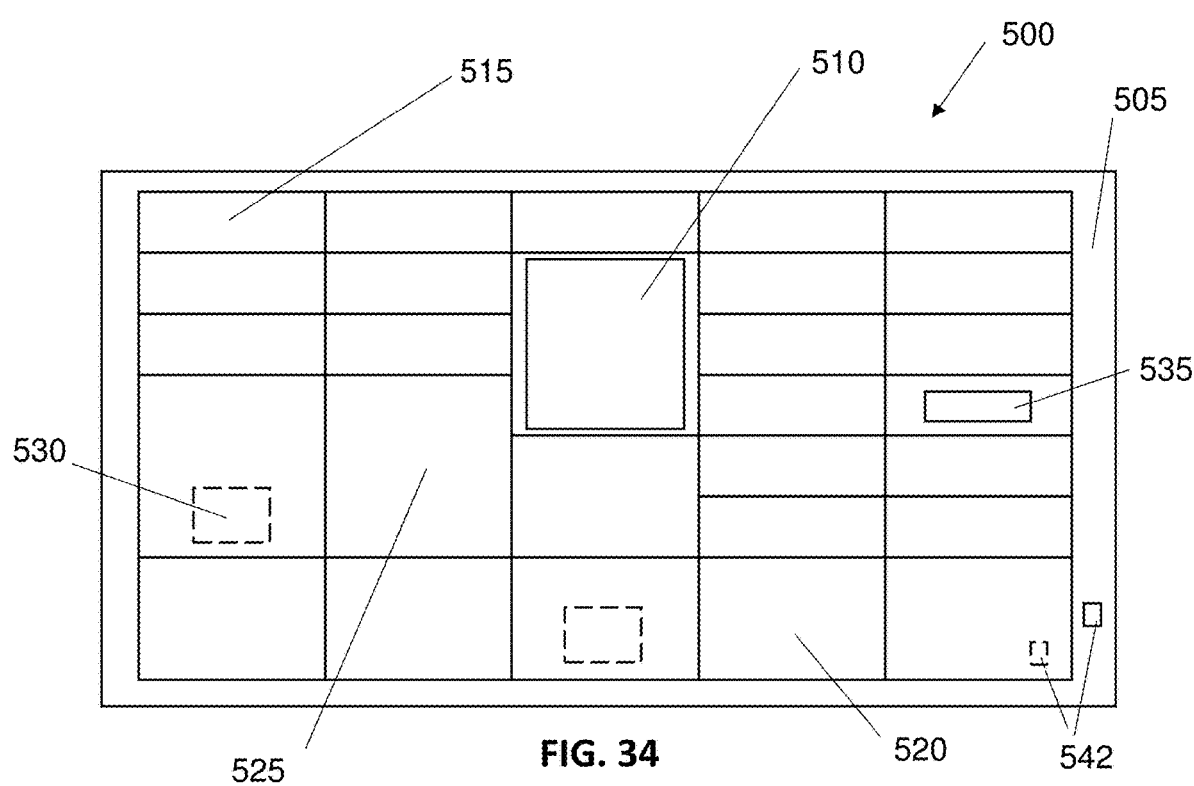
FIG. 34 illustrates an example of a charging station according to embodiments of the present invention.

FIGS. 33 and 34 illustrate an exemplary embodiment of the exemplary disclosed system, apparatus, and method. System 500 may include a charging station 505 (e.g., a charging kiosk) that may for example include components generally similar to the exemplary disclosed charging stations disclosed above regarding FIGS. 4A-4F and 26-29. Data transfer and reporting may be provided during an operation of system 500 via a user device such as a mobile device, email reporting, via a website or portal, via a user interface of charging station 505, and/or any other suitable technique. For example, charging station 505 may include a user interface 510 that may be similar for example to the exemplary disclosed user interfaces described herein. In at least some exemplary embodiments, user interface 510 may be a touchscreen. Charging station 505 may also include one or more storage housings 515, 520, and 525 that may be similar to the storage housings described herein. For example, storage housings 515, 520, and 525 may each be storage or security lockers including cavities for securing and charging one or more worker devices 530. Storage housings 515, 520, and 525 may be compartments or lockers that may be selectively locked and unlocked for example as described above. Storage housings 515, 520, and 525 may be of varying sizes and configurations for securing and charging different types of worker devices 530. For example, storage housing 525 may be larger than storage housing 520, and storage housing 520 may be larger than storage housing 515.

Charging station 505 may also include a scanner 535. Scanner 535 may be any suitable type of scanner such as, for example, a radio-frequency identification (RFID) scanner. Scanner 535 may also include a barcode scanner or a QR scanner. Scanner 535 may scan or read any suitable object including a code such as, for example, a barcode or QR code and/or RFID. The scanned object may be an object carried or located with a user (e.g., a worker) such as a tag, card, or any other suitable item. Scanner 535 may also include a biometric device such as a biometric scanner (e.g., finger scanner or optical scanner).

A worker may identify himself or herself to charging station 505 by any suitable technique. For example, a worker may enter a password or code via user interface 510 and/or may provide identification via scanner 535. For example via user interface 510 and/or scanner 535, workers may input employee codes, scan or swipe badges, scan QR codes from their phone, or provide input via RFID cards or tags. Charging station 505 may also include imaging devices for example as described herein that may take a photo and/or video of a worker who may access storage housings 515, 520, and/or 525 to remove one or more worker devices 530. Charging station 505 may also operate to record a date and timestamp recording the time at which a given worker device 530 was retrieved from charging station 505.

A first worker 540 may return a given worker device 530, and a second worker 540 (e.g., who may be a different worker than the first worker) may retrieve the given worker device 530 after worker device 530 has been charged. Any number of different workers may utilize the same worker device 530 at different times based on an operation of system 500. Various worker devices 530 may be stored in select storage housings 515, 520, and 525 based on a level of access granted to different types of workers. For example, a given worker 540 may be given access to select storage housings 515, 520, and 525 storing and charging worker devices 530 to which that given worker 540 has access. Such role-based access may provide for a given worker 540 gaining access to select worker devices 530 (e.g., select storage housings 515, 520, and 525 storing and charging select types of worker devices 530) appropriate for performing his or her job functions, while other worker devices 530 may remain securely locked and not accessible to that given worker 540.

In at least some exemplary embodiments, each worker device 530 may be stored (e.g., housed and charged) in a single storage housing 515, 520, or 525. Also in at least some exemplary embodiments, one or more worker devices 530 may be stored (e.g., housed and charged) in storage housings 515, 520, and 525. System 500 may operate (e.g., as described herein) to record each worker device 530 that is removed or returned by one or more of the following mechanisms: worker 540 may indicate via user interface (e.g., touchscreen) which worker device 530 is removed; worker device 530 may include an RFID chip that may be automatically detected as having been removed from charging station 505 when worker device 530 passes through a predetermined portion (e.g., a locker door opening) of storage housing 515, 520, or 525; and/or system 500 may detect a change in current in one of the charging cables (e.g., similar to the exemplary disclosed charging cable described herein) and/or detects a physical detachment when worker device 530 is unplugged from the exemplary disclosed charging cable.

In at least some exemplary embodiments, when worker 540 indicates (e.g., provides input for example onscreen via user interface 510) the type of work and/or worker device 530 he or she is to utilize, system 500 may automatically open a door of corresponding storage housing 515, 520, or 525 holding a worker device 530 in an appropriate category such as that has a highest amount of charge, has been charging for the longest period of time, is the newest worker device 530 in a fleet, and/or any other suitable criteria (e.g., from a business perspective). Also for example, system 500 may automatically open a door of a given storage housing 515, 520, or 525 based on an input of the identity of a given worker 540 (e.g., may select a given worker device 530 according to the exemplary criteria based on the input of an identity of worker 540 via an operation of user interface 510 and/or scanner 535).

In at least some exemplary embodiments, worker 540 may indicate (e.g., provide input for example onscreen via user interface 510) that he or she is returning a worker device 530 that has been damaged, has scratches, does not function so that the proper repair or replacement cycle can be initiated, and/or exhibits any other unsuitable operation.

In at least some exemplary embodiments, system 500 may communicate with staff and/or support personnel associated with workers 540 (e.g., provide an online portal such as an online portal for back-of-house management) to provide real time or near real-time data regarding a status of worker devices 530 (e.g., which have been removed and which are being stored and charged), and may provide data and reports of the status of worker devices 530 including for example "shrink" (e.g., lost or stolen devices). For example, staff and/or support personnel associated with workers 540 may include managers, business staff (e.g., corporate staff), tech support, IT department members, and/or third party vendors who may manage the exemplary disclosed devices. System 500 may provide for communication (e.g., reporting and data transfer) regarding theft or loss (e.g., shrinkage) of devices, battery level of devices, damage to devices, and/or any other suitable information. For example, if a given worker 540 does not return one or more worker devices 530 within a predetermined time period (e.g., during a shift period of worker 540), an exception report may be issued by system 500 (e.g., via the exemplary disclosed portal, text message or email, user interface 510, and/or any other suitable communication technique) to alert managers as to which workers 540 have outstanding worker devices 530 (e.g., have not returned worker devices 530 to charging station 505). System 500 may operate for example to prevent a given worker 540 who has not returned one or more worker devices 530 from removing or checking out any additional worker devices 530 (e.g., without a manager override or other suitable approval action). System 500 may include a detection device 542 that may be disposed on or at charging station 505 and/or in one or more of the exemplary disclosed storage housings. Detection device 542 may be any suitable device for detecting a given worker 540 removing and/or returning a given worker device 530 such as, for example, a camera (e.g., picture or video), a biometric device such as a fingerprint scanner, an identification badge scanner, and/or any other suitable device for identifying an individual removing and/or returning devices.

In at least some exemplary embodiments, system 500 may provide a back-of-house solution that may include many storage housings (e.g., lockers) and one or more user interfaces (e.g., screens) that allow users (e.g., workers) to access the lockers. The lockers may vary in size depending on the device or devices to be stored, charged, and/or dispensed. For example, different sized lockers may be provided such as, for example, lockers that may be sized to accommodate relatively larger devices and/or may supply relatively more electrical current. System 500 may include one or more charging stations 505 that may be configured as appropriate for a given field, industry, or type of organization utilizing system 500.

In at least some exemplary embodiments, system 500 may check out and check in distinct devices to different users, and track whether or not these devices have been returned. System 500 may track a location or status of worker devices 530 (e.g., including utilizing positioning such as GPS of worker devices 530 or other location data for example as described herein). System 500 may utilize (e.g., leverage) user input to track a condition of worker devices 530. System 500 may utilize identification data (e.g., as described above) to manage access of workers 540 to worker devices 530 (e.g., role-based access). System 500 may utilize photo verification for example as described herein to track a last worker 540 to have checked a given worker device 530 in or out and to track and manage loss for users of system 500 (e.g., for retailers).

In at least some exemplary embodiments, system 500 may operate to provide an electronic role-based ledger for device management (e.g., based on the exemplary disclosed computing systems) that also securely charges worker devices 530 between uses. System 500 may include a plurality of charging stations 505 (e.g., a fleet of kiosks) to manage a plurality of worker devices 530 (e.g., a fleet of devices). System 500 may provide access to an exemplary disclosed storage housing (e.g., locker) via worker input (e.g., input of an employee code), swiping or scanning an identification badge or other item, RFID badge, QR code, and/or any other suitable technique. System 500 may track when a user (e.g., worker 540) checks out one or more worker devices 530 but does not return it (e.g., within a predetermined time period). System 500 may transfer (e.g., share) data including photo-verification (e.g., photo or video data), drop-off and pick-up time of devices, employee codes, and/or any other suitable data with suitable parties. System 500 may selectively open storage housings (e.g., lockers) based on % battery remaining of working devices 530 and/or time since start of charging. System 500 may selectively charge more than one device. System 500 may manage (e.g., enforce) role-based access to particular storage housings (e.g., lockers) based on which devices are used by particular workers and/or on particular shifts (e.g., based on worker ID). System 500 may track serial numbers and other data of worker devices 530. System 500 may include any desired number of exemplary disclosed storage housings.

Figure 35:
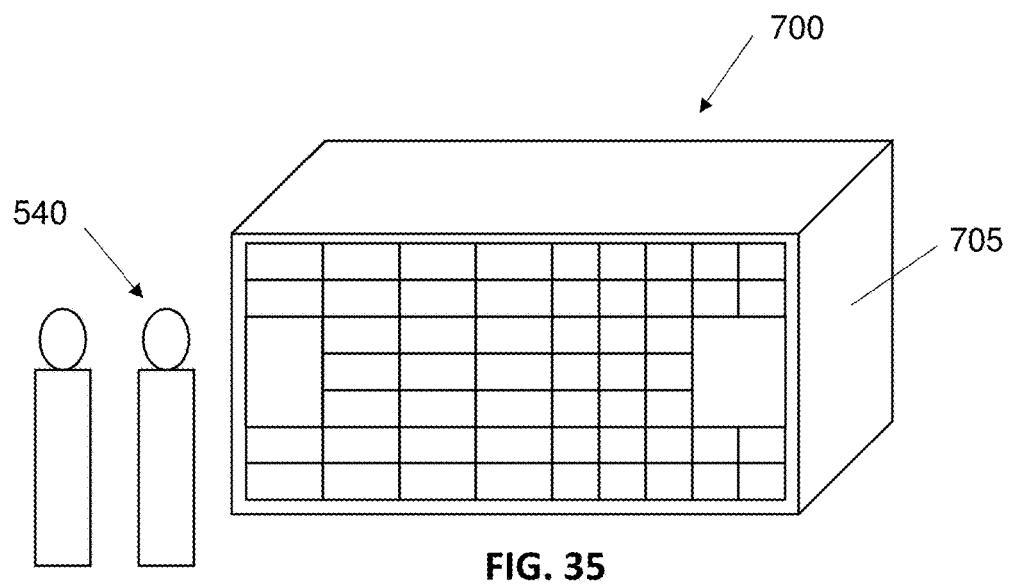
FIG. 35 illustrates an example of a charging station according to embodiments of the present invention.
Figure 36:
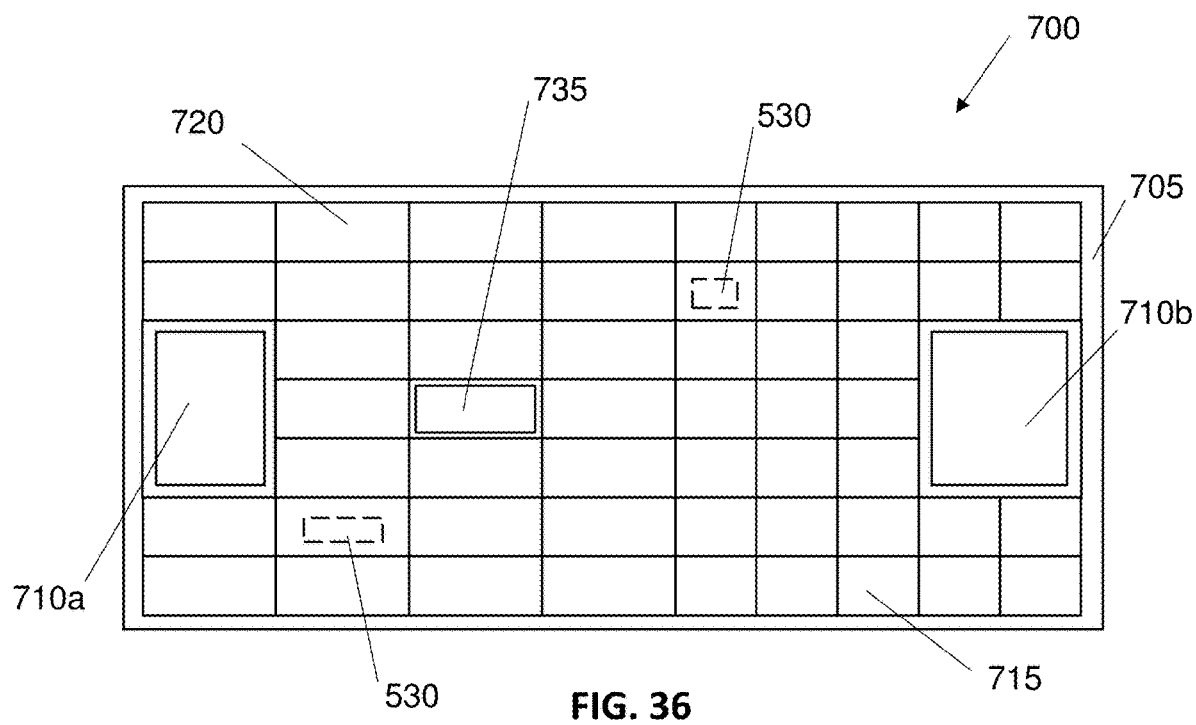
FIG. 36 illustrates an example of a charging station according to embodiments of the present invention.

FIGS. 35 and 36 illustrate an exemplary embodiment of the exemplary disclosed system, apparatus, and method. System 700 may include a charging station 705 (e.g., a charging kiosk) that may be similar to charging station 505. Charging station 705 may include a user interface 710*a* and a user interface 710*b* that may each be similar to user interface 510. Charging station 705 may also include a plurality of storage housings 715 and 720 that may be similar to storage housings 515, 520, and 525. Charging station 705 may further include a scanner 735 that may be similar to scanner 535.

Figure 37:
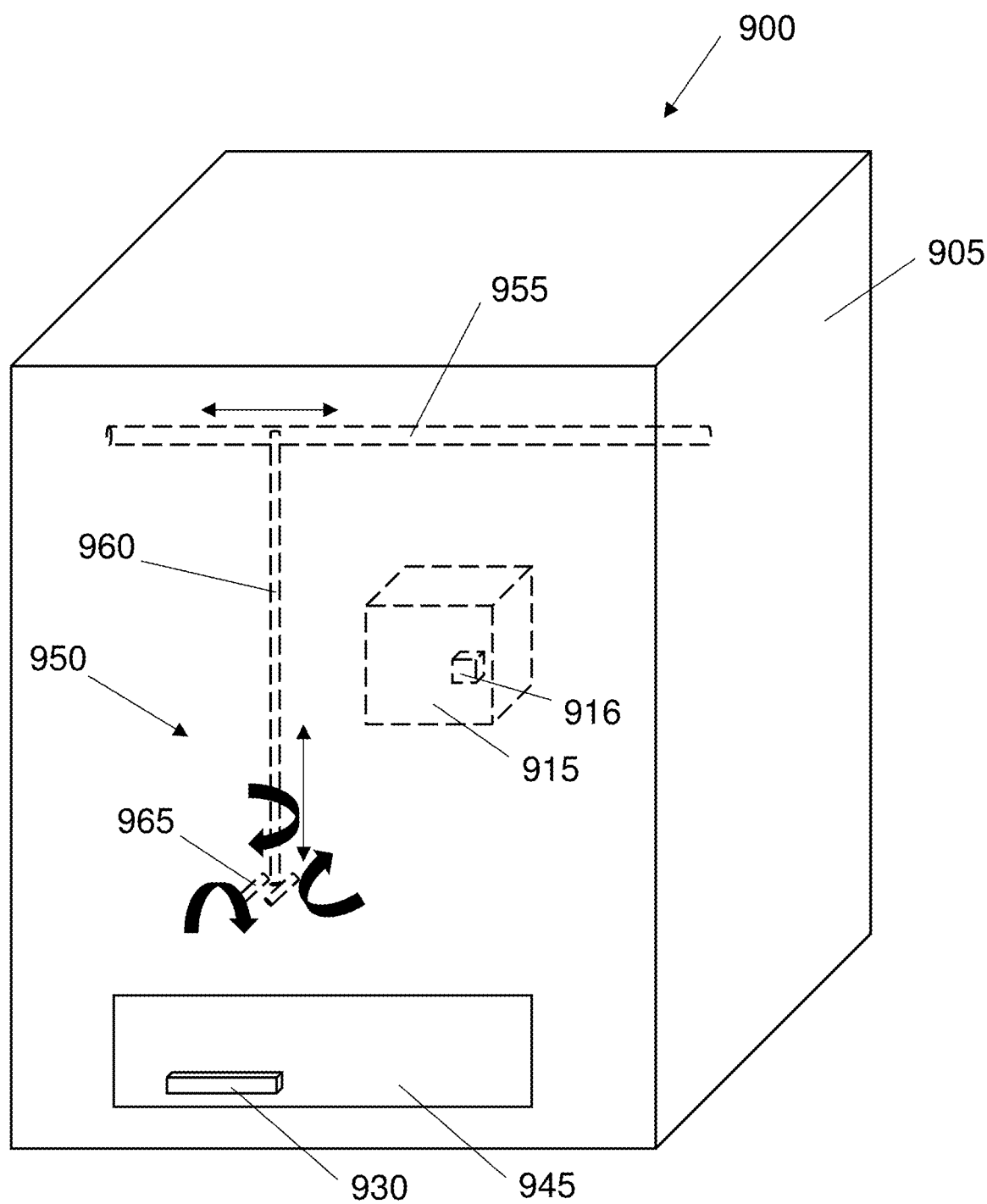
FIG. 37 illustrates an example of a charging station according to embodiments of the present invention.

FIG. 37 illustrates an exemplary embodiment of the exemplary disclosed system, apparatus, and method. System 900 may include a charging station 905 (e.g., a charging kiosk) that may be similar to charging station 505 (e.g., and that may include similar components to charging station 505). Charging station 905 may include a storage housing 915 that may be similar to storage housings 515, 520, and 525. Storage housing 915 may include a charging cable 916 that may be similar for example to the exemplary disclosed charging cables described herein. Charging station 905 may include a dispensing cavity 945 that may receive one or more devices 930 (e.g., worker devices or consumer devices that may be similar to device 530). Charging station 905 may also include a transfer assembly 950. Dispensing cavity 945 may for example be covered by a movable (e.g., hinged) door that may be formed from transparent or other material.

Transfer assembly 950 may be any suitable assembly for moving device 930 between one or more dispensing cavities 945 and one or more storage housings 915 disposed within charging station 905. For example, transfer assembly 950 may include a support member 955 on which a movable member 960 may be movably attached. For example, movable member 960 may translate on support member 955 for example in the directions illustrated in FIG. 37. Movable member 960 may be configured to increase and decrease in length (e.g., may be retractable and extendable) for example in the directions illustrated in FIG. 37. For example, movable member 960 may include telescopic members or any other suitable configuration for increasing and decreasing in length. Movable member 960 may be movably attached to support member 955 at a first end portion and may be movably attached to a support assembly 965 at a second end portion. Movable member 960 may also be configured to rotate relative to support member 955. Support assembly 965 may be configured to removably attach to and/or hold device 930. Support assembly 965 may be rotatably attached to movable member 960. Support assembly 965 may rotate or pivot around a plurality of axes relative to movable member 960 for example as illustrated in FIG. 37. Support assembly 965 may include any suitable members and/or configuration for removably attaching or holding device 930 during transfer of device 930 between dispensing cavity 945 and one or more storage housings 915. Transfer assembly 950 may include any suitable motors, actuators, controllers, and/or computing devices (e.g., for example as described herein) for translating, extending, retracting, rotating, and pivoting movable member 960 and support assembly 965.

In at least some exemplary embodiments, transfer assembly 950 may removably attach to or hold device 930 disposed in dispensing cavity 945. Based for example on the exemplary disclosed configuration described above, support assembly 965 and movable member 960 may move device 930 through one or more interior cavities of charging station 905 to storage housing 915. For example, transfer assembly 950 may include or comprise a robot that may translate and and/or rotate support assembly 965 along or about X, Y, and Z axes to retrieve device 930 from its position inside storage housing 915, unplug it from charging cable 916, and move it to dispensing cavity 945 to be dispensed to a user (e.g., worker or customer). When a user returns device 930 to dispensing cavity 945, transfer assembly 950 may translate and/or rotate support assembly 965 along or about X, Y, and Z axes to move device 930 from dispensing cavity 945 to a storage position inside storage housing 915, and plug device 930 into charging cable 916 (e.g., based on support assembly 965 rotating to a suitable position for plugging charging cable 916 into device 930). Transfer assembly 950 may dispense and/or receive back device 930 for example based on criteria and/or user input or identification as described herein.

Features of the exemplary disclosed sanitization embodiments (e.g., as described regarding FIGS. 23 through 29) may be combined and used with any other exemplary disclosed embodiments such as, for example, the embodiments described regarding FIGS. 33-37.

Figure 38:
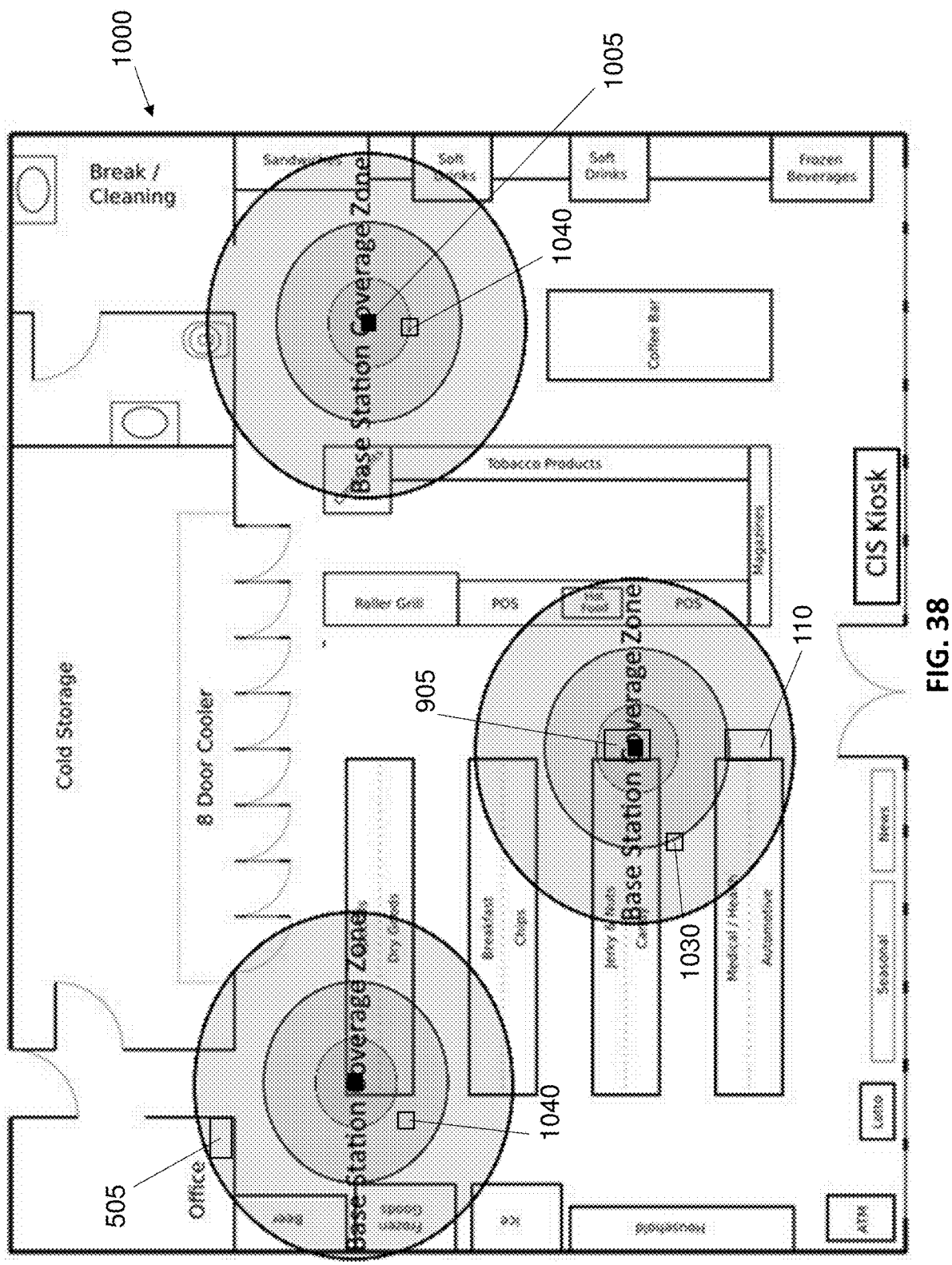
FIG. 38 illustrates an example of a charging station location or venue according to embodiments of the present invention.
Figure 39:
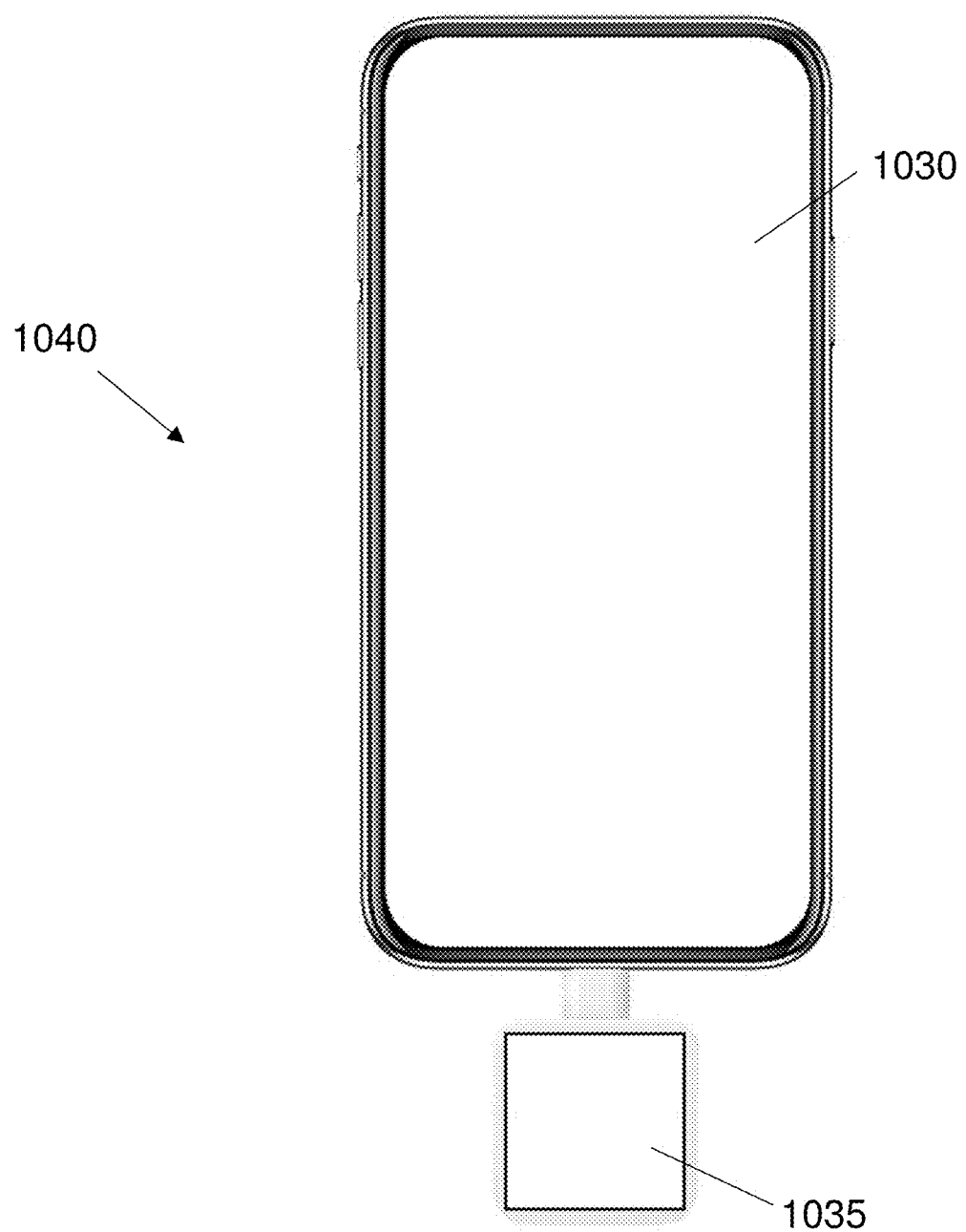
FIG. 39 illustrates an example of a charging device according to embodiments of the present invention.

FIGS. 38 and 39 illustrate an exemplary embodiment of the exemplary disclosed system, apparatus, and method. System 1000 may be an over-the-air (OTA) wireless charging system. System 1000 may charge devices without contact, attachment, or tethering to the devices. System 1000 may provide OTA wireless charging by any suitable technique such as, for example, radio frequency (RF) and/or Millimeter wave (mmWave) wireless charging.

As illustrated in FIG. 38, system 1000 may include one or more base stations 1005 that may transmit power wirelessly (e.g., via RF or mmWave). In at least some exemplary embodiments and as illustrated in FIG. 39, a device 1030 that may be similar to device 930 may be attached to a device such as a receiver adapter 1035 to facilitate OTA charging of device 1030. Receiver adapter 1035 may be any suitable device for wirelessly receiving energy from one or more exemplary disclosed base stations of system 1000 for example as described below. Receiver adapter 1035 may also connect, attach to, and/or plug into device 1030 to form a configuration or assembly 1040 that wirelessly transfers power from system 1000 to device 1030.

Returning to FIG. 38, system 1000 may include one or more base stations 1005. Base station 1005 may be any suitable device for wirelessly transmitting power such as an RF base station or an mmWave transmitter. Base stations 1005 may be placed to maximize charging availability and to meet any other suitable criteria throughout any suitable location such as a store, warehouse, distribution facility, factory, government services location, transportation facility, maintenance facility, military or law enforcement facility, and/or any other suitable facility or location. Base stations 1005 may transmit power to any suitable devices or assemblies such as one or more assemblies 1040, one or more devices 1030 (e.g., directly to device 1030), one or more charging stations 110, one or more charging stations 505, one or more charging stations 905, and/or any other components or assemblies such as described herein. FIG. 38 illustrates exemplary charging zones of base stations 1005, with for example a magnitude or level of charging increasing as a device is placed closer to a given base station 1005. In at least some exemplary embodiments, the exemplary disclosed charging stations may serve as base stations or integrally include base station 1005. Also for example, any desired number of base stations 1005 may be arranged in a given location.

Any of the exemplary disclosed charging stations (e.g., as illustrated in FIG. 38) may be utilized for dispensing receiver adapters 1035 to users (e.g., customers and/or workers). For example, users may enter data through the exemplary disclosed user interfaces of the exemplary disclosed charging stations. For example, a user may enter a phone number, an email address, credit card information, and/or a device type. System 1000 may operate to control an exemplary disclosed charging station to dispense or open a storage housing securing a specific type of receiver adapter 1035 that may be compatible (e.g., may be pluggable) to a device type entered by a user. For example, the exemplary disclosed charging station may include different types of receiver adapters 1035 for different types of devices 1030. A certain receiver adapter 1035 may thereby be provided that is compatible with device ports of a given device 1030.

Users of system 1000 may return receiver adapter 1035 to any available charging station, in addition to the charging station from which they obtained receiver adapter 1035 (e.g., they may return receiver adapter 1035 at a different area of a venue or near an exit as they are departing the venue). System 1000 may communicate with the various exemplary disclosed charging stations to accept receiver adapter 1035 from the user and to cross-reference other charging station data to store the return time for receiver adapter 1035 (e.g., and to confirm that the receiver adapter 1035 was returned in a predetermined time purchased and/or provided to a user). For example, a user may be charged an additional fee if receiver adapter 1035 is returned late to the exemplary disclosed charging station (e.g., and a late fee may be avoided by the user by returning receiver adapter 1035 to any of the charging stations of a given location or venue).

In at least some exemplary embodiments, system 1000 may provide a system of interconnected kiosks, with system 1000 managing a system of OTA receiver adapters 1035 that may connect to OTA base stations 1005 that may exist within a venue or may be located within a charging assembly. System 1000 may track users who check in and out receiver adapters 1035 from the exemplary disclosed charging stations. Users may provide credentials and/or a deposit (e.g., credit card) to check out receiver adapter 1035. The deposit may be returned if receiver adapter 1035 is returned.

In at least some exemplary embodiments, system 1000 may perform a pre-authorization of a user's credit card before completing the transaction and dispensing receiver adapter 1035 from the exemplary disclosed charging station. The user's credit card number may also serve as a unique identifier for the user that replaces a mobile number.

In at least some exemplary embodiments, system 1000 may control base stations 1005 to provide zones of wireless charging capabilities in a store or other venue. The exemplary disclosed charging stations may display a map and/or other information regarding locations in the store at which users can wirelessly charge their devices. When receiver adapters 1035 are returned they may undergo one or more sanitization cycles for example as described herein (e.g., UV-C sanitization). System 1000 may make receiver adapters 1035 available using a rental model and/or a subscription model (e.g., monthly fee, in which a subscription ID may be used for user identification as an alternative to a credit card number).

Figure 40:
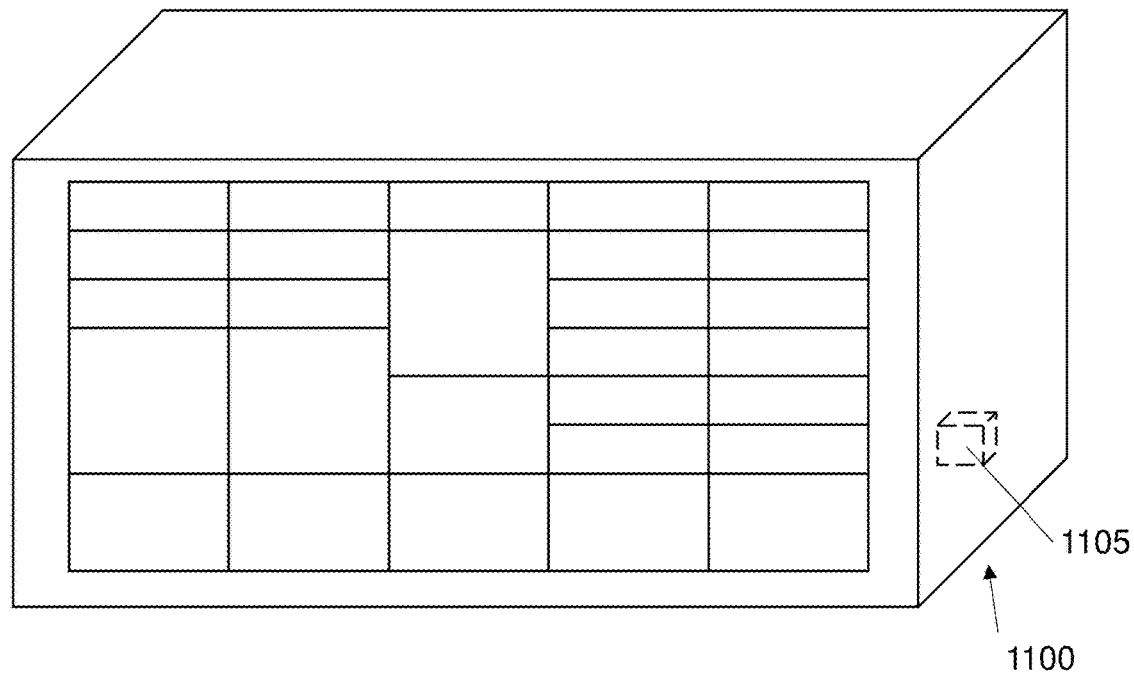
FIG. 40 illustrates an example of a charging station according to embodiments of the present invention.

In at least some exemplary embodiments and as illustrated in FIG. 40, the exemplary disclosed system, apparatus, and method may include a battery backup supply system 1100 including a battery backup supply 1105. When an exemplary disclosed charging station (e.g., charging station 110, charging station 505, charging station 705, or charging station 905) loses power (e.g., loses its wall power) for example due to a brief or prolonged power outage, its battery backup supply 1105 (e.g., universal power supply or UPS) may provide auxiliary power to the charging station to allow the charging station to continue operating. A duration of this battery backup power's life (e.g., UPS life) may be influenced by many factors, such as quantity of charging stations charging with the UPS, age of the battery, and/or types of other hardware components that may be active. For example, the UPS battery backup may power the charging station for a certain time (e.g., up to 40 minutes) following the beginning of a power outage.

The exemplary disclosed UPS (e.g., battery backup supply 1105) may maintain the kiosk's operations so that users (e.g., customers or workers) may retrieve their device even when regular power is lost. However, the exemplary disclosed system may determine that it may not be desirable to allow new charge transactions to be initiated when a charging station is operating on UPS power because the charging station may possibly be powered down when users return to attempt to retrieve their device (e.g., users may not be able to retrieve their devices because the charging station may be powered down due, for example, to an extended power outage).

The exemplary disclosed charging station may receive data of a status of the UPS via a USB connection or any other suitable communication technique for example as described herein. The charging station may receive status data indicative of whether or not the charging station is currently receiving power (e.g., from wall power or power from any other suitable source) or whether it is on battery backup (e.g., UPS power). To avoid an unfavorable user experience in which a user secures (e.g., locks up) his or her device in the charging station but then cannot later retrieve it because the charging station has powered down, the exemplary disclosed system may be configured (e.g., software may be designed) to prevent users from generating new charging transactions when the charging station is on battery backup (UPS). For example, the exemplary disclosed system may prevent new charging transactions until power (e.g., wall power) is restored, a predetermined time period (e.g., 40 minutes or any other suitable time period) has elapsed, or any other suitable criteria has been met (e.g., based on whichever criteria occurs first). For example, the exemplary disclosed system may prevent locking of the locker door and/or charging when the charging station is on backup power.

Figure 41:
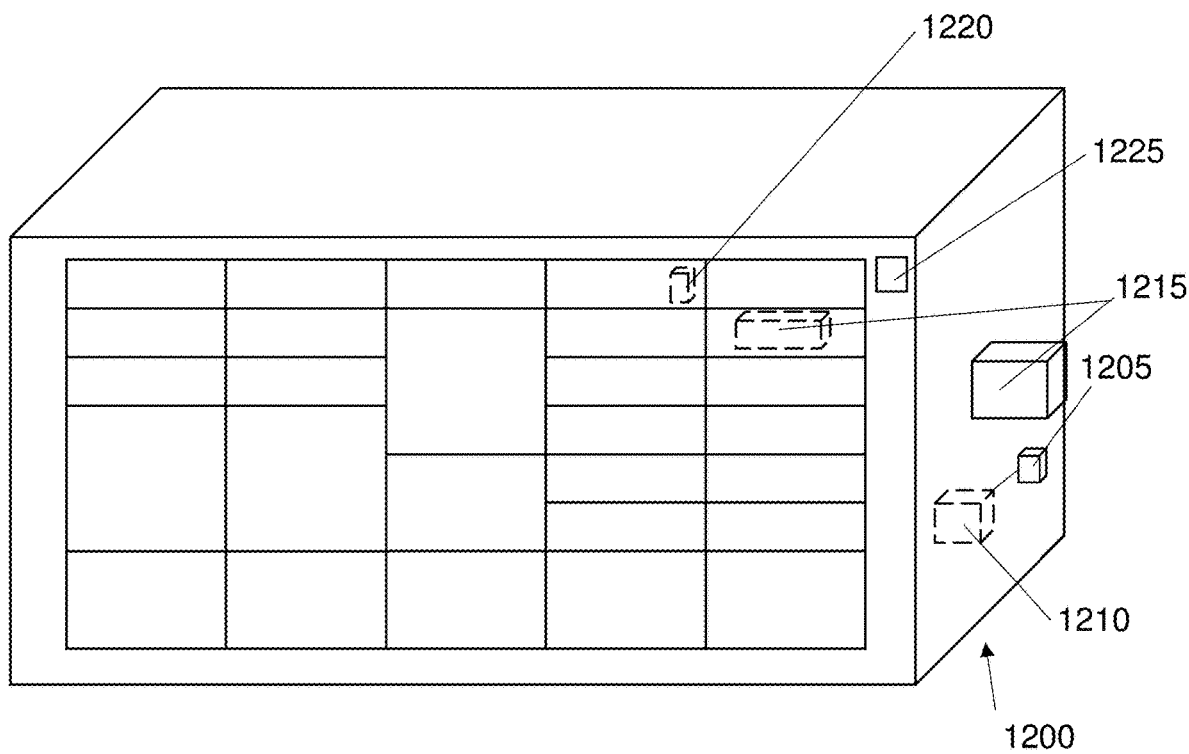
FIG. 41 illustrates an example of a charging station according to embodiments of the present invention.

In at least some exemplary embodiments and as illustrated in FIG. 41, the exemplary disclosed system, apparatus, and method may include a controller board system 1200. The exemplary disclosed charging station (e.g., charging station 110, charging station 505, charging station 705, or charging station 905) may include a controller board 1205 that may control lighting and display (e.g., locker LEDs), charging cables, storage housing locks (e.g., locker locks), and any other suitable components. Controller board 1205 may be removably attachable to the charging station or integrally formed with the charging station. The exemplary disclosed controller boards (e.g., controller board 1205) may control a predetermined number (e.g., set number) of charging cables, storage housings (e.g., lockers), and/or other components. The exemplary disclosed charging station may include one or a plurality of controller boards 1205. Controller board hardware and/or firmware may be designed to be adaptable to new technologies that may not yet be released at the time of the creation of the hardware and/or firmware such as, for example, new charging cable types and new charging power profiles. In at least some exemplary embodiments, controller board system 1200 may include a plurality of controller boards 1205 for providing differing (e.g., relatively higher) power output.

The exemplary disclosed controller boards (e.g., controller board 1205) may be connected to a computing device 1210 (e.g., similar to the exemplary disclosed computing devices described herein) of the charging station for example as illustrated in FIG. 4I. In at least some exemplary embodiments, a USB interface may be used to connect the exemplary disclosed controller board (e.g., controller board 1205) with computing device 1210 of the charging station (e.g., controller board 1205 may communicate with computing device 1210 of the charging station via any suitable communication technique for example as described herein). Computing device 1210 of the charging station may control (e.g., command) controller board 1205 to perform actions using the exemplary disclosed hardware of the charging station. The exemplary disclosed controller board (e.g., controller board 1205) may also generate data, reports, and/or events that may indicate a state of the hardware of the charging station.

In at least some exemplary embodiments, the exemplary disclosed controller board (e.g., controller board 1205) may be programmable via firmware and/or computing device 1210 of the charging station to produce any suitable display or pattern such as an LED illumination pattern (e.g., "LED attract" sequence). The LED illumination pattern may be a vertical wave.

The exemplary disclosed controller board (e.g., controller board 1205) may include (e.g., be equipped with) firmware and/or hardware that may determine and/or sense (e.g., recognize) a level of charging that may be suitable for a given device (e.g., customer device or worker device such as a mobile device). In at least some exemplary embodiments, the exemplary disclosed controller board (e.g., controller board 1205) may offer any suitable level of charging (e.g., up to 45 W of charging) by offering 3 A at 15V to some devices, 15 W (3A at 5V) to some devices, and/or 27A (3A at 9V) to some devices. The proper voltage level and/or current level for a charging session may be determined (e.g., by controller board 1205) through interacting with the user device via an exemplary disclosed charging cable, through a prompt via the exemplary disclosed user interface (e.g., the user may enter input to determine charging level before or while connecting the user's device), through firmware and/or software of controller board 1205 and/or computing device 1210 of the charging station, and/or any other suitable technique.

Controller board system 1200 may operate to control an amount of power being drawn from a power source (e.g., at a wall outlet) for example for energy consumption reasons. The controller board firmware and/or software of the charging station may be configured or programmed, remotely and/or on-site via software or a configuration update, to control (e.g., "throttle" or load balance) the share of power transferred to connected devices. For example, controller board system 1200 (e.g., controller board 1205) may operate to throttle power to devices to provide suitable draw (e.g., optimize for minimal draw) at a power source such as a wall. Controller board system 1200 (e.g., controller board 1205) may thereby lower energy consumption by suitably (e.g., optimally) charging some devices while offering a reduced charging profile (e.g., less preferable profile) to other devices, and alternating between charging levels for some or all devices.

Such control may include charging some devices at a relatively higher level (e.g., optimal level) while offering a relatively lower or reduced rate of charging to other devices (e.g., and also alternating between charging levels throughout a charging session). In at least some exemplary embodiments, controller board system 1200 may be configured (e.g., programmed) to charge electrical devices during periods of relatively lower electricity costs (e.g., late at night or early in the morning).

Controller board system 1200 may also include a wireless charging pad 1215 for example as illustrated in FIG. 4I. Wireless charging pad 1215 may be any suitable device for wirelessly transferring power or charge to a device. Wireless charging pad 1215 may provide increased flexibility for charging devices and may accommodate devices that may not have a charging port and/or may be relatively easier to use. Wireless charging pad 1215 may be integrated into the exemplary disclosed charging station (e.g., charging station 110, charging station 505, charging station 705, or charging station 905), or attached to or disposed near the exemplary disclosed charging station. For example, wireless charging pad 1215 may be disposed in one or more (e.g., some or all) of the exemplary disclosed storage housings. Using controller board 1205, controller board system 1200 may control the charging station to determine or detect whether a device is charging using wireless charging pad 1215 (e.g., has been placed on wireless charging pad 1215) as opposed to using a charging cable. In at least some exemplary embodiments, select storage housings (e.g., lockers) of the exemplary disclosed charging station may be equipped with wireless charging pads 1215, or substantially all storage housings may include wireless charging pads 1215.

A user may be able to select a storage housing having wireless charging pad 1215 based on the user interface or exemplary disclosed identification techniques for example as described herein. A user may also indicate (e.g., via the exemplary disclosed user interface or identification techniques, for example via interactive touchscreen) which type of device or charging tip (e.g., charging connector) the user is utilizing, and controller board system 1200 may in response to the input present different available storage housings as options based on the type of charging and other criteria indicated by the user. The user may thereby confirm that a selected storage housing is configured and/or equipped to be compatible with the user's device.

In at least some exemplary embodiments, one or more controller boards 1205 of the exemplary disclosed charging station may detect, sense, and/or determine how some or all of the charged devices are being charged (e.g., via charging cable, wireless charging pad 1215, OTA system 1000, or any other available charging technique) without user input, which may provide an efficient user experience. For example, one or more controller boards 1205 may detect which devices are being charged and therefore which cables or charging sources are being used without user input (e.g., without user input via the exemplary disclosed user interface).

One or more controller boards 1205 of the exemplary disclosed charging station may also detect, sense, and/or determine a battery level of some or all of the devices during charging. Controller board 1205 may transfer data (e.g., reports) indicating charge status for the charged devices to controller board system 1200 (e.g., and to the system controlling the charging stations) via communication components of the exemplary disclosed charging station.

In at least some exemplary embodiments, controller board system 1200 may determine whether doors (e.g., locker doors) of storage housings of a charging station are fully shut (e.g., for security reasons). For example as illustrated in FIG. 4I, controller board system 1200 may include a detection device 1220 that may detect whether a lock of a storage housing door has been locked without the door being closed (e.g., such as in the case that the lock is manually activated by a user in order to continue using his or her device while the device charges). Because such user behavior may pose a security risk and/or may be otherwise unfavorable to a venue, detection device 1220 may be added to some or all storage housings (e.g., lockers) to detect whether a locker door is in a closed or open position. Detection device 1220 may be a plunger, a magnet, a motion sensor, a weight sensor, a pressure plate, a camera (e.g., a photo camera and/or a video camera), or any other suitable device for detecting whether a door is in an open or closed position. Data of the status of each detection device 1220 may be transferred from controller board 1205 to computing device 1210 via any suitable technique for example as described herein (e.g., and uploaded to the exemplary disclosed server in real-time or near real-time). An alert may be displayed or communicated to the user when detection device 1220 detects the door has been locked without the door being closed. Also, the exemplary disclosed system may prevent or stop electrical charging of user devices when the door has been locked without the door being closed.

In at least some exemplary embodiments, controller board system 1200 may include a controller board display 1225 in addition for example to displays (e.g., LED displays) including branding and status configurations (e.g., locker LEDs changing color with branding configuration and status of the locker for example if the locker is in use or available). Controller board display 1225 may be an RGB LED display or any other suitable type of display (e.g., LCD). Controller board display 1225 may be located at a top portion of a charging station or at any other suitable location. Controller board display 1225 may be disposed behind a semi-translucent film or any other suitable material. Controller board display 1225 may be controlled (e.g., programmed) by controller board 1205 and/or computing device 1210. Controller board display 1225 may be controlled to project a custom color or series of colors. Controller board display 1225 may be used for any suitable purposes such as signaling to others within a venue that an associate or employee is requested for additional assistance, as a beacon to alert users to the charging station's location in the venue, as a status indicator to report whether there are available lockers at the present time, to advertise or project the venue's brand image and colors, and/or any other desired purpose.

In at least some exemplary embodiments, the exemplary disclosed user interface of the charging station may prompt a user to provide additional information before allowing the user to start a session, gain access to a storage housing (e.g., locker), and/or retrieve the device or devices. The information may be requested via a touchscreen or any other suitable user interface, and may include custom text-based entry data such, for example, last name, zip code, state, city, and/or any other suitable data. The user interface may prompt the user to use text-based entry and/or select from one or more predefined answers (e.g., pull-downs). Input provided by the user may dynamically branch the survey to a predetermined next question or set of questions. These questions and answers may be configurable via an online platform (e.g., PaaS) in which system administrators may configure which charging stations (e.g., kiosks) the survey and/or form should display these items. The user input data collected via the form may be sent via secure transmission to a backend database (e.g., via a suitable communication technique for example as described herein). User input data may also be sent securely to a client's database via use of automated API, SFTP transfer, and/or other suitable method of data transmission.

In at least some exemplary embodiments, the exemplary disclosed system, apparatus, and method may provide user interface or user event tracking. The exemplary disclosed event tracking system may generate an auto-populating data table to track some or all pages (e.g., every page) displayed on a charging station's user interface. Actions taken by the user to engage with and navigate through the user interface flow may also be recorded, including for example timestamps to assess an amount of time spent by a user on each page. The exemplary disclosed event tracking system may record non-user-interface events such as hardware actions (e.g., "door opened," "door closed," "connection detected," and/or any other desired events). The exemplary disclosed event tracking system may generate a meta-data table that summarizes key touch points during a user session as well as data indicating the charging station's state (e.g., software version, UV-C status, and/or any other desired status). Some or substantially all data may be tracked locally on the charging station and periodically sent to the exemplary disclosed server for data analysis. The exemplary disclosed event tracking system may utilize the tracked event data to identify and diagnose user behavior patterns in order to adjust (e.g., optimize) the user experience at the kiosk. For example, the exemplary disclosed analysis may provide reports (e.g., facilitate insights) into where users expend most of their time on the user flow, how users navigate through the user flow, where users abandon (e.g., and at what rate) on various screens, how changes to the system's software impact these user metrics, and/or any other desired information. The exemplary disclosed event tracking system may create events that may be linked to each user interface interaction to allow the system to analyze user journey and drive software improvements. The exemplary disclosed event tracking system may measure time spent by users on each step, measure a number or percentage of users that abandon the user flow at each step, track abnormal user journeys (e.g., going back to a start page or screen), track a quantity of taps on features such as "help" or "FAQs," track use of international versus domestic phones with the system, and/or quantify and analyze any other suitable data.

In at least some exemplary embodiments, the exemplary disclosed system, apparatus, and method may provide data visualization (e.g., Looker links in Lime or any other suitable applications). The exemplary disclosed data visualization system may include a business intelligence platform (e.g., Looker, Domo, Adverity, Izenda, Grow, and/or any other suitable data visualization software) that may allow data visualization based on any suitable database (e.g., online database) in the form of dashboards and reports. The data on these dashboards and reports may be filterable. For example, a dashboard showing charge frequency trends may be filtered based on charging stations (e.g., by kiosk ID) to show data pertaining to a specific charging station. The exemplary disclosed data visualization system may also dynamically filter dashboards and reports by altering certain parts of a URL associated with the data. The exemplary disclosed data visualization system may support historical data and trends. The exemplary disclosed data visualization system may utilize dynamic URLs to integrate data visualization software with the exemplary disclosed system and method. The exemplary disclosed data visualization system may push and/or add certain parameters to a URL which may lead to a pre-filtered data visualization dashboard or report. For example, users may navigate to a charging station control panel and then click a hyperlink that may redirect the user to a data visualization dashboard that may be pre-filtered by charging station (e.g., based on the kiosk ID for the kiosk being used by the user). The exemplary disclosed data visualization system may create a streamlined workflow for support members and staff of an organization utilizing the exemplary disclosed system and method to quickly analyze trends in alert logs (e.g., by providing a smart-filtering link to a business intelligence tool within a system administrator's site process).

In at least some exemplary embodiments, the exemplary disclosed system, apparatus, and method may provide location analysis. The exemplary disclosed location analysis system may categorize charging station locations based on the different configurations of the charging stations. For example, if a charging station (e.g., kiosk) includes UV-C functionality for example as described herein, the exemplary disclosed location analysis system may record data indicating it as a "UV-C" category. Data indicating other categories may include "advanced" charging technology such as Qi or Magsafe wireless charging and/or any other suitable categories. This exemplary disclosed categorization data may be transferred to the exemplary disclosed server (e.g., including system website and mobile app) in the form of labels, using any suitable application (e.g., Locations API). The exemplary disclosed location analysis system may include website locations and mobile app software, which based on labels received by the API, may display a user interface element indicating which category or categories a given charging station at a location belongs to (e.g., based on the exemplary disclosed data). The exemplary disclosed location analysis system may thereby provide users with increased visibility into features available at a given kiosk location, and also the ability to search for certain kiosk locations (e.g., based on the exemplary disclosed categories).

The exemplary disclosed location analysis system may display image data (e.g., a photo or photos of a kiosk) that may be included on a mobile application and/or web site of the exemplary disclosed system to indicate to users what a given charging station looks like (e.g., as they seek to locate it within a venue). The image data may be uploaded to an administrator's site and linked with a particular kiosk serial number or site. The image data may then be uploaded to a website and/or mobile app of the exemplary disclosed system (e.g., via Locations API or any other suitable application).

The exemplary disclosed location analysis system may provide a specific site description of a charging station (e.g., kiosk) such as, for example, "near men's shoes" or "first floor elevator," which may be added to an application (e.g., Locations API) to further help the user of the mobile app or website to identify where a given kiosk is located within a venue. This exemplary disclosed site description may be shown on the exemplary disclosed user interface (e.g., of the mobile app or website) at any desired time and/or selectively shown once the user's GPS location is within a predetermined range of the kiosk (e.g., such as 1,000 feet or any other desired distance). The exemplary disclosed location analysis system may thereby provide data that may help users to quickly and easily find charging stations within a venue, without the user taking time to seek help of venue workers.

In at least some exemplary embodiments, the exemplary disclosed system, apparatus, and method may provide a universal login. The exemplary disclosed universal login system may allow users (e.g., customers and/or workers) to create a login and specify preferences to streamline interaction with exemplary disclosed charging stations across multiple locations, and simplify a user's use of an application (e.g., a mobile app) for using the charging stations. Once an account for a user has been created by the exemplary disclosed system, a unique code (e.g., a QR code, a barcode, or any other suitable technique) may be generated for the user so that the user may gain access to a charging locker by simply scanning the QR code. This may allow for the user to bypass actions such as entering a unique code (e.g., mobile number), selecting a security image, and/or entering an email address because this exemplary information may be stored within the user's unique code (e.g., QR code). The use of the unique code may thereby provide touchless access to a charging locker, relatively faster access to a charging locker, and/or increased customer loyalty across the exemplary disclosed charging stations (e.g., based on ease of use). Also for example, a unique passcode that a user creates on a login page of the exemplary disclosed user interface of the charging station may be used (e.g., using the exemplary disclosed touchscreen).

In at least some exemplary disclosed embodiments, the exemplary disclosed universal login system may provide users with an account that designates the user's desired kiosk locations, customizes notifications regarding low battery status, nearby charging stations, available lockers, available lockers with UV-C sanitization technology, and/or any other suitable information or criteria. Also for example, users (e.g., account holders) may receive data regarding special offers such as coupons and discounts at venues, rewards based on frequency of charging, and/or any other suitable incentives or promotional information. The exemplary disclosed universal login system may provide a frequent charging program, offer discounts, and/or offer increased (e.g., premier) access to new charging technology releases.

In at least some exemplary disclosed embodiments, the exemplary disclosed universal login system may streamline access to charging lockers through a universal login. The exemplary disclosed universal login system may provide an account-based model in which the system pulls information from user accounts to shorten the user interface flow for each subsequent charge by the user (e.g., based on data provided by the user and/or system on earlier charging uses). The exemplary disclosed universal login system may facilitate touchless access to the exemplary disclosed charging station to begin a transaction. The exemplary disclosed universal login system may reduce friction (e.g., based on burdensome user flows) and reward loyal customers.

Figure 42:
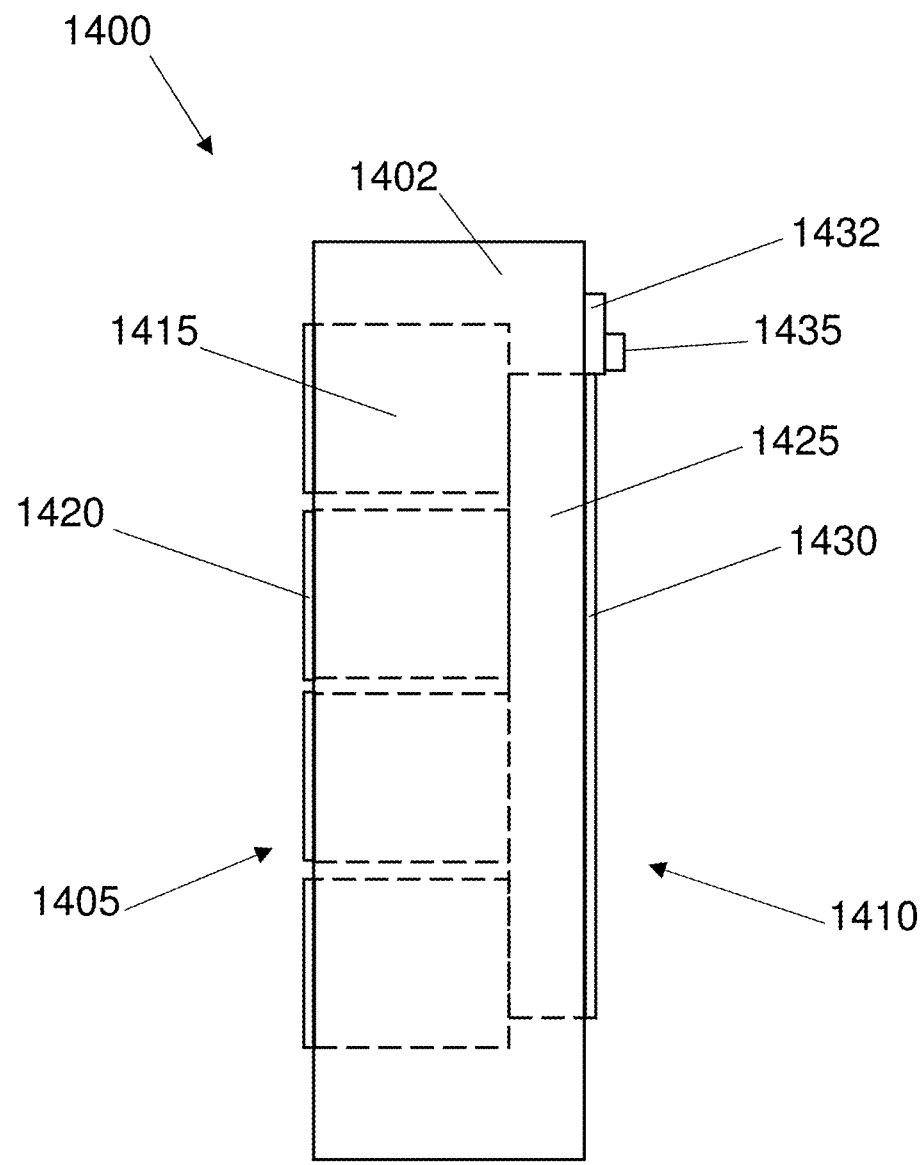
FIG. 42 illustrates an example of a charging station according to embodiments of the present invention.

In at least some exemplary embodiments and as illustrated in FIG. 42, the exemplary disclosed system (e.g., system 1400) may include a housing (e.g., housing 1402 such as a kiosk). The housing may include a first side 1405 and a second side 1410. Housing 1402 may include one or more compartments 1415, each of the one or more compartments including a compartment door 1420 disposed at first side 1405 of housing 1402. Housing 1402 may also include an operator door 1430 that selectively opens to allow access to a cavity 1425 that may access one or more compartments 1415, and closes to block access to one or more compartments 1415. An electronic lock 1432 may be configured to selectively lock and unlock operator door 1430. Electronic lock 1432 may include an operator interface 1435. Housing 1402 may include the exemplary disclosed ultraviolet lighting device described herein disposed in at least one of the one or more compartments. System 1400 may also include computing memory having associated therewith code and a processor communicatively coupled with the computing memory, for example as described herein. The exemplary disclosed processor may be configured to execute the code and to receive a random code from a random code generator (e.g., for example as described herein), program electronic lock 1432 to unlock operator door 1430 when the random code is entered via operator interface 1435 (e.g., for example as described herein), and control the exemplary disclosed ultraviolet lighting device to selectively emit ultraviolet lighting in an interior of the at least one of the one or more compartments 1415 (e.g., for example as described herein).

In at least some exemplary embodiments, some or all components of the exemplary disclosed sanitization system for example as described regarding FIGS. 24-29 may be integrated with the exemplary disclosed systems described regarding FIGS. 1-9 and 33-42.

Figure 43:
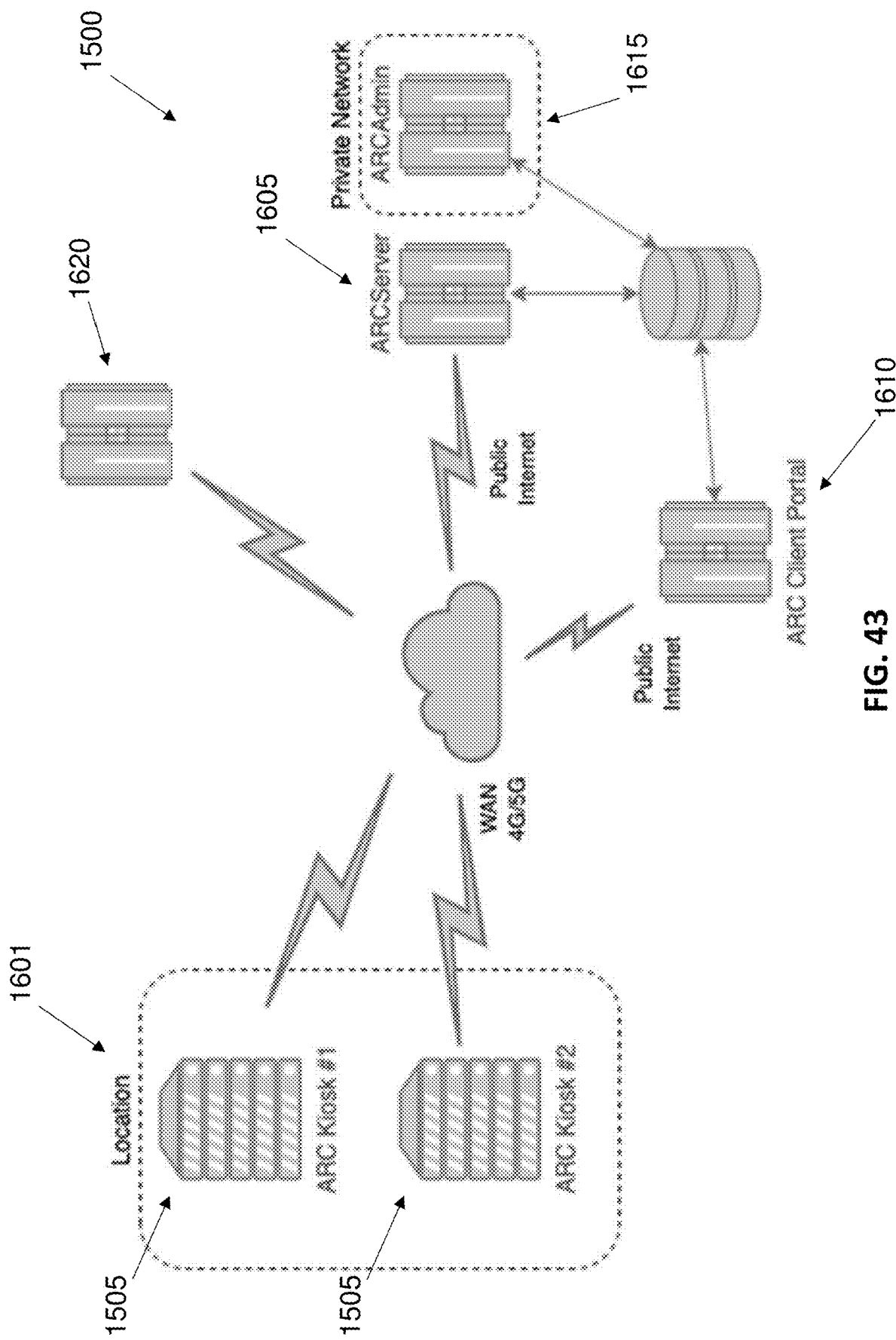
FIG. 43 illustrates a block diagram of a system according to embodiments of the present invention.

FIGS. 43 through 46 illustrate additional exemplary embodiments of the exemplary disclosed system, apparatus, and method. As illustrated in FIG. 43, an ARC system 1500 may include several interconnected components including exemplary disclosed charging stations such as charging stations 1505 (e.g., ARC Kiosks), an ARC Server 1605, and an ARC Client Portal 1610. The exemplary disclosed charging stations 1505 (e.g., ARC Kiosks) may securely store worker devices such as mobile devices as described herein. Charging stations 1505 (e.g., the ARC Kiosks) may communicate directly with ARC Server 1605 regarding the status of each locker of the ARC Kiosks and devices stored within the lockers. ARC Server 1605 may track the state of some or all charging stations 1505 (e.g., the ARC Kiosks) and their corresponding lockers at a given location. When a status of a given locker changes, ARC Server 1605 may push communication to other ARC Kiosks in a same location 1601 (e.g., a geographic area such as a venue) so that some or all ARC Kiosks within a given location 1601 are in sync with each other. An ARC Admin 1615 (e.g., an ARC Admin Portal or Platform) may configure charging stations 1505 (e.g., the ARC Kiosks) for functional features as well as to brand a given ARC Kiosk for a given client. ARC Client Portal 1610 may track which employees and devices may be available for use at a given location. For example, workers (e.g., employees) may not check out or return a device without a valid employee ID or badge ID (e.g., the ID on a given worker's badge may be the same or different than the given worker's employee ID). ARC Client Portal 1610 may also track which worker devices are available or may be checked for repair.

ARC system 1500 may interface with any number of desired external systems (e.g., one or more client systems 1620). Client system 1620 may for example maintain real-time or near real-time records of information such as workers 1540 (e.g., employees such as workers or technicians) similar to as described above regarding workers 540, managers, worker devices 1530, tickets (e.g., work tickets or maintenance tickets), and/or any other desired data records. For example, client system 1620 may be an employee system that may include details (e.g., data of workers 1540 and/or managers) such as Employee First and Last Name, date of birth, email address, mobile number (e.g., for purposes of sending auto-generated email or SMS messages), employee role (e.g., to determine role-based access to systems), and/or any other suitable data. By interfacing directly with client systems such as client system 1620, ARC system 1500 may reduce or substantially minimize operational redundancies so that data for use by ARC system 1500 may not be maintained across multiple external databases and may be maintained by the exemplary disclosed databases of ARC system 1500. ARC system 1500 may interface with client systems 1620 based on direct APIs, ARC Client Portal 1610 (e.g., which may accept manual inputs of worker 1540, managers, worker devices 1530, and/or bulk inputs for example via .csv files and/or any other suitable input or command entry).

The exemplary disclosed API may include an ARC App that may be an extension of ARC Client Portal 1610 and/or ARC Admin 1615, and may be downloaded to user devices of users (e.g., iOS or Android devices). In at least some exemplary embodiments, team leads 1540a and managers 1540b may have access to the exemplary disclosed API, and workers 1540 may not have access (e.g., or workers 1540 who may be technicians may have access, or some or substantially all workers 1540 may have some access). For example, team leads 1540a and managers 1540b may have a greater level of access to the exemplary disclosed API than workers 1540. The exemplary disclosed system may include users having multiple roles and multiple corresponding levels of access. For example, a given manager (e.g., manager 1540b) may have a greatest level of access, a team lead (e.g., team lead 1540a) may have a level of access below top managers but greater than a worker, and a worker may have a lowest level of access or substantially no access. The exemplary disclosed API may provide managers the ability to view reports, add and remove employees and worker devices from the exemplary disclosed rosters of ARC system 1500, see issues that are to be addressed at charging stations 1505, and/or any other suitable features or information. The exemplary disclosed API may be utilized in relatively large locations 1601 such as warehouses and arenas in which managers may not be stationary in an office, but may instead be moving around while at work. The exemplary disclosed API may keep managers up-to-date with the status of charging stations 1505 under their management.

In at least some exemplary embodiments, the exemplary disclosed API may also include a companion application (e.g., a third party device companion app). The companion app (e.g., for Android devices, Apple devices, or any other suitable operating system) may be installed on the client devices (e.g., client user devices). The companion app may communicate with the servers (e.g., ARC Server 1605) of ARC system 1500 and may provide information such as device battery level, device serial number, and location data of worker devices 1530. This information may be used for purposes such as tracking worker devices 1530, maintaining an inventory list, tracking device battery levels, and/or any other suitable purpose. The information may also be communicated (e.g., via data transfer with the server) while a device is stored in charging station 1505 (e.g., in a locker) and not in use. The information may also be used in conjunction with information collected through the operation of ARC system 1500 to increase accuracy and functionality of ARC system 1500 (e.g., of certain features of ARC system 1500). For example, if the data from the companion app of the exemplary disclosed API indicates a low battery level while the worker device has been charging in charging station 1505 (e.g., a locker) for a relatively long period of time, then it can be inferred that there may be an issue with the device and/or locker. The exemplary disclosed maintenance workflow for example as described herein may thereby be initiated.

Examples of how ARC system 1500 may utilize data provided via the exemplary disclosed interface with client system 1620 are provided below. ARC system 1500 may provide a ticketing system in which one or more workers 1540 (e.g., an employee) or managers indicate via the exemplary disclosed interface of charging station 1505 (e.g., an ARC touchscreen and/or a user device, worker device 1530, or exemplary disclosed API) that a worker device 1530 and/or charging station 1505 has been damaged. ARC system 1500 may automatically generate and route data (e.g., a ticket) to a system operator, technician, manager, or worker 1540 who may inspect and/or repair the reported worker device 1530 and/or charging station 1505.

As another example of how ARC system 1500 may utilize data provided via the exemplary disclosed interface with client system 1620, ARC system 1500 may interface with an employee database. For example if workers 1540 (e.g., an employee) do not return their worker device 1530 before the end of their shift, ARC system 1500 may store data indicating that a given worker 1540 has a worker device 1530 checked out. ARC system 1500 may interface with client system 1620 (e.g., an employee clock-in system) to provide data indicating the worker device 1530 is still checked out, and client system 1620 may prevent the worker 1540 from clock-in access or certain system permissions for their shift until the worker device 1530 is returned and corresponding data noted, received, and/or updated by ARC system 1500. For example, once ARC system 1500 detects that the worker device 1530 is returned for example as described herein, ARC system 1500 may interface with client system 1620 to provide data indicating the worker device 1530 has been returned (e.g., at which point client system 1620 may restore access or permission to that worker 1540).

As another example of how ARC system 1500 may utilize data provided via the exemplary disclosed interface with client system 1620, ARC system 1500 may interface with an employee database when a worker 1540 (e.g., a new employee) is hired and issued an Employee ID. Data of that ID may be transmitted to ARC in real-time or near real-time so that the worker 1540 may utilize ARC system 1500 to for example immediately check out a worker device 1530 on the employee's first day of work.

Figure 44:
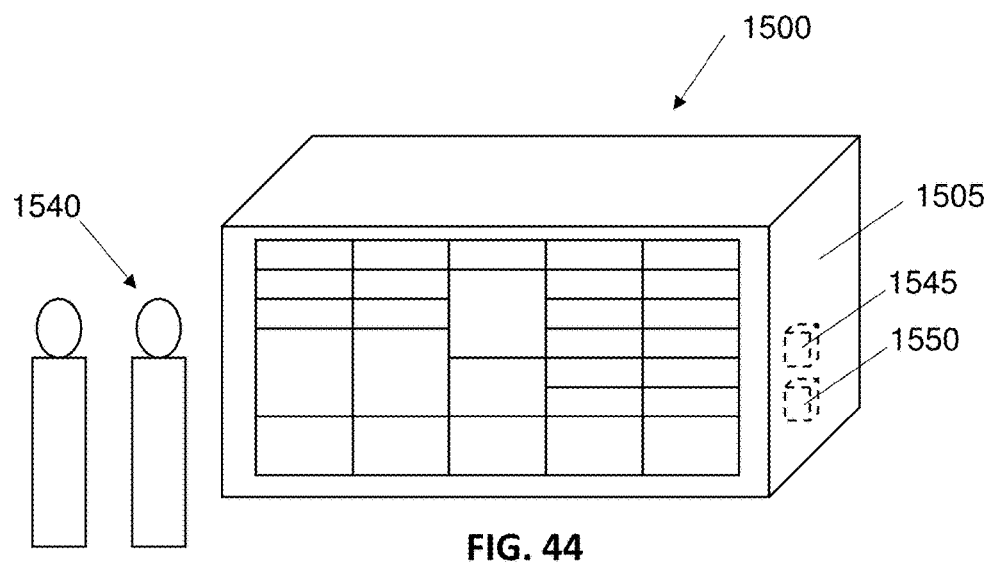
FIG. 44 illustrates an example of a charging station according to embodiments of the present invention.
Figure 45:
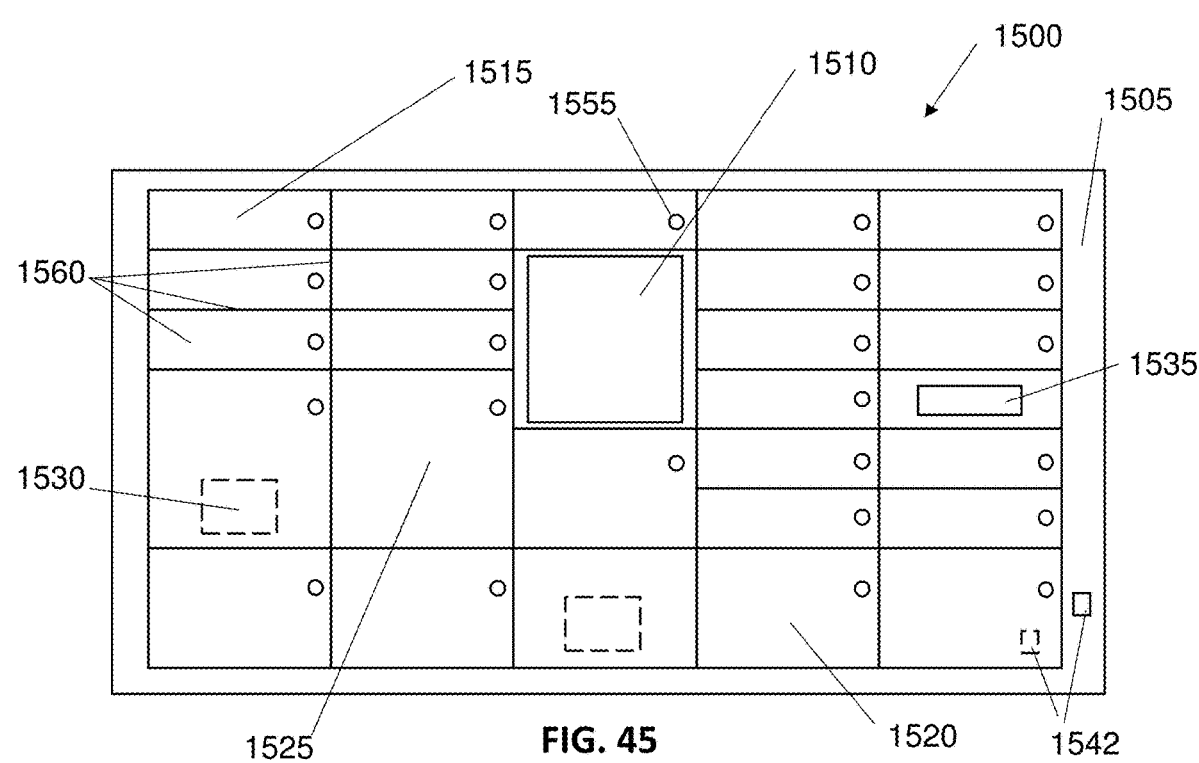
FIG. 45 illustrates an example of a charging station according to embodiments of the present invention.

FIGS. 44 and 45 illustrate an exemplary disclosed charging station 1505 of ARC system 1500. ARC system 1500 may include one or more charging stations 1505 that may be similar to charging station 505 (e.g., a charging kiosk) that may for example include components generally similar to the exemplary disclosed charging stations disclosed above regarding FIGS. 4A-4F and 26-29. Some components of ARC system 1500 may operate similarly to system 500 for example as described above. ARC system 1500 may include a plurality of charging stations 1505 that may be similar to charging stations 505. Charging station 1505 may include a user interface 1510 that may be similar to user interface 510, and one or more storage housings 1515, 1520, and 1525, which may be similar to storage housings 515, 520, and 525, for securing and charging one or more worker devices 1530 that may be similar to worker devices 530. Storage housings 1515, 1520, and/or 1525 may be upper lockers or lower lockers based on their position in charging station 1505. For example, storage housings 1515, 1520, and/or 1525 may be stored in columns with the exemplary disclosed storage housings disposed at various heights of the column. For example, storage housings 1515, 1520, and/or 1525 disposed at a bottom portion (e.g., a bottom third or a bottom half) of charging station 1505 may be lower lockers that may be below a height guideline provided by law or government policy (e.g., specified by the American Disabilities Act for individuals in wheelchairs). Lower lockers may also be suitable for individuals (e.g., workers 1540) who may be relatively short and may not be able to reach the upper lockers of charging station 1505. Also for example, storage housings 1515, 1520, and/or 1525 disposed at an upper portion (e.g., an upper third or an upper half) of charging station 1505 may be upper lockers that may be suitable for individuals (e.g., workers 1540) who may not want to bend down (e.g., or who have difficulty bending due to injuries or back problems) to retrieve or replenish worker devices 1530 stored in charging station 1505. Using the exemplary disclosed system, data indicating whether a given worker 1540 may comfortably use upper lockers, lower lockers, or both upper and lower lockers of storage housings 1515, 1520, and/or 1525 may be provided to, stored by, and used during an operation of the exemplary disclosed system. Workers 1540 may also use the exemplary disclosed user interface to select or request lower lockers or upper lockers.

In at least some exemplary embodiments, charging station 1505 may also include an identification device such as a scanner 1535 that may be similar to scanner 535. The exemplary disclosed identification device (e.g., scanner 1535) may for example be a biometric device for determining an identity of a user, an RFID device, a scanning device, a manual entry device (e.g., for receiving input from a user to confirm the user's identity), camera technology (e.g., an image recognition device such as a facial recognition imaging device), and/or any other suitable device for determining and/or confirming an identity of a user. Charging station 1505 may also include a detection device 1542 that may be similar to detection device 542. Charging station 1505 including scanner 1535 and detection device 1542 may for example operate similarly to the exemplary disclosed operation of charging station 505 described above. Scanner 1535 may be any suitable device for validating an identity of a user for example as described herein. For example, Detection device 1542 may for example operate similarly to as described above regarding detection device 542. Detection device 1542 may be any suitable device for detecting whether or not an exemplary disclosed worker device is disclosed in an exemplary disclosed storage housing or locker. In at least some exemplary embodiments, detection device 1542 may include a sensor or other suitable electrical component for detecting a current flow through one or more exemplary disclosed charging cables of charging station 1505. Detection device 1542 may include a strain gauge, a weight sensor, and/or any other suitable type of sensor or device for detecting a change in objects or materials (e.g., a presence or absence of one or more worker devices 1530) in a given storage housing 1515, 1520, and/or 1525 of charging station 1505. Detection device 1542 may include an infrared (IR) sensor and/or any other suitable sensing devices for detecting a presence and/or change of position of objects (e.g., one or more worker devices 1530) disposed in a given storage housing 1515, 1520, and/or 1525 of charging station 1505. Detection device 1542 (e.g., and/or scanner 1535) may also include sensors for reading tags (e.g., RFID or QR tags) or other identification components of worker devices 1530 to determine whether or not worker devices 1530 may be disposed in a given storage housing 1515, 1520, and/or 1525 of charging station 1505.

In at least some exemplary embodiments, charging station 1505 may include one or more electronic control boards that may power components of ARC system 1500 and may charge different types of worker devices 1530. For example, charging station 1505 may include an AC current monitoring board 1545 and a locker control board 1550. Workers 1540 may use multiple types of worker devices 1530 at a given venue such as location 1601. Each worker device 1530 or type of worker devices 1530 may have a unique functionality and physical characteristics including unique charging methods. For example, a given type of handheld worker device 1530 may include a USB-C port and another given type of relatively larger handheld scanner worker device 1530 may utilize a charging cradle that includes an active AC power connection. ARC system 1500 may thereby be powered by two or more types of electronic control boards (e.g., AC current monitoring board 1545 and locker control board 1550), which may be used in tandem for charging worker devices 1530 or may be interchangeable with each other in charging worker devices 1530. For example, each type of electronic control board (e.g., AC current monitoring board 1545 and locker control board 1550) may provide a different charging method, which may allow ARC system 1500 to support and charge a wide range of devices (e.g., a wide range of worker devices 1530). For example, AC current monitoring board 1545 may be capable of charging some or any worker devices 1530 that involve an AC adapter or charging cradle. Also for example, locker control board 1550 may be capable of charging some or any worker devices 1530 using a USB and/or USB-C charging cable.

In at least some exemplary embodiments, charging station 1505 may include one or more (e.g., a plurality of) indicators 1555. For example, doors of some or substantially all of storage housings 1515, 1520, and/or 1525 may include an indicator 1555. Indicator 1555 may be any suitable device for indicating a status of any given storage housing 1515, 1520, and/or 1525 (e.g., locker). For example, indicator 1555 may be an indicator light such as an LED indicator light. For example, indicators 1555 that may be LED indicator lights may be disposed in or on or near doors of some or substantially all storage housings 1515, 1520, and/or 1525. Indicator 1555 may indicate the status of a given storage housing 1515, 1520, and/or 1525 (e.g., a given locker). A plurality of colors of indicators 1555 corresponding to statuses may be configured and controlled via ARC system 1500 (e.g., ARC Admin 1615). For example, a green light displayed by indicator 1555 may indicate normal operation of a given locker and a red light displayed by indicator 1555 may indicate a potential failure and/or unsuitable operation of a given locker. Once a status of a given storage housing 1515, 1520, and/or 1525 (e.g., a given locker) changes, ARC system 1500 may control indicators 1555 to change a display status in real-time or near real-time. Indicator 1555 may also emit audio indications or warnings. For example if a worker 1540 (e.g., a worker, team lead, and/or manager) is detected to be near a given locker based on system tracking of that worker's worker device 1530, ARC system 1500 may control indicator 1555 of that given locker to emit an audio indication or warning.

In at least some exemplary embodiments, at least some portions of charging station 1505 may be formed from structural members 1560. Because at least some or most (e.g., a large majority) of worker devices 1530 housed in charging station 1505 may utilize WiFi communication (e.g., to receive software updates or time sensitive notifications from operators and clients using ARC system 1500), structural members 1560 forming at least some portions of charging station 1505 may allow WiFi signals to pass through structural members 1560. Structural members 1560 may form doors and walls of storage housings 1515, 1520, and/or 1525 and other portions of charging station 1505. Structural members 1560 may be formed from any suitable structural material that allows WiFi signals to pass through them such as, for example, plastic. Structural members 1560 may be formed from non-metal material such as plastic and composite material. For example, structural members 1560 may include plastic locker windows and/or interior panels.

Figure 46:
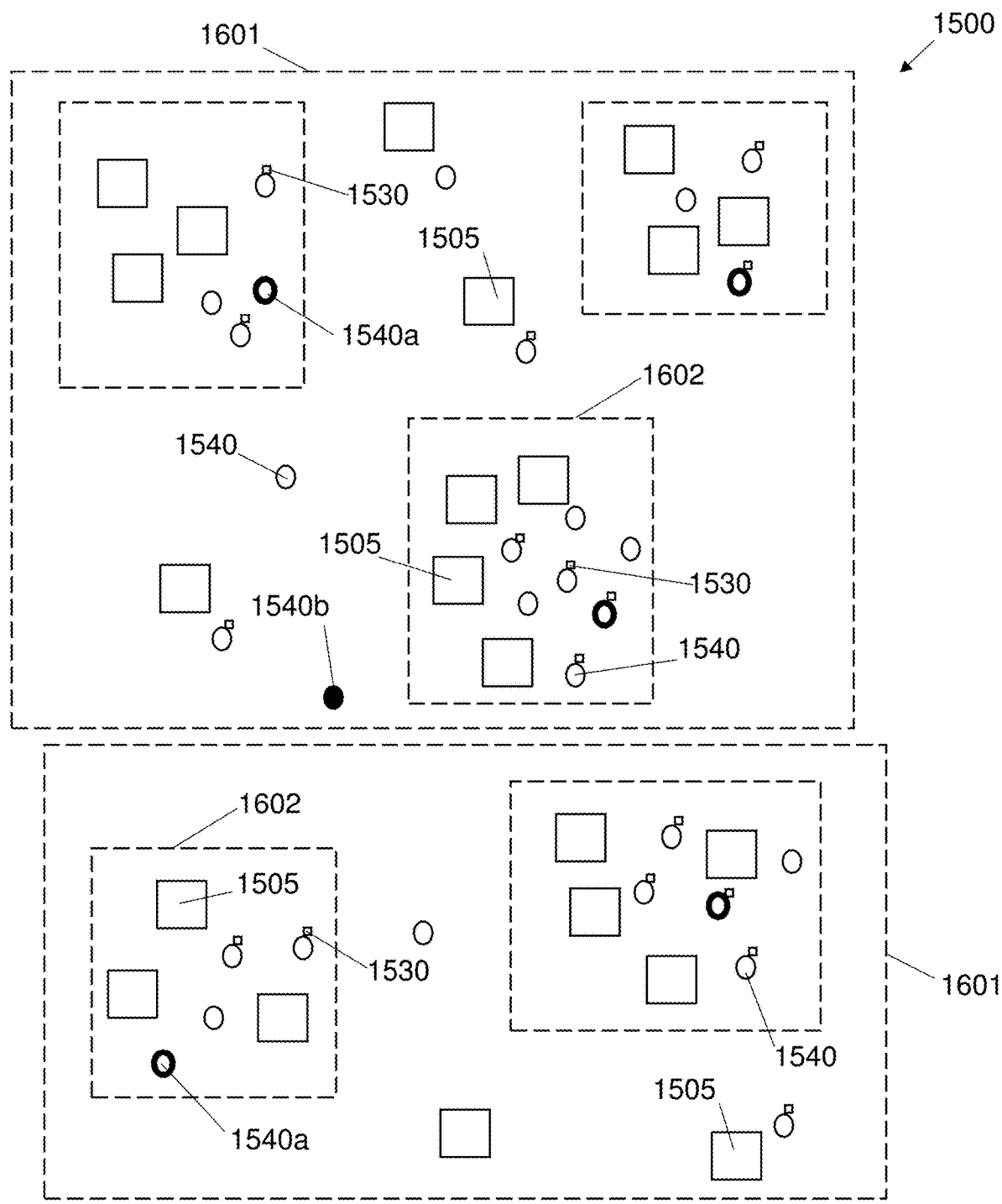
FIG. 46 illustrates an example of a charging system according to embodiments of the present invention.

FIG. 46 illustrates an exemplary disclosed configuration of ARC system 1500. ARC system 1500 may include one or more locations 1601. A given location 1601 may include one or more stand-alone charging stations 1505 and/or one or more site clusters 1602. Each site cluster 1602 may include a plurality of charging stations 1505. In at least some exemplary embodiments, ARC system 1500 may include a plurality of locations 1601 each including one or more stand-alone charging stations 1505 and one or more site clusters 1602 each including a plurality of charging stations 1505. One or more workers 1540 may work at or near some or substantially all of the exemplary disclosed stand-alone charging stations 1505 and/or charging stations 1505 of site clusters 1602. A team lead 1540a may lead or direct activity or work of workers 1540 at each of some or all of site clusters 1602 and/or locations 1601. A manager 1540b may lead or direct activity or work of team leads 1540a and workers 1540 at a plurality of site clusters 1602 and/or locations 1601. Additional layers of supervisors may also lead or direct activity or work of managers 1540b, team leads 1540a, and workers 1540 such as, for example, supervisors, regional supervisors, directors, and/or any other suitable management role or function.

Figure 47:
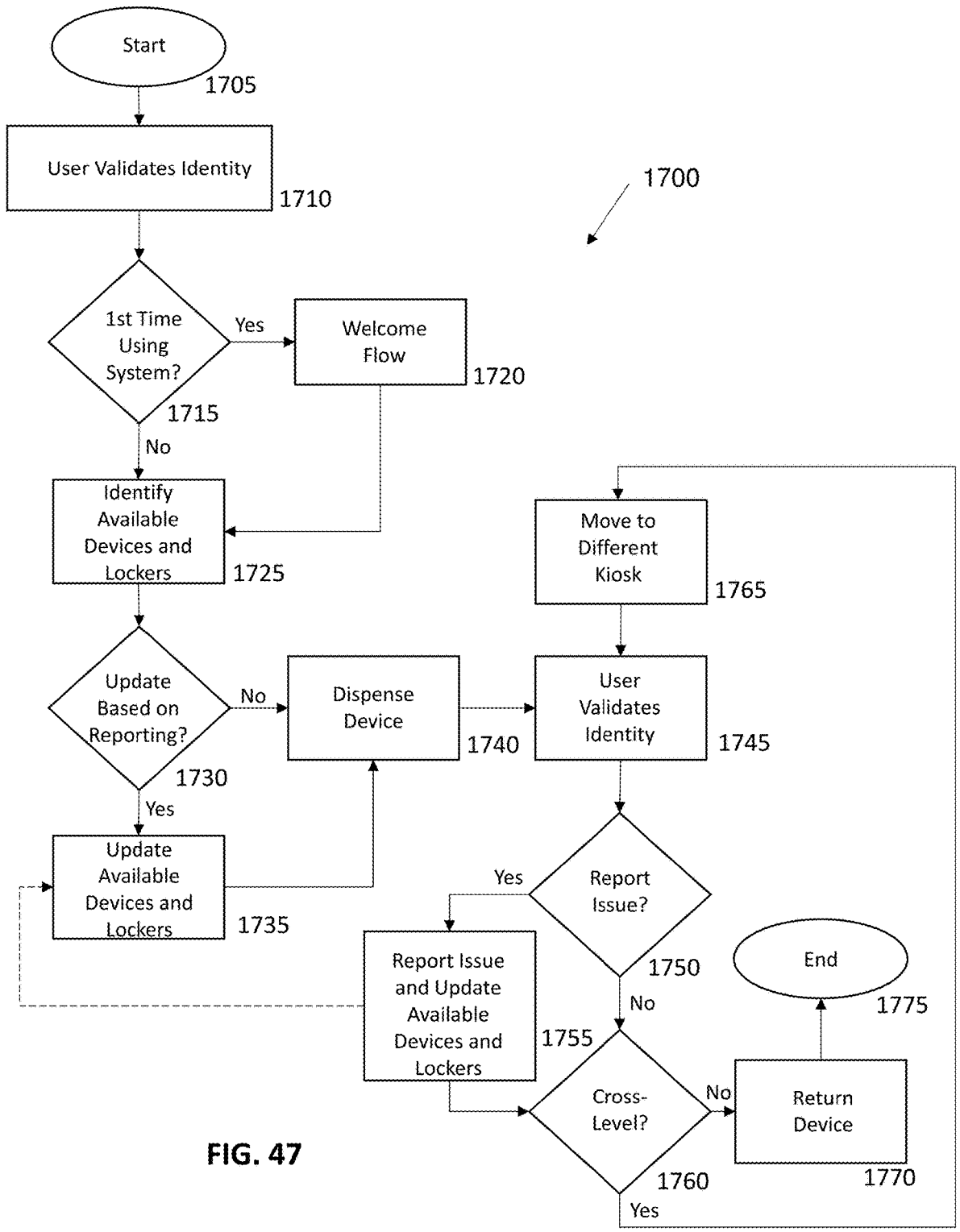
FIG. 47 illustrates a flowchart of an exemplary method according to embodiments of the present invention.

An exemplary operation of the exemplary disclosed system, apparatus, and method will now be described. FIG. 47 illustrates an exemplary process 1700 of ARC system 1500. Process 1700 begins at step 1705.

At step 1710, ARC system 1500 may validate a user identity. For example, ARC system 1500 may validate an identity of a worker 1540 (e.g., or a team lead 1540a or a manager 1540b). Users may utilize user interface 1510 and/or scanner 1535 of charging station 1505 and/or an API using a user device or worker device 1530 to validate their identities to ARC system 1500. For example, workers (e.g., employees) and/or devices (e.g., worker devices 1530) may be validated in ARC system 1500 using a variety of methods such as manually entering a bar code number (e.g., via user interface 1510 or an exemplary disclosed API), scanning a barcode or QR code label or QR code (e.g., via scanner 1535), using RFID technology (e.g., via scanner 1535), and/or biometric scan (e.g., via detection device 1542). Users (e.g., workers 1540, team leads 1540a, and/or managers 1540b) may use any desired charging station 1505 of ARC system 1500 to validate their identities or may be directed by ARC system 1500 to use certain charging stations 1505 or a specific charging station 1505 to validate their identities.

In the case of an ID (e.g., an alpha and/or numeric string of digits), the user ID may be validated by ARC system 1500 for a user to gain access to storage housing 1515, 1520, or 1525 (e.g., a locker). Charging station 1505 may be configured to support multiple techniques for validating that an acceptable ID is entered by a user. For example, syntactic validation may be used (e.g., any code that is 9 digits long and starts with a certain prefix may be accepted or any code that is exactly 9 digits long and contains at least one letter may be accepted). Also for example, a number of digits may be accepted in which any ID that is a certain number (e.g., six) of digits long may be accepted.

Also for example, a match (e.g., a 100% match) to a database may be used for a user to gain access. For example, any code that has been entered into the database (e.g., via the ARC Client Portal 1610 or API or a customer database) and has a "status=active" may be accepted. In the case that a user (e.g., an employee) has been terminated or has quit, a company utilizing ARC system 1500 may change that user's status to inactive. Then, even if an employee code of that user is entered at charging station 1505, access to ARC system 1500 for that user will be denied. Also for example when a 100% match method is employed by ARC system 1500, if a code is entered, scanned, or provided, which is not a 100% match, a user with an authorized role (e.g. a manager such as team lead 1540*a* or manager 1540*b* or an Admin or a SuperAdmin of ARC system 1500 or a technician) may choose to add-to-database in real-time at the kiosk. This may update the database with the new code so that it can be used by a given user (e.g., employee) in the future.

A roster of users (e.g., workers 1540, team leads 1540*a*, and managers 1540*b*) and devices (e.g., worker devices 1530) may be maintained via ARC Client Portal 1610. Charging stations 1505 may reference these rosters to determine if a user (e.g., an employee) is validated to transact at charging station 1505, and if a worker device 1530 is validated to be dispensed to a user. This functionality may be configurable in ARC Admin 1615, which may provide flexibility to lift or change validation criteria when appropriate. This may occur for example in an early phase of a new roll out when data of employees or devices (e.g., worker devices 1530) may not be fully updated in ARC Client Portal 1610. Access of users to ARC system 1500 may also be updated based on data transfer with client systems 1620 for example as described above (e.g., access by users may be allowed or blocked based on updated data of employee databases of client systems 1620).

At step 1715, ARC system 1500 may determine whether or not a user is using ARC system 1500 for the first time based on stored data (e.g., via ARC Admin 1615). If ARC system 1500 determines that a given user (e.g., worker 1540, team lead 1540*a*, or manager 1540*b*) is using ARC system 1500 for the first time, process 1700 proceeds to step 1720. At step 1720, a welcome flow or onboarding process may be presented to the user via user interface 1510 or an API of a user device. For example at step 1720, any suitable special screens that may be relevant to a first time user may be presented (e.g., an opt-in to terms of the kiosk such as consent to take photos, and/or any other messaging appropriate for first-time users). The welcome flow or onboarding process may include a series of screens that may direct users through the exemplary disclosed software interface. The onboarding screens may educate the user about the functions and benefits of ARC system 1500, provide user opt-in and agreement to terms of use of ARC system 1500, and/or facilitate a positive user experience. The welcome flow or onboarding process may be displayed the first time a user interacts with the system (e.g., displayed once per badge ID). Users may advance through the welcome flow (e.g., by pressing a 'Next' button) until the flow is complete. The welcome flow may include a plurality (e.g., up to five) configurable screens that may be managed through ARC Admin 1615. Each configurable screen may include a predefined area in which custom content (e.g., images) may be uploaded by ARC Admin 1615. The uploaded images may be displayed on respective screens to form the welcome flow.

A roster of employees and devices may be maintained via ARC Client Portal 1610. Additionally, charging station 1505 may also support functionality to create or update employee and device records via user interface 1510 (e.g., the kiosk touchscreen) and/or the exemplary disclosed API. For example, if a new employee attempts to use the kiosk (e.g., at step 1720) and cannot because the new employee is not yet validated in ARC Client Portal 1610, an authorized manager (e.g., team lead 1540*a* or manager 1540*b*) may be able to add that employee's credentials to ARC Client Portal 1610 directly using user interface 1510 (e.g., and/or by logging into the website associated with ARC Client Portal 1610). Data of the credentials provided via user interface 1510 of charging station 1505 may be sent (e.g., immediately sent) to ARC server 1605 and used to update the roster of ARC Client Portal 1610. After this occurs, the employee may be able to enter into transactions at charging station 1505.

If ARC system 1500 determines that a given user (e.g., worker 1540, team lead 1540*a*, or manager 1540*b*) has used ARC system 1500 before (e.g., not for the first time), process 1700 proceeds to step 1725.

At step 1725, ARC system 1500 may identify available worker devices 1530 (e.g., and/or available storage housings) that may be provided to a given user (e.g., worker 1540, team lead 1540*a*, or manager 1540*b*). ARC system 1500 may provide data (e.g., via the exemplary disclosed API) directing a given user to a specific charging station 1505 or to one of a specified group of charging stations 1505. ARC system 1500 may also identify available worker devices 1530 at a given charging station 1505 via user interface 1510 if the user is already at the given charging station 1505.

One or more device types of worker devices 1530 may be in use by employees at a given site cluster 1602 or location 1601. A device type selection feature may allow an admin user of ARC system 1500 to configure one or more worker devices 1530 per organization (e.g., client) utilizing ARC system 1500. After a user (e.g., employee) validates identity at step 1710 (e.g., scans a badge or provides any other suitable validation for example as described above), a screen display showing available device types (e.g. iPhone 8 and Zebra C51) of worker devices 1530 may be provided to the user for example via the exemplary disclosed API and/or user interface 1510. The user may select which type of worker device 1530 the user would like to have dispensed via charging station 1505. ARC Client Portal 1610 may allow Admins (e.g., administrative users of ARC system 1500) the ability to specify which type of devices (e.g., worker devices 1530) each employee is allowed to use. Therefore, depending on identify validation at step 1710 (e.g., an employee badge scan or other suitable validation), an appropriate device or devices (e.g., worker devices 1530) may be displayed to the user.

ARC system 1500 may also employ role-based access at step 1725 to identify available devices. Depending on an access level granted via ARC Client Portal 1610 and/or via the exemplary disclosed API, each user may be assigned to various levels of device access based on the user's working role such as position, role, rank, experience level, training level, and/or any other suitable criteria. For example, worker 1540 may be authorized to pick up and return a single type (e.g., or a reduced number of types) of worker device at charging station 1505. A given worker 1540 may also be authorized to pick up and return two or more types of worker devices 1530. Team leads 1540*a* may for example have access to a Manager's Tools console of ARC system 1500 that may allow them to perform various types of troubleshooting including verifying users in the system, opening storage housings 1515, 1520, and 1525 that are empty, and/or other managerial tasks. Managers 1540*b* may have the access granted to team leads 1540*a* as well as increased levels of access and authority to perform additional activities. For example, a full manager (e.g., manager 1540*b*) may be able to perform functions of team leads 1540*a* along with additional functions such as opening storage housings 1515, 1520, and 1525 that include charging worker devices 1530, calibrating the touchscreen of user interface 1510, and/or any other suitable functions.

ARC system 1500 may also utilize updates based on client systems 1620 at step 1725 to identify available devices. Worker devices 1530 that may be available to users may also be updated based on data transfer with client systems 1620 for example as described above (e.g., identification of worker devices 1530 that may be available may be updated based on updated data of ticketing and maintenance databases of client systems 1620). For example, worker devices 1530 that are to be repaired may be indicated as unavailable and not displayed as available to users.

Users may also indicate whether lower lockers or upper lockers are suitable for example as described above. For example, users may enter a preference for upper lockers or lower lockers via user interface 1510 and/or the exemplary disclosed API. ARC system 1500 may update the identification of available devices at one or more charging stations 1505 based on whether lower lockers or upper lockers are specified by users.

The identification of available devices and/or storage housings at step 1725 may be based on (e.g., predicated on) identification of a presence or location of worker devices 1530 by ARC system 1500. For example as described above, detection device 1542 and/or scanner 1535 of given charging stations 1505 may provide data to ARC system 1500 of a presence or absence of various types of worker devices 1530 disposed within charging stations 1505 (e.g., including in which storage housings 1515, 1520, and/or 1525 worker devices 1530 may be located). Locations of worker devices 1530 may also be corroborated based on any other suitable data such as location data (e.g., provided by GPS sensors of worker devices 1530). ARC system 1500 may update location and availability data of a fleet of worker devices 1530 based on processing data of detection devices 1542, scanners 1535, the exemplary disclosed location data, data from client systems 1620, data provided by users for example as described herein, and/or any other suitable data. For example, if an employee attempts to steal a worker device 1530 by entering data that the worker device 1530 was returned to charging station 1505, data of detection device 1542, scanner 1535, and/or the exemplary disclosed location data may alert ARC system 1500 that the worker device 1530 is missing (e.g., has been stolen).

At step 1730, ARC system 1500 may determine whether or not the identification of available devices at step 1725 should be further updated or modified. If ARC system 1500 determines that the identification of available devices at step 1725 should not be further updated or modified, process 1700 may proceed to step 1740 to dispense one or more worker devices 1530 to users (e.g., unlock doors of one or more select storage housings). If ARC system 1500 determines that the identification of available devices at step 1725 should be further updated or modified, process 1700 may proceed to step 1735.

For example at step 1735, if ARC system 1500 processes additional data affecting availability of worker devices 1530 and/or storage housings for example as described above, ARC system 1500 may further update the identification of available devices (e.g., and/or available storage housings). Also for example, if users (e.g., workers 1540, team leads 1540*a*, and/or managers 1540*b*) and/or external systems 1620 provide additional data affecting availability, ARC system 1500 may update the identification of available devices and/or storage housings.

Also for example at step 1735, the identification of available devices and/or storage housings may be updated based on an operation of ARC Client Portal 1610. ARC Client Portal 1610 may include a self-service website for client system administrators (e.g., user organizations of ARC system 1500) to maintain a roster of valid users to ARC system 1500 at each client location (e.g., location 1601 of the user organization). The user roster may provide a method to maintain access control of the system by managing which users (e.g., workers 1540, team leads 1540*a*, and/or managers 1540*b*) may access ARC system 1500. For example, ex-employee users may have their access revoked such that their access codes may be rejected when entered at step 1710. Additionally, ARC Client Portal 1610 (e.g., a self-service website) may provide reporting (e.g., lifetime reporting) of employee transactions at charging stations 1505 associating a given user with a unique access code. Additionally for example, ARC Client Portal 1610 may be used to maintain a roster of devices in addition to the user roster. The device roster may allow for client system administrators to control which devices may be dispensed by charging stations 1505. The device roster may also provide reporting (e.g., life-time reporting) of worker devices 1530 and may provide a mechanism for reporting (e.g., via data transfer) when worker devices 1530 may be missing, out for repair, and/or permanently discarded and/or storage housings are to be checked and/or repaired. Also for example, ARC Client Portal 1610 may be used for system administrators to view and explore analytics and/or reporting of ARC system 1500 in a secure and constrained environment.

Also for example at step 1735 (e.g., or any other desired step of process 1700), the identification of available devices may be updated based on actions taken based on indicators 1555 and data updates on which the operation of indicators 1555 is based. When an indicator 1555 indicates unsuitable operation of one or worker devices 1530 and/or charging stations 1505 (e.g., storage housings), a software notification may be displayed on user interface 1510 and/or the exemplary disclosed API indicating that users should resolve a certain issue (e.g., repair of one or more worker devices 1530 or storage housings). For example, the notification could include text and/or a number message to inform how many issues are to be addressed and/or the severity of the one or more issues. For example, a message such as "Manager-1" may indicate that there is 1 issue to be addressed by a manager (e.g., manager 1540*b*) and a "Team Lead-3" could indicate that 3 issues are to be addressed by team leader 1540*a*. When the one or more issues are resolved, the user (e.g., worker 1540, team lead 1540*a*, and/or manager 1540*b*) may provide an update (e.g., input data) to ARC system 1500, which may be used to update available devices and/or storage housings (e.g., additional worker devices 1530 and/or storage housings may be displayed as available to users).

Further for example at step 1735 (e.g., or any other desired step of process 1700), data transfers (e.g., email notifications) may be sent in the event that a certain condition or conditions are triggered in ARC system 1500. The condition or conditions may configured via ARC Client Portal 1610 and ARC Admin 1615. For example, an email notification may be sent to users of ARC system 1500 each time storage housings 1515, 1520, and/or 1525 are reported to have a technical issue by a user or sensor of ARC system 1500. Also for example, an email notification may be sent to a team lead 1540a or manager 1540b if an employee (e.g., users 1540) has a worker device 1540 that has been checked out for more than 24 hours or any other predetermined amount of time. ARC system 1500 may also update the identification of available devices and/or storage housings at step 1735 (e.g., or any other desired step of process 1700) based on the data transfer (e.g., email notification).

At step 1740, charging station 1505 may dispense one or more devices (e.g., worker devices 1530) based on the identified available devices at steps 1725 and/or 1735 (e.g., by unlocking a door of a given storage housing). In at least some exemplary embodiments, charging station 1505 may dispense one or more devices (e.g., worker device 1530) based on a device type selected via input of the user. Also for example, charging station 1505 may dispense one or more devices (e.g., worker device 1530) based on one or more predetermined algorithms, criteria, and/or user input by unlocking doors of one or more corresponding storage housings (e.g., in which the devices are disposed). For example, charging station 1505 may dispense one or more devices (e.g., worker device 1530) based on a time duration that a device has been charging in the exemplary disclosed storage housing (e.g., locker). The time duration may begin using a timer that begins timing when a device (e.g., worker device 1530) is attached to the exemplary disclosed charging cable and a charge is detected. Charging station 1505 may also dispense one or more devices (e.g., worker device 1530) based on an amount of energy the device has received from the exemplary disclosed charging port of a given storage housing, which may be determined by measuring a current drawn by the device over time. Charging station 1505 may also dispense one or more devices (e.g., worker device 1530) based on a manual user override (e.g., in which an interface in manager tools allows the device to be dispensed immediately). The manual user override may for example be initiated based on a supervisor (e.g., team lead 1540a or manager 1540b) or some other user having sufficient authority validating identity at step 1710. The exemplary disclosed dispensing criteria may be configurable via the ARC Admin 1615 on a client-by-client basis (e.g., depending on a client organization using ARC system 1500), which may allow for appropriate criteria to be set to provide for adequately-charged devices (e.g., worker devices 1530) to be retrieved by users based on ARC system 1500 unlocking a door of a given storage housing in which the device is disposed.

After worker device 1530 is dispensed at step 1740, the user may utilize the device to perform work as desired. When worker device 1530 is to be returned, for example at the end of a user's shift or any other suitable time, process 1700 proceeds to step 1745. At step 1745, the user (e.g., worker 1540, team lead 1540a, or manager 1540b) may validate identity similarly to as described above regarding step 1710.

At step 1750, ARC system 1500 may determine whether or not the user has requested to report an issue with worker device 1530 (e.g., and/or charging station 1505), for example based on the user entering input data to ARC system 1500. If the user has not indicated that an issue is to be reported, process 1700 proceeds to step 1760. If the user has indicated that an issue is to be reported, process 1700 proceeds to step 1755.

At step 1755, the user (e.g., worker 1540, team lead 1540a, or manager 1540b) may report an issue. For example when returning a device, a screen displayed by user interface 1510 or the exemplary disclosed API may prompt the user to report any issues the user has with one or more worker devices 1530 the user was utilizing, charging station 1505, and/or any other issues with ARC system 1500. There can be one, two, or more issue types (e.g., any desired number of issue types) which may be configurable by a client organization using ARC system 1500 (e.g., via ARC Client Portal 1610). Examples of issue may include "WiFi Not Working," "Screen Cracked," "Device Won't Turn On," or any other suitable issue. Each issue may be configured, when selected by a user, to trigger a different response by ARC system 1500. For example, a first given issue may put the exemplary disclosed storage housing (e.g., locker) out of service and notify a manager to handle the issue (e.g., via the exemplary disclosed email notification), a second given issue may put the storage housing out of service for a technician to handle, a third given issue may maintain the storage housing in service until the same issue is reported multiple times (e.g., in a row), a fourth given issue may put one or more worker devices 1530 out of service (e.g., not available), and/or any other suitable issues may be identified.

ARC system 1500 may perform diagnostic logic-driven checks based on collected data and issues reported by users. For example, ARC system 1500 may perform logic-driven checks based on data associated with storage housings 1515, 1520, and 1525 (e.g., based on data associated with a Locker ID), worker devices 1530 (e.g., based on data associated with a Device ID), and users (e.g., based on data associated with a User ID). ARC system 1500 may prompt users to provide input and/or take actions based on the logic-driven checks. For example, if a user reports that a given worker device 1530 has insufficient charge (e.g., even after having charged for a suitable amount of time in charging station 1505), ARC system 1500 may store data of the report. On a first report, ARC system 1500 may take no action, put the affected worker device 1530 out of service to be checked by managers or technicians, put the involve storage housing (e.g., locker) out of service to be checked by managers or technicians, prompt the user to provide additional information, and/or take any other suitable action. If a similar report is given again, ARC system 1500 may identify whether the same worker device, storage housing, and/or user (e.g., reporting user or user who returned the device before the reporting user) is involved based on the Device ID, Locker ID, and User ID. If the same worker device is involved, ARC system 1500 may take the device out of service and indicate to managers and/or technicians that the device should be checked and possibly serviced (e.g., battery may be degraded). If the same storage housing is involved, ARC system 1500 may take the locker out of service and indicate to managers and/or technicians that the locker should be checked and possibly serviced (e.g., a problem may exist with the charging cable). If the same user is involved, ARC system 1500 may provide troubleshooting help or tips to the user regarding charging devices and/or reminders to the user to remember to return and recharge devices.

Also for example at step 1755, ARC system 1500 may determine a time period (e.g., based on user input via ARC Client Portal 1610) for how long a given storage housing (e.g., locker) may be out of service. For example based on user input (e.g., when a button is selected on the user interface or API), the storage housing may remain out of service for a predetermined period of time. The role of the user who may be authorized to address a given issue (e.g., manager, technician, or team lead) may be determined (e.g., via ARC Client Portal 1610) such that certain roles may resolve certain out-of-service storage housings. A pattern may be configured such that a storage housing remains in service when an issue is reported unless that issue has been repeatedly reported up to a predetermined threshold (e.g., based on an operation of ARC Client Portal 1610).

Based on activities and data transfer at step 1755, identification of available worker devices 1530 (e.g., and/or available storage housings) may be updated. For example, process 1700 may return to step 1735 to update available devices and/or storage housings based on updates of step 1755.

At step 1760, ARC system 1500 may determine whether or not to cross-level worker devices 1530 between charging stations 1505, site clusters 1602, and/or locations 1601. If ARC system 1500 determines that worker devices 1530 should be cross-leveled, process 1700 proceeds to step 1765. ARC system 1500 may determine that worker devices 1530 should be cross-leveled based on any suitable criteria and/or algorithm such as, for example, a differential in worker devices 1530 existing between charging stations 1505, a given charging station 1505 having less than a predetermined minimum number of worker devices 1530 or more than a predetermined maximum number of worker devices 1530, a first charging station having more or less worker devices than other charging stations, input provided by a user such as user request for additional worker devices 1530 at a given charging station 1505, and/or any other desired criteria. Also for example, ARC system 1500 may operate to ensure users pick up and return worker devices 1530 to the same (e.g., or different) charging station 1505, site cluster 1602, and/or location 1601.

At step 1765, ARC system 1500 may cross-level worker devices 1530 between charging stations 1505, site clusters 1602, and/or locations 1601 by channeling users into returning a given worker device 1530 to a desired charging station 1505, site cluster 1602, and/or location 1601 by instructing users to return worker device 1530 to a given charging station 1505, site cluster 1602, and/or location 1601 and/or by displaying an error message (e.g., via user interface 1510 and/or the exemplary disclosed API) if a user attempts to return worker device 1530 to an inappropriate charging station 1505, site cluster 1602, and/or location 1601. ARC system 1500 may also control one or more indicators 1555 to emit alert or warning lights and/or audio alarms if a user attempts to return worker device 1530 to an inappropriate charging station 1505, site cluster 1602, and/or location 1601. Management personnel (e.g., team lead 1540a and/or manager 1540b) may also be alerted by data transfer of ARC system 1500 of inappropriate returns of worker devices 1530. ARC System 1500 may thereby operate to maintain a consistent stock of worker devices 1530 at any given charging station 1505, site cluster 1602, and/or location 1601. Desired cross-leveling may for example be configured via an operation of ARC Client Portal 1610 and/or ARC Admin 1615.

In at least some exemplary embodiments, the exemplary disclosed system may block access of users (e.g., workers) to a full charging station 1505 station, which may not include an empty storage housing, when the worker is returning an in-use worker device of the plurality of worker devices. Also for example, the exemplary disclosed system may block access of users (e.g., workers) to an empty charging station 1505, which may lack an available storage housing including an available worker device of the plurality of worker devices, when the worker is retrieving the available worker device. Further for example, the exemplary disclosed system may block access to a full charging station 1505, which may not include an empty upper storage housing, when the worker is returning an in-use worker device of the plurality of worker devices and data of the worker indicates that the worker has input a preference for upper storage housings of the plurality of storage housings. The exemplary disclosed system may also block access to a full charging station 1505, which may not include an empty lower storage housing, when the worker is returning an in-use worker device of the plurality of worker devices and data of the worker indicates that the worker has input a preference for lower storage housings of the plurality of storage housings. The exemplary disclosed system may block access to an empty charging station 1505, which may lack an available upper storage housing including an available worker device of the plurality of worker devices, when the worker is retrieving the available worker device and data of the worker indicates that the worker has input a preference for upper storage housings of the plurality of storage housings. The exemplary disclosed system may also block access to an empty charging station 1505, which may lack an available lower storage housing including an available worker device of the plurality of worker devices, when the worker is retrieving the available worker device and data of the worker indicates that the worker has input a preference for lower storage housings of the plurality of storage housings.

Once a user arrives at an appropriate charging station 1505 or site cluster 1602 determined at step 1760, the user may return one or more worker devices 1530 by validating identity at step 1745 and repeating steps 1750 through 1760 as necessary.

Once cross-leveling is complete or no cross-leveling is identified at step 1760, the user may return worker device 1530 at step 1770. Detection device 1542 (e.g., and/or scanner 1535 and/or the exemplary disclosed location data of worker device 1530) may transfer data indicating that one or more worker devices 1530 have been returned to given storage housings 1515, 1520, and/or 1525. Process 1700 ends at step 1775.

In at least some exemplary embodiments, an ongoing session of a user may be automatically ended based on that user's device (e.g., worker device 1530) that was checked out by that user being returned to charging station 1505 by another user (e.g., any user). As an illustrative example, a first employee checks out a device from charging station 1505 and then mistakenly leaves the device out (e.g., on a shelf). During the next shift, a second employee finds the device and returns it to a charging station. Based on the return of the device, ARC system 1500 may end the first employee's transaction and update the device status as returned.

In at least some exemplary embodiments, ARC system 1500 may reject a badge scan (e.g., to remove additional devices) of a user if that user has already checked out a device or a predetermined number of devices. For example, each user may have a predetermined number of devices (e.g., including type of device) that each user is authorized to remove, which may be recorded in ARC Admin 1615. When the user has exceeded the predetermined number of devices, ARC system 1500 may prevent the user from engaging in additional transactions to remove devices until at least one device has been returned by that user.

In at least some exemplary embodiments, ARC system 1500 may provide for creating a new session when a device to be retrieved is disposed in a locker that has been left open by a previous user. As an illustrative example, a first user (e.g., User A) returns a device but neglects to shut a door (e.g., a locker door) of the exemplary disclosed storage housing. A second user (e.g., User B) may retrieve that device from the open locker, bypassing the exemplary disclosed Pick Up flow (e.g., as described above regarding process 1700). When User B shuts the door, ARC system 1500 may prompt User B for feedback based on the door being closed (e.g., based on a discrepancy existing because the door should have been closed). User B may report (enter input via user interface 1510 or the exemplary disclosed API) that User B is picking up a device. ARC system 1500 may prompt User B to validate identity (e.g., scan User B's Badge or any other suitable validation for example as described above regarding step 1710). After User B has validated identity, ARC system 1500 may reassign User A's device to User B. ARC system 1500 may end User A's session and may begin a new checkout session for User B.

In at least some exemplary embodiments, ARC system 1500 may provide for a manager (e.g., team lead 1540*a* or manager 1540*b*) to end a session. The manager may end a given employee's session (e.g., worker 1540) so that the given employee may check out a second device (e.g., or additional devices), thereby for example overriding a "one device per employee" functionality (e.g., or up to a predetermined number of devices per employee).

In at least some exemplary embodiments, ARC system 1500 may provide warning messages (e.g., via user interface 1510 or the exemplary disclosed API) or alerts (e.g., via indicator 1555) when a user scans an Employee ID instead of a Device ID (e.g., or a Device ID instead of an Employee ID) during steps of process 1700. For example using smart technology (e.g., including machine learning operations), ARC system 1500 may differentiate between different types of scans by users, and may give users feedback onscreen (e.g., via user interface 1510 or the exemplary disclosed API) when the users may have scanned the wrong code.

In at least some exemplary embodiments, ARC system 1500 may provide for a system rescan after a power outage. If power at a venue (e.g., one or more locations 1601) is lost and the charging stations 1505 go offline, managers (e.g., team leads 1540*a* and/or managers 1540*b*) may manually open storage housings (storage housings 1515, 1520, and/or 1525) to distribute worker devices 1530 and/or to return worker devices 1530 to continue work and operations. If there is no power at charging stations 1505, identity validation may be prevented (e.g., an employee ID and badge ID may not be scanned when worker devices 1530 are removed or returned), so actual locker and device statuses at charging station 1505 may become out of sync with the ARC Server 1605. ARC system 1500 (e.g., ARC SmartRescan technology) may detect power loss such as a complete loss of power (e.g., loss of power at the wall and subsequent substantially complete draining of the exemplary disclosed Uninterruptible Power Supply "UPS" of each charging station 1505). Once power is restored, ARC system 1500 may automatically initiate a locker-by-locker rescan (e.g., a rescan of each storage housing 1515, 1520, and 1525) to determine the new status of each locker of charging stations 1505.

As a first illustrative example, power may be lost at one or more charging stations 1505 (e.g., kiosks). A worker 1540 (e.g., Employee A) has a worker device 1530 (e.g., Device 111) checked out for the worker's shift. When Employee A's shift is over, Employee A wishes to return Device 111 to charging station 1505 (e.g., the kiosk). The Manager (e.g., team lead 1540*a* or manager 1540*b*) may assist Employee A by manually opening a locker and placing Device 111 in a storage housing (e.g., Locker #1). Once power is restored, ARC Server 1605 includes data indicating that there is no device in Locker #1. After the exemplary disclosed rescan (e.g., SmartRescan), however, ARC system 1500 may detect a device (e.g., Device 111) in Locker #1. ARC system 1500 may then change the status of Locker #1 from 'Available' to 'Device Present-ID unknown'. This status prompts managers (e.g., the Manager) to take action the next time the Manager logs in to the Manager Tools Menu (e.g., following step 1710). Workflow screens (e.g., SmartRescan workflow screens displayed via user interface 1510 and/or the exemplary disclosed API) may prompt the Manager to open the locker, rescan the device, and close the locker door. The Device ID 111 then becomes known to charging station 1505 (e.g., and ARC system 1500), and assigned to Locker #1. Employee A's return of the device is credited so that Employee A is able to check out devices on Employee A's next shift. ARC system 1500 may update an identification of available devices and lockers for example as described above in process 1700.

As a second illustrative example, power may be lost at one or more charging stations 1505 (e.g., kiosks). A worker 1540 (e.g., Employee B) may report to location 1601 for work involving a device. The Manager (e.g., team lead 1540*a* or manager 1540*b*) may manually open an exemplary disclosed storage housing (e.g., Locker #5) and may give Employee B a device disposed in Locker #5. Employee B's Badge ID may be unknown (e.g., unknown to ARC system 1500 because step 1710 has not occurred). Power may be restored before Employee B finishes the employee's shift. Employee B may return to charging station 1505 (e.g., the kiosk), and perform identity validation (e.g., as described above regarding step 1710). For example, Employee B may scan the employee's Badge ID, scan the Device ID (e.g., 222) of the device that was issued during the power outage, and place the device in Locker #7. Although ARC system 1500 had not received an update that Employee B had an ongoing transaction because of the power outage, ARC system 1500 may accept the return of the device. Accordingly, Employee B may be credited with the return and may be able to pick up a device on Employee B's next shift. ARC system 1500 may record data indicating that Device 222 is now disposed in Locker #7. ARC system 1500 may update an identification of available devices and lockers for example as described above in process 1700.

In at least some exemplary embodiments, ARC system 1500 may operate in an offline mode. Under normal conditions, ARC system 1500 may utilize connectivity between charging stations 1505 and ARC Server 1605 for data transfer. However, ARC system 1500 may operate resiliently when connectivity is lost so that operations are not interrupted. When one or more charging stations 1505 (e.g., ARC kiosks) at a given location 1601 lose connectivity, ARC system 1500 may automatically switch into an offline mode for some or all charging stations 1505 at one or more locations 1601 and/or site clusters 1602. During this time operating in the offline mode, offline charging stations 1505 may utilize local caching to record transaction events (e.g., removal and return of worker devices 1530). Some or substantially all conditions preventing removal and return of worker devices 1530 may be removed so that users may have continuous access to worker devices 1530. When connectivity is restored and transfer of data resumes between charging stations 1505 and ARC Server 1605, the cached transaction events may be transferred to ARC Server 1605 so that ARC system 1500 may update statuses of devices and lockers. This may allow AC system 1500 to utilize an intelligent way of matching (e.g., or rematching) transactions so that reporting is up-to-date and accurate. ARC system 1500 may also automatically initiate a locker-by-locker rescan (e.g., a rescan of each storage housing 1515, 1520, and 1525) for example as described above.

In at least some exemplary embodiments, ARC system 1500 may record and store (e.g., capture) a significant amount of operational data during an operation of ARC system 1500, which may be analyzed (e.g., transformed) into meaningful reporting and analytics for various internal and external audiences. Machine learning operations may be used in analyzing the data. The reporting and analytics may include for example analysis and reporting of life-time data about users and their interactions with kiosks, tracking and ranking levels of user compliance with kiosk procedures, analysis and reporting of life-time data about devices (e.g., worker devices 1530) dispensed by the kiosk including usage stats and device issues, analysis and reporting of operational data at charging station 1505 (e.g., the kiosk), site cluster 1602, location 1601, and brand level to monitor fleet health and performance metrics, and/or any other suitable analysis and reporting.

In at least some exemplary embodiments, ARC system 1500 may provide visual and/or audio output to users (e.g., via user interface 1510 and/or the exemplary disclosed API). For example in addition to messaging on the exemplary disclosed touchscreens, ARC system 1500 may emit audio indicators at various points in the flow (e.g., flow of process 1700) to encourage proper user behavior (for example, emitting positive or encouraging audio sounds when successfully connecting a device to a charging cable of charging station 1505). These audio indicators may positively reinforce appropriate user activity at the kiosk. Similarly, ARC system 1500 may utilize audio indicators when ARC system 1500 detects an irregularity or unsuitable operation. The audio indicators may alert the user to rectify an issue or to provide diagnostic feedback.

In at least some exemplary embodiments, managers and technicians maintain charging stations 1505 (e.g., the kiosks) in good working order, for example by resolving issues with storage housing 1515, 1520, and 1525 (e.g., lockers) that may have an Out of Service status recorded by ARC system 1500. ARC System 1500 may use predefined workflows in various "Tools Menus" (e.g., Manager Tools accessed by managers and Tech Tools accessed by technicians) to address locker issues in a logical and orderly manner (e.g., as part of process 1700). The workflows may provide for the lockers to be appropriately addressed according to operational procedures, with issues being suitably resolved or escalated.

In at least some exemplary embodiments, the exemplary disclosed system may be a system for charging a plurality of worker devices for use by a plurality of users, comprising one or more charging stations, each charging station including a plurality of storage housings, one or more detection devices, and an identification device, and a controller. The controller may be configured to selectively lock and unlock the plurality of worker devices in the plurality of storage housings of the one or more charging stations, electrically charge the plurality of worker devices when locked in the plurality of storage housings of the one or more charging stations, and validate an identity of the plurality of users with the identification device of the one or more charging stations when the plurality of users removes or returns the plurality of worker devices to the plurality of storage housings of the one or more charging stations. The controller may also be configured to detect a presence of the plurality of worker devices in the plurality of storage housings using the one or more detection devices of the one or more charging stations, update data of the plurality of worker devices or the plurality of storage housings based on data transferred from the identification device and the one or more detection devices of the one or more charging stations, and identify available worker devices of the plurality of worker devices or available storage housings of the plurality of storage housings to the plurality of users based on the data of the plurality of worker devices or the plurality of storage housings. Each of the plurality of storage housings of the one or more charging stations may include a plurality of light indicators configured to indicate whether or not the available worker devices are disposed in each of the plurality of storage housings of the one or more charging stations. Each of the plurality of storage housings of the one or more charging stations includes a plurality of upper lockers and a plurality of lower lockers, and the controller may be configured to identify the available worker devices based on whether the plurality of users specify the plurality of upper lockers or the plurality of lower lockers.

In at least some exemplary embodiments, the exemplary disclosed method may include providing a plurality of worker devices for use by a plurality of users, providing one or more charging stations, each charging station including a plurality of storage housings, selectively locking and unlocking the plurality of worker devices in the plurality of storage housings of the one or more charging stations, and electrically charging the plurality of worker devices when locked in the plurality of storage housings of the one or more charging stations. The exemplary disclosed method may also include validating an identity of the plurality of users when the plurality of users removes or returns the plurality of worker devices to the plurality of storage housings of the one or more charging stations, detecting a presence of the plurality of worker devices in the plurality of storage housings of the one or more charging stations, updating data of the plurality of worker devices or the plurality of storage housings based on data transferred from the one or more charging stations, and identifying available worker devices of the plurality of worker devices or available storage housings of the plurality of storage housings to the plurality of users based on the data of the plurality of worker devices or the plurality of storage housings. Each charging station may include one or more detection devices and an identification device, validating the identity of the plurality of users includes using the identification device of the one or more charging stations, and detecting the presence of the plurality of worker devices in the plurality of storage housings includes using the one or more detection devices of the one or more charging stations. The exemplary disclosed method may further include indicating some of the available worker devices or the available storage housings as unavailable based on the plurality of users reporting multiple errors involving at least one of a single worker device of the plurality of worker devices, a single storage housing of the plurality of storage housings, or a single user of the plurality of users. The plurality of users may be a plurality of workers working at a location including the one or more charging stations that are grouped into a plurality of site clusters at the location, the plurality of worker devices being removed from and returned to the one or more charging stations by the plurality of workers during working hours of the plurality of workers at the location. The exemplary disclosed method may also include directing a worker of the plurality of users to return a first device of the plurality of worker devices to a second station of the one or more charging stations that is different from a first station of the one or more charging stations from which the worker removed the first device. The exemplary disclosed method may further include blocking access of a worker of the plurality of users to at least one of a full station of the one or more charging stations, which does not include an empty storage housing, when the worker is returning an in-use worker device of the plurality of worker devices, or an empty station of the one or more charging stations, which lacks an available storage housing including an available worker device of the plurality of worker devices, when the worker is retrieving the available worker device. The exemplary disclosed method may also include blocking access of a worker of the plurality of users to at least one of: a full station of the one or more charging stations, which does not include an empty upper storage housing, when the worker is returning an in-use worker device of the plurality of worker devices and data of the worker indicates that the worker has input a preference for upper storage housings of the plurality of storage housings, a full station of the one or more charging stations, which does not include an empty lower storage housing, when the worker is returning an in-use worker device of the plurality of worker devices and data of the worker indicates that the worker has input a preference for lower storage housings of the plurality of storage housings, an empty station of the one or more charging stations, which lacks an available upper storage housing including an available worker device of the plurality of worker devices, when the worker is retrieving the available worker device and data of the worker indicates that the worker has input a preference for upper storage housings of the plurality of storage housings, or an empty station of the one or more charging stations, which lacks an available lower storage housing including an available worker device of the plurality of worker devices, when the worker is retrieving the available worker device and data of the worker indicates that the worker has input a preference for lower storage housings of the plurality of storage housings. Instructing the worker to return the first device to the second station may be based on a first amount of the plurality of worker devices locked in the first station being greater than a first predetermined amount, a second amount of the plurality of worker devices locked in the second station being less than a second predetermined amount, or the first amount being greater than the second amount. The exemplary disclosed method may further include detecting the presence or absence of the plurality of worker devices in all of the plurality of storage housings using the one or more detection devices of the one or more charging stations when power is restored to the one or more charging stations following a power outage. The exemplary disclosed method may further include locally caching data of the presence or absence of the plurality of worker devices in the plurality of storage housings at a first station of the one or more charging stations when the first station is in an offline mode and not connected to a network, and transferring the locally cached data from the first station to the network when connectivity is restored between the first station and the network. The exemplary disclosed method may also include updating the data of the plurality of worker devices or the plurality of storage housings and identifying the available worker devices or the available storage housings based on receiving data of the plurality of users or the plurality of worker devices from an external database. The exemplary disclosed method may further include unlocking a door of a first housing of the plurality of storage housings based on at least one selected from the group of a time duration that a first device of the plurality of worker devices has been charging in the first housing, an amount of energy that the first device has received from a charging port of the first housing, an amount of charge available to the first device, an amount of use time available to the first device, and combinations thereof. The exemplary disclosed method may also include unlocking a door of a first housing of the plurality of storage housings of some or all of the one or more charging stations based on one or more users having a greater level of access than workers of the plurality of users entering input data to a user interface of the first station. Validating the identity of the plurality of users may include displaying a plurality of screens to a first-time user of the plurality of users when the first-time user scans identification for the first time at the identification device of one of the one or more charging stations, the screens selected from the group of one or more onboarding screens, one or more instructional screens, one or more opt-in screens for terms of use, one or more preference setting screens, and combinations thereof. The exemplary disclosed method may further include receiving input at a user interface of one of the one or more charging stations by a manager of a first-time user of the plurality of users, the input including at least one of updating the data of the plurality of worker devices or the plurality of storage housings with access for the first-time user to remove a device of the plurality of worker devices, or activating a first-time device of the plurality of worker devices, the first-time device activation being input for the first time. The data of the plurality of worker devices or the plurality of storage housings may include an amount and a type of the plurality of worker devices that each of the plurality of users is authorized to use and which of the plurality of storage housings that each of the plurality of users is authorized to unlock based on a working role of each of the plurality of users.

In at least some exemplary embodiments, the exemplary disclosed method may include providing a plurality of worker devices for use by a plurality of users, providing one or more charging stations, each charging station including a plurality of storage housings, one or more detection devices, and an identification device, selectively locking and unlocking the plurality of worker devices in the plurality of storage housings of the one or more charging stations, and electrically charging the plurality of worker devices when locked in the plurality of storage housings of the one or more charging stations. The exemplary disclosed method may further include validating an identity of the plurality of users with the identification device of the one or more charging stations when the plurality of users removes or returns the plurality of worker devices to the plurality of storage housings of the one or more charging stations, detecting a presence of the plurality of worker devices in the plurality of storage housings using the one or more detection devices of the one or more charging stations, updating data of the plurality of worker devices or the plurality of storage housings based on data transferred from the identification device and the one or more detection devices of the one or more charging stations, and identifying available worker devices of the plurality of worker devices or available storage housings of the plurality of storage housings to the plurality of users based on the data of the plurality of worker devices or the plurality of storage housings. The exemplary disclosed method may also include instructing a worker of the plurality of users to return a first device of the plurality of worker devices to a second site cluster of the one or more charging stations that is different from a first site cluster of the one or more charging stations from which the worker removed the first device, wherein the plurality of users is a plurality of workers working at a location including the one or more charging stations that are grouped into the first site cluster and the second site cluster that is located away from the first site cluster or that accepts different types of the plurality of worker devices than the first site cluster. The exemplary disclosed method may further include blocking access of a worker of the plurality of users to at least one of a full station of the one or more charging stations, which does not include an empty storage housing, when the worker is returning an in-use worker device of the plurality of worker devices, or an empty station of the one or more charging stations, which lacks an available storage housing including an available worker device of the plurality of worker devices, when the worker is retrieving the available worker device.

In at least some exemplary disclosed embodiments, the exemplary disclosed method may include providing a door that selectively opens to allow access to a cavity and selectively closes to block access to the cavity, using a lock to selectively lock and unlock the door when the door is closed, electrically charging a user device in the cavity when the door is closed and locked, unlocking the door based on a first input provided by a first user, the first user removing the user device, electrically charging the user device in the cavity when the door is closed and locked after the first user returns the user device, and unlocking the door based on a second input provided by a second user, the second user removing the user device. The user device may be a worker device, the first user may be a first worker, and the second user may be a second worker. The first user and the second user may be employees or contractors working at a location at which the cavity is disposed, and the user device may be a worker device controlled by an employer of the employees or contractors. The first input may be provided by via a first object of the first user being scanned by a scanner, and the second input may be provided by via a second object of the second user being scanned by the scanner. The first object may include a first unique code that is scanned by the scanner, which may be different from a second unique code of the second object that is scanned by the scanner. The method may also include controlling a detection device to image the first user removing the user device, the first user returning the user device, and the second user removing the user device. The method may further include detecting whether or not a charging device configured to electrically charge the user device is on battery backup power, and preventing both locking of the door and electrically charging the user device when the charging device is on battery backup power. The method may additionally include detecting if the door is locked when the door is open, and preventing electrical charging of the user device when the door is locked when the door is open.

In at least some exemplary disclosed embodiments, the exemplary disclosed system for charging at least one user device may include at least one cavity including a door, which selectively opens to allow access to the cavity and selectively closes to block access to the cavity, a lock configured to selectively lock and unlock the door when the door is closed, an electrical charger configured to charge the at least one user device, and an ultraviolet lighting device, and a controller. The controller may be configured to control the electrical charger to electrically charge the at least one user device in the at least one cavity when the door is closed and locked, control the lock to unlock the door based on a first input provided by a first user before the first user removes the at least one user device, control the electrical charger to electrically charge the at least one user device in the at least one cavity when the door is closed and locked after the first user returns the at least one user device, and control the lock to unlock the door based on a second input provided by a second user before the second user removes the at least one user device. The first user may be a first worker, the second user may be a second worker, and the at least one user device may be a worker device controlled by an employer of the first worker and the second worker. The ultraviolet lighting device may be a UV-C lighting device that emits UV-C light in the at least one cavity when the door is closed and locked and the at least one user device is being electrically charged. The system may also include a dispensing cavity, and a transfer assembly configured to move the at least one user device between the at least one cavity and the dispensing cavity. The at least one cavity may include a plurality of cavities, and the at least one user device may include a plurality of user devices. The controller may be configured to control the lock to unlock the door of one of the plurality of cavities that is charging one of the plurality of user devices that is at least one selected from the group of a user device having a highest amount of charge of the plurality of user devices, a user device having been charged for the longest period of time of the plurality of user devices, a user device being the newest user device of the plurality of user devices, and combinations thereof. The system may additionally include a controller board that is attachable to the controller. The controller board may be configured to vary the charging level of the plurality of user devices disposed in the plurality of cavities independently of each other. The system may also include a detection device configured to detect whether the door is locked when the door is open, wherein the detection device is at least one selected from the group of a plunger, a magnet, a motion sensor, a weight sensor, a camera (e.g., a photo camera and/or a video camera), and combinations thereof.

In at least some exemplary disclosed embodiments, the exemplary disclosed system for charging at least one user device may include at least one cavity including a door, which selectively opens to allow access to the cavity and selectively closes to block access to the cavity, a lock configured to selectively lock and unlock the door when the door is closed, and an electrical charger configured to charge the at least one user device, a controller, and at least one base station configured to transmit power wirelessly to at least one selected from the group of the at least one user device, the lock, the electrical charger, the controller, and combinations thereof. The controller may be configured to control the electrical charger to electrically charge the at least one user device in the at least one cavity when the door is closed and locked, control the lock to unlock the door based on a first input provided by a first user before the first user removes the at least one user device, control the electrical charger to electrically charge the at least one user device in the at least one cavity when the door is closed and locked after the first user returns the at least one user device, and control the lock to unlock the door based on a second input provided by a second user before the second user removes the at least one user device. The controller may be configured to control the exemplary disclosed lighting devices (e.g., LEDs) by turning the lighting devices on/off and/or by changing the colors of the lighting devices.

The at least one user device may be a receiver adapter configured to attach to a mobile device and transfer power received from the at least one base station to the mobile device. The at least one cavity may be a plurality of cavities and the at least one user device is a plurality of receiver adapters. The controller may be configured to control the lock to unlock the door of one of the plurality of cavities securing one of the plurality of receiver adapters that is compatible with a mobile device described by mobile-device-type data inputted by the first or second user.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A system for charging a plurality of worker devices for use by a plurality of users, comprising:
    one or more charging stations, each charging station including,
        a plurality of storage housings, wherein each of the plurality of storage housings of the one or more charging stations includes a plurality of upper lockers and a plurality of lower lockers,
        one or more detection devices, and
        an identification device; and
    a controller, wherein the controller is configured to;
        selectively lock and unlock the plurality of worker devices in the plurality of storage housings of the one or more charging stations;
        electrically charge the plurality of worker devices when locked in the plurality of storage housings of the one or more charging stations;
        validate an identity of the plurality of users with the identification device of the one or more charging stations when the plurality of users removes or returns the plurality of worker devices to the plurality of storage housings of the one or more charging stations;
        detect a presence of the plurality of worker devices in the plurality of storage housings using the one or more detection devices of the one or more charging stations;
        update data of the plurality of worker devices or the plurality of storage housings based on data transferred from the identification device and the one or more detection devices of the one or more charging stations;
        identify available worker devices of the plurality of worker devices or available storage housings of the plurality of storage housings to the plurality of users based on the data of the plurality of worker devices or the plurality of storage housings; and
        identify the available worker devices based on whether the plurality of users specify the plurality of upper lockers or the plurality of lower lockers.

2. The system of claim 1, wherein each of the plurality of storage housings of the one or more charging stations includes a plurality of light indicators configured to indicate whether or not the available worker devices are disposed in each of the plurality of storage housings of the one or more charging stations.

3. A method, comprising:
    providing a plurality of worker devices for use by a plurality of users;
    providing one or more charging stations, each charging station including a plurality of storage housings;
    selectively locking and unlocking the plurality of worker devices in the plurality of storage housings of the one or more charging stations;
    electrically charging the plurality of worker devices when locked in the plurality of storage housings of the one or more charging stations;
    validating an identity of the plurality of users when the plurality of users removes or returns the plurality of worker devices to the plurality of storage housings of the one or more charging stations;
    detecting a presence of the plurality of worker devices in the plurality of storage housings of the one or more charging stations;
    updating data of the plurality of worker devices or the plurality of storage housings based on data transferred from the one or more charging stations;
    identifying available worker devices of the plurality of worker devices or available storage housings of the plurality of storage housings to the plurality of users based on the data of the plurality of worker devices or the plurality of storage housings;
    locally caching device transaction event data for the plurality of worker devices in the plurality of storage housings at a first station of the one or more charging stations when the first station is in an offline mode and not connected to a network, wherein the device transaction event data includes a present or absent status for one or more of the plurality of worker devices of the first station; and
    transferring the device transaction event data from the first station to the network when connectivity is restored between the first station and the network.

4. The method of claim 3, wherein each charging station includes one or more detection devices and an identification device, validating the identity of the plurality of users includes using the identification device of the one or more charging stations, and detecting the presence of the plurality of worker devices in the plurality of storage housings includes using the one or more detection devices of the one or more charging stations.

5. The method of claim 3, further comprising indicating some of the available worker devices or the available storage housings as unavailable based on the plurality of users reporting multiple errors involving at least one of a single worker device of the plurality of worker devices, a single storage housing of the plurality of storage housings, or a single user of the plurality of users.

6. The method of claim 3, wherein the plurality of users is a plurality of workers working at a location including the one or more charging stations that are grouped into a plurality of site clusters at the location, the plurality of worker devices being removed from and returned to the one or more charging stations by the plurality of workers during working hours of the plurality of workers at the location.

7. The method of claim 3, further comprising directing a worker of the plurality of users to return a first device of the plurality of worker devices to a second station of the one or more charging stations that is different from a first station of the one or more charging stations from which the worker removed the first device.

8. The method of claim 7, wherein instructing the worker to return the first device to the second station is based on a first amount of the plurality of worker devices locked in the first station being greater than a first predetermined amount, a second amount of the plurality of worker devices locked in the second station being less than a second predetermined amount, or the first amount being greater than the second amount.

9. The method of claim 3, further comprising blocking access of a worker of the plurality of users to at least one of:
a full station of the one or more charging stations, which does not include an empty storage housing, when the worker is returning an in-use worker device of the plurality of worker devices; or
an empty station of the one or more charging stations, which lacks an available storage housing including an available worker device of the plurality of worker devices, when the worker is retrieving the available worker device.

10. The method of claim 3, further comprising blocking access of a worker of the plurality of users to at least one of:
a full station of the one or more charging stations, which does not include an empty upper storage housing, when the worker is returning an in-use worker device of the plurality of worker devices and data of the worker indicates that the worker has input a preference for upper storage housings of the plurality of storage housings;
a full station of the one or more charging stations, which does not include an empty lower storage housing, when the worker is returning an in-use worker device of the plurality of worker devices and data of the worker indicates that the worker has input a preference for lower storage housings of the plurality of storage housings;
an empty station of the one or more charging stations, which lacks an available upper storage housing including an available worker device of the plurality of worker devices, when the worker is retrieving the available worker device and data of the worker indicates that the worker has input a preference for upper storage housings of the plurality of storage housings; or
an empty station of the one or more charging stations, which lacks an available lower storage housing including an available worker device of the plurality of worker devices, when the worker is retrieving the available worker device and data of the worker indicates that the worker has input a preference for lower storage housings of the plurality of storage housings.

11. The method of claim 3, further comprising detecting the presence or absence of the plurality of worker devices in all of the plurality of storage housings using the one or more detection devices of the one or more charging stations when power is restored to the one or more charging stations following a power outage.

12. The method of claim 3, further comprising updating the data of the plurality of worker devices or the plurality of storage housings and identifying the available worker devices or the available storage housings based on receiving data of the plurality of users or the plurality of worker devices from an external database.

13. The method of claim 3, further comprising unlocking a door of a first housing of the plurality of storage housings based on at least one selected from the group of a time duration that a first device of the plurality of worker devices has been charging in the first housing, an amount of energy that the first device has received from a charging port of the first housing, an amount of charge available to the first device, an amount of use time available to the first device, and combinations thereof.

14. The method of claim 3, further comprising unlocking a door of a first housing of the plurality of storage housings of some or all of the one or more charging stations based on one or more users having a greater level of access than workers of the plurality of users entering input data to a user interface of the first station.

15. The method of claim 3, wherein validating the identity of the plurality of users includes displaying a plurality of screens to a first-time user of the plurality of users when the first-time user scans identification for the first time at the identification device of one of the one or more charging stations, the screens selected from the group of one or more onboarding screens, one or more instructional screens, one or more opt-in screens for terms of use, one or more preference setting screens, and combinations thereof.

16. The method of claim 15, further comprising receiving input at a user interface of one of the one or more charging stations by a manager of a first-time user of the plurality of users, the input including at least one of:
updating the data of the plurality of worker devices or the plurality of storage housings with access for the first-time user to remove a device of the plurality of worker devices; or
activating a first-time device of the plurality of worker devices, the first-time device activation being input for the first time.

17. The method of claim 15, wherein the data of the plurality of worker devices or the plurality of storage housings includes an amount and a type of the plurality of worker devices that each of the plurality of users is authorized to use and which of the plurality of storage housings that each of the plurality of users is authorized to unlock based on a working role of each of the plurality of users.

18. A method, comprising:
providing a plurality of worker devices for use by a plurality of users;
providing one or more charging stations, each charging station including a plurality of storage housings, one or more detection devices, and an identification device;
selectively locking and unlocking the plurality of worker devices in the plurality of storage housings of the one or more charging stations;
electrically charging the plurality of worker devices when locked in the plurality of storage housings of the one or more charging stations;
validating an identity of the plurality of users with the identification device of the one or more charging stations when the plurality of users removes or returns the plurality of worker devices to the plurality of storage housings of the one or more charging stations;
detecting a presence of the plurality of worker devices in the plurality of storage housings using the one or more detection devices of the one or more charging stations;
updating data of the plurality of worker devices or the plurality of storage housings based on data transferred from the identification device and the one or more detection devices of the one or more charging stations;
identifying available worker devices of the plurality of worker devices or available storage housings of the plurality of storage housings to the plurality of users based on the data of the plurality of worker devices or the plurality of storage housings; and
instructing a worker of the plurality of users to return a first device of the plurality of worker devices to a second site cluster of the one or more charging stations that is different from a first site cluster of the one or more charging stations from which the worker removed the first device;

wherein the plurality of users is a plurality of workers working at a location including the one or more charging stations that are grouped into the first site cluster and the second site cluster that is located away from the first site cluster or that accepts different types of the plurality of worker devices than the first site cluster.

19. The method of claim 18, further comprising blocking access of a worker of the plurality of users to at least one of:
a full station of the one or more charging stations, which does not include an empty storage housing, when the worker is returning an in-use worker device of the plurality of worker devices; or
an empty station of the one or more charging stations, which lacks an available storage housing including an available worker device of the plurality of worker devices, when the worker is retrieving the available worker device.

\* \* \* \* \*

UNITED STATES PATENT AND TRADEMARK OFFICE
CERTIFICATE OF CORRECTION

PATENT NO. : 12,322,986 B2
APPLICATION NO. : 17/675136
DATED : June 3, 2025
INVENTOR(S) : Douglas Baldasare et al.

Page 1 of 1

It is certified that error appears in the above-identified patent and that said Letters Patent is hereby corrected as shown below:

On the Title Page

In item (60) the Related U.S. Application Data section:
Application No. 61/732,732, should be replaced with Application No. 61/732,731.

Signed and Sealed this
Twelfth Day of August, 2025

Coke Morgan Stewart
*Acting Director of the United States Patent and Trademark Office*